(12) United States Patent
Hu et al.

(10) Patent No.: US 11,947,180 B2
(45) Date of Patent: Apr. 2, 2024

(54) OPTICAL SYSTEM

(71) Applicant: TDK TAIWAN CORP., Taoyuan (TW)

(72) Inventors: Chao-Chang Hu, Taoyuan (TW); Chen-Hsien Fan, Taoyuan (TW); Yueh-Lin Lee, Taoyuan (TW); Yu-Chiao Lo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 342 days.

(21) Appl. No.: 17/134,024

(22) Filed: Dec. 24, 2020

(65) Prior Publication Data
US 2021/0199912 A1 Jul. 1, 2021

Related U.S. Application Data

(60) Provisional application No. 63/050,503, filed on Jul. 10, 2020, provisional application No. 62/972,259, filed on Feb. 10, 2020, provisional application No. 62/964,377, filed on Jan. 22, 2020, provisional application No. 62/953,773, filed on Dec. 26, 2019.

(51) Int. Cl.
*G02B 7/02* (2021.01)
*G02B 7/20* (2021.01)

(52) U.S. Cl.
CPC .............. *G02B 7/021* (2013.01); *G02B 7/025* (2013.01); *G02B 7/20* (2013.01)

(58) Field of Classification Search
CPC ...... G02B 27/646; G02B 7/021; G02B 7/025; G02B 7/08; G02B 7/20
See application file for complete search history.

(56) References Cited

U.S. PATENT DOCUMENTS

| 2006/0017815 | A1 | 1/2006 | Stavely et al. |
| 2007/0066093 | A1* | 3/2007 | Saugier ............ H01L 27/14618 439/70 |
| 2009/0052037 | A1 | 2/2009 | Wernersson |

(Continued)

FOREIGN PATENT DOCUMENTS

| CN | 110007543 A | 7/2019 |
| CN | 211698336 U | 10/2020 |

(Continued)

OTHER PUBLICATIONS

Office Action dated Jun. 23, 2021 in CN Application No. 202023174992, 2 pages.

(Continued)

*Primary Examiner* — Joseph P Martinez
*Assistant Examiner* — Vipin Patel
(74) *Attorney, Agent, or Firm* — MUNCY, GEISSLER, OLDS & LOWE, PC

(57) ABSTRACT

An optical system is provided. The optical system includes a first movable portion, a fixed portion, a first driving assembly, and a first sensing assembly. The first movable portion is used for connecting to an optical assembly having a main axis. The first movable portion is movable relative to the fixed portion. The first driving assembly is used for driving the first movable portion to move relative to the fixed portion. The first sensing assembly is used for sensing the movement of the first movable portion relative to the fixed portion.

19 Claims, 121 Drawing Sheets

(56) References Cited

U.S. PATENT DOCUMENTS

| | | | |
|---|---|---|---|
| 2011/0050922 A1 | 3/2011 | Chiu | |
| 2011/0286732 A1* | 11/2011 | Hosokawa | G03B 17/12 396/55 |
| 2012/0314307 A1* | 12/2012 | Ikushima | G02B 7/08 359/814 |
| 2017/0003517 A1 | 1/2017 | Sue et al. | |
| 2018/0284476 A1 | 10/2018 | Minamisawa | |
| 2019/0278101 A1 | 9/2019 | Minamisawa | |

FOREIGN PATENT DOCUMENTS

| | | | |
|---|---|---|---|
| EP | 3 555 470 A1 | 10/2019 | |
| WO | WO-2017072525 A1 * | 5/2017 | F03G 7/0614 |
| WO | WO2017084090 | 5/2017 | |
| WO | WO2019037160 A1 | 2/2019 | |
| WO | WO2019221038 A1 | 11/2019 | |

OTHER PUBLICATIONS

European Search Report dated May 27, 2021 in Application No. 20217380.3; pp. 1-12.
European Search Report dated Jun. 9, 2023 in EP Application No. 20217380.3, 6 pages.
An Office Action and Search Report in corresponding CN Application No. 202011563252.7 dated Apr. 22, 2023 is attached, 3 pages and 2 pages respectively.

* cited by examiner

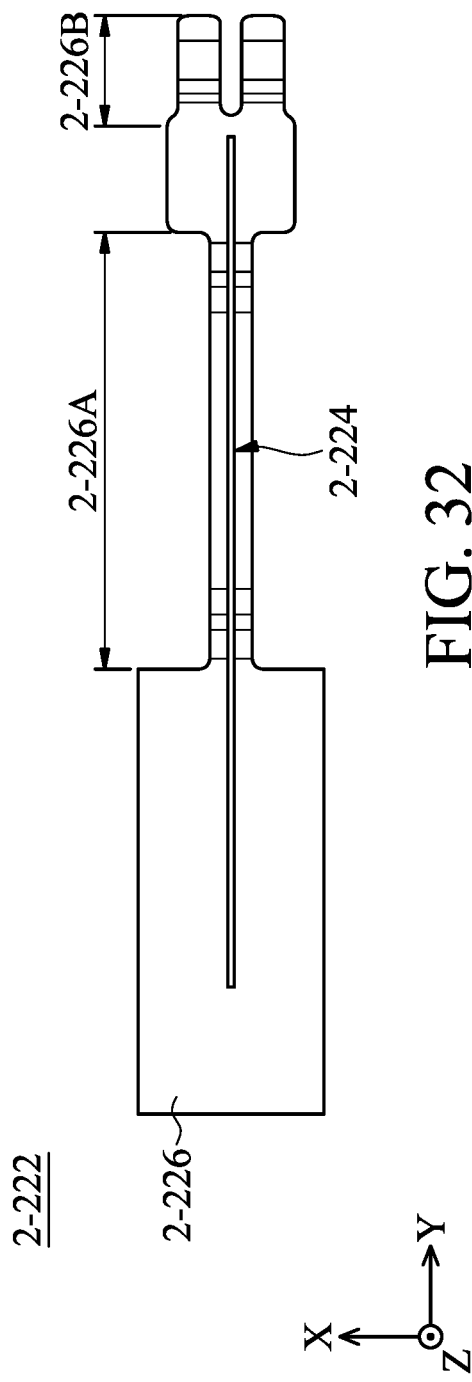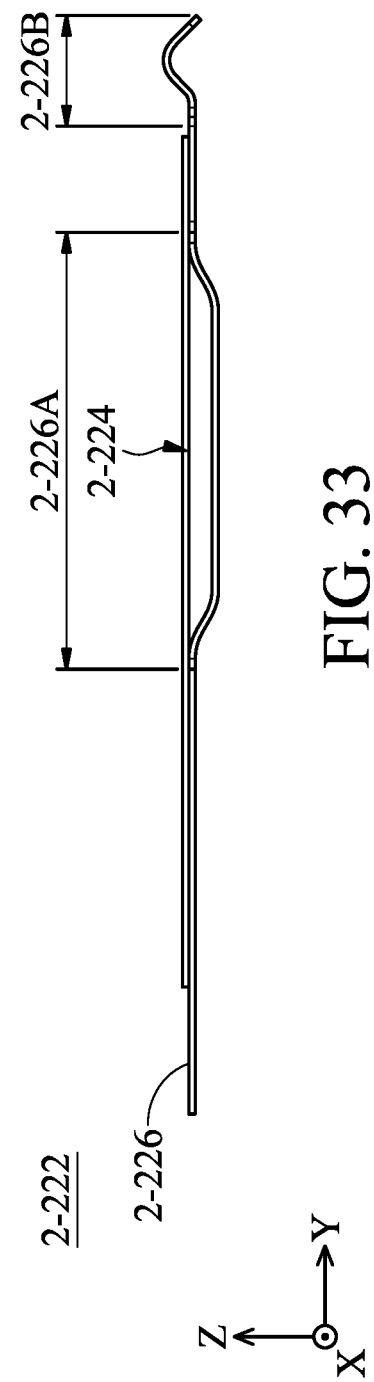
FIG. 32
FIG. 33

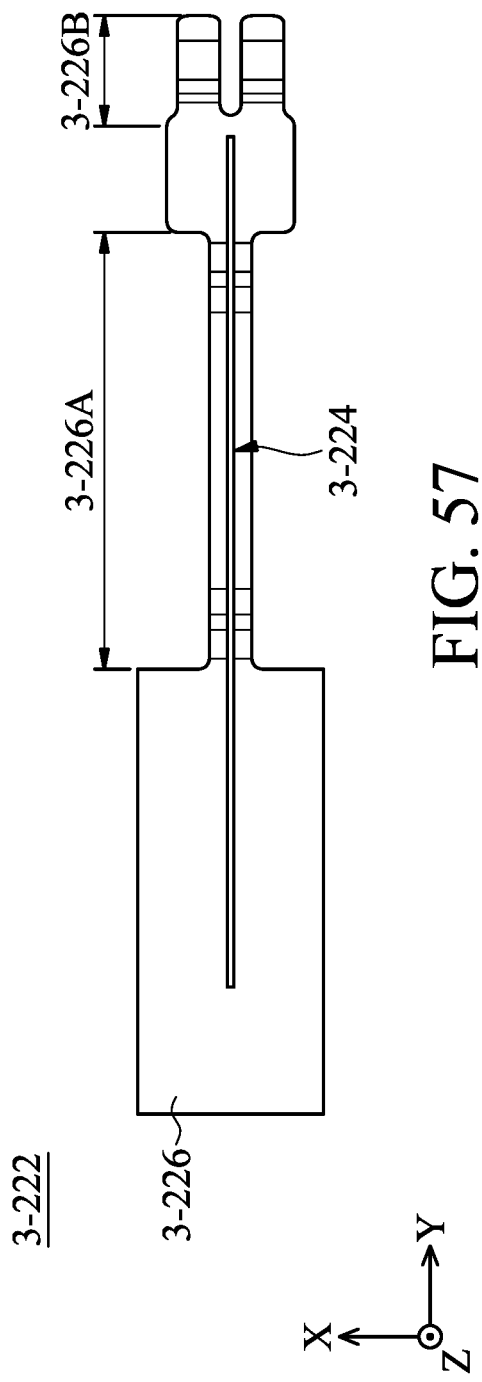
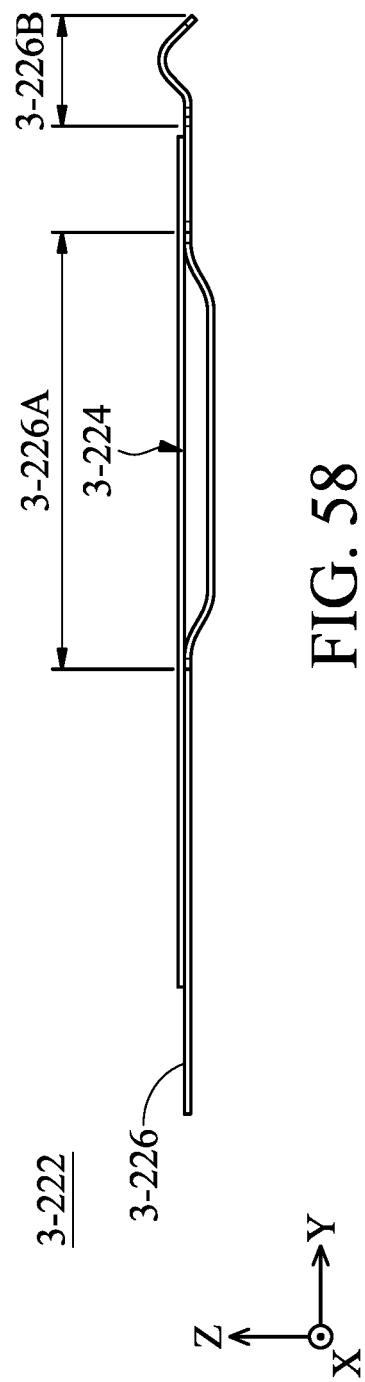
FIG. 57
FIG. 58

OPTICAL SYSTEM

CROSS REFERENCE TO RELATED APPLICATIONS

This application claims the benefit of U.S. Provisional Application No. 62/953,773, filed on Dec. 26, 2019, No. 62/964,377, filed on Jan. 22, 2020, No. 62/972,259, filed on Feb. 10, 2020, and No. 63/050,503, filed on Jul. 10, 2020, the entirety of which are incorporated by reference herein.

BACKGROUND OF THE DISCLOSURE

Field of the Disclosure

The present disclosure relates to an optical system.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

An optical system is provided in some embodiments of the present disclosure. The optical system includes a first movable portion, a fixed portion, a first driving assembly, and a first sensing assembly. The first movable portion is used for connecting to an optical assembly having a main axis. The first movable portion is movable relative to the fixed portion. The first driving assembly is used for driving the first movable portion to move relative to the fixed portion. The first sensing assembly is used for sensing the movement of the first movable portion relative to the fixed portion.

In some embodiments, the optical system further includes a connecting module. The movable portion is movably connected to the fixed portion through the connecting module. The connecting module includes a first movable portion connecting portion affixed on the movable portion, and a second fixed portion connecting portion affixed on the fixed portion; and a first resilient portion. The first movable portion connecting portion is movably connected to the second fixed portion connecting portion through the first resilient portion. An elastic modulus of the first movable portion connecting portion relative to the first fixed portion connecting portion in a first direction is different from an elastic modulus of the first movable portion connecting portion relative to the first fixed portion connecting portion in a second direction. The first direction and the second direction are not parallel. An elastic modulus of the first movable portion connecting portion relative to the first fixed portion connecting portion when rotating relative to a rotational axis extending in the first direction is different from an elastic modulus of the first movable portion connecting portion relative to the first fixed portion connecting portion when rotating relative to a rotational axis extending in the second direction. The first movable portion connection portion includes a heat spreader.

In some embodiments, the elastic modulus of the first movable portion portion relative to the first fixed portion connecting portion in the first direction is less than the elastic modulus of the first movable portion connecting portion relative to the first fixed portion connecting portion in the second direction. The first direction and the second direction are perpendicular. The elastic modulus of the first movable portion connecting portion relative to the first fixed portion connecting portion when rotating relative to the rotational axis extending in the first direction is higher than the elastic modulus of the first movable portion connecting portion relative to the first fixed portion connecting portion when rotating relative to the rotational axis extending in the second direction. The heat spreader includes a heat sink.

In some embodiments, the optical system further includes a first circuit assembly electrically connected to the optical assembly. The first circuit assembly includes a second movable portion connecting portion affixed on the optical assembly, a second fixed portion connecting portion directly or indirectly connected to the fixed portion, and a second resilient portion. The second movable portion connecting portion is movably connected to the second fixed portion connecting portion through the second resilient portion. An elastic modulus of the second movable portion connecting portion relative to the second fixed portion connecting portion in the first direction is different from an elastic modulus of the second movable portion connecting portion relative to the second fixed portion connecting portion in the second direction; an elastic modulus of the second movable portion connecting portion relative to the second fixed portion connecting portion when rotating relative to a rotational axis extending in the first direction is different from an elastic modulus of the second movable portion connecting portion relative to the second fixed portion connecting portion when rotating relative to a rotational axis extending in the second direction.

In some embodiments, the elastic modulus of the second movable portion portion relative to the second fixed portion connecting portion in the first direction is higher than the elastic modulus of the second movable portion connecting portion relative to the second fixed portion connecting portion in the second direction. The elastic modulus of the second movable portion connecting portion relative to the second fixed portion connecting portion when rotating relative to the rotational axis extending in the first direction is less than the elastic modulus of the second movable portion connecting portion relative to the second fixed portion connecting portion when rotating relative to the rotational axis extending in the second direction. The fixed portion includes a case and a bottom arranged along a main axis. The first direction is not parallel to the main axis. The second direction is not parallel to the main axis. The first direction and the second direction are perpendicular to the main axis. When viewed along the main axis, the fixed portion is polygonal. When viewed along the main axis, the fixed portion includes a first side extending in the first direction and a second side extending in the second direction. When viewed along the main axis, the second resilient portion is disposed at the second side. When viewed along the main axis, the first resilient portion is not disposed at the second side. When viewed along the main axis, the first resilient portion includes a first resilient unit, wherein the first resilient unit is disposed at the second side. When viewed along the main axis, the first resilient portion further includes a second resilient unit, the fixed portion further includes a third side, wherein the second resilient unit is disposed at the third side. When viewed along the main axis, the first side and the third side extend in parallel directions.

In some embodiments, the driving assembly includes a first driving assembly used for driving the movable portion to move relative to the fixed portion in a first dimension. The first driving assembly includes a first coil and a first magnetic element including a first magnetic element surface facing the first coil. The first magnetic element surface is not parallel to the first direction. The first magnetic element surface is not perpendicular to the first direction. The first magnetic element surface is not parallel to the second direction. The first magnetic element surface is not perpendicular to the second direction. The optical system further includes a first magnetic conductive element corresponding to the first magnetic element to generate a first driving force to the movable portion, a second magnetic conductive element corresponding to the first magnetic element to generate a second driving force to the movable portion, and a third magnetic conductive element corresponding to the first magnetic element to generate a third driving force to the movable portion. The first magnetic element is movable relative to the first magnetic conductive element. When viewed in a direction that is perpendicular to the first magnetic element surface, the first magnetic conductive element does not overlap the first magnetic element. When viewed in a direction that is parallel to the first magnetic element surface, at least a portion of the first magnetic conductive element overlaps the first magnetic element. Directions of the first driving force and the second driving force are different. The first magnetic element is movable relative to the second magnetic conductive element. When viewed in a direction that is parallel to the first magnetic element surface, at least a portion of the second magnetic conductive element overlaps the first coil. The first magnetic conductive element and the second magnetic conductive element are arranged in a direction that is parallel to the first magnetic element surface. The direction of the first driving force is different from a direction of the third driving force. When viewed in a direction that is parallel to the first magnetic element surface, the first coil is between the first magnetic element and the third magnetic conductive element. When viewed in a direction that is perpendicular to the first magnetic element surface, at least a portion of the third magnetic conductive element overlaps the first magnetic field. When viewed in a direction that is perpendicular to the first magnetic element surface, the first magnetic conductive element does not overlap the third magnetic conductive element. When viewed in a direction that is parallel to the first magnetic element surface, at least a portion of the first magnetic conductive element overlaps the third magnetic conductive element.

In some embodiments, the optical system further includes a second driving assembly used for driving the movable portion to move relative to the fixed portion in a second dimension. The second driving assembly includes a second coil and a second magnetic element corresponding to the second coil. When viewed along the main axis, a connection between centers of the first magnetic element and the second magnetic element is parallel to the second direction. When viewed along the main axis, the connection between centers of the first magnetic element and the second magnetic element does not penetrate a center of the optical assembly.

In some embodiments, the optical system further includes a second circuit assembly electrically connected to the driving assembly. The second circuit assembly includes a circuit element having a circuit, and an electronic element electrically connected to the circuit element. The circuit element is electrically connected to the driving assembly. The circuit element is plate-shaped. The electronic includes a control unit for controlling the driving assembly or includes a position sensor used for detecting the movement of the movable portion relative to the fixed portion. The electronic element includes an electronic element surface facing the movable portion. When viewed in a direction that is parallel to the electronic element surface, the fixed portion includes a wall, and the wall is disposed between the electronic element and the movable portion. When viewed in a direction that is perpendicular to the electronic element surface, at least a portion of the wall overlaps the electronic element. The fixed portion includes an accommodating space corresponding to the electronic element. When viewed along the main axis, the electronic element is disposed at a fourth side of the fixed portion. The fourth side is parallel to the second side.

In some embodiments, the intermediate module includes a main body, a first intermediate element affixed on the main body, a second intermediate element affixed on the main body, a third intermediate element affixed on the main body, a fourth intermediate element affixed on the main body, a first connecting element connected to the main body and the first intermediate element, and a second connecting element connected to the main body and the second intermediate element. The main body includes a first opening corresponding to the optical element. The first opening is circular. The main body is movably connected to the fixed portion through the first intermediate element. The main body is movably connected to the movable portion through the second intermediate element. The main body is movably connected to the fixed portion through the third intermediate element. The main body is movably connected to the movable portion through the fourth intermediate element; a minimum distance between the first intermediate element and the third intermediate element is different from a minimum distance between the second intermediate element and the fourth intermediate element.

In some embodiments, the minimum distance between the first intermediate element and the third intermediate element is greater than the minimum distance between the second intermediate element and the fourth intermediate element. The main body is plate-shaped. The first intermediate element is plate-shaped. The first intermediate element is not parallel to the main body. The first intermediate element is parallel to the main axis. The first connecting element is plate-shaped. The first connecting element is not parallel to the main axis. The second intermediate element is plate-shaped. The second intermediate element is parallel to the main axis. The first connecting element and the second intermediate element are not parallel. When viewed along the main axis, the first intermediate element and the third intermediate element are disposed on opposite sides of the optical assembly. When viewed along the main axis, a center of the first intermediate element and a center of the third intermediate element are arranged in a direction that is parallel to the second direction.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 32 and FIG. 33 are schematic views of the optical element driving mechanism when viewed in different directions.

FIG. 57 and FIG. 58 are schematic views of the optical element driving mechanism when viewed in different directions.

DETAILED DESCRIPTION OF DISCLOSURE

Figure 1:
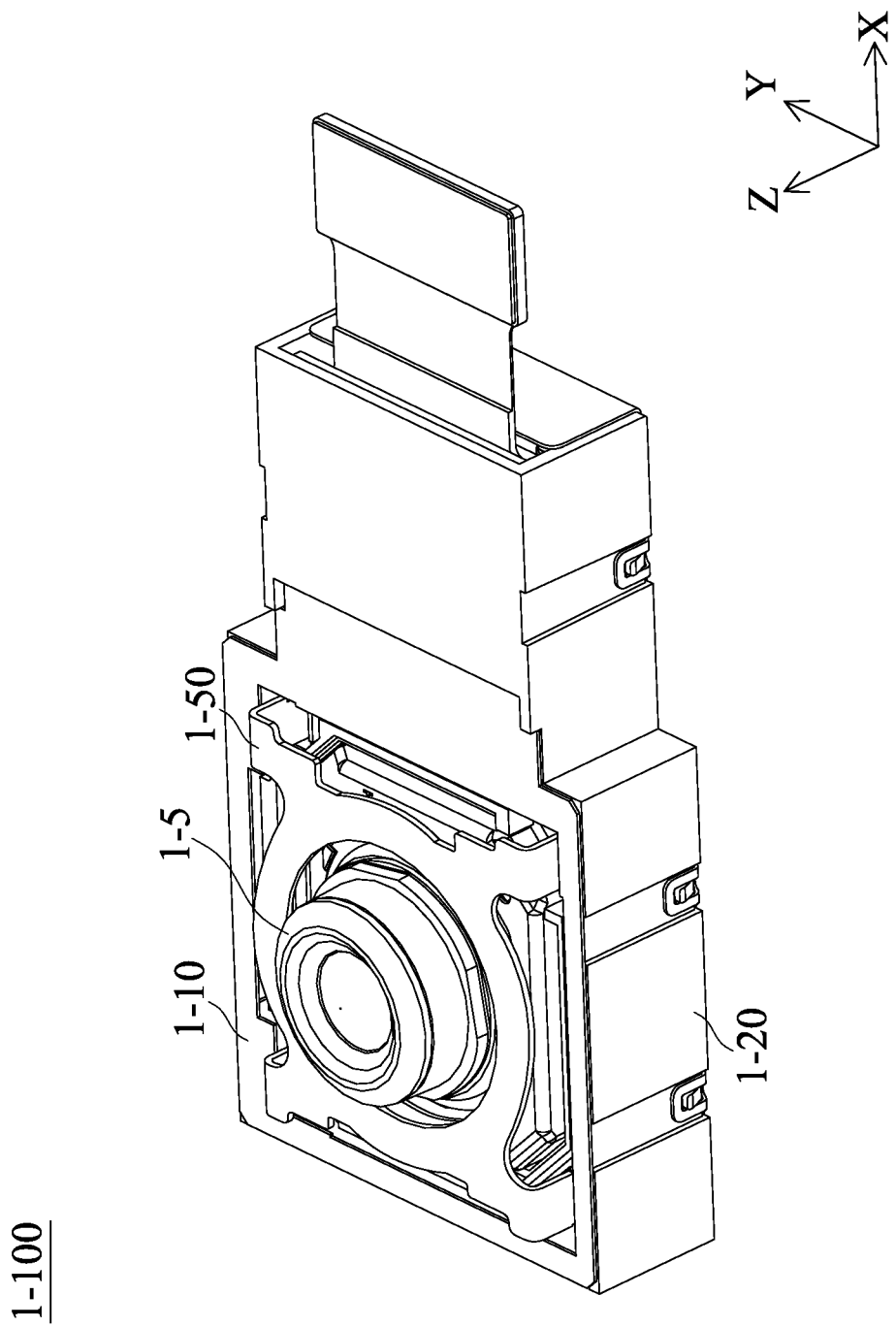
FIG. 1 is a perspective view of an optical system in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
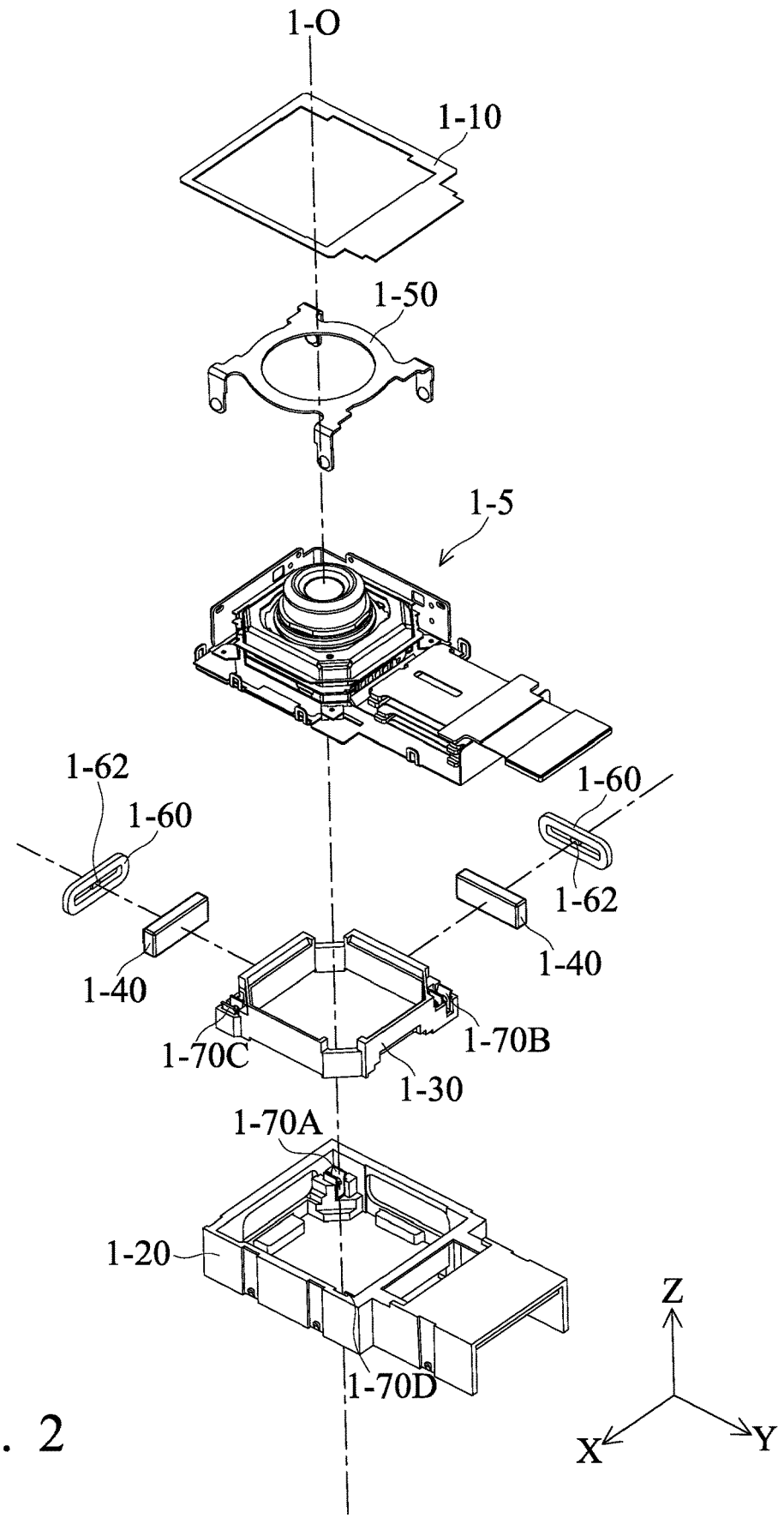
FIG. 2 is an exploded view of the optical system.
Figure 3:
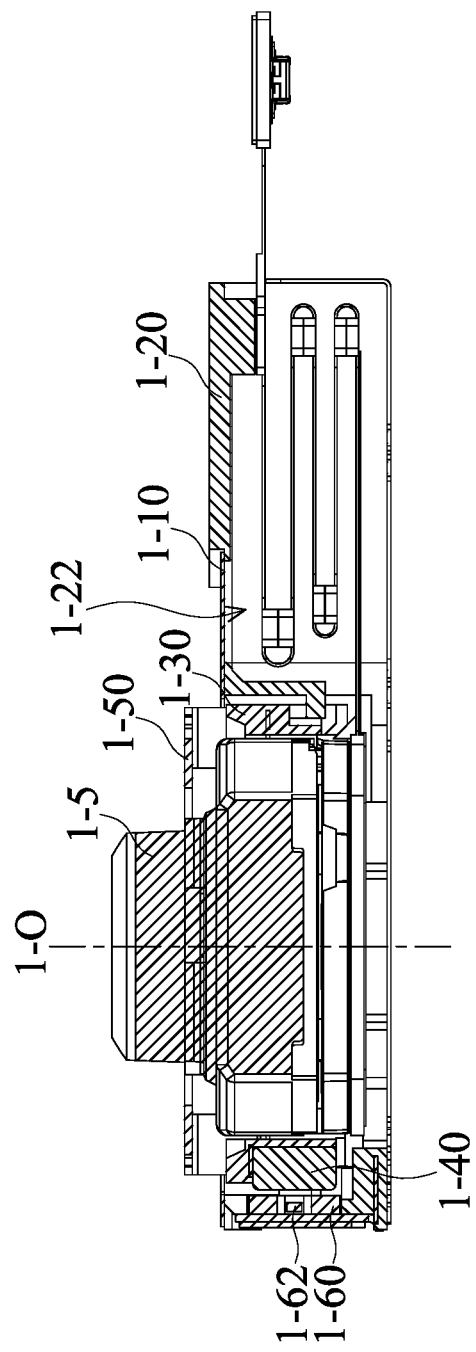
FIG. 3 is a cross-sectional view of the optical system.

FIG. 1 to FIG. 3 are a perspective view, a exploded view, and a cross-sectional view of an optical system 1-100 in some embodiments of the present disclosure. In FIG. 2, the optical system 1-100 mainly includes a case 1-10, a bottom 1-20, a movable portion 1-30, a first magnetic element 1-40, a frame 1-50, a second magnetic element 1-60, and a position sensor 1-62. The optical system 1-100 may be used for driving an optical assembly 1-5, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

The case 1-10 and the bottom 2-20 may be combined with each other to form a case of the optical system 1-100. Moreover, the case 1-10 and the bottom 1-20 may be called as the fixed portion 1-F. In some embodiments, the movable portion 1-30 may move relative to the fixed portion 1-F (e.g. the case 1-10 and the bottom 1-20). Therefore, the optical assembly 1-5 that is disposed on the movable portion 1-30 may be moved by the movable portion 1-30 to move together with the movable portion 1-30, and optical image stabilization may be achieved.

In some embodiments, the first magnetic element 1-40 and the second magnetic element may be called as the driving assembly 1-D. The driving assembly 1-D is used for driving the movable portion 1-30 to move relative to the fixed portion 1-F. For example, the first magnetic element 1-40 and the second magnetic element 1-60 may include a combination of a driving coil and a driving magnet. For example, the first magnetic element 1-40 may be a driving magnet, and the second magnetic element 1-60 may be a driving coil. Alternatively, the first magnetic element may be a driving coil, and the second magnetic element 1-60 may be a driving coil, and the present disclosure is not limited thereto. The first magnetic element 1-40 and the second magnetic element 1-60 may be respectively disposed on the fixed portion 1-F and the movable portion 1-30, or their position may be interchanged. It should be realized that the interaction between the first magnetic element 1-40 and the second magnetic element 1-60 may generate a magnetic force to move the optical assembly 1-5 disposed on the movable portion 1-30 relative to the fixed portion 1-F to achieve auto focus or optical image stabilization. In some embodiments, the driving assembly 1-D may include other driving elements, such as piezoelectric elements or shape memory alloy elements.

In some embodiments, the position sensor 1-62 may be provided in the optical system 1-100 to detect the position of the movable portion 1-30 relative to the fixed portion 1-F. For example, the position sensor 1-62 may be disposed in the second magnetic element 1-60. The position sensor 1-62 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The optical assembly 1-5 may include a case, a bottom, and an optical element disposed between the case and the bottom. It should be realized that a case opening and a bottom opening are formed on the case and the bottom, respectively. The center of the case opening corresponds to a main axis 1-O, the bottom opening corresponds to an image sensor disposed on a substrate. As a result, the optical element disposed in the optical assembly 1-5 can perform image focusing with the image sensor along the main axis 1-O (i.e. the Z direction).

Moreover, additional movable assembly (not shown) may be disposed in the optical assembly. The movable assembly is movable relative to the case and the bottom of the optical assembly 1-5, and the optical element may be affixed on the movable assembly. For example, it may be fixed by means of locking, bonding, or snapping. Therefore, the optical element and the movable assembly may move together in a direction that is different than the moving direction of the movable portion 1-30. Therefore, the optical element may be driven in more direction, such as be driven in the X, Y, or Z direction.

The substrate of the optical assembly 1-5 may be a flexible printed circuit adhered on the bottom of the optical assembly 1-5. In this embodiment, the substrate is electrically connected to other electronic elements disposed inside or outside the optical assembly 1-5. For example, an electric signal may be transfer to the driving assembly through the substrate to control the movement of the movable assembly in the X, Y, or Z directions to achieve auto focus or optical image stabilization.

In some embodiments, a first clipping element 1-70A and a fourth clipping element 1-70D may be disposed on the bottom 1-20, and a second clipping element 1-70B and a third clipping element 1-70C may be disposed on the movable portion 1-30. In some embodiments, the first clipping element 1-70A and the fourth clipping element 1-70D may be affixed on the bottom 1-20 (the fixed portion 1-F), and the second clipping element 1-70B and the third clipping element 1-70C may be affixed on the movable portion 1-30. When viewed along the main axis 1-O, the bottom 1-20 and the movable portion 1-30 may have a polygonal shape, such as rectangular. The first clipping element 1-70A and the fourth clipping element 1-70D may position at opposite corners of the bottom 1-20, and the second clipping element 1-70B and the third clipping element 1-70C may position at opposite corners of the movable portion 1-30. In some embodiments, the minimum distance between the first clipping element 1-70A and the fourth clipping element 1-70D may be different than the minimum distance between the second clipping element 1-70B and the third clipping element 1-70C.

Figure 4A:
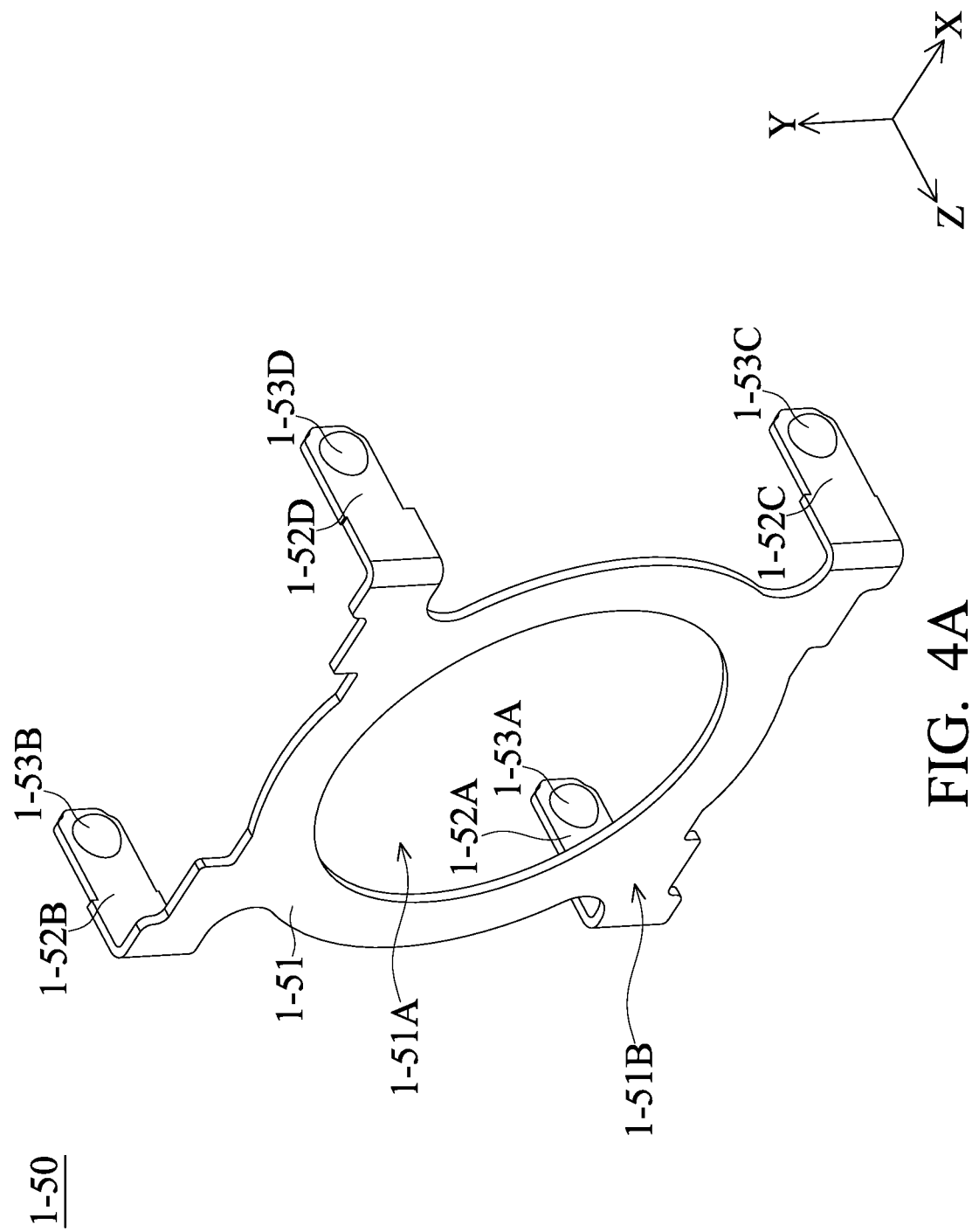
FIG. 4A is a perspective view of a frame.
Figure 4B:
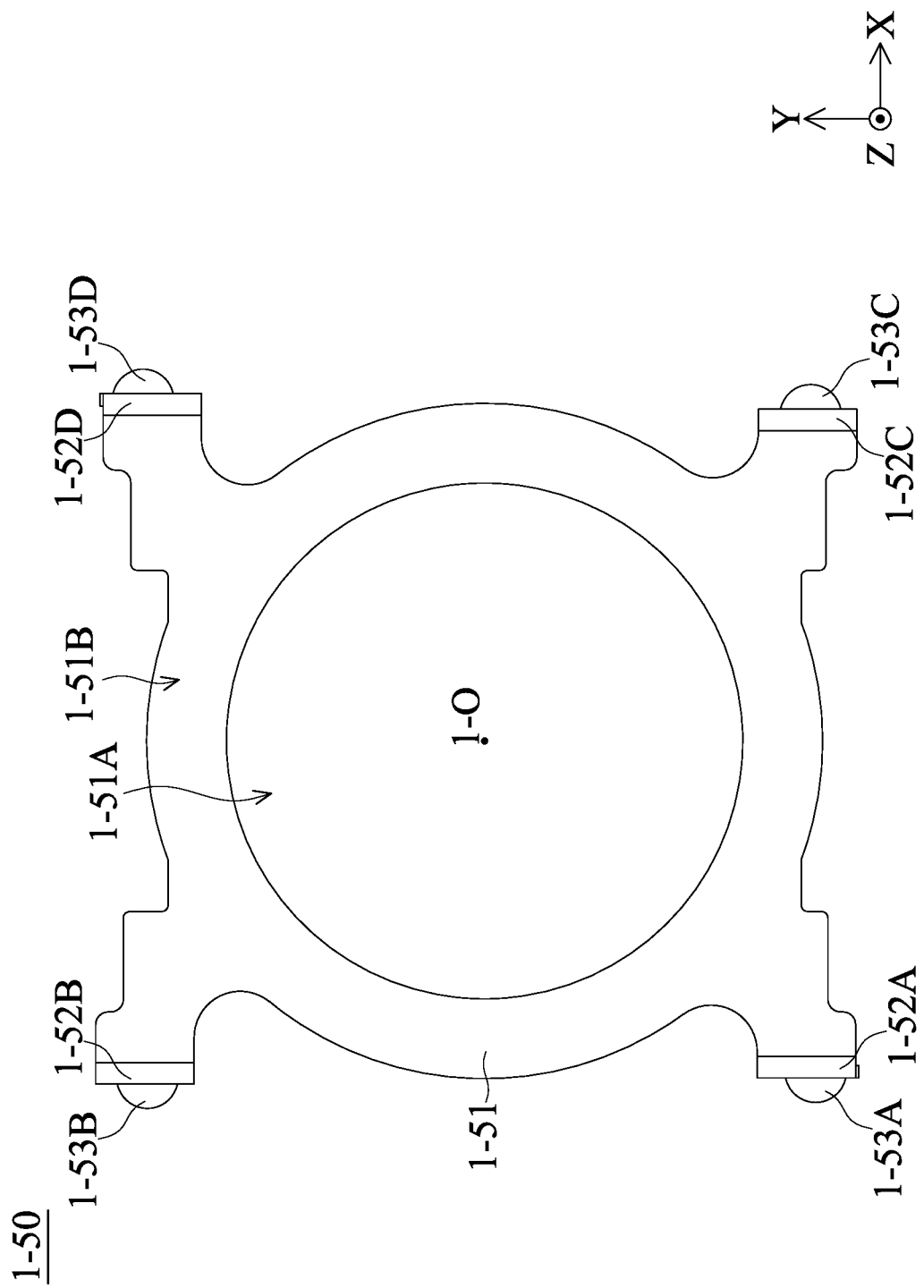
FIG. 4B is a top view of the frame.
Figure 4C:
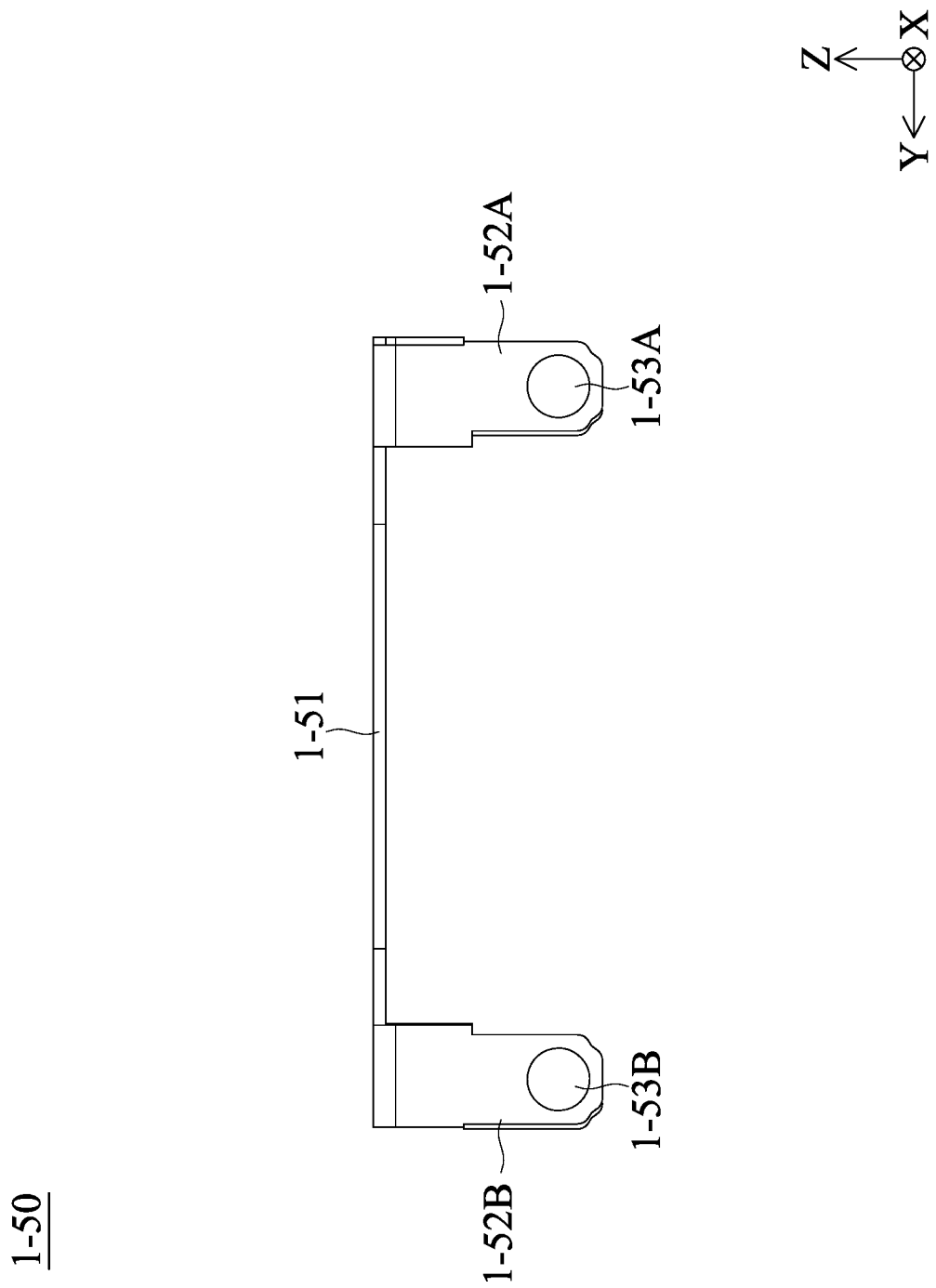
FIG. 4C and FIG. 4D are side views of the frame when viewed in different directions.
Figure 4D:
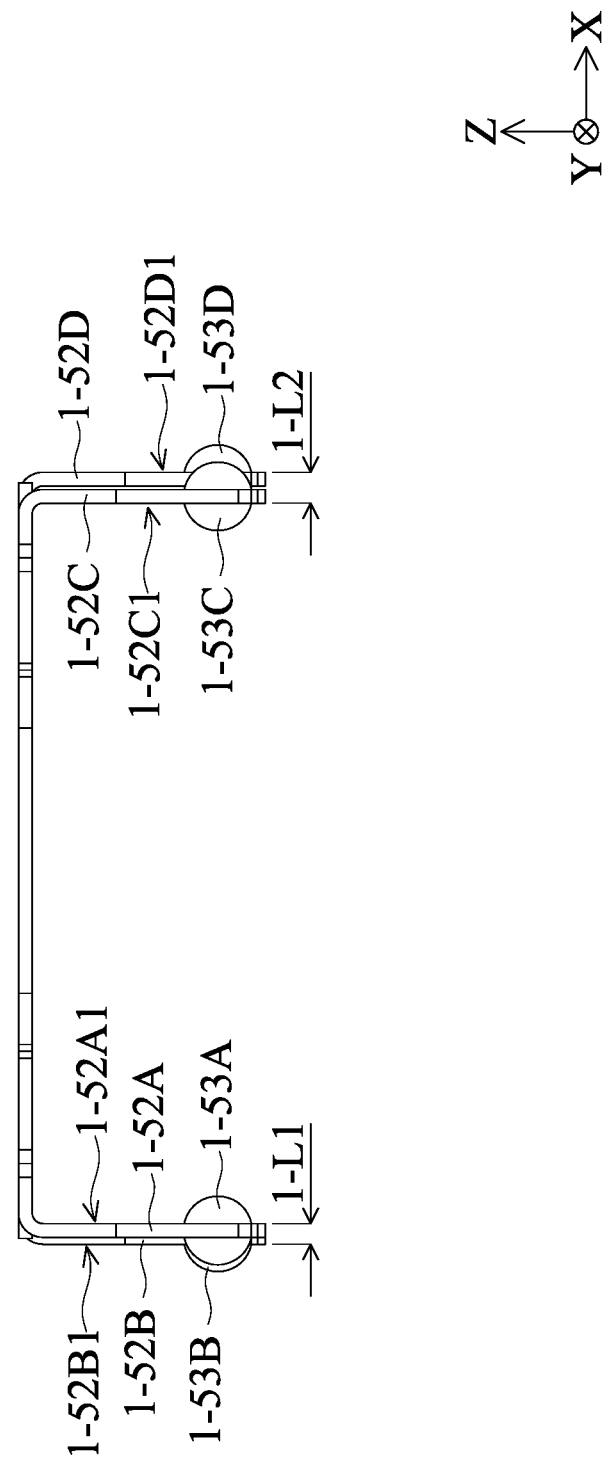

FIG. 4A is a perspective view of the frame 1-50, FIG. 4B is a top view of the frame 1-50, FIG. 4C and FIG. 4D are side views of the frame 1-50 viewed in different directions. The frame 1-50 mainly includes a main body 1-51, a first intermediate element 1-52A, a second intermediate element 1-52B, a third intermediate element 1-52C, a fourth intermediate element 1-52D, a first contact element 1-53A, a second contact element 1-53B, a third contact element 1-53C, and a fourth contact element 1-53D.

As shown in FIG. 4A and FIG. 4B, the main body 1-51 has a first opening 1-51A corresponding to the optical assembly 1-5, and the first opening 1-51A may have a circular shape. The optical assembly 1-5 may be disposed in the first opening 1-51A. The main body 1-51 may be plate-shaped and may be perpendicular to the main axis 1-O. For example, a top surface 1-51B of the main body 1-51 may be perpendicular to the main axis 1-O.

In some embodiments, the first intermediate element 1-52A, the second intermediate element 1-52B, the third intermediate element 1-52C, and the fourth intermediate element 1-52D may be affixed on the main body 1-51, such as may be formed as one piece with the main body 1-51. Moreover, the first intermediate element 1-52A, the second intermediate element 1-52B, the third intermediate element 1-52C, and the fourth intermediate element 1-52D may be plate-shaped. In some embodiments, the first intermediate element 1-52A, the second intermediate element 1-52B, the third intermediate element 1-52C, and the fourth intermediate element 1-52D may parallel to the main axis 1-O. In other words, the planes that the first intermediate element 1-52A, the second intermediate element 1-52B, the third intermediate element 1-52C, and the fourth intermediate element 1-52D position at may parallel to the main axis 1-O.

As shown in FIG. 4B, when viewed along the main axis 1-O (the Z direction), the first intermediate element 1-52A and the second intermediate element 1-52B may arrange in a first direction (e.g. the Y direction) and may have a gap that is not zero (greater than zero). The first intermediate element 1-52A is parallel to the first direction, the second intermediate element 1-52B is parallel to the first direction. Moreover, the first direction (the Y direction) is not parallel to the main axis 1-O (the Z direction), such may perpendicular to the main axis 1-O.

In the first direction, at least a portion of the first intermediate element 1-52A does not overlap the second intermediate element 1-52B. For example, as shown in FIG. 4C, a portion of the second intermediate element 1-52B is exposed from the first intermediate element 1-52A when viewed in the Y direction. Moreover, in the first direction (the Y direction), at least a portion of the third intermediate element 1-52C does not overlap the fourth intermediate element 1-52D. For example, as shown in FIG. 4C, a portion of the fourth intermediate element 1-52D is exposed from the third intermediate element 1-52C when viewed in the Y direction. Moreover, in the X direction, a distance between a surface 1-52A1 of the first intermediate element 1-52A that faces the X direction and a surface 1-52B1 of the second intermediate element 1-52B that faces the −X direction is 1-L1, a distance between a surface 1-52C1 of the third intermediate element 1-52C that faces the −X direction and a surface 1-52D1 of the fourth intermediate element 1-52D that faces the X direction is 1-L2, and the distance 1-L1 may be different than the distance 1-L2. In some embodiments, the distance 1-L1 is less than the distance 1-L2.

In some embodiments, the first contact element 1-53A is affixed on the first intermediate element 1-52A, the second contact element 1-53B is affixed on the second intermediate element 1-52B, the third contact element 1-53C is affixed on the third intermediate element 1-52C, and the fourth contact element 1-53D is affixed on the fourth intermediate element 1-52D. Moreover, the first contact element 1-53A and the first intermediate element 1-52A may be formed as one piece, the second contact element 1-53B and the second intermediate element 1-52B may be formed as one piece, the third contact element 1-53C and the third intermediate element 1-52C may be formed as one piece, and the fourth contact element 1-53D and the fourth intermediate element 1-52D may be formed as one piece. For example, the elements may be connected by welding, such as soldering or melting.

In addition, the main body 1-51, the first intermediate element 1-52A, the second intermediate element 1-52B, the third intermediate element 1-52C, the fourth intermediate element 1-52D, the first contact element 1-53A, the second contact element 1-53B, the third contact element 1-53C, and the fourth contact element 1-53D may include metal, and the material between the first contact element 1-53A and the first intermediate element 1-52A may be different, the material between the second contact element 1-53B and the second intermediate element 1-52B may be different, the material between the third contact element 1-53C and the third intermediate element 1-52C may be different, and the material between the fourth contact element 1-53D and the fourth intermediate element 1-52D may be different.

Figure 5A:
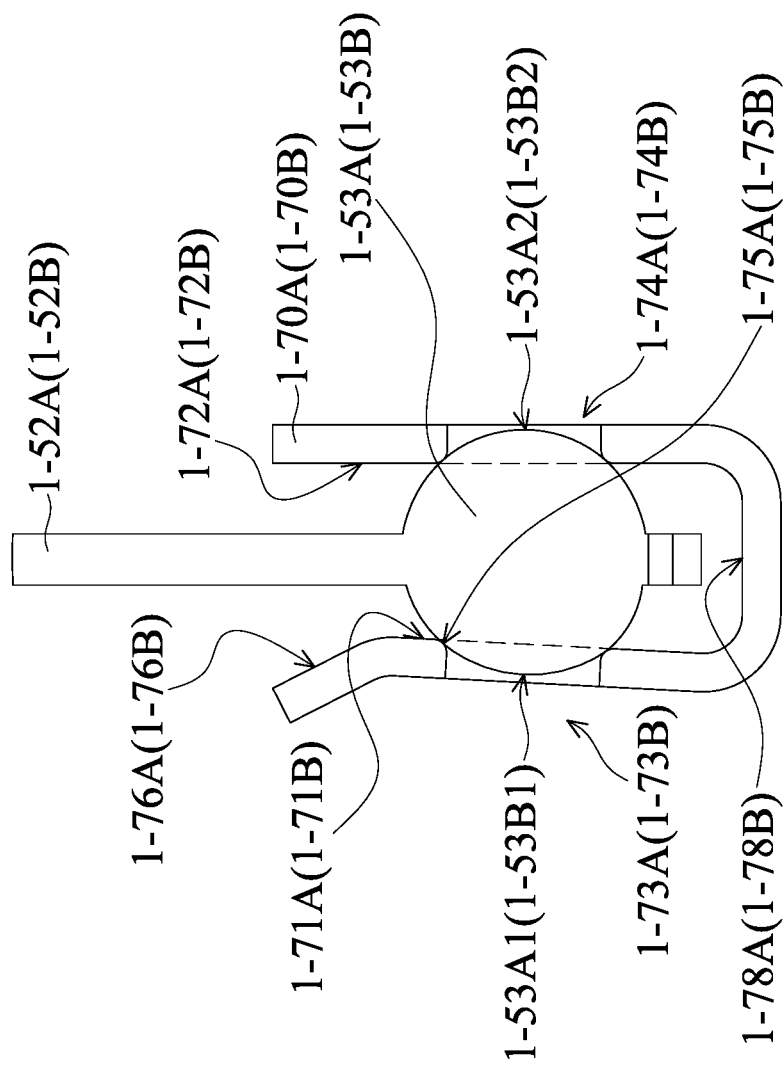
FIG. 5A is a schematic view when a first contact element and a first clipping element are assembled.

The first contact element 1-53A, the second contact element 1-53B, the third contact element 1-53C, and the fourth contact element 1-53D may be respectively disposed in the first clipping element 1-70A, the second clipping element 1-70B, the third clipping element 1-70C, and the fourth clipping element 1-70D. For example, FIG. 5A is a schematic view when the first contact element 1-53A is assembled with the first clipping element 1-70A (or when the second contact element 1-53B is assembled with the second clipping element 1-70B). The assembly between the third contact element 1-53C, the fourth contact element 1-53D, the third clipping element 1-70C, and the fourth clipping element 1-70D may be similar, and is not repeated.

As shown in FIG. 5A, the first contact element 1-53A may have a first contact surface 1-53A1 and a second contact surface 1-53A2 which are curved surfaces. For example, the first contact surface 1-53A1 and the second contact surface 1-53A2 may be a portion of a spherical surface. Furthermore, when viewed along the first direction (the Y direction), the first contact surface 1-53A1 and the second contact surface 1-53A2 may position at opposite sides of the first intermediate element 1-52A. The first clipping element 1-70A may be in direct contact with the first contact element 1-53A. For example, the first contact element 1-53A may be disposed in the first clipping element 1-70A by means of friction contact. When the maximum static friction between the first contact element 1-53A and the first clipping element 1-70A is overcame, the first contact element 1-53A may move relative to the first clipping element.

The first clipping element 1-70A includes a first clipping surface 1-71A and a second clipping surface 1-72A facing the first contact element 1-53A. The minimum distance between the first clipping surface 1-71A and the movable portion 1-30 is greater than the minimum distance between the second clipping surface 1-72A and the movable portion 1-30. In other words, the second clipping surface 1-72A is closer to the movable portion 1-30 than the first clipping surface 1-71A. Furthermore, as shown in FIG. 5A, the first clipping surface 1-71A and the second clipping surface 1-72A face different directions and are not parallel. As shown in FIG. 5A, the first clipping surface 1-71A and the second clipping surface 1-72A are arranged in the X direction, and the second clipping surface 1-72A may be substantially perpendicular to the X direction. Therefore, at least a portion of the first clipping surface 1-71A overlaps the second clipping surface 1-72A in a direction that is perpendicular to the second clipping surface 1-72A (e.g. the X direction).

In some embodiments, the first clipping element 1-70A may further include a first accommodating structure 1-73A and a second accommodating structure 1-74A that respectively position on the first clipping surface 1-71A and the second clipping surface 1-72A. The first accommodating structure 1-73A and the second accommodating structure 1-74A correspond to the first contact element 1-53A and may be through holes or recesses, depending on design requirement. Therefore, a portion of the first contact element 1-53A may be disposed in the first accommodating structure 1-73A and the second accommodating structure 1-74A. In other words, when viewed in a direction that is parallel to the first clipping surface 1-71A (e.g. from the Y direction), at least a portion of the first clipping surface 1-71A overlaps the first contact surface 1-53A1, and at least a portion of the second clipping surface 1-72A overlaps the second contact surface 1-53A2. Therefore, the first contact element 1-53A may be clipped in the first clipping element 1-70A, and the first contact element 1-53A may move relative to the first clipping element 1-70A.

Moreover, the boundary between the first clipping surface 1-71A and the first accommodating structure 1-73A may be a curved surface or a tilted surface. For example, a third clipping surface 1-75A may at the boundary between the first clipping surface 1-71A and the first accommodating structure 1-73A, and the third clipping surface 1-75A may be a curved surface or a tilted surface. The first contact surface 1-53A1 may be in direct contact with the third clipping surface 1-75A. The boundary between the second clipping surface 1-72A and the second accommodating structure 1-74A may have similar feature to allow the first contact element 1-53A is disposed in the first clipping element 1-70A by means of friction contact. Furthermore, the interface (e.g. the third clipping surface 1-75A) is curved surface or tilted surface, so no boundary that is too sharp will contact the first contact element 1-53A to prevent dust from being generated then the first contact element moves relative to the first clipping element 1-70A.

In some embodiments, the first clipping element 1-70A may include a first tilted surface 1-76A connecting to the first clipping surface 1-71A. It should be noted that the first tilted surface 1-76A is not parallel nor perpendicular to the first clipping surface 1-71A and the second clipping surface 1-72A, and at least a portion of the second clipping surface 1-72A overlaps the first tilted surface 1-76A in a direction that is perpendicular to the second clipping surface 1-72A (e.g. the X direction). The first tilted surface 1-76A on the first clipping element 1-70A allows the first contact element 1-53A can be easily disposed in the first clipping element 1-70A.

The second clipping element 1-70B disposed on the movable portion 1-30 may have similar structure. As shown in FIG. 5A, the second contact element 1-53B may have a third contact surface 1-53B1 and a fourth contact surface 1-53B2 which are curved surfaces. For example, the third contact surface 1-53B1 and the fourth contact surface 1-53B2 may be a portion of a spherical surface. Furthermore, when viewed along the first direction (the Y direction), the third contact surface 1-53B1 and the fourth contact surface 1-53B2 may position at opposite sides of the second intermediate element 1-52B. The second clipping element 1-70B may be in direct contact with the second contact element 1-53B. For example, the second contact element 1-53B may be disposed in the second clipping element 1-70B by means of friction contact. When the maximum static friction between the second contact element 1-53B and the second clipping element 1-70B is overcame, the second contact element 1-53B may move relative to the first clipping element.

The second clipping element 1-70B includes a fourth clipping surface 1-71B and a fifth clipping surface 1-72B facing the second contact element 1-53B. Furthermore, as shown in FIG. 5A, the fourth clipping surface 1-71B and the fifth clipping surface 1-72B face different directions and are not parallel. As shown in FIG. 5A, the fourth clipping surface 1-71B and the fifth clipping surface 1-72B are arranged in the X direction, and the fifth clipping surface 1-72B may be substantially perpendicular to the X direction. Therefore, at least a portion of the fourth clipping surface 1-71B overlaps the fifth clipping surface 1-72B in a direction that is perpendicular to the fifth clipping surface 1-72B (e.g. the X direction).

In some embodiments, the second clipping element 1-70B may further include a third accommodating structure 1-73B and a fourth accommodating structure 1-74B that respectively position on the fourth clipping surface 1-71B and the fifth clipping surface 1-72B. The third accommodating structure 1-73B and the fourth accommodating structure 1-74B correspond to the second contact element 1-53B and may be through holes or recesses, depending on design requirement. Therefore, a portion of the second contact element 1-53B may be disposed in the third accommodating structure 1-73B and the fourth accommodating structure 1-74B. In other words, when viewed in a direction that is parallel to the fourth clipping surface 1-71B (e.g. from the Y direction), at least a portion of the fourth clipping surface 1-71B overlaps the third contact surface 1-53B1, and at least a portion of the fifth clipping surface 1-72B overlaps the fourth contact surface 1-53B2.

Moreover, the boundary between the fourth clipping surface 1-71B and the third accommodating structure 1-73B may be a curved surface or a tilted surface. For example, a sixth clipping surface 1-75B may at the boundary between the fourth clipping surface 1-71B and the third accommodating structure 1-73B, and the sixth clipping surface 1-75B may be a curved surface or a tilted surface. The third contact surface 1-53B1 may be in direct contact with the sixth clipping surface 1-75B. The boundary between the fifth clipping surface 1-72B and the fourth accommodating structure 1-74B may have similar feature to allow the second contact element 1-53B is disposed in the second clipping element 1-70B by means of friction contact. Furthermore, the interface (e.g. the sixth clipping surface 1-75B) is curved surface or tilted surface, so no boundary that is too sharp will contact the second contact element 1-53B to prevent dust from being generated then the first contact element moves relative to the second clipping element 1-70B.

In some embodiments, the second clipping element 1-70B may include a second tilted surface 1-76B connecting to the fourth clipping surface 1-71B. It should be noted that the second tilted surface 1-76B is not parallel nor perpendicular to the fourth clipping surface 1-71B and the fifth clipping surface 1-72B, and at least a portion of the fifth clipping surface 1-72B overlaps the second tilted surface 1-76B in a direction that is perpendicular to the fifth clipping surface 1-72B (e.g. the X direction). The second tilted surface 1-76B on the second clipping element 1-70B allows the second contact element 1-53B can be easily disposed in the second clipping element 1-70B.

Figure 5B:
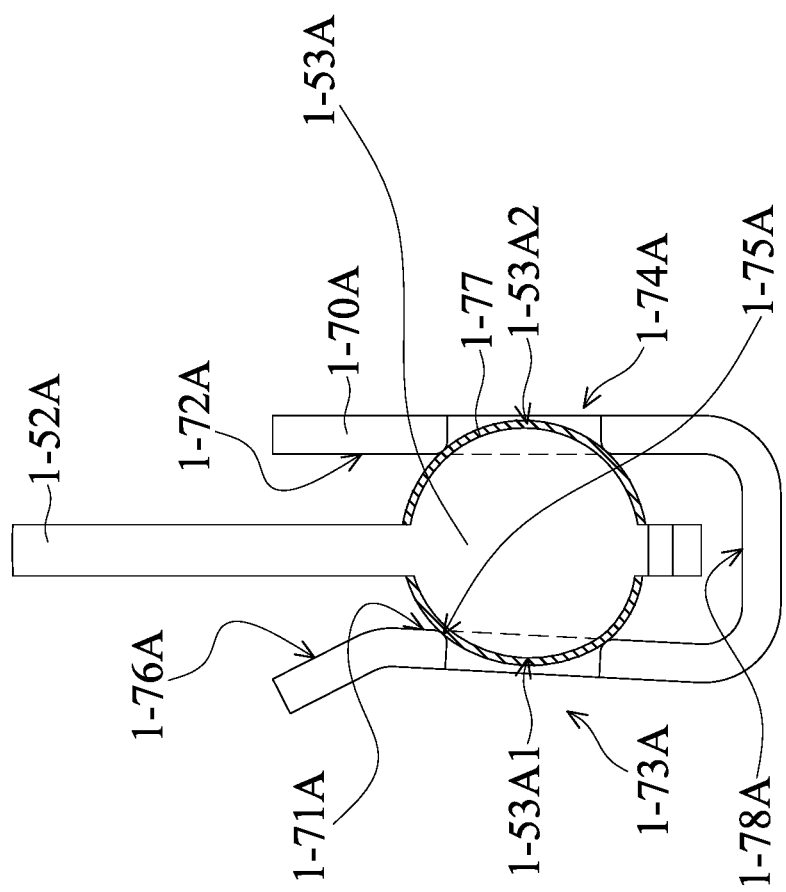
FIG. 5B is a schematic view when a first contact element and a first clipping element are assembled in other embodiments.

FIG. 5B is a schematic view when the first contact element 1-53A assembles with the first clipping element 1-70A in other embodiments. When compared with the embodiment of FIG. 5A, the embodiment of FIG. 5B further includes a first buffer element 1-77. The first buffer element 1-77 may be in direct contact with the first contact element 1-53A and the first clipping element 1-70A. For example, the first buffer element 1-77 may be lubricant to reduce the friction between the first contact element 1-53A and the first clipping element 1-70A. Alternatively, the first buffer element 1-77 may be a damping element (e.g. gel) to reduce the unnecessary vibration between the first contact element 1-53A and the first clipping element 1-70A. In some embodiments, the material of the first buffer element 1-77 may exclude metal. As shown in FIG. 5B, in some embodiments, the first buffer element 1-77 may cover the entire first contact surface 1-53A1 and the second contact surface 1-53A2, in direct contact with the first intermediate element 1-52A, and does not in contact with a first connecting surface 1-78A used for connecting the first clipping surface 1-71A and the second clipping surface 1-72A for better lubrication.

Figure 5C:
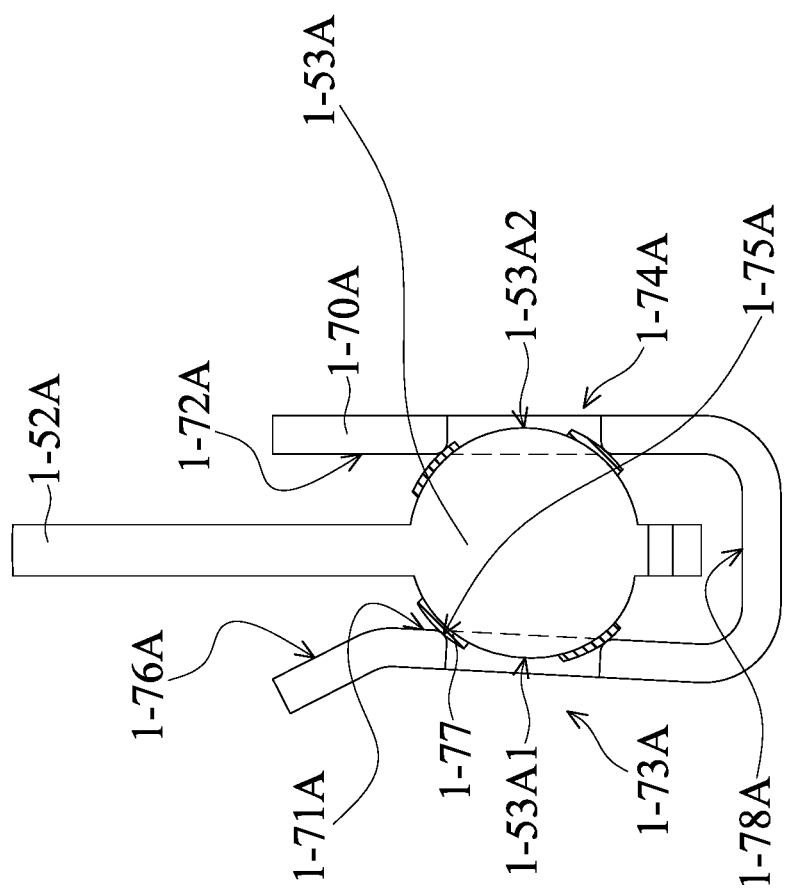
FIG. 5C is a schematic view when a first contact element and a first clipping element are assembled in other embodiments.

FIG. 5C is a schematic view when the first contact element 1-53A assembles with the first clipping element 1-70A in other embodiments. The position of the first buffer element 1-77 may be different than the position of the first buffer element 1-77 in FIG. 5B. For example, a portion of the first contact surface 1-53A1 and a portion of the second contact surface 1-53A2 may be exposed from the first buffer element 1-77 to reduce the usage of the first buffer element 1-77, and may prevent excess first buffer element 1-77 from flowing to other positions.

It should be noted that similar first buffer element 1-77 may be provided when the second contact element 1-53B assembled with the second clipping element 1-70B, when the third contact element 1-53C assembled with the third clipping element 1-70C, and when the fourth contact element 1-53D assembled with the fourth clipping element 1-70D, which is not repeated.

In some embodiments, the frame 1-50, the first clipping element 1-70A, the second clipping element 1-70B, the third clipping element 1-70C, and the fourth clipping element 1-70D may be called as an intermediate module 1-C, and the movable portion 1-30 may move relative to the fixed portion 1-F through the intermediate module 1-C. The intermediate module 1-C may in direct contact with the movable portion 1-30 and the fixed portion 1-F.

Figure 6:
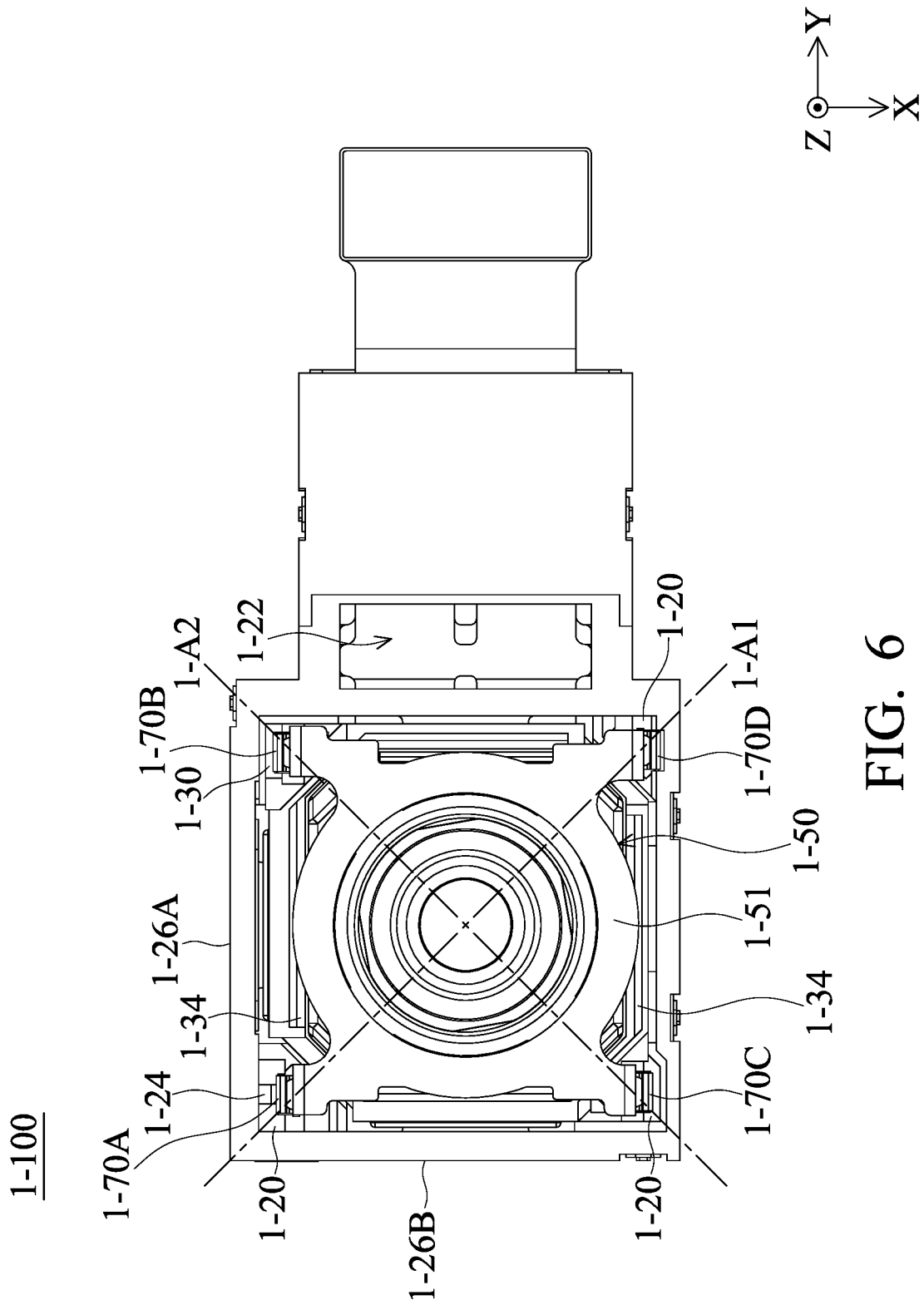
FIG. 6 is a top view of some elements of the optical system.

FIG. 6 is a top view of some elements of the optical system 1-100, wherein the case 1-10 is omitted to show other elements more clearly. As shown in FIG. 3 and FIG. 6, an opening 1-22 may be formed on the base 1-20, and the opening 1-22 may be covered by the case 1-10 (FIG. 3). The opening 1-22 on the bottom 1-20 prevents the circuit of the optical assembly 1-5 from hitting the bottom 1-20 when the optical system 1-100 is operating, and the weight of the optical system 1-100 may be reduced. Moreover, the case 1-10 which covers the opening 1-22 may prevent dust from entering the optical system 1-100.

Because the first contact element 1-53A and the fourth contact element 1-53D are respectively disposed on the first clipping element 1-70A and the fourth clipping element 1-70D, and the first clipping element 1-70A and the fourth clipping element 1-70D are affixed on the bottom 1-20, the first contact element 1-53A and the fourth contact element 1-53D may movably connected to the bottom 1-20 (the fixed portion 1-F) through the first clipping element 1-70A and the fourth clipping element 1-70D. Moreover, the second contact element 1-53B and the third contact element 1-53C are respectively disposed on the second clipping element 1-70B and the third clipping element 1-70C, and the second clipping element 1-70B and the third clipping element 1-70C are affixed on the movable portion 1-30, the second contact element 1-53B and the third contact element 1-53C may movably connected to the movable portion 1-30 through the second clipping element 1-70B and the third clipping element 1-70C.

In some embodiments, a connection between the second contact element 1-53B and the third contact element 1-53C may be defined as a first rotational axis 1-A1, and a connection between the first contact element 1-53A and the fourth contact element 1-53D may be defined as a second rotational axis 1-A2. The movable 1-30 may rotate relative to the frame 1-50 by taking the first rotational axis 1-A1 as its rotational axis, and the movable portion 1-30 and the frame 1-50 may rotate together relative to the fixed portion 1-F by taking the second rotational axis 1-A2 as their rotational axis. In other words, the movable portion 1-30 and the optical assembly 1-5 disposed on the movable portion 1-30 may rotate in multiple directions to achieve optical image stabilization. In some embodiments, the second rotational axis 1-A2 may be perpendicular to the main axis 1-O, and the first rotational axis 1-A1, the second rotational axis 1-A2, and the main axis 1-O may extend in different directions.

Figure 7A:
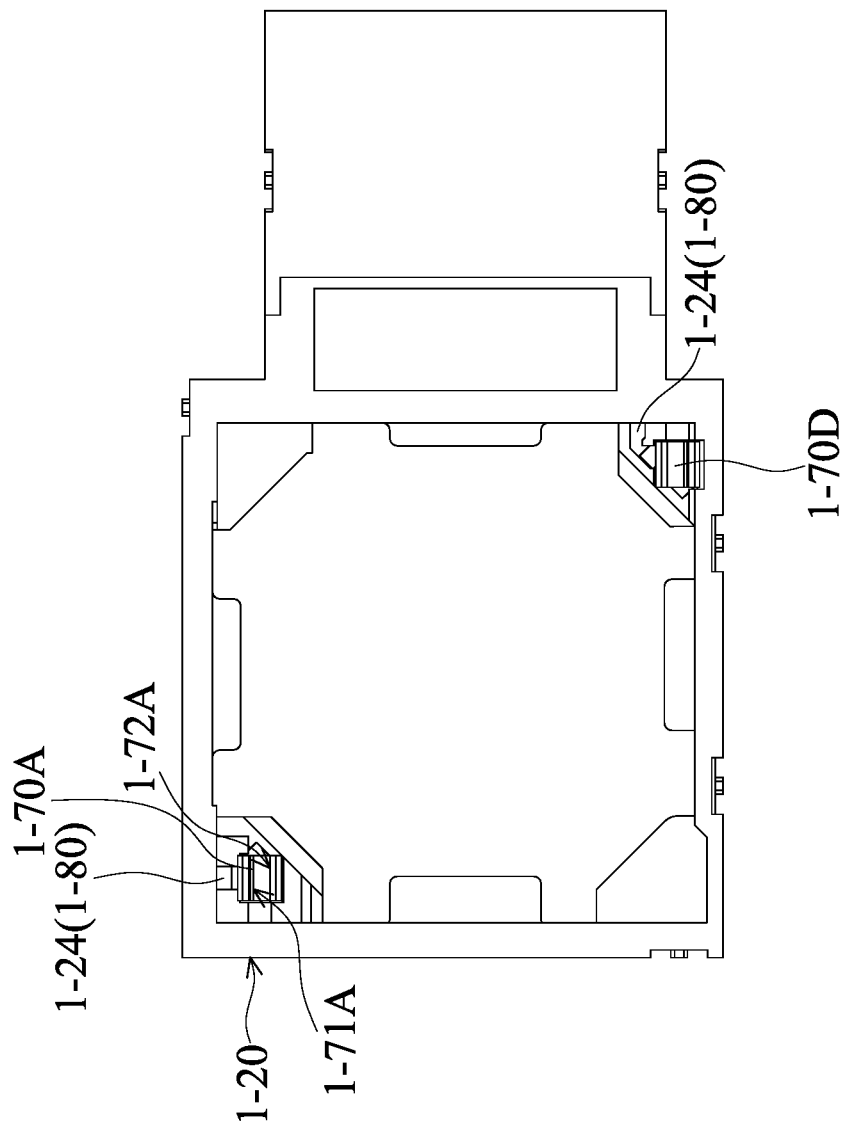
FIG. 7A is a schematic view of the bottom, the first clipping element, and the fourth clipping element.

FIG. 7A is a schematic view of the bottom 1-20, the first clipping element 1-70A, and the fourth clipping element 1-70D. The bottom 1-20 of the fixed portion 1-F has first recesses 1-24 used for accommodating a first connecting element 1-80 (e.g. glue). The first clipping element 1-70A and the fourth clipping element 1-70D may be disposed on two different first recesses 1-24, and the first connecting element 1-80 in the first recesses 1-24 may be used for connecting to the first clipping element 1-70A or the fourth clipping element 1-70D. In other words, the first clipping element 1-70A and the fourth clipping element 1-70D may affixed on the fixed portion 1-F through the first connecting element 1-80. Moreover, when viewed along the main axis 1-O (e.g. viewed in the Z direction), the first clipping surface 1-71A is between the first recess 1-24 and the second clipping surface 1-72A.

Figure 7B:
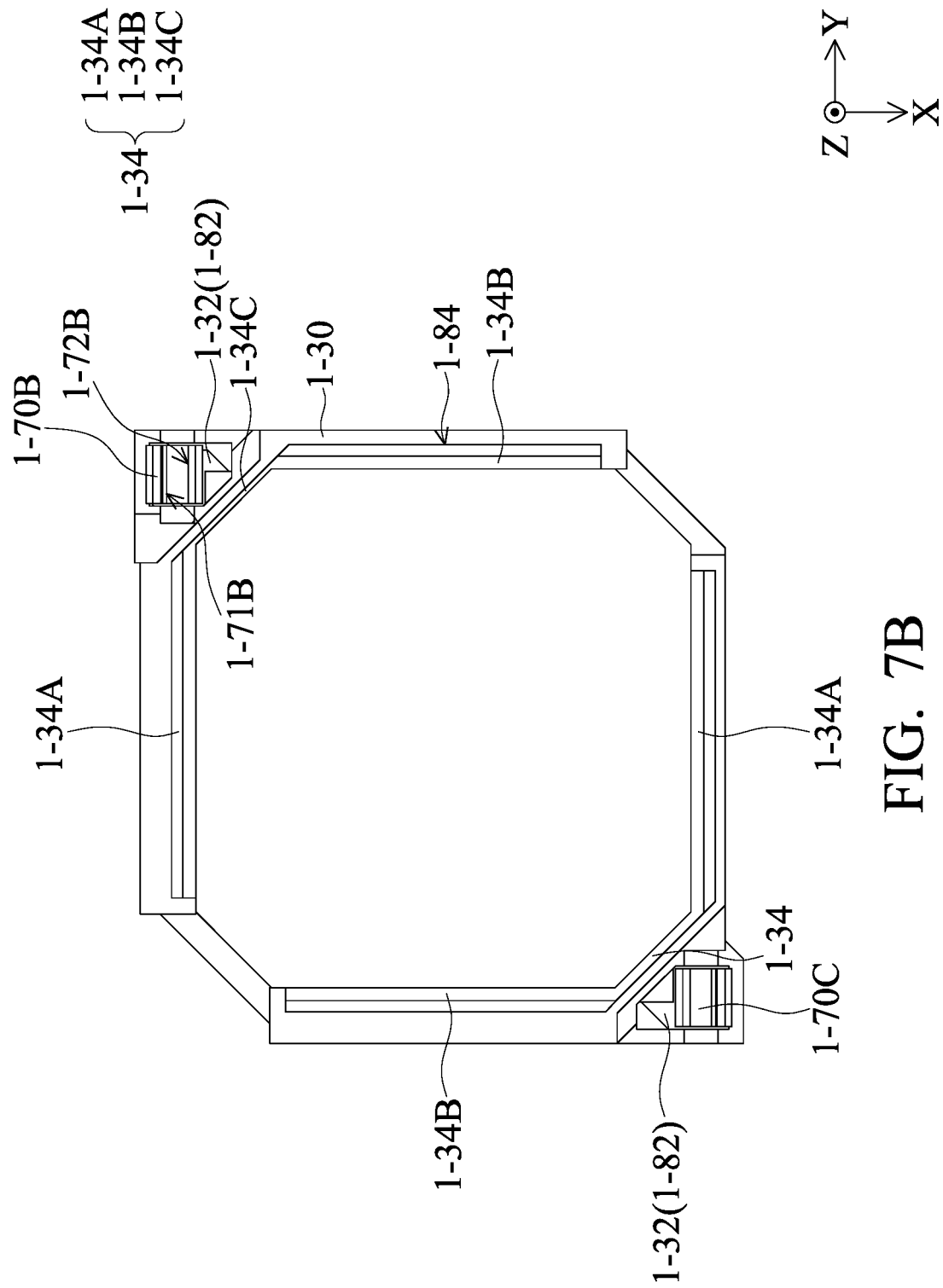
FIG. 7B is a schematic view of the movable portion, the second clipping element, and the third clipping element.

FIG. 7B is a schematic view of the movable portion 1-30, the second clipping element 1-70B, and the third clipping element 1-70C. The movable portion 1-30 has second recesses 1-32 used for accommodating a second connecting element 1-82 (e.g. glue). The second clipping element 1-70B and the third clipping element 1-70C may be disposed on two different second recesses 1-32, and the second connecting element 1-82 in the second recesses 1-32 may be used for connecting to the second clipping element 1-70B or the third clipping element 1-70C. In other words, the second clipping element 1-70B and the third clipping element 1-70C may affixed on the movable portion 1-30 through the second connecting element 1-82. Moreover, when viewed along the main axis 1-O (e.g. viewed in the Z direction), the fifth clipping surface 1-72B is between the second recess 1-32 and the fourth clipping surface 1-71B.

In some embodiments, the movable portion 1-30 further includes third recesses 1-34 used for accommodating a third connecting element 1-84 (e.g. glue), and the optical assembly 1-5 may be affixed to the movable portion 1-30 through the first connecting element 1-84. In other words, the third connecting element 1-84 may be in direct contact with the movable portion 1-30 and the optical assembly 1-5. Moreover, as shown in FIG. 6, when viewed along the main axis 1-O (e.g. viewed in the Z direction), the main body 1-51 does not overlap the third recess 1-34. For example, a portion of the third recess 1-34 may expose from the main body 1-51.

In some embodiments, the movable portion 1-30 may include two third recesses 1-34, and each third recess 1-34 may include a first portion 1-34A, a second portion 1-34B, and a third portion 1-34C. The first portion 1-34A may extend in the second direction (the Y direction), the second portion 1-34B may extend in the third direction (the X direction), and the third portion 1-34B may between the first portion 1-34A and the second portion 1-34B. Furthermore, when viewed along the main axis 1-O, as shown in FIG. 6, the bottom 1-20 of the fixed portion 1-F may have a first side 1-26A extending in the second direction (the Y direction) and a second side 1-26B extending in the third direction (the X direction). The second direction is not parallel to the third direction. Moreover, when the movable portion 1-30 is at a predetermined position relative to the fixed portion 1-F (such as when the movable portion 1-30 has not move relative to the fixed portion 1-F), the second direction may be parallel to the first direction. Therefore, the sides of the optical assembly 1-5 may be adjacent to the third recess 1-34 to allow the third connecting element 1-84 being provided on the sides of the optical assembly 1-5, and the connecting between the optical assembly 1-5 and the movable portion 1-30 may be increased.

Figure 8A:
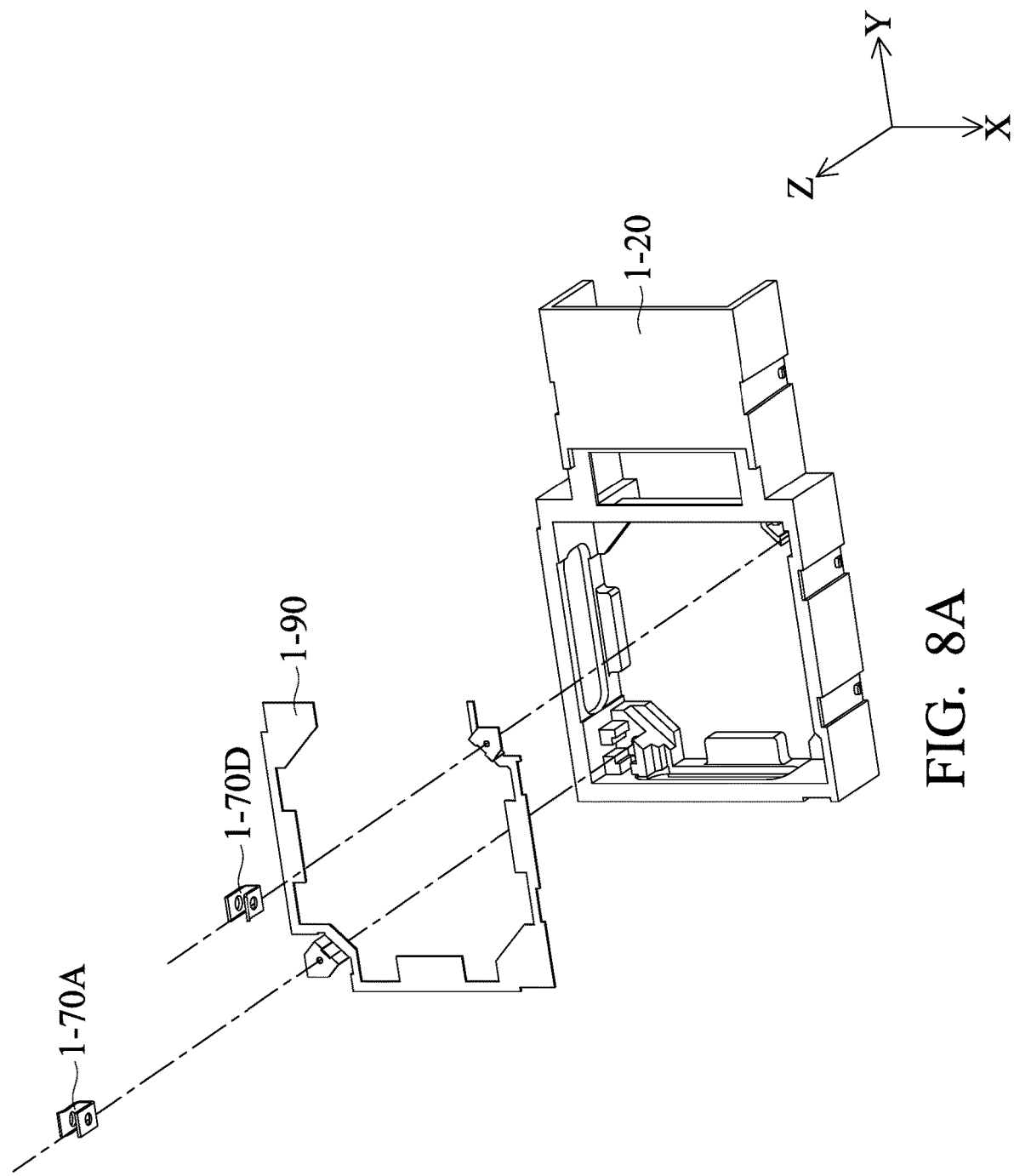
FIG. 8A is an exploded view of the first clipping element, the fourth clipping element, and the bottom.
Figure 8B:
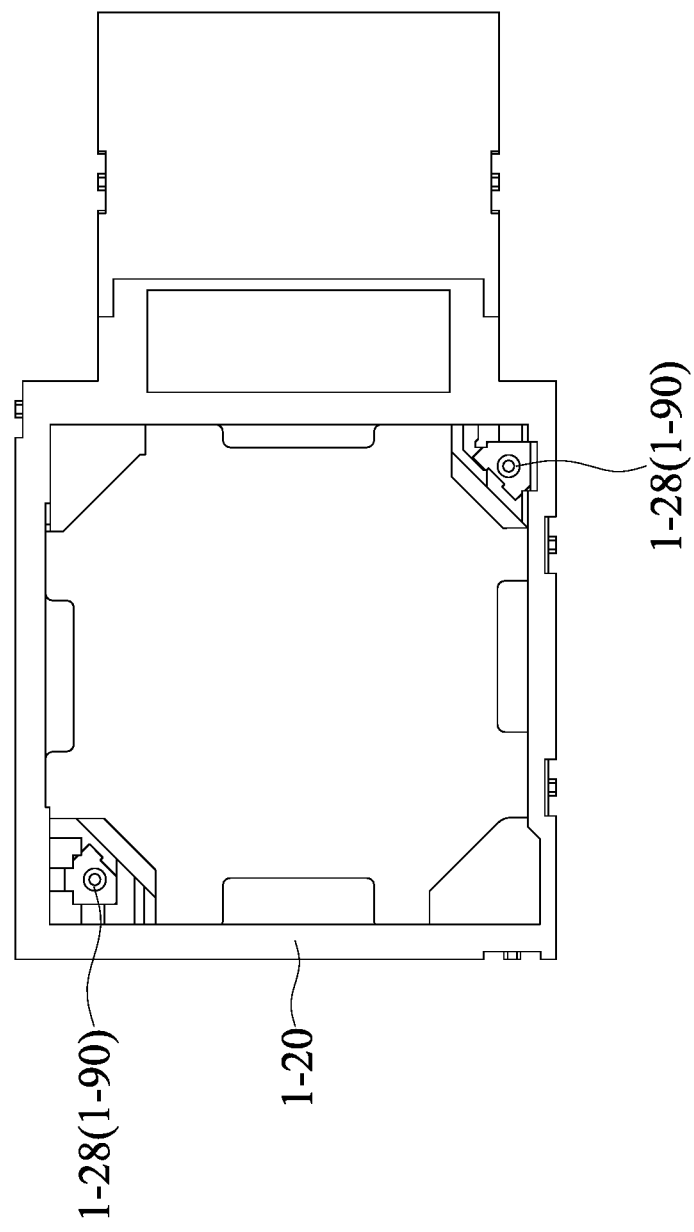
FIG. 8B is a top view of the bottom.

FIG. 8A is an exploded view of the first clipping element 1-70A, the fourth clipping element 1-70D, and the bottom 1-20, and FIG. 8B is a top view of the bottom 1-20. It should be noted that a first metal element 1-90 may be disposed in the bottom 1-20, such as at least a portion of the first metal element 1-90 is embedded in the bottom 1-20 and does not exposed from the bottom 1-20 of the fixed portion 1-F. For example, the bottom 1-20 may include a first exposing portion 1-28, and at least a portion of the first metal element 1-90 may exposed form the first exposing portion 1-28. The portion of the first metal element 1-90 that is exposed from first exposing portion 1-28 may be used for connecting to the first clipping element 1-70A and the fourth clipping element 1-70D. For example, the first clipping element 1-70A and the fourth clipping element 1-70D may be affixed on the first metal element 1-90 by welding. In other words, when viewed along the main axis 1-O, at least a portion of the first exposing portion 1-28 overlaps the first clipping element 1-70A and the fourth clipping element 1-70D. Moreover, the material of the bottom 1-20 may not be metal to prevent short circuit from occurring when the first metal element 1-90 is in contact with the bottom 1-20.

Figure 9A:
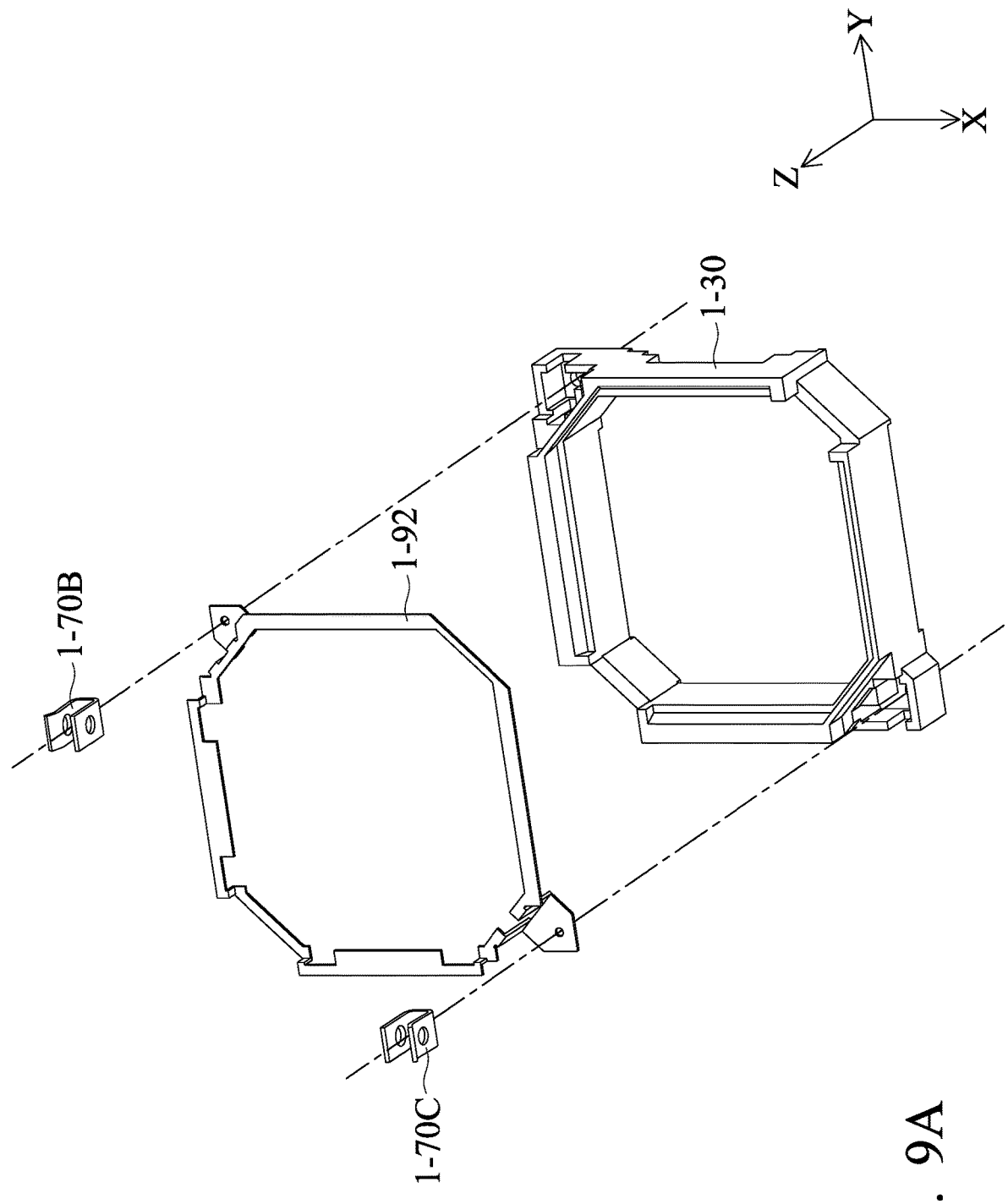
FIG. 9A is an exploded view of the second clipping element, the third clipping element, and the movable portion.
Figure 9B:
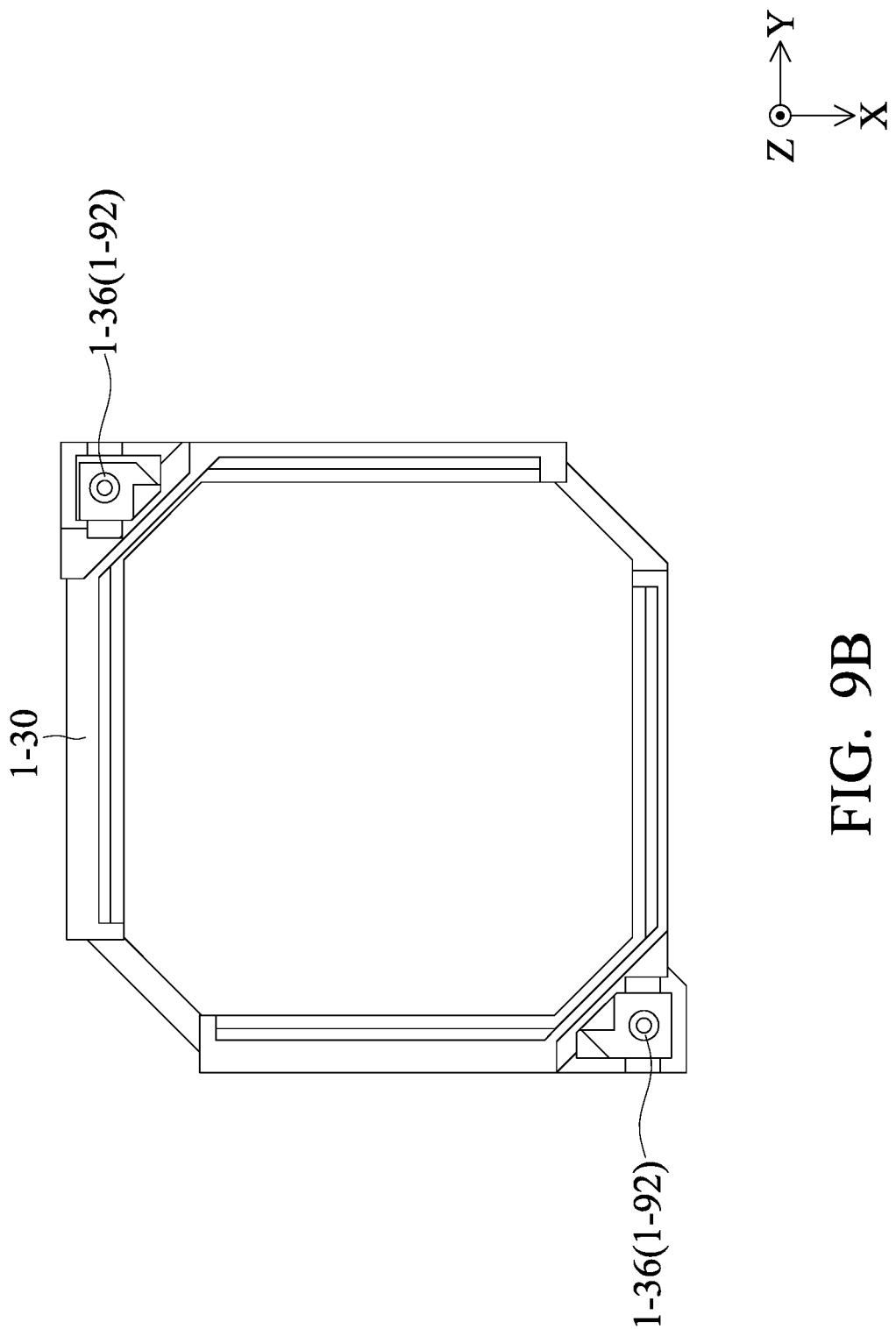
FIG. 9B is a top view of the movable portion.

FIG. 9A is an exploded view of the second clipping element 1-70B, the third clipping element 1-70C, and the movable portion 1-30, and FIG. 9B is a top view of the movable portion 1-30. It should be noted that a second metal element 1-92 may be disposed in the movable portion 1-30, such as at least a portion of the second metal element 1-92 is embedded in the movable portion 1-30 and does not exposed from the movable portion 1-30. For example, the movable portion 1-30 may include a second exposing portion 1-36, and at least a portion of the second metal element 1-92 may exposed form the second exposing portion 1-36. The portion of the second metal element 1-92 that is exposed from second exposing portion 1-36 may be used for connecting to the second clipping element 1-70B and the third clipping element 1-70C. For example, the second clipping element 1-70B and the third clipping element 1-70C may be affixed on the second metal element 1-92 by welding. In other words, when viewed along the main axis 1-O, at least a portion of the second exposing portion 1-36 overlaps the second clipping element 1-70B and the third clipping element 1-70C. Moreover, the material of the movable portion 1-30 may not be metal to prevent short circuit from occurring when the second metal element 1-92 is in contact with the movable portion 1-30.

Figure 10:
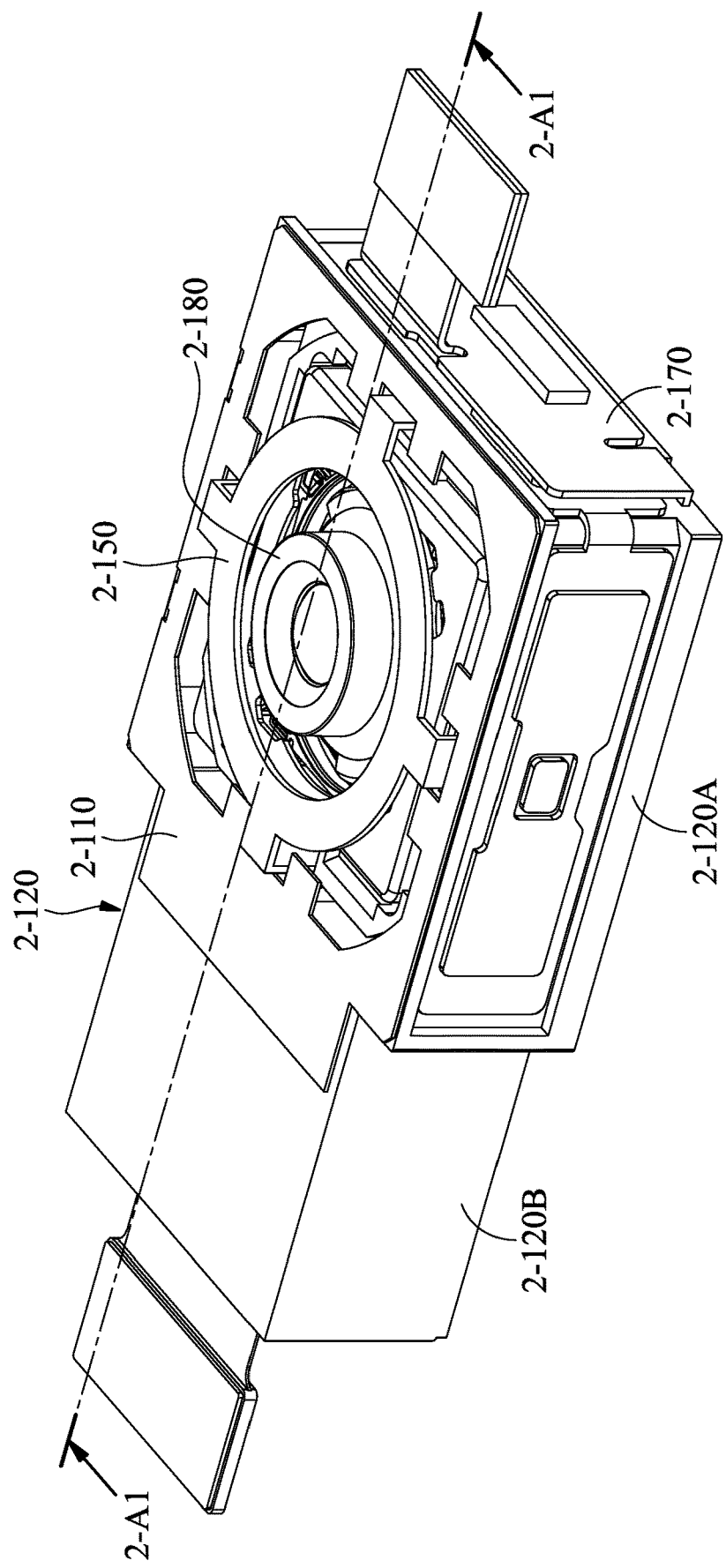
FIG. 10 is a schematic view of an optical element driving mechanism in some embodiments of the present disclosure.
Figure 11:
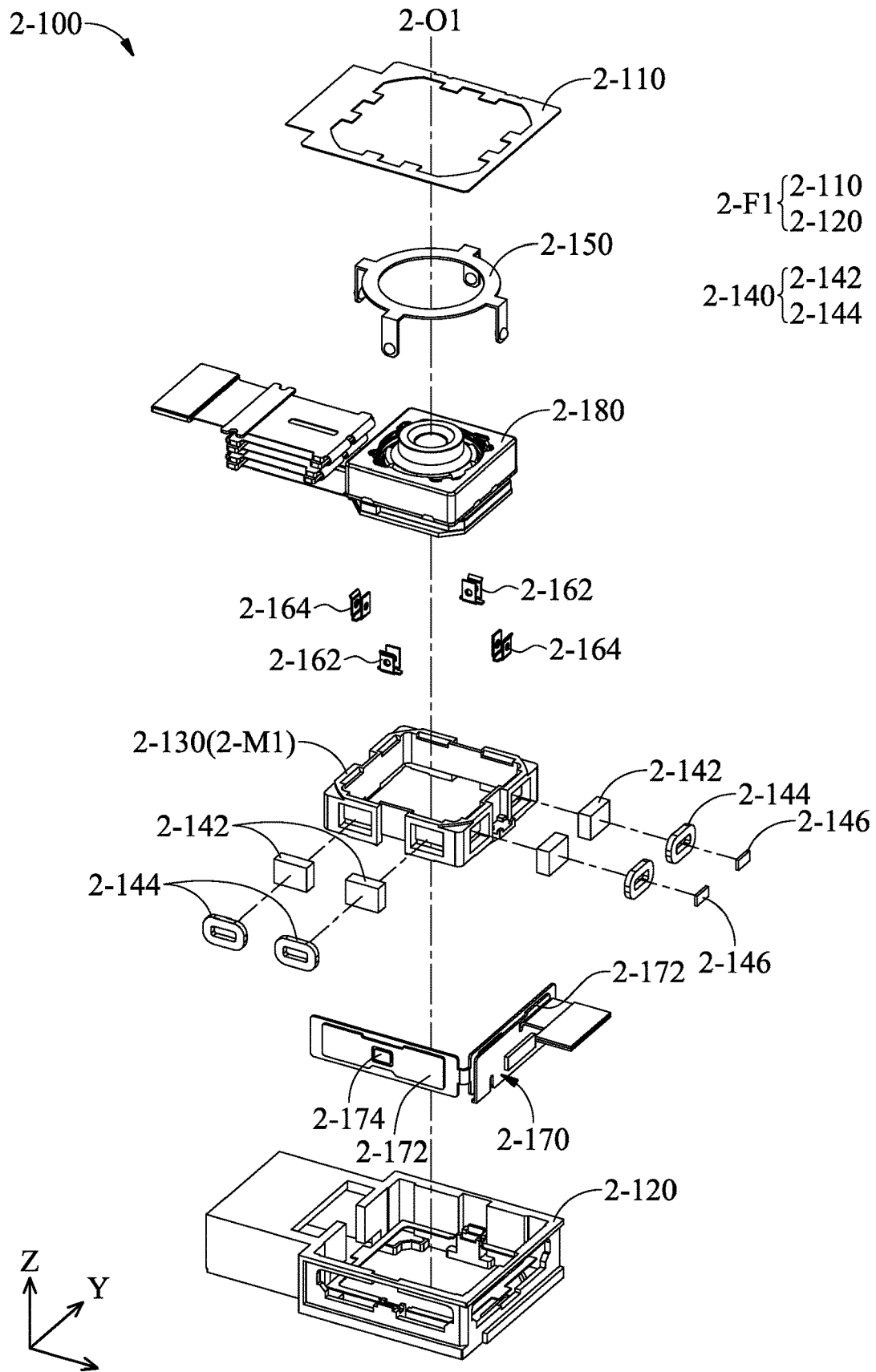
FIG. 11 is an exploded view of the optical element driving mechanism.
Figure 12:
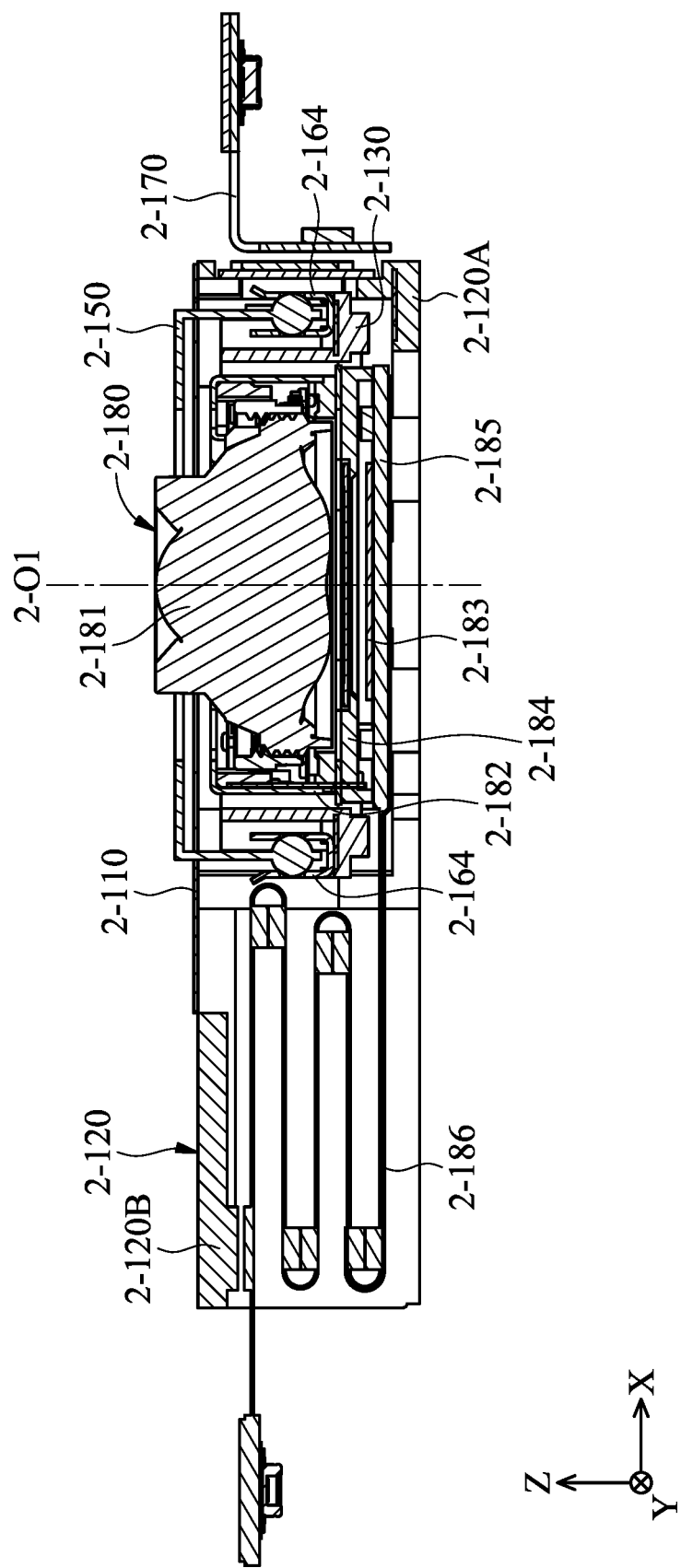
FIG. 12 is a cross-sectional view of the optical element driving mechanism.

FIG. 10 to FIG. 12 are a perspective view, a exploded view, and a cross sectional view viewed from the line 2-A1-2-A1 in FIG. 10 of an optical element driving mechanism 2-100. In FIG. 11, the optical element driving mechanism 2-100 mainly includes a top plate 2-110, a bottom 2-120, a holder 2-130 (or a movable portion 2-M1), a first magnetic element 2-142, a second magnetic element 2-144, a position sensor 2-146, a connecting element 2-150, a contact element 2-162, a contact element 2-164, and a circuit board 2-170 arranged in a main axis 2-O1. The optical element driving mechanism 2-100 may be used for driving an optical module 2-180, or may be used to drive various optical elements, such as a lens, a mirror, a prism, a beam splitter, or an aperture, but it is not limited thereto.

In some embodiments, the top plate 2-110 and the bottom 2-120 may be combined to form a case of the optical element driving mechanism 2-100. Furthermore, the top plate 2-110 and the bottom 2-120 may be called as the fixed portion 2-F1. As shown in FIG. 10, the bottom 2-120 may have a first portion 2-120A and a second portion 2-120B, and some elements of the optical element driving mechanism 2-100 (e.g. the holder 2-130, the first magnetic element 2-142, the second magnetic element 2-144, the position sensor 2-146, the connecting element 2-150, the contact element 2-162, the contact element 2-164, or the circuit board 2-170) may be disposed in the first portion 2-120A to protect such elements.

In some embodiments, the movable portion 2-M1 (the holder 2-130) may move relative to the fixed portion 2-F1 (e.g. the top plate 2-110 and the bottom 2-120). Therefore, the optical module 2-180 which is disposed on the holder 2-130 may move with the holder 2-130 to achieve auto focus (AF) or optical image stabilization (OIS).

In some embodiments, the first magnetic element 2-142 and the second magnetic element 2-144 may be called as a driving assembly 2-140 used for moving the movable portion 2-M1 (or the holder 2-130) relative to the fixed portion 2-F1. For example, the first magnetic element 2-142 and the second magnetic element 2-144 may include a combination of driving coils and driving magnets. For example, the first magnetic element 2-142 may be a driving magnet, and the second magnetic element 2-144 may be a driving coil. Alternatively, the first magnetic element 2-142 may be a coil, and the second magnetic element 2-144 may be a driving magnet, and is not limited. The first magnetic element 2-142 and the second magnetic element 2-144 may be respectively disposed on the fixed portion 2-F1 and the movable portion 2-M1 (or the holder 2-130), or their position may be interchanged. It should be noted that the interaction between the first magnetic element 2-142 and the second magnetic element 2-144 may generate a magnetic force to move the optical module 2-180 relative to the fixed portion 2-F1, so auto focus or optical image stabilization may be achieved. In some embodiments, the driving assembly 2-140 may include other driving elements, such as a piezoelectric element or a shape memory alloy element.

It should be noted that a pair of the contact element 2-162 and the contact element 2-164 may be respectively disposed on the bottom 2-120 and the holder 2-130. The contact elements 2-162 may be disposed at sides of the bottom 2-120, and the contact elements 2-164 may be disposed on the sides of the holder 2-130. In some embodiments, the bottom 2-120 and the contact element 2-162 may be formed as one piece or formed separately, and the holder 2-130 and the contact element 2-164 may be formed as one piece or formed separately as well.

Moreover, the circuit board 2-170 may be, for example, a flexible printed circuit (FPC), which may be bonded on the fixed portion 2-F1 by adhesion. In some embodiments, the circuit board 2-170 is electrically connected to other electronic elements in the optical element driving mechanism 2-100 or outside the optical element driving mechanism 2-100. For example, the circuit board 2-170 may be used for transferring electric signal to the driving assembly 2-140 to control the movement of the holder 2-130. In some embodiments, the circuit board 2-170 may be affixed on at least two adjacent sides of the fixed portion 2-F1 (e.g. the bottom 2-120), and may be arranged with the bottom 2-120 in the XY plane rather than in the Z direction to reduce the thickness of the optical element driving mechanism 2-100 in the Z direction. In some embodiments, additional reinforcement structure (e.g. a reinforce element 2-172) may be provided on the circuit board 2-170 to enhance the structure of the circuit board 2-170. The reinforce element 2-172 may be formed by material that is not magnetic-conductive. Furthermore, as shown in FIG. 11, the reinforce element 2-172 may have an opening, and additional magnetic-conductive element 2-174 may be disposed in the opening to increase the driving force of the optical element driving mechanism 2-100.

In some embodiments, the position sensor 2-146 may be disposed in the optical element driving mechanism 2-100 to detect the position of the movable portion 2-M1 relative to the fixed portion 2-F1. The position sensor may include a Hall sensor, a magnetoresistance effect sensor (MR sensor), a giant magnetoresistance effect sensor (GMR sensor), a tunneling magnetoresistance effect sensor (TMR sensor), or a fluxgate sensor. In some embodiments, if the second magnetic element 2-144 is a capsule-shaped coil, the position sensor 2-146 may be disposed in the second magnetic element 2-144 to protect the position sensor 2-146.

Figure 13:
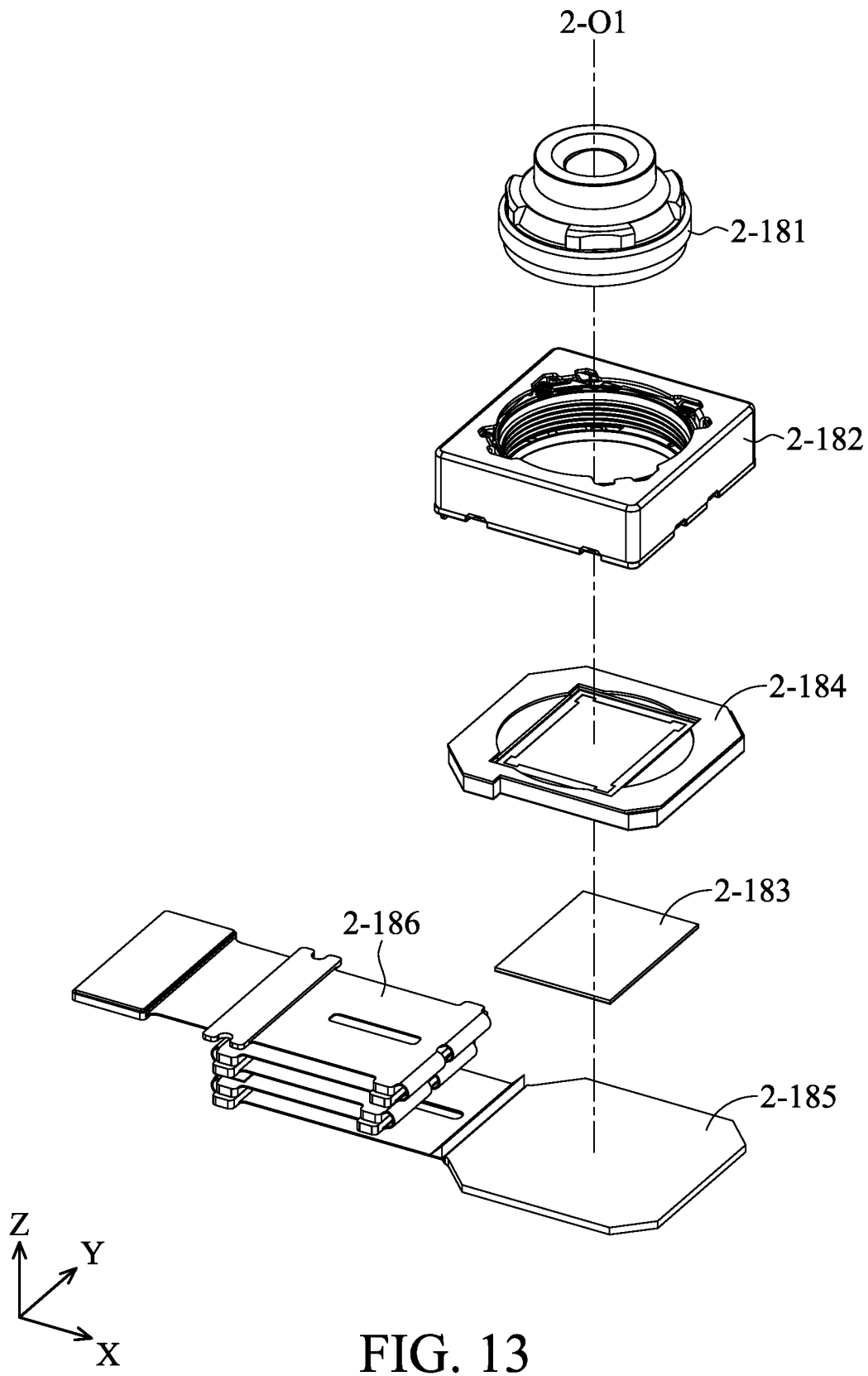
FIG. 13 is an exploded view of the optical module.

FIG. 13 is an exploded view of the optical module 2-180. The optical module 2-180 may be used for driving an optical element 2-181, and may include a driving assembly 2-182, an optical sensor 2-183, a holder 2-184, and a substrate 2-185 arranged in the main axis 2-O1 of the optical element 2-181.

The optical element 2-181 may be affixed on the driving assembly 2-182, such as by locking, adhesion, or snapping. Furthermore, the driving assembly 2-182 may be used for driving the optical element 2-181 to move in different direction than the holder 2-130 (or the movable portion 2-M1) to drive the optical element 2-181 in more directions. For example, the optical element 2-181 may be driven in X, Y, or Z directions.

The optical sensor 2-183 may detect the light passing through the optical element 2-181 and transfer the light to electric signal to other external element (e.g. a processor). The holder 2-184 may be disposed between the driving assembly 2-182 and the optical sensor 2-183 to connect the elements.

The substrate 2-185 may be a flexible printed circuit which may be affixed on the bottom 2-120 by adhesion. In this embodiment, the substrate 2-185 is electrically connected to electronic elements inside or outside the optical module 2-180. For example, electric signal may be transferred by the substrate 2-185 to the driving assembly 2-182 to control the movement of the optical element 2-181 in X, Y, or Z directions to achieve auto focus or optical image stabilization. A wiring 2-186 may be disposed on one side of the substrate 2-185, such as may be disposed in the second portion 2-120B of the bottom 2-120 to protect the wiring 2-186. The wiring 2-186 has a structure that is stacked in the Z direction as multiple layers to save the space and achieve miniaturization.

Moreover, as shown in FIG. 12, the circuit board 2-170 and the wiring 2-186 are extending beyond the bottom 2-120 in different directions to prevent interference between the circuit board 2-170 and the wiring 2-186.

Figure 14:
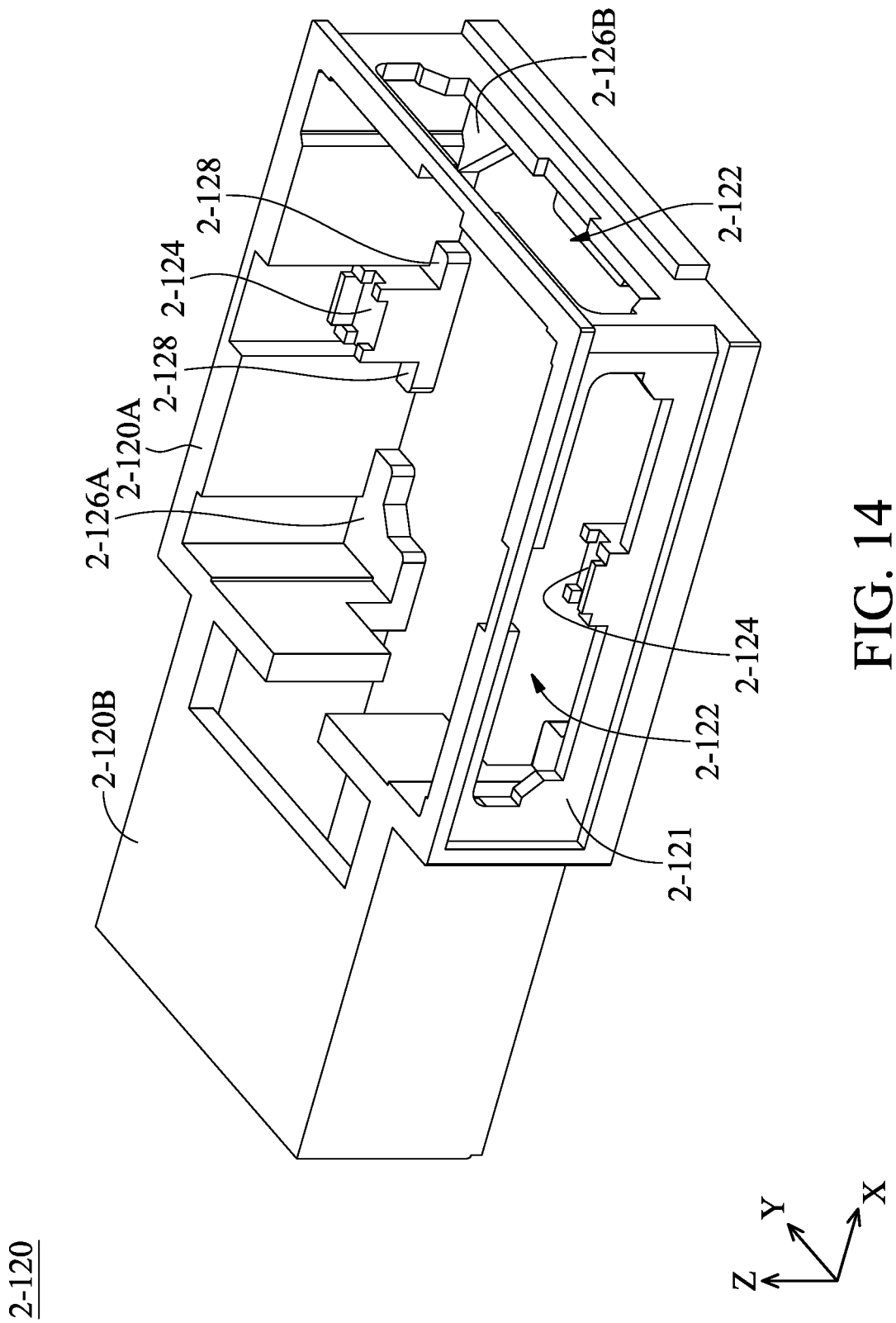
FIG. 14 is a schematic view of a bottom.

FIG. 14 is a schematic view of the bottom 2-120. The bottom 2-120 may has a recess 2-121 and a plurality of openings 2-122 at the first portion 2-120A used for accommodating the circuit board 2-170 and the second magnetic element 2-144, respectively. In some embodiments, the recess 2-121 and the openings 2-122 may be positioned at an identical side of the bottom 2-120 to reduce the distance between the second magnetic element 2-144 and the circuit board 170 to achieve miniaturization.

Moreover, in some embodiments, a pair of accommodating recesses 2-124 may be formed at the side of the bottom 2-120 for accommodating the contact element 2-162. In some embodiments, the contact element 2-162 may be formed as one piece with the bottom 2-120. In some embodiments, the contact elements 2-162 may be affixed in the accommodating recesses 2-124 of the bottom 2-120 by soldering, welding, resistance welding, or conductive glue.

Figure 15:
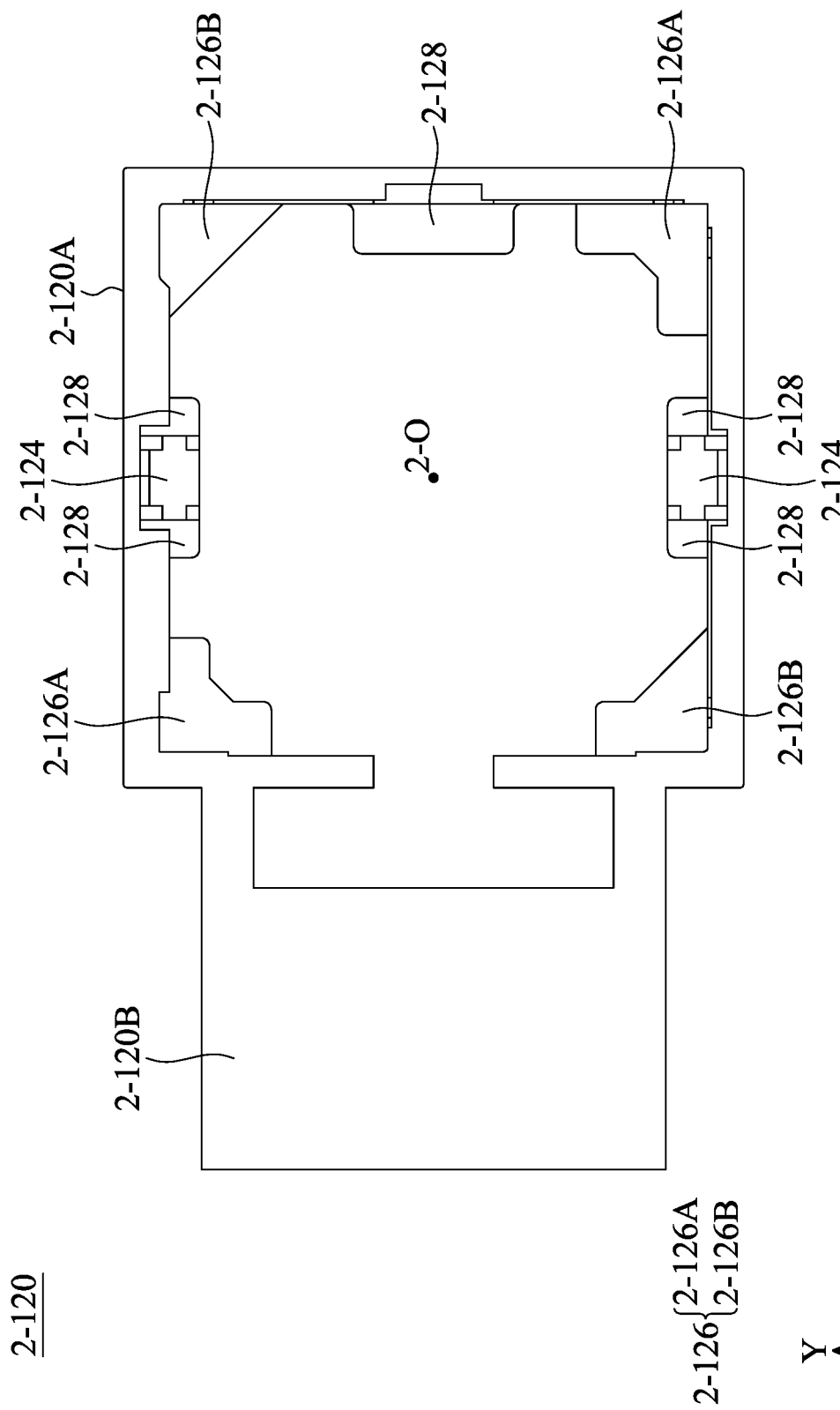
FIG. 15 is a top view of the bottom.

FIG. 15 is a top view of the bottom 2-120. The bottom 2-120 includes corner stopping portions 2-126 (includes a first corner stopping portion 2-126A and a second corner stopping portion 2-126B) and side stopping portions 2-128. The corner stopping portions 2-126 are positioned at the corners of the bottom 2-120, and the side stopping portions 2-128 are at the sides of the bottom 2-120. In some embodiments, the shape of the first corner stopping portion 2-126A and the second corner stopping portion 2-126B may have different shapes, or the distance between the first corner stopping portion 2-126A and the main axis 2-O1 is different than the distance between the second corner stopping portion 2-120B and the main axis 2-O1. As a result, the movable range of the movable portion 2-M1 relative to the bottom 2-120 in different directions may be controlled.

Figure 16:
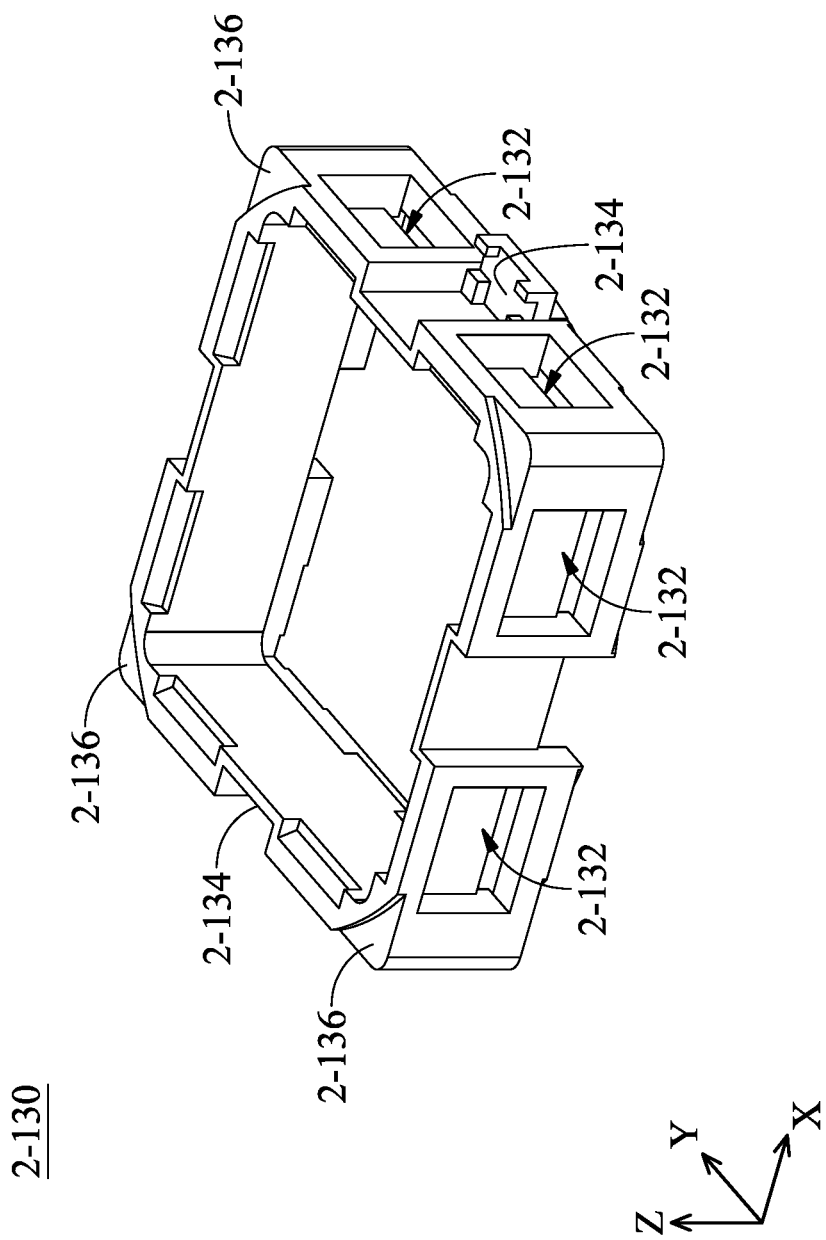
FIG. 16, FIG. 17A, and FIG. 17B are schematic views of the holder viewed in different directions.
Figure 17A:
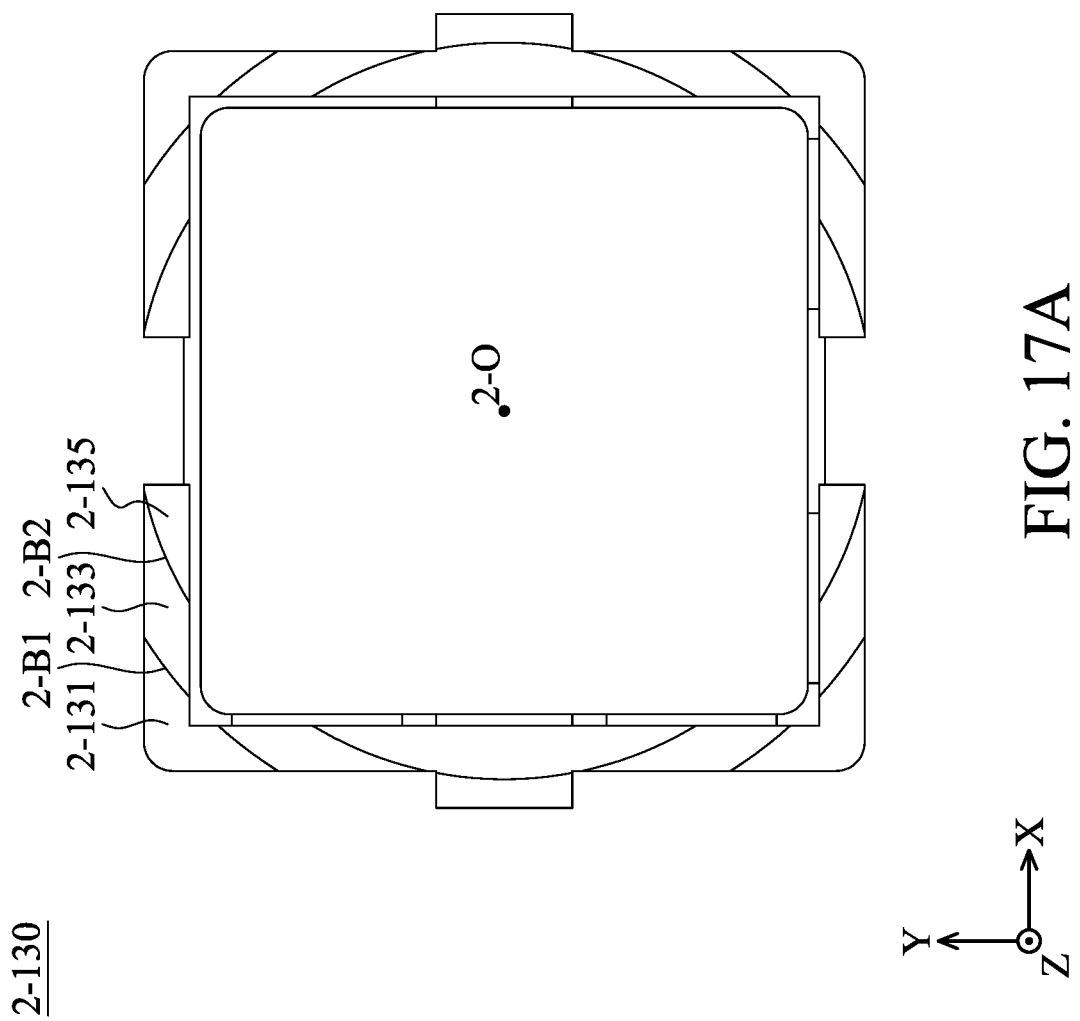
Figure 17B:
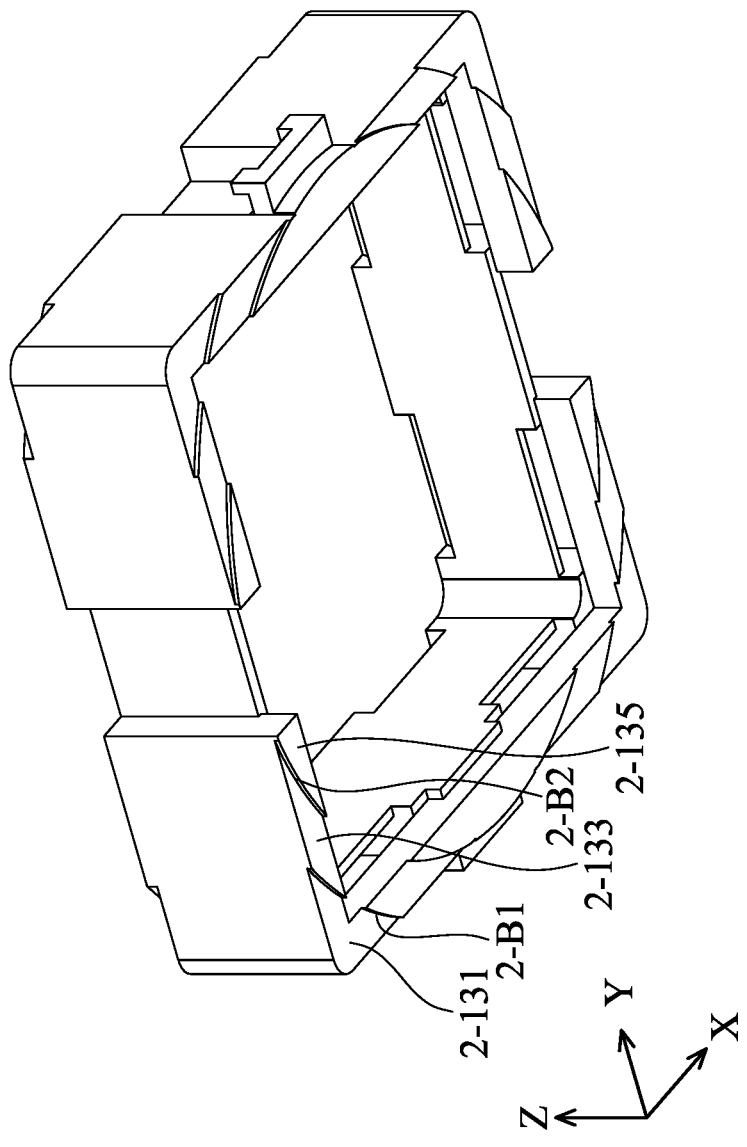

FIG. 16, FIG. 17A, and FIG. 17B are schematic views of the holder 2-130 in different directions. The holder 2-130 may have multiple openings 2-132 at the sides. The openings 2-132 are used for accommodating the first magnetic elements 2-142. In some embodiments, the openings 2-132 may position at some sides of the holder 2-130, and other sides of the holder 2-130 may not have the opening. In other embodiments, the openings 2-132 may be formed at all sides of the holder 2-130 to provide the first magnetic elements 2-142 at four sides of the holder 2-130, depending on design requirement. The holder 2-130 may have a pair of accommodating recesses 2-134 at the sides. The accommodating recesses 2-134 are used for accommodating the contact element 2-164. In some embodiments, the contact element 2-164 may be formed as one piece with the holder 2-130. In some embodiments, the contact elements 2-164 may be affixed in the accommodating recesses 2-134 of the holder 2-130 by soldering, welding, resistance welding, or conductive glue.

Furthermore, concave portions 2-136 may be formed at the corners of the holder 2-130. The concave portions 2-136 may act as a stopper for the holder 2-130 when the holder 2-130 is moving. In other words, the concave portions 2-136 may be in contact with the top plate 2-110 to limit the movable range of the holder 2-130.

In FIG. 17A and FIG. 17B, the holder 2-130 has a first portion 2-131, a second portion 2-133, and a third portion 2-135 at the bottom of the holder 2-130, and the first portion 2-131, the second portion 2-133, and the third portion 2-135 are arranged from the corner to the center of the holder 2-130. The first portion 2-131, the second portion 2-133, and the third portion 2-135 have a first bottom surface 2-131A, a second bottom surface 2-133A, and a third bottom surface 2-135A. The first edge B1 between the first portion 2-131 and the second portion 2-133 and the second edge B2 between the second portion 2-133 and the third portion 2-135 may have substantially circular shapes to balance the movable range of the holder 2-130 in different directions. In some embodiments, the centers of circle of the first edge 2-B1 and the second edge 2-B2 are penetrated by the main axis 2-O1. In other words, the centers of circle of the first edge 2-B1 and the second edge 2-B2 overlaps each other.

Figure 18:
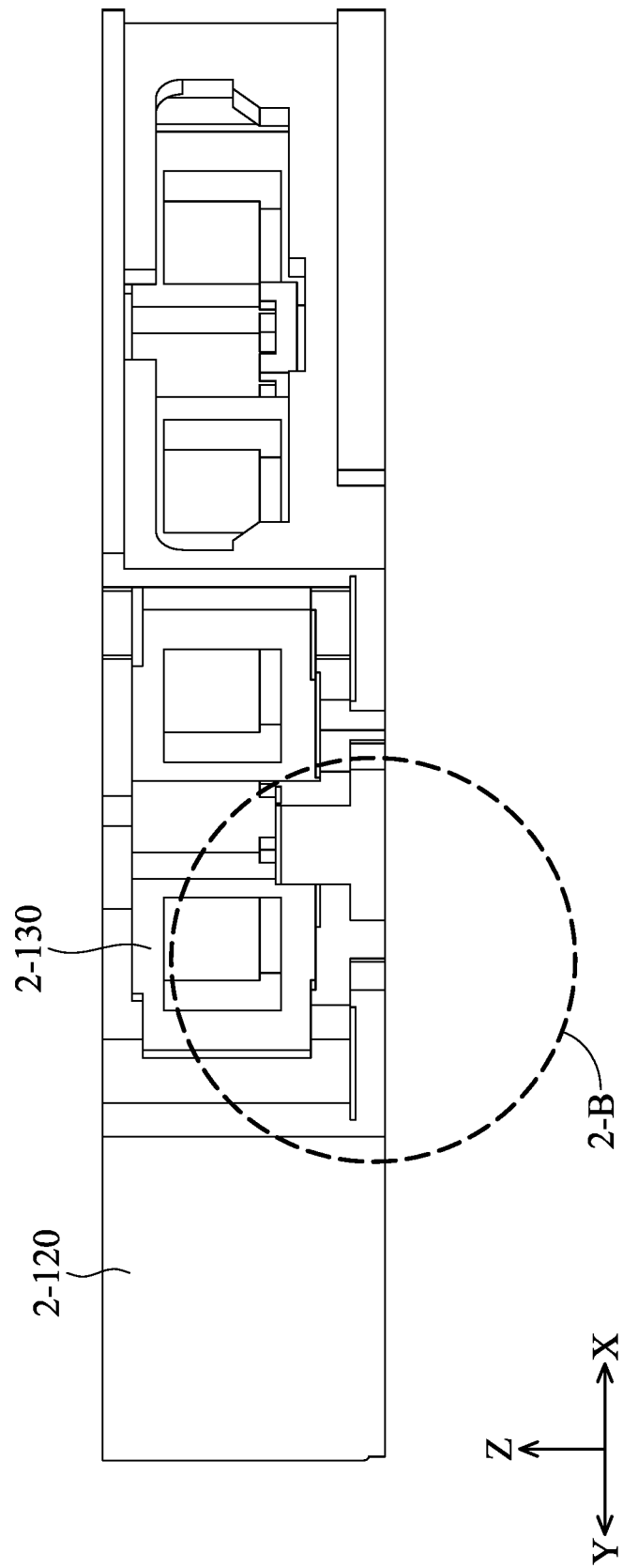
FIG. 18 is a cross-sectional view of some elements of the optical element driving mechanism.
Figure 19:
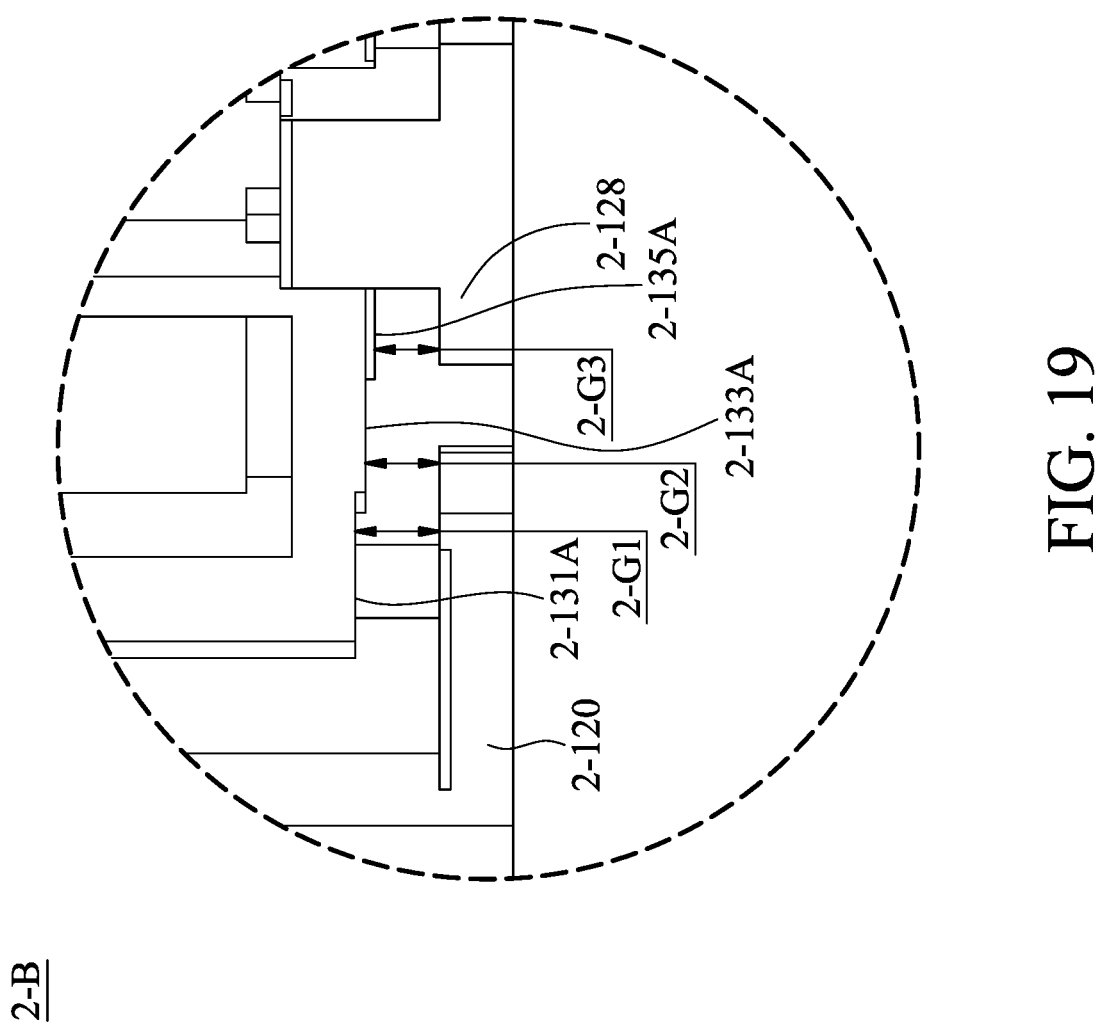
FIG. 19 is an enlarged view of the portion 2-B in FIG. 18.

FIG. 18 is a cross-sectional view of the bottom 2-120 and the holder 2-130 when viewed from the side, and FIG. 19 is an enlarged view of the portion 2-B in FIG. 18. As shown in FIG. 17 to FIG. 19, the holder 2-130 may have a stepped structure at its bottom surface (the surface facing the concave portion 2-136). The holder 2-130 may have multiple bottom surfaces, such as the first bottom surface 2-131A, the second bottom surface 2-133A, and the third bottom surface 2-135A that form the stepped structure. In other words, in the Z direction, the distances between the first bottom surface 2-131A, the second bottom surface 2-133A, and the third bottom surface 2-135A to the bottom 2-120 are different. In some embodiments, in the Z direction, the distance between the first bottom surface 2-131A and the corner stopping portion 2-126 is 2-G1, the distance between the second bottom surface 2-133A and the corner stopping portion 2-126 is 2-G2, the distance between the third bottom surface 2-135A and the corner stopping portion 2-126 is 2-G3, and 2-G1>2-G2>2-G3. In other words, in the direction of the main axis 2-O1, the distance between the top surface of the corner stopping portion 2-126 to the movable portion 2-M1 (e.g. the distance 2-G1 or 2-G2) is greater than the distance between the top surface of the side stopping portion 2-128 to the movable portion 2-M1 (e.g. the distance 2-G3). Therefore, when the holder 2-130 moves relative to the bottom 2-120 to tilt, multiple bottom surfaces of the holder 2-130 (the stepped first bottom surface 2-131A, the second bottom surface 2-133A, and the third bottom surface 2-135A) may in contact with the bottom 2-120, so the contact force may be separated to enhance the reliability of the optical element driving mechanism 2-100.

Figure 20:
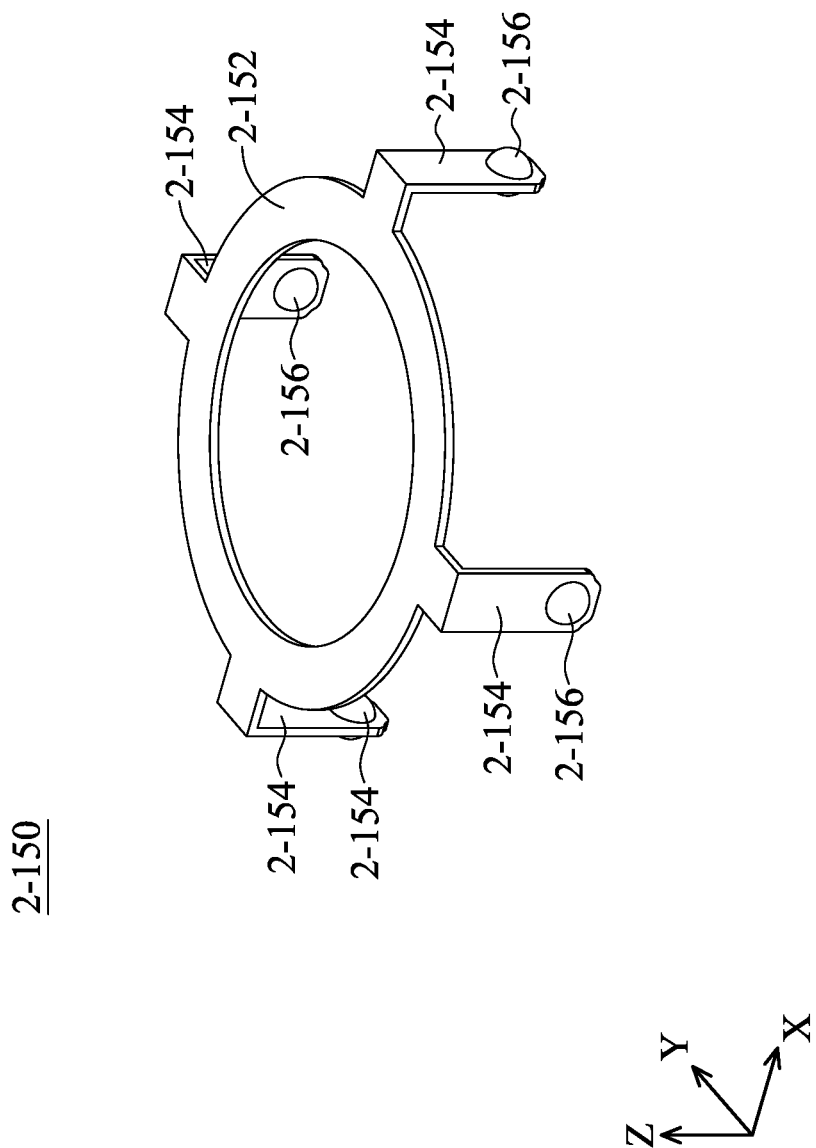
FIG. 20 is a schematic view of the connecting element.

FIG. 20 is a schematic view of the connecting element 2-150. The connecting element 2-150 includes a main body 2-152, an extending portion 2-154, and a connecting portion 2-156. In some embodiments, the main body 2-152 may have a circular shape. The extending portion 2-154 may extend from the main body 2-152 in the Z direction, and the connecting portion 2-156 is disposed on the extending portion 2-154 and may be spherical shaped. In some embodiments, the material of the connecting element 2-150 may be metal that is not magnetic-conductive to prevent magnetic interference between the connecting element 2-150 and other elements in the optical element driving mechanism 2-100 (e.g. the first magnetic element 2-142 or the second magnetic element 2-144). The optical module 2-180 may be affixed on the connecting element 2-150, such as affixed on the main body 2-152 and move with the connecting element 2-150. For example, the optical module 2-180 may move relative the holder 2-130, or move relative to the top plate 2-110, the bottom 2-120 together with the holder 2-130 and the connecting element 2-150.

Figure 21:
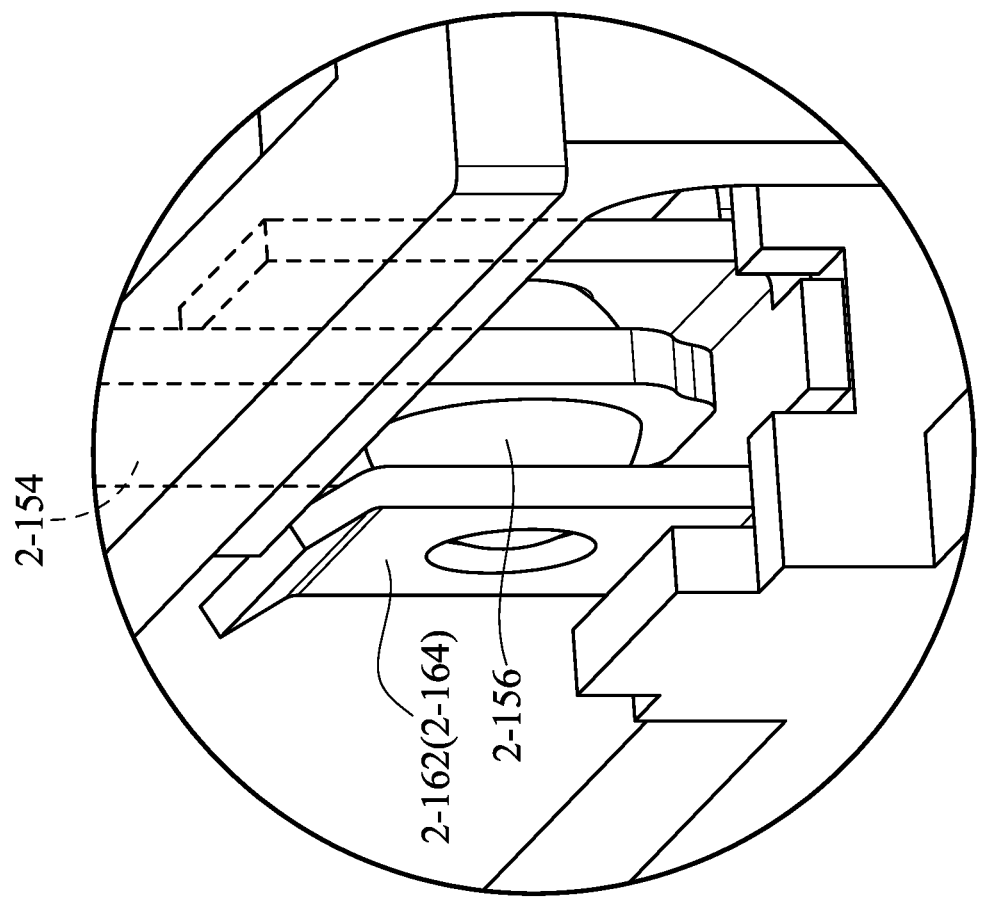
FIG. 21 is a schematic view of some elements of the optical element driving mechanism.
Figure 22:
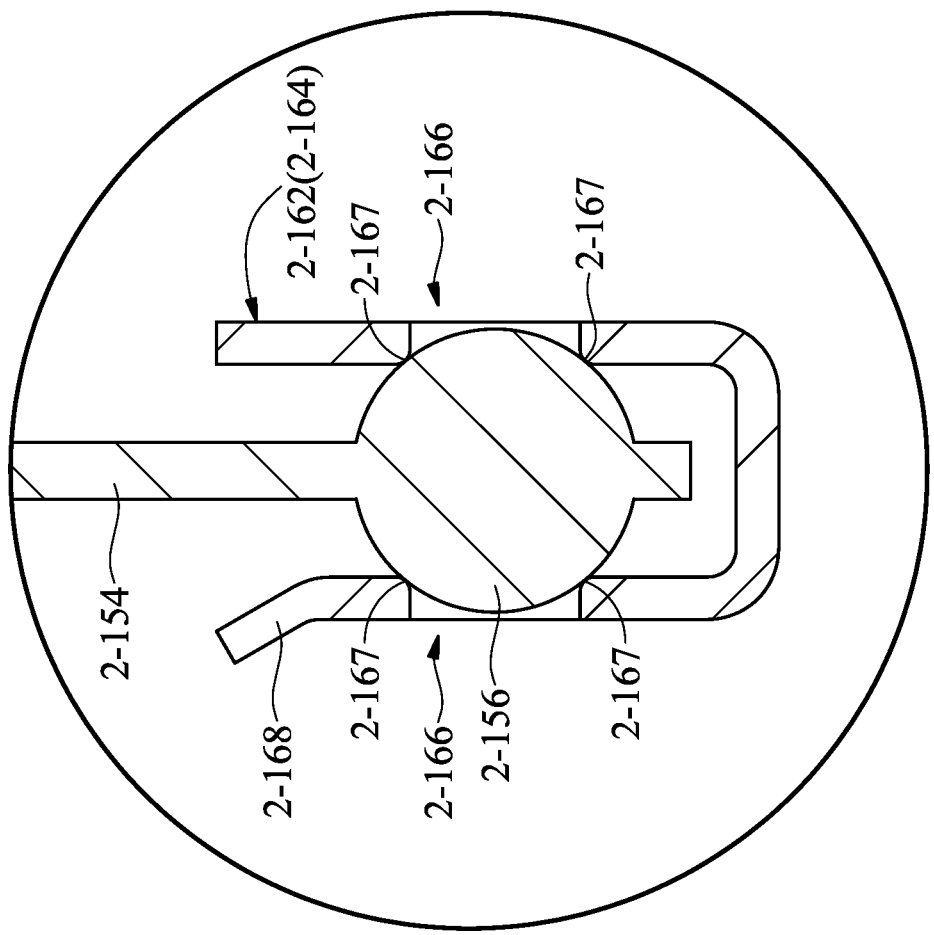
FIG. 22 is a cross-sectional view of some elements in the optical element driving mechanism.

FIG. 21 and FIG. 22 are a schematic view and a cross-sectional view when the connecting element 2-150 connects to the contact element 2-162 or the contact element 2-164. A pair of the connecting portion 2-156 of the connecting element 2-150 is disposed in the contact element 2-162, and another pair of the connecting portions 2-156 are disposed in the contact element 2-164. In other words, the contact element 2-162 or the contact element 2-164 is in contact with one of the connecting portions 2-156.

The contact element 2-162 or the contact element 2-164 may have a pair of contact portions 2-165 extending to the Z direction. Each of the two contact portions 2-165 may have an assembling portion 2-166 (e.g. a circular opening). The connecting portion 2-156 may be clipped by the two contact portions 2-165 from the opposite sides of the connecting portion 2-156. In other words, the connecting portion 2-156 is disposed between two contact portions 2-165. Furthermore, a part of the spherical connecting portion 2-156 may be disposed in the assembling portion 2-166. In other words, when viewed along the main axis 2-O1, one of the connecting portion 2-156 overlaps on of the contact portions 2-165 to allow the connecting element 2-150 movably connects the bottom 2-120 (a portion of the fixed portion 2-F1) or the holder 2-130 (a portion of the movable portion 2-M1). In other words, a pair of the connecting portions 2-156 of the contact element 2-162 or the contact element 2-164 may directly and movably in contact with one of the movable portion 2-M1 or the fixed portion 2-F1, and another pair of the connecting portions 2-156 of the contact element 2-162 or the contact element 2-164 may directly and movably in contact with another one of the movable portion 2-M1 or the fixed portion 2-F1.

In some embodiments, a corner 2-167 of the assembling portion 2-166 which is in contact with the connecting portion 2-156 may not be a right angle (e.g. a rounded angle or a chamfer) to prevent the connecting portion 2-156 from in direct contact from right angle. In some embodiments, a bent portion 2-168 may be disposed on one of the contact portion 2-165 to allow the connecting portion 2-156 of the connecting element 2-150 be easily disposed in the contact element 2-162 or the contact element 2-164.

Figure 23:
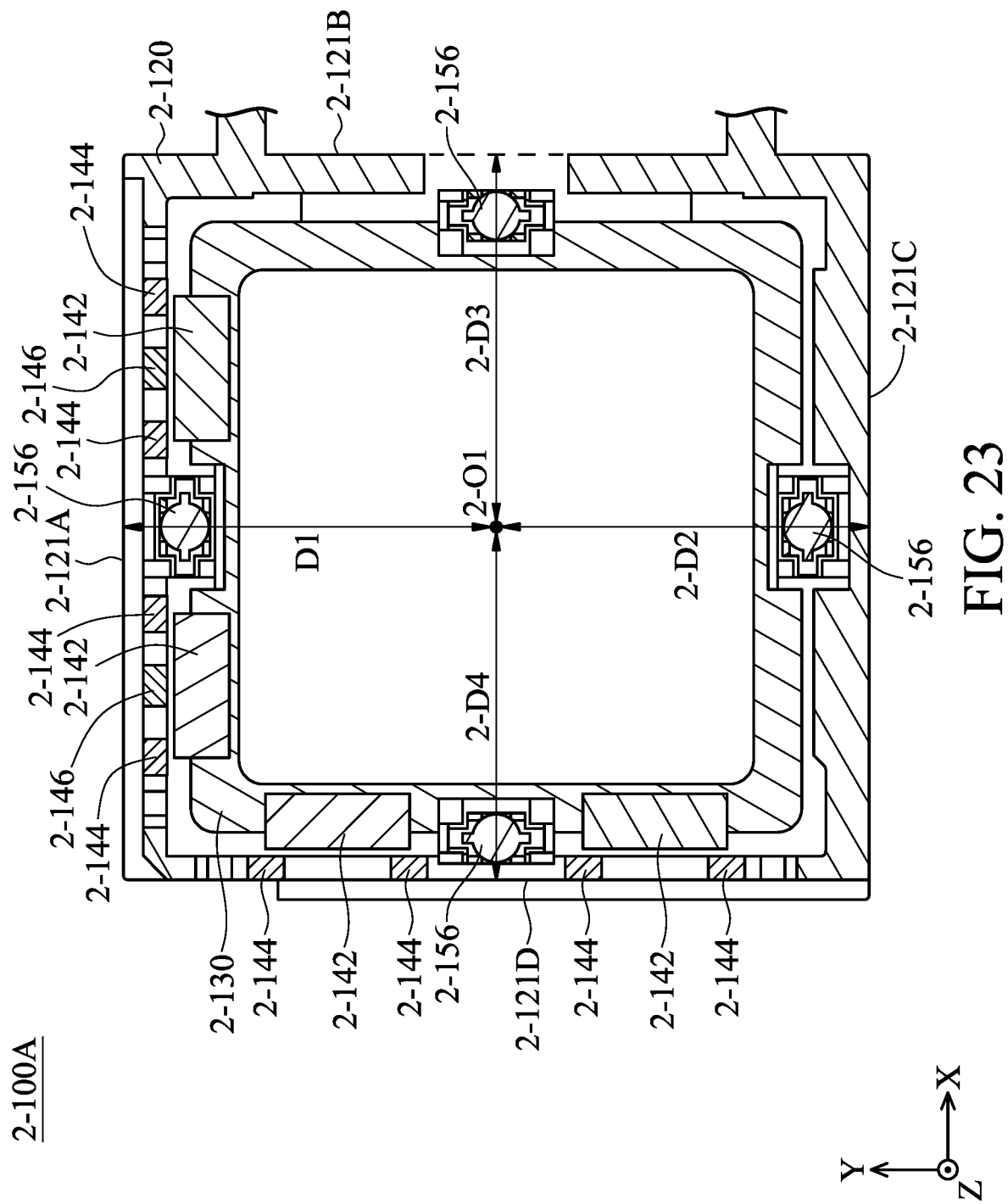
FIG. 23 is a cross-sectional view of some elements in the optical element driving mechanism in some embodiments.

FIG. 23 is a cross-sectional view of the optical element driving mechanism 2-100A when viewed from top. The structure of the optical element driving mechanism 2-100A may be similar to the optical element driving mechanism 2-100. The first magnetic element 2-142 and the second magnetic element 2-144 may disposed opposite from each other, and may be disposed on some of the sides of the optical element driving mechanism 2-100A, such as disposed on two of the adjacent sides. Other sides may not have the first magnetic element 2-142 and the second magnetic element 2-144. In other words, the fixed portion 2-F1 has a rectangular shape, and the driving elements (the first magnetic element 2-142 and the second magnetic element 2-144) are disposed on adjacent sides of the fixed portion 2-F1. Therefore, magnetic interference in the optical element driving mechanism 2-100A may be reduced. The position sensor 2-146 may be disposed in the second magnetic element 2-144 at the first side 2-121A, and the second magnetic element 2-144 which is disposed at the second side 2-121D may not have any position sensor. Furthermore, as shown in FIG. 23, the connecting portion 2-156 may substantially disposed at the centers of the sides of the bottom 2-120, such as the first side 2-121A, the second side 2-121B, the third side 2-121C, or the fourth side 2-121D. Therefore, the optical module 2-180 may rotate, and the rotational axis of the optical module 2-180 may be parallel to the X axis or the Y axis to easily control the optical element driving mechanism 2-100A. Moreover, the required space may be reduced to achieve miniaturization.

In some embodiments, the distance between the main axis 2-O1 (which passes through the center of the holder 2-130 or the optical module 2-180) and the sides of the bottom 2-120 may be different. For example, as shown in FIG. 23, the distance between the main axis 2-O1 to the first side 2-121A, the second side 2-121B, the third side 2-121C, and the fourth side 2-121D may be distances 2-D1, 2-D2, 2-D3, and 2-D4, respectively. The distance 2-D1 may be not equal to the distance 2-D3, and the distance 2-D2 may be not equal to the distance 2-D4. In particular, the first side 2-121A is opposite from the second side 2-121B, the third side 2-121C is opposite from the fourth side 2-121D. The optical element 2-181 is circular, and the main axis 2-O1 passes through the center of circle of the optical element 2-181. In a first direction that is perpendicular to the main axis 2-O1 (e.g. the Y direction), the distance 2-D1 between the center of the optical element 2-181 to the first side 2-121A is different than the distance 2-D2 between the center of the optical element 2-181 to the second side 2-121B. Moreover, in a second direction (e.g. the X direction) that is perpendicular to the main axis 2-O1 and the first direction (e.g. the Y direction), the distance 2-D3 between the center of the optical element 2-181 to the third side 2-121C is different than the distance 2-D4 between the center of the optical element 2-181 to the fourth side 2-121D. In other words, the main axis 2-O1 is not at the center of the bottom 2-120. Therefore, additional elements may be disposed at specific sides to utilize the space more efficiently, and miniaturization may be achieved. However, the present disclosure is not limited thereto. The main axis 2-O1 may pass the center of the bottom 2-120 to balance the weight of the optical element driving mechanism 2-100A.

In some embodiments, the holder 2-130 may be omitted, and the first magnetic element 2-142 may be directly disposed on the driving assembly 2-182 of the optical module 2-180 to achieve miniaturization.

Figure 24:
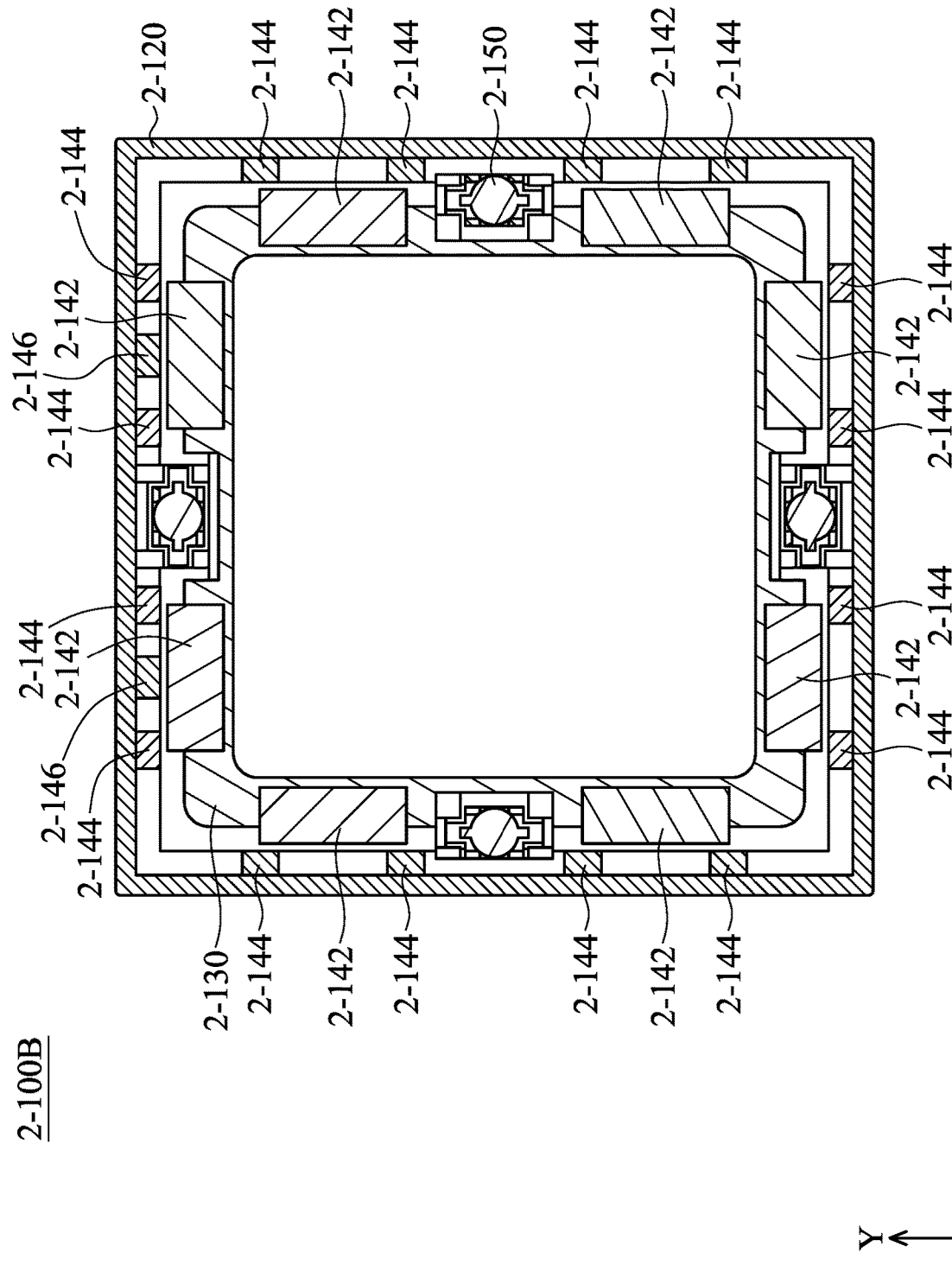
FIG. 24 is a cross-sectional view of some elements in the optical element driving mechanism in some embodiments.

In some embodiments, as shown in FIG. 24, the first magnetic element 2-142 and the second magnetic element 2-144 may be disposed at all sides of the optical element driving mechanism 2-100B. In other words, the fixed portion 2-F1 has a rectangular shape, and the driving element (e.g. the first magnetic element 2-142 and the second magnetic element 2-144) may be disposed on at least two opposite sides of the fixed portion 2-F1, and may be disposed on four sides of the fixed portion 2-F1. Therefore, the driving force of the driving assembly 2-140 may be further enhanced. In FIG. 24, two position sensors 146 may be used for detecting the movement in different directions, and may be disposed at an identical side.

Figure 25:
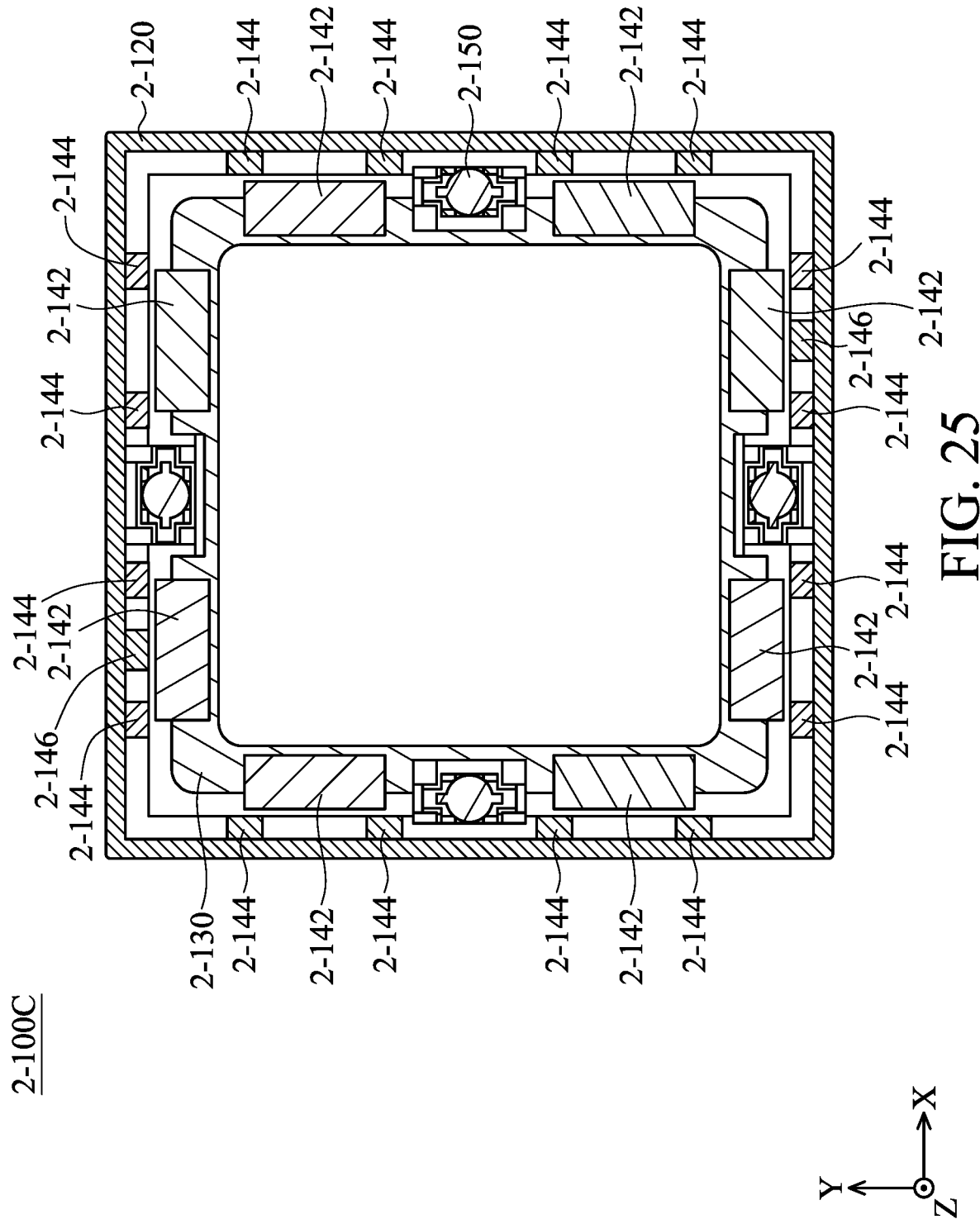
FIG. 25 is a cross-sectional view of some elements in the optical element driving mechanism in some embodiments.

In some embodiments, as shown in FIG. 25, the first magnetic element 2-142 and the second magnetic element 2-144 may be disposed at all sides of the optical element driving mechanism 2-100C to further increase the driving force of the driving assembly 2-140. In FIG. 25, two position sensors 2-146 may be used for detecting movement in different directions, and may be disposed at different sides, such as may be disposed at opposite sides or adjacent sides.

Therefore, the connecting element 2-150 may be movably disposed in the optical element driving mechanism 2-100 to achieve rotation in one axis or multiple axes, rather than using a spring so suspend the optical module 2-180 in the optical element driving mechanism 2-100. Therefore, the optical element driving mechanism 2-100 may be operated if the friction between the connecting element 2-150, the contact element 2-162, and the contact element 2-162 is overcame, so required power may be reduced. Furthermore, this design allows the optical module 2-180 to be rotated by the optical element driving mechanism 2-100 with a higher angle (e.g. ±2 degrees or ±10 degrees). Moreover, the connecting element 2-150 has a higher mechanical strength, so the reliability of the optical element driving mechanism 2-100 may be increased, and the optical module 2-180 may be prevented from sinking because of its weight, but the present disclosure is not limited thereto.

Figure 26:
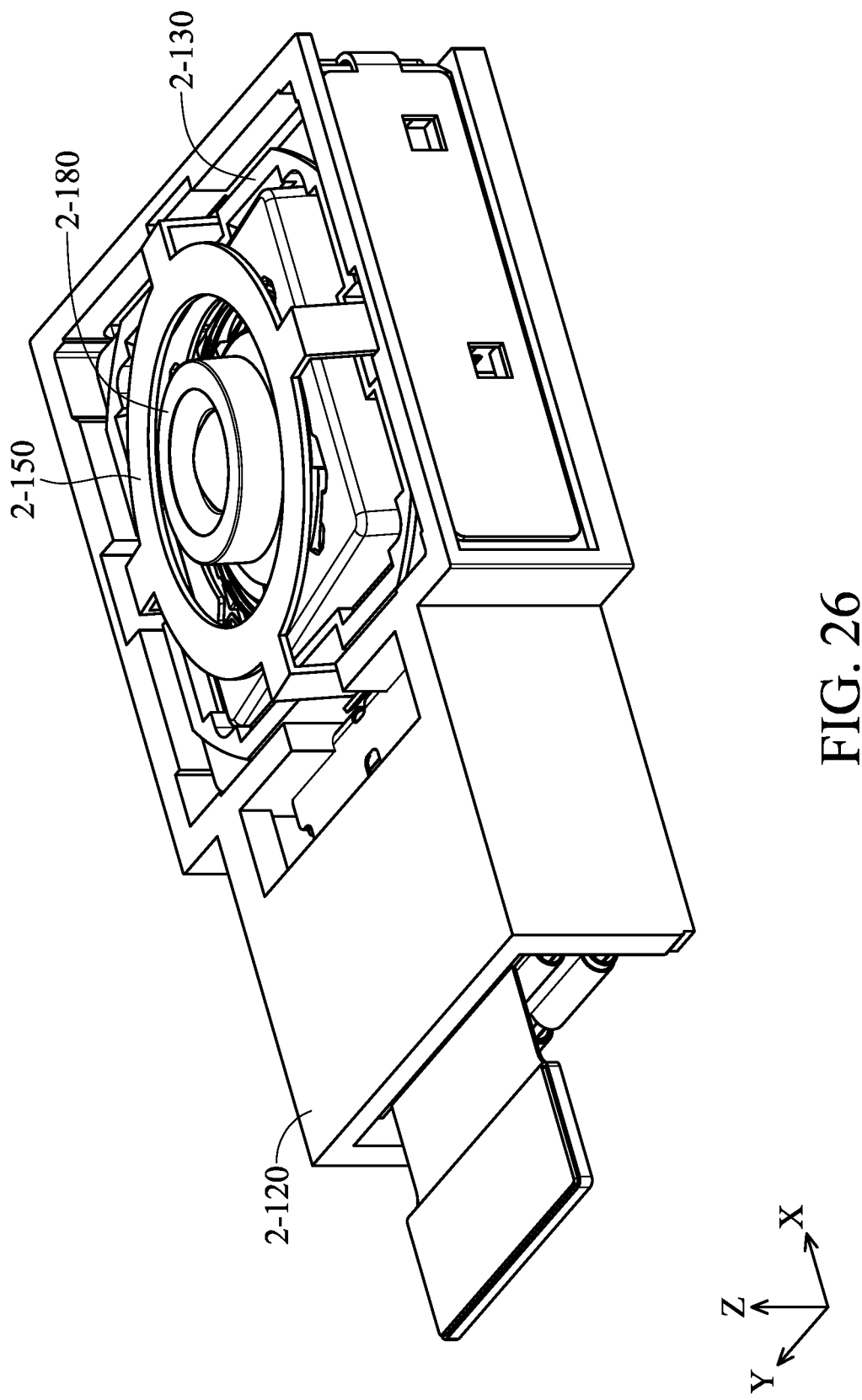
FIG. 26 is a schematic view when the optical element driving mechanism is operating.
Figure 27:
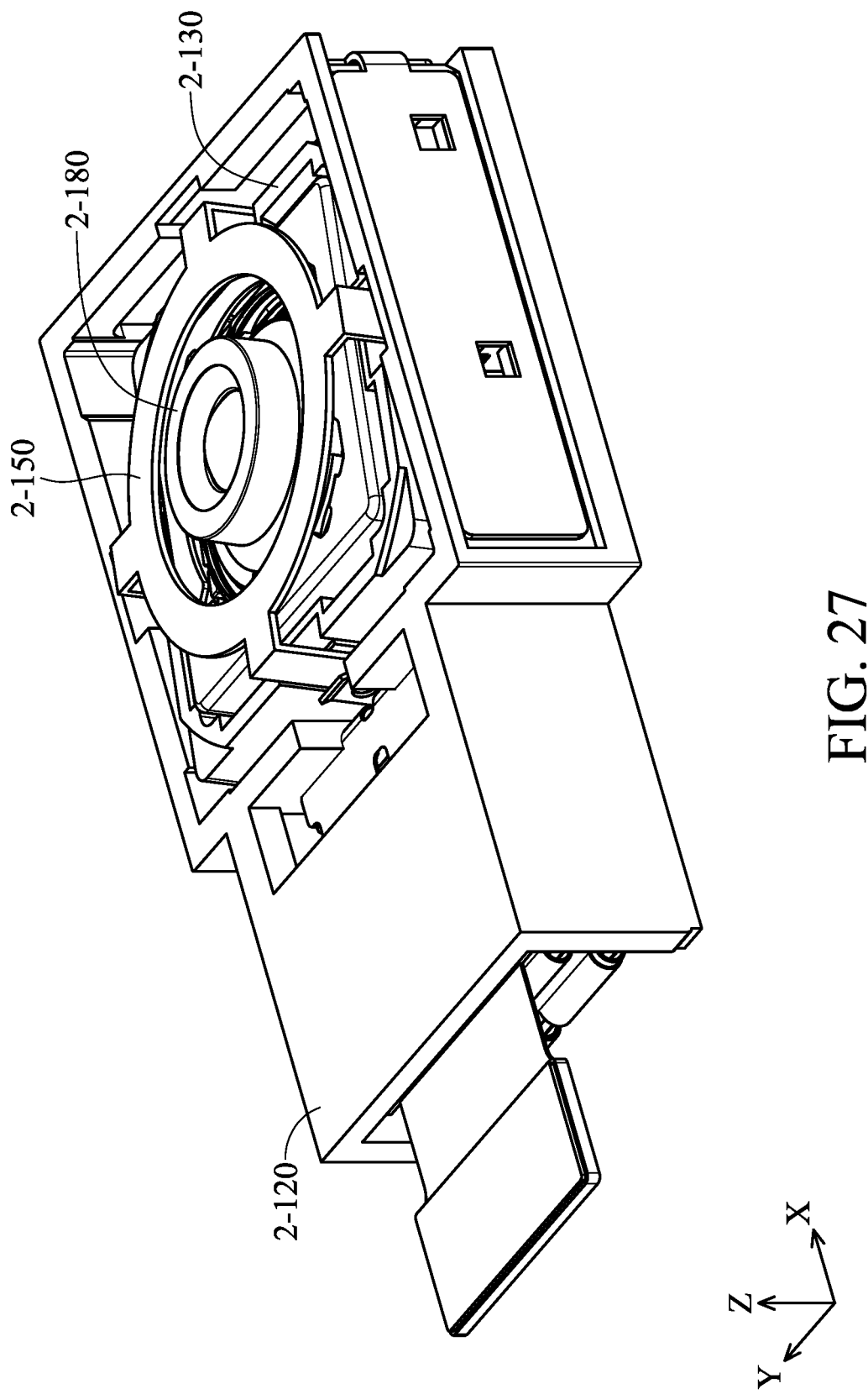
FIG. 27 is a schematic view when the optical element driving mechanism is operating.

FIG. 26 is a schematic view when the connecting element 2-150 and the optical module 2-180 in the optical element driving mechanism 2-100 rotates relative to the fixed portion 2-F1 in one direction, wherein the holder 2-130 does not move relative to the fixed portion 2-F1. FIG. 27 is a schematic view when the holder 2-130, the connecting element 2-150, and the optical module 2-180 disposed on the connecting element 2-150 rotate relative to the fixed portion 2-F1 in another direction. As shown in FIG. 26 and FIG. 27, the connecting element 2-150 and the optical module 2-180 disposed on the connecting element 2-150 may rotate in different direction by the driving force generated by the driving assembly 2-140. Although the optical module 2-180 only rotates in one direction in FIG. 26 and FIG. 27, it should be realized that the optical module 2-180 also may rotate in more than one axis (e.g. the X axis, the Y axis, or the Z axis) to achieve optical image stabilization.

Figure 28:
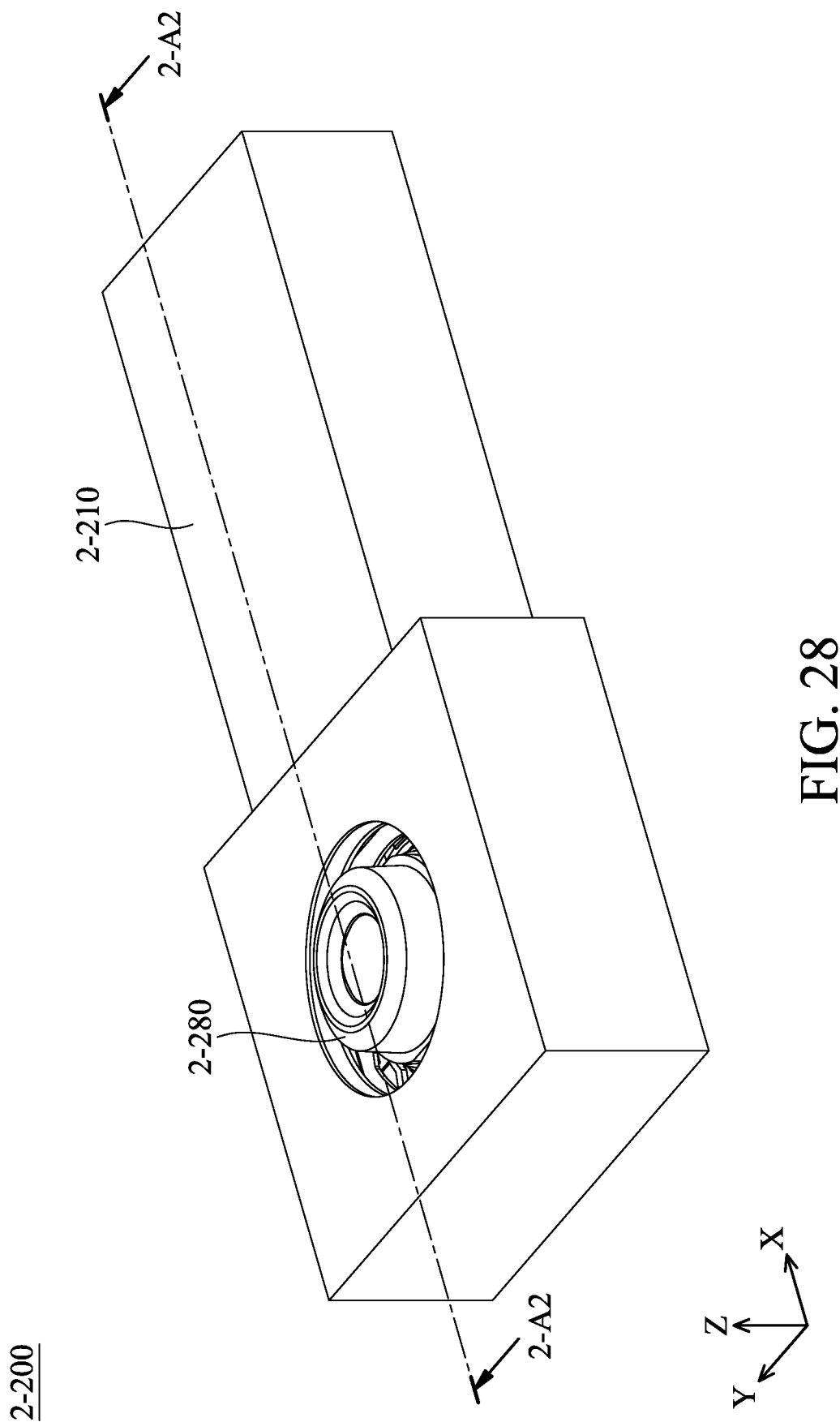
FIG. 28 is a perspective view of an optical element driving mechanism in some embodiments of the present disclosure.
Figure 29:
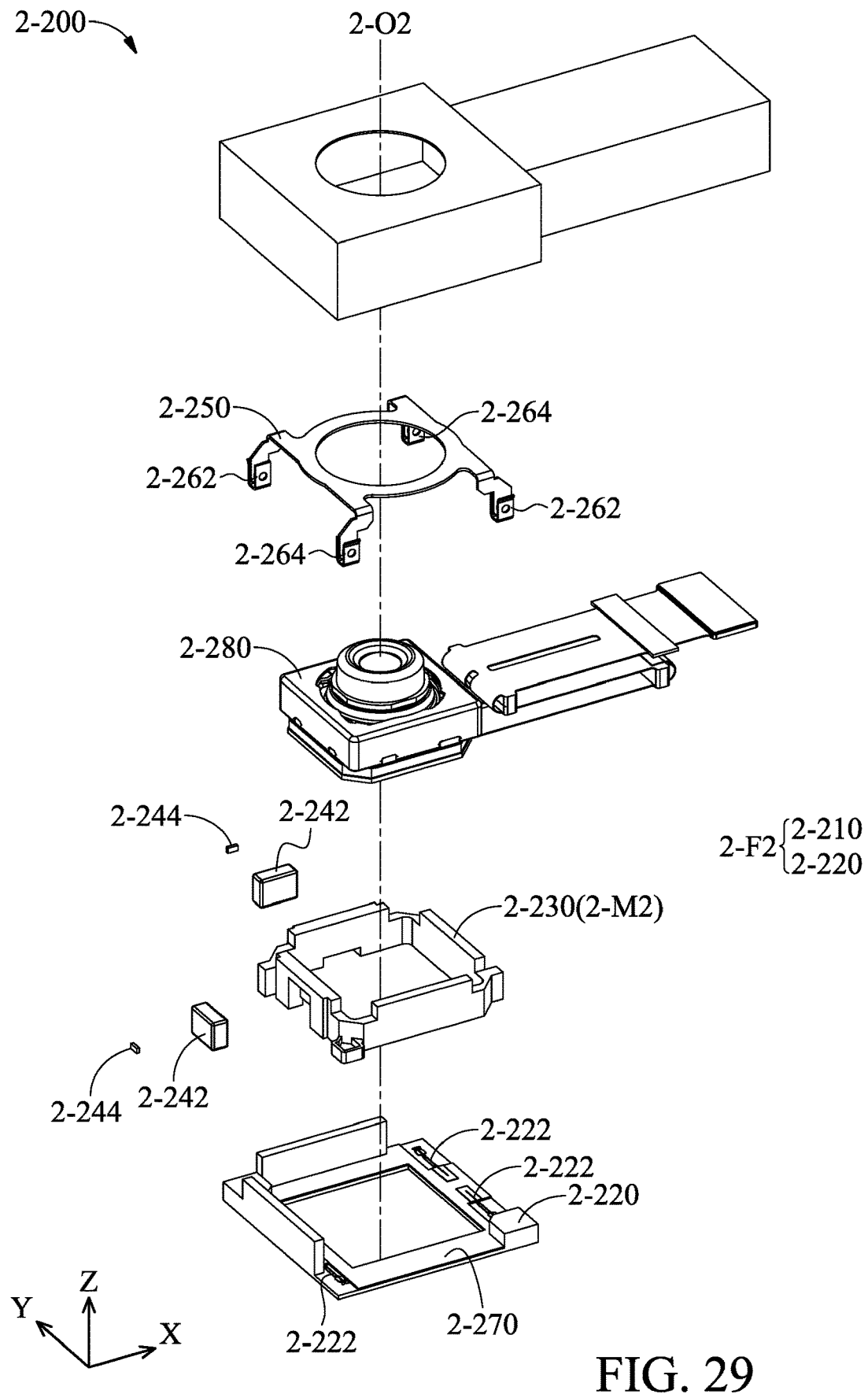
FIG. 29 is an exploded view of the optical element driving mechanism.
Figure 30:
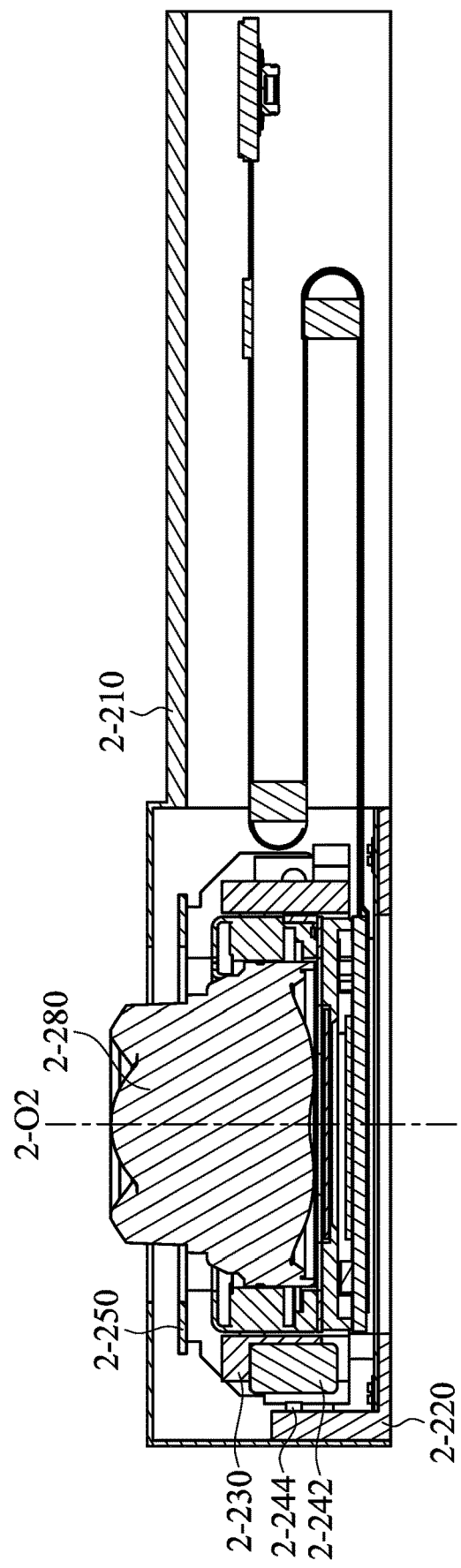
FIG. 30 is a cross-sectional view of the optical element driving mechanism.

FIG. 28 to FIG. 30 are a perspective view, an exploded view, and a cross-sectional view illustrated along the line 2-A2-2-A2 of FIG. 28 of an optical element driving mechanism 2-200 in some embodiments of the present disclosure. In FIG. 29, the optical element driving mechanism 2-200 mainly includes a top case 2-210, a bottom 2-220, a driving assembly 2-222, a holder 2-230 (or movable portion 2-M2), a magnetic element 2-242, a position sensor 2-244, a connecting element 2-250, a contact element 2-262, a contact element 2-264, and a circuit board 2-240. The optical element driving mechanism 2-200 is used for driving an optical module 2-280 to move, or may be used for driving other optical elements, such as a lens, a mirror, a prism, a beam splitter, or an aperture, but the present disclosure is not limited thereto.

In some embodiments, the top case 2-210 and the bottom 2-220 may be combined to form the case of the optical element driving mechanism 2-200. Moreover, the top case 2-210 and the bottom 2-220 may be called as the fixed portion 2-F2.

In some embodiments, the holder 2-230 (the movable portion 2-M2) may be relative to the fixed portion 2-F2 (e.g. the top case 2-210 and the bottom 2-220). Therefore, the optical module 2-280 which is disposed on the holder 2-230 may be moved by the holder 2-230 to achieve auto focus or optical image stabilization.

Figure 31:
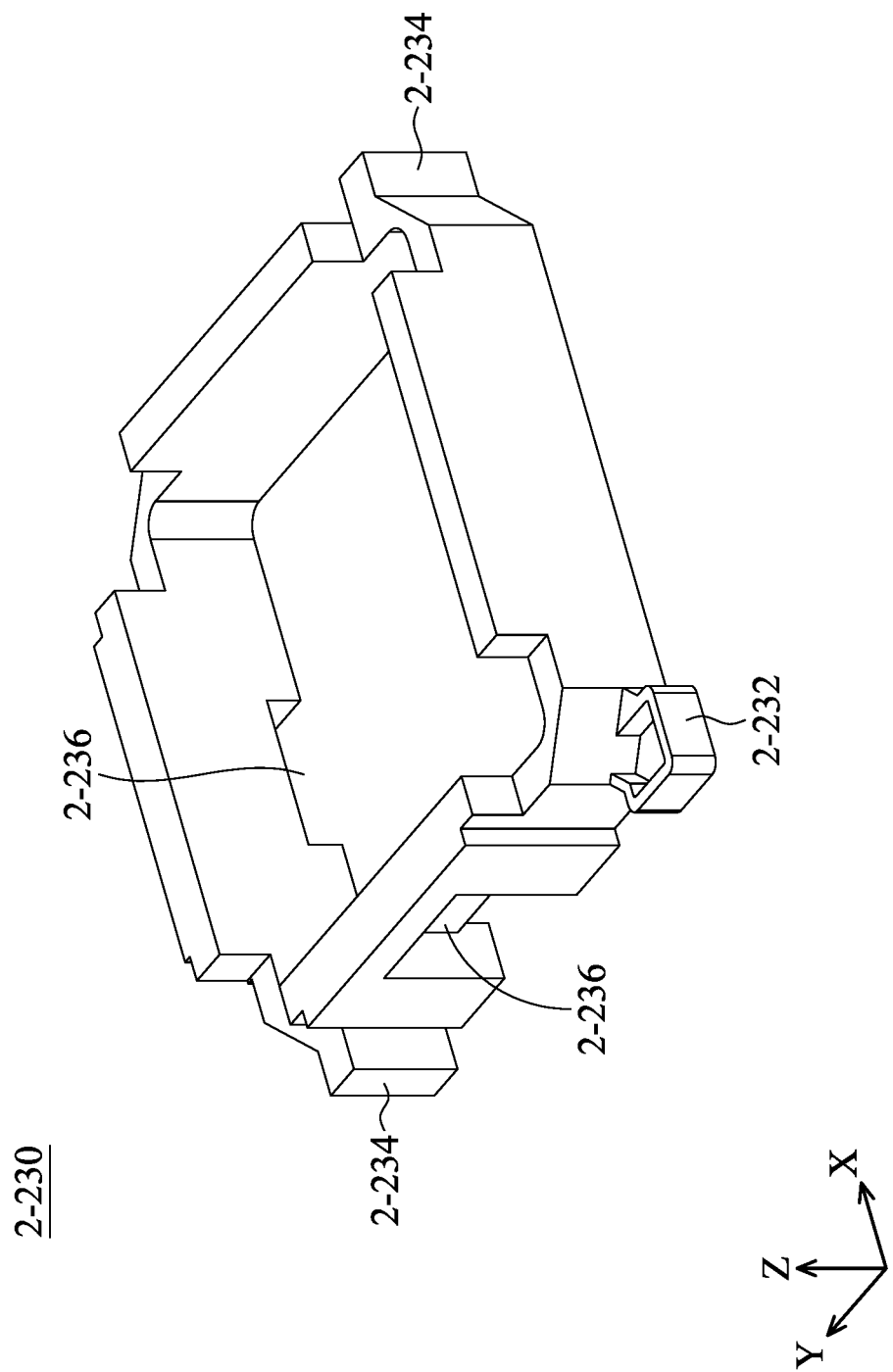
FIG. 31 is a schematic view of the holder.

FIG. 31 is a schematic view of the holder 2-230. The holder 2-230 may have a pair of first extending portions 2-232 and a pair of second extending portions 2-234 disposed on opposite corners of the holder 2-230. The shapes of the first extending portion 2-232 and the second extending portion 2-234 may be different. The contact element 2-264 may be disposed on the first extending portion 2-232.

In some embodiments, magnetic elements 2-242 (e.g. magnets) may be disposed on the holder 2-230, and position sensors 2-244 may be disposed on the fixed portion 2-F2 (e.g. the bottom 2-220) to allow the position sensor 2-244 detect the variation of the magnetic field generated by the magnetic element 2-242 when the holder 2-230 moves relative to the fixed portion 2-F2. For example, as shown in FIG. 31, the holder 2-230 may have a recess 2-236, and the magnetic element 2-242 may be disposed in the recess 2-236 to allow the magnetic element 2-242 to move relative to the holder 2-230.

The configuration of the connecting element 2-250, the contact element 2-262, and the contact element 2-264 of the optical element driving mechanism 2-200 are similar to the connecting element 2-150, the contact element 2-162, and the contact element 2-164 of the optical element driving mechanism 2-100, and is not repeated.

FIG. 32 is a top view of the driving assembly 2-222, and FIG. 33 is a side view of the driving assembly 2-222. As shown in FIG. 32 and FIG. 33, the driving assembly 2-222 may include a plurality of driving elements, such as a first driving element 2-224 and a second driving element 2-226. The first driving element 2-224 may be linear shaped, and the second driving element 2-226 may have a curved shape, such as may have a first portion 2-226A and a second portion 2-226B that bend to different directions.

The first driving element 2-224 may be formed by shape memory alloy (SMA), which is an alloy that can eliminate the deformation in lower temperature by heating. When the shape memory alloy performs plastic deformation under its phase transition temperature, it may return to its original shape by heating. Therefore, the temperature of the first driving element 2-224 may be changed by passing current to change the shape of the first driving element 2-224, and the second driving element 2-226 which is resilient may be moved accordingly. It should be noted that the fixed portion 2-F2 and the movable portion 2-M2 are affixed on the second driving element 2-226.

Figure 34:
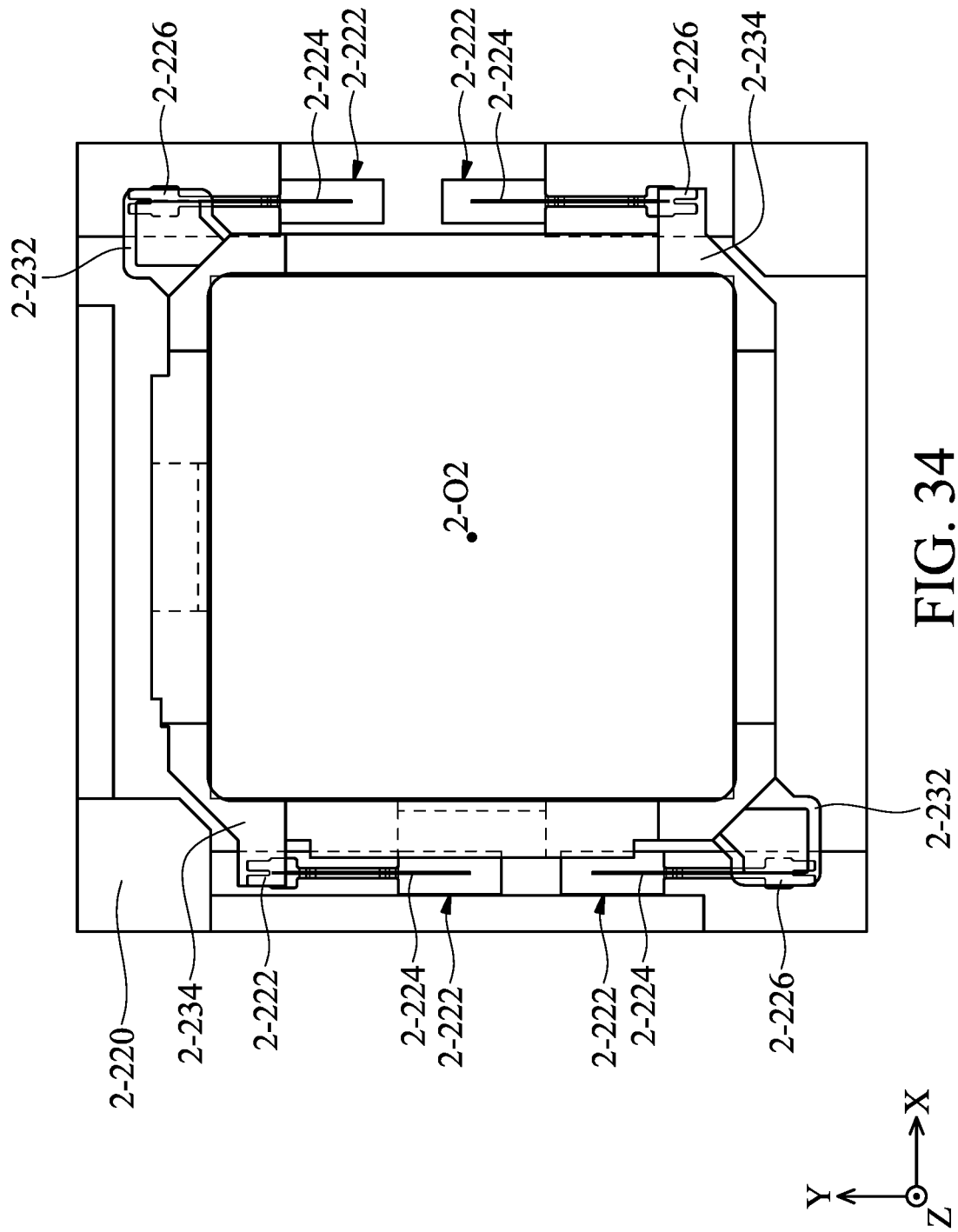
FIG. 34 is a top view of some elements of the optical element driving mechanism.

FIG. 34 is a top view of some elements of the optical element driving mechanism 2-200, wherein the first extending portion 2-232 and the second extending portion 2-234 of the holder 2-230 may be disposed (e.g. affixed) on the second portion 2-224B of the second driving element 2-226 (FIG. 33) to allow the holder 2-230 move with the deformation of the second driving element 2-226. Therefore, the holder 2-230 and the optical module 2-280 disposed on the holder 2-230 may move together relative to the fixed portion 2-F2, and the optical module 2-280 may move in additional directions (e.g. rotate relative to the X, Y, or Z axis) to improve the performance of the optical module, such as achieving optical image stabilization.

Figure 35A:
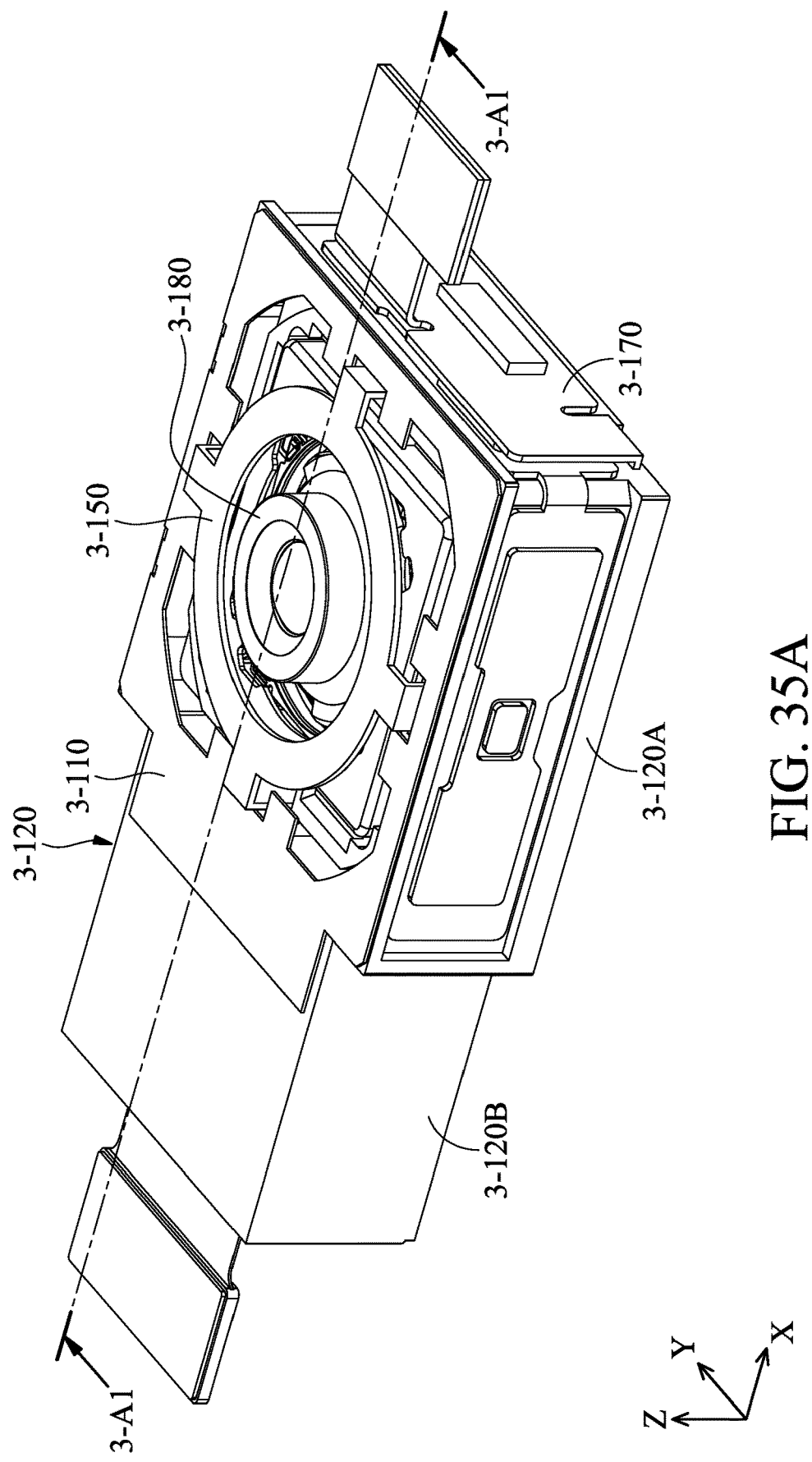
FIG. 35A is a schematic view of an optical element driving mechanism in some embodiments of the present disclosure.
Figure 35B:
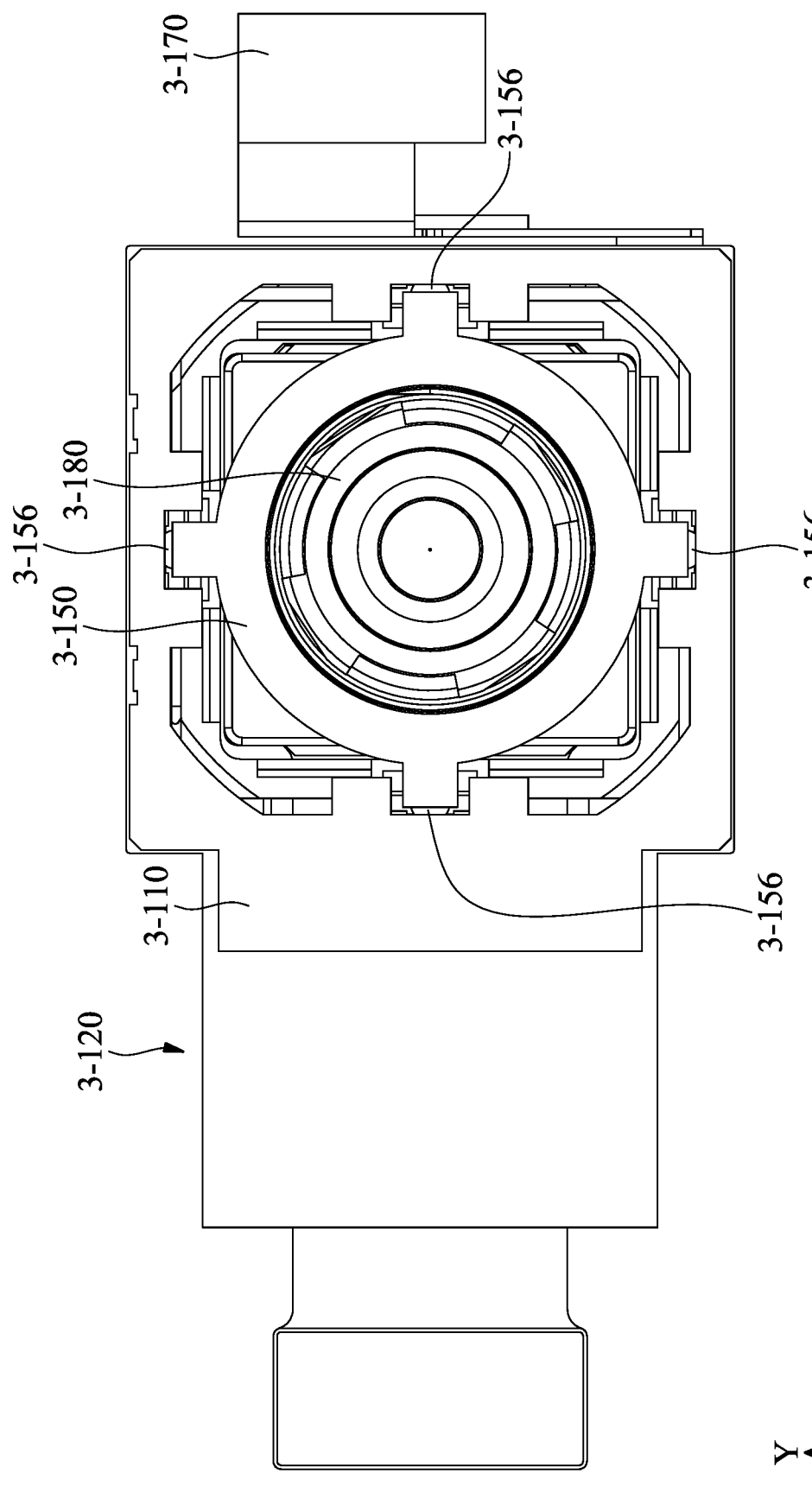
FIG. 35B is a top view of the optical element driving mechanism.
Figure 35C:
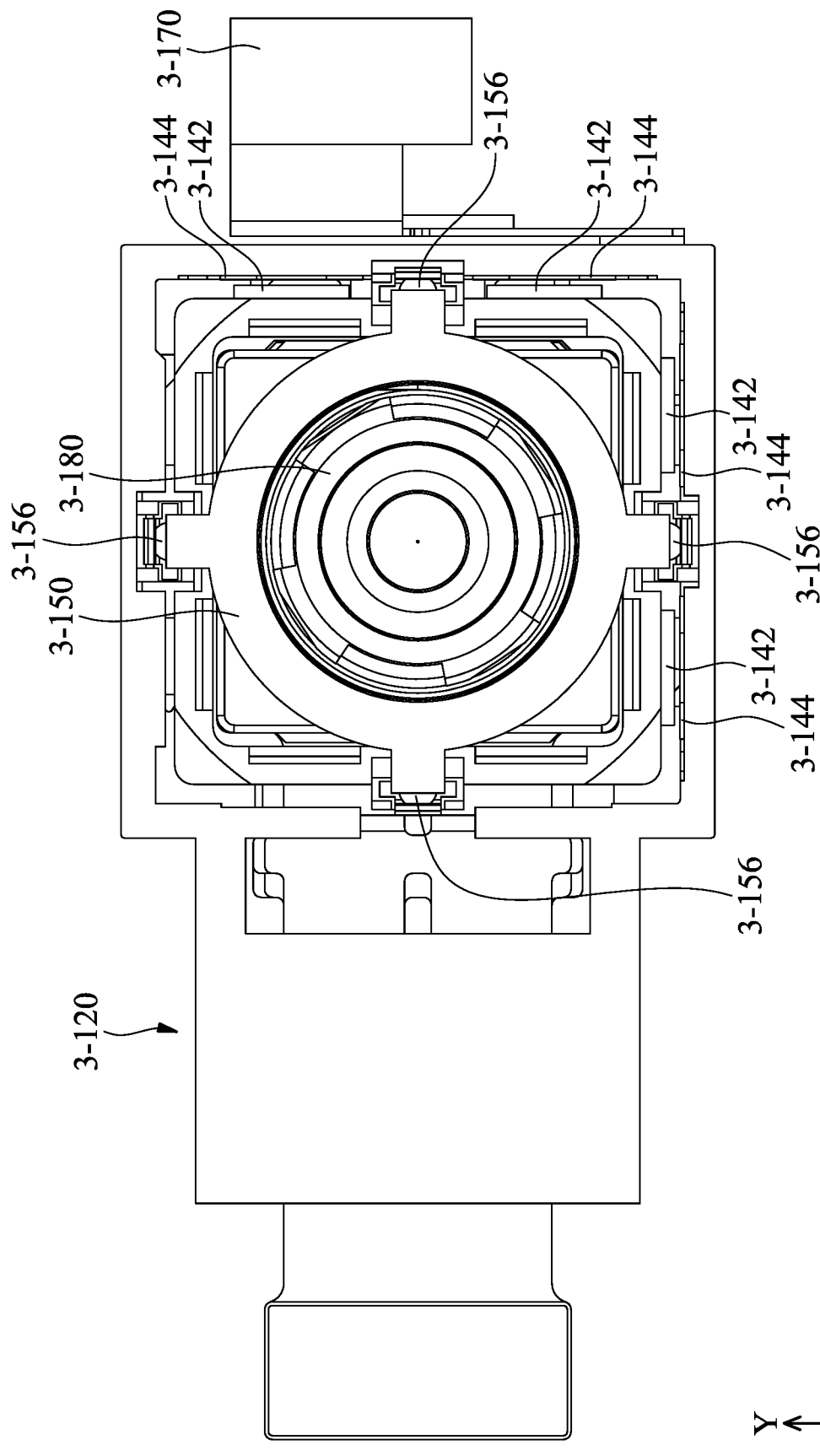
FIG. 35C is a top view of some elements of the optical element driving mechanism.
Figure 36:
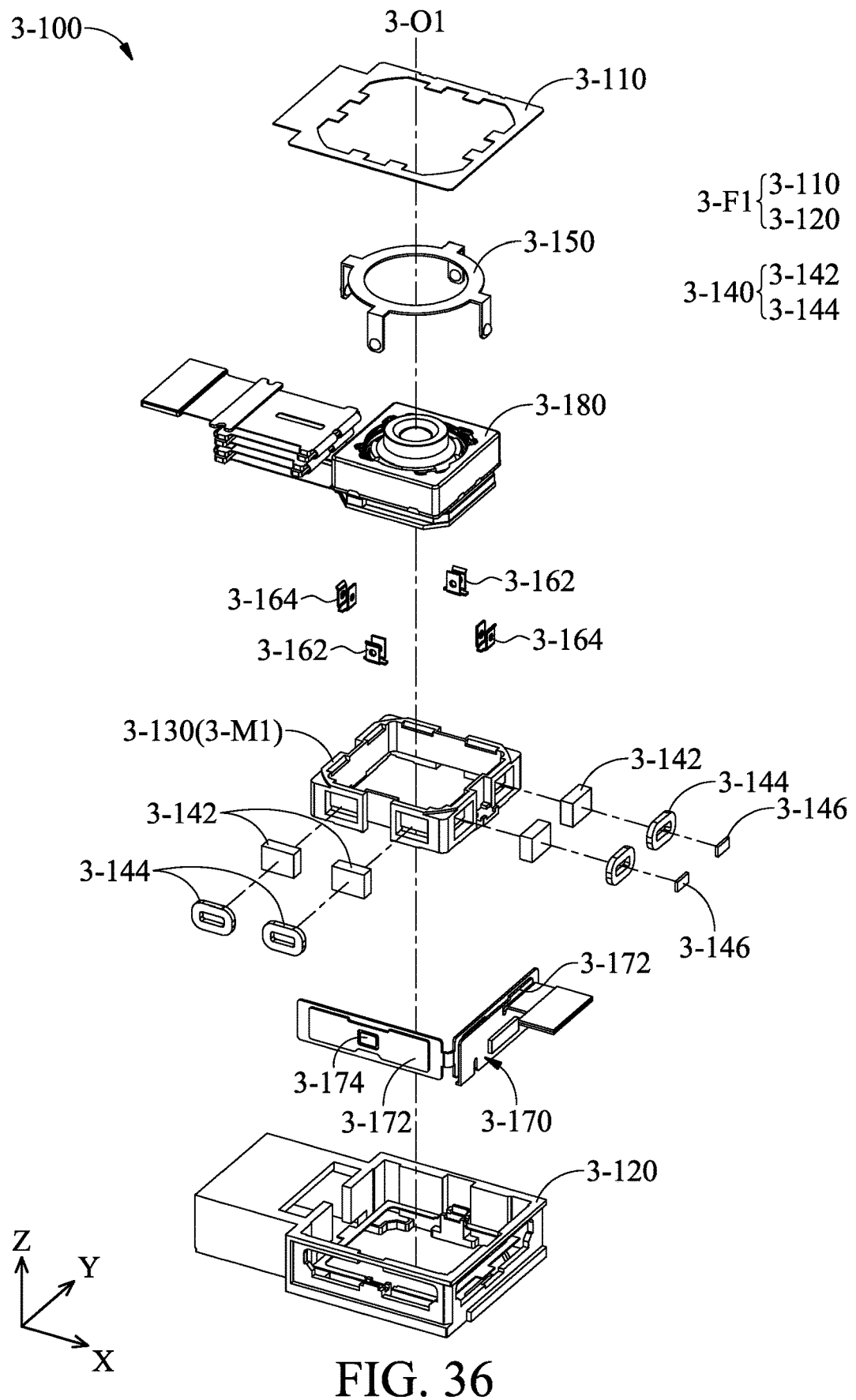
FIG. 36 is an exploded view of the optical element driving mechanism.
Figure 37:
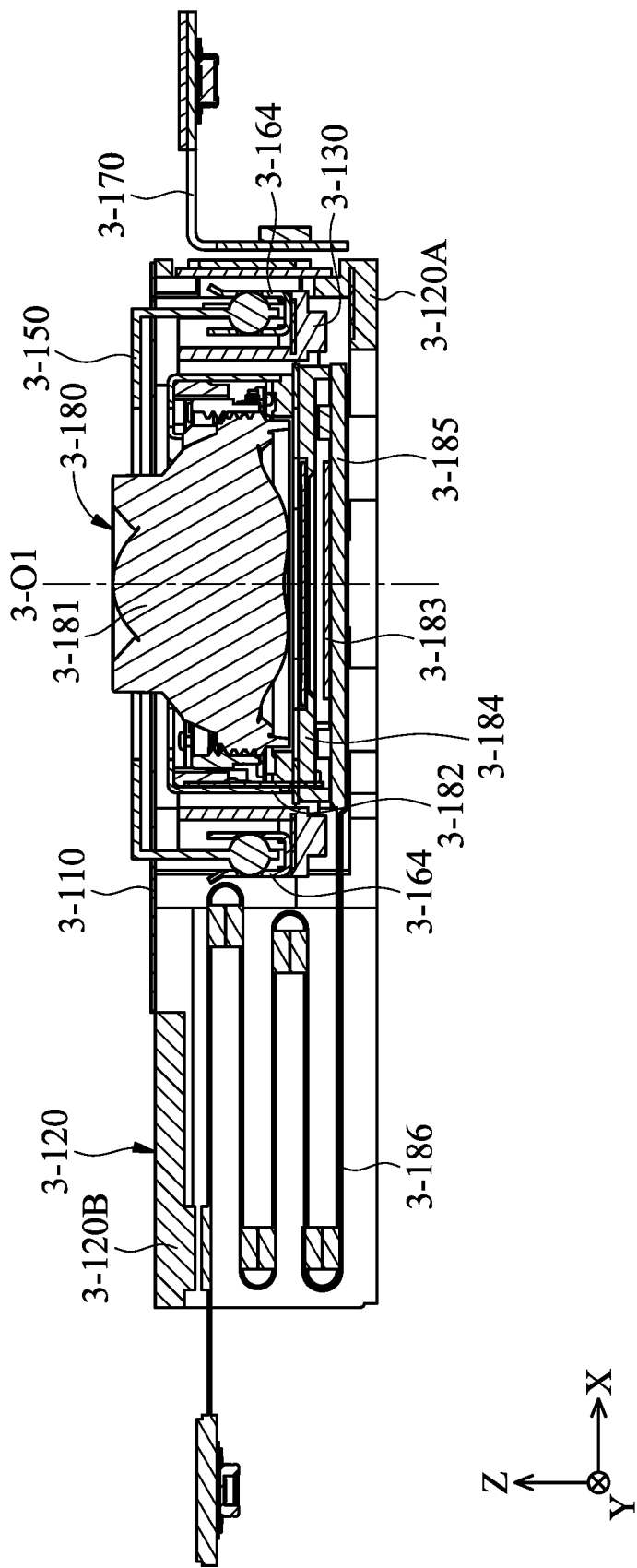
FIG. 37 is a cross-sectional view of the optical element driving mechanism.

FIG. 35A is a schematic view of an optical element driving mechanism 3-100 in some embodiments of the present disclosure. FIG. 35B is a top view of the optical element driving mechanism 3-100. FIG. 35C is a top view of some elements of the optical element driving mechanism 3-100. FIG. 36 is an exploded view of the optical element driving mechanism 3-100. FIG. 37 is a cross-sectional view of the optical element driving mechanism 3-100 illustrated in a line 3-A1-3-A1 in FIG. 35A. In FIG. 36, the optical element driving mechanism 3-100 mainly includes a top plate 3-110, a bottom 3-120, a holder 3-130 (or a movable portion 3-M1), a first magnetic element 3-142, a second magnetic element 3-144, a position sensor 3-146, a connecting element 3-150, a contact element 3-162, a contact element 3-164, and a circuit board 3-170 arranged in a main axis 3-O1. The optical element driving mechanism 3-100 may be used for driving an optical module 3-180, or may be used to drive various optical elements, such as a lens, a mirror, a prism, a beam splitter, or an aperture, but it is not limited thereto.

In some embodiments, the top plate 3-110 and the bottom 3-120 may be combined to form a case of the optical element driving mechanism 3-100. Furthermore, the top plate 3-110 and the bottom 3-120 may be called as the fixed portion 3-F1. As shown in FIG. 10, the bottom 3-120 may have a first portion 3-120A and a second portion 3-120B, and some elements of the optical element driving mechanism 3-100 (e.g. the holder 3-130, the first magnetic element 3-142, the second magnetic element 3-144, the position sensor 3-146, the connecting element 3-150, the contact element 3-162, the contact element 3-164, or the circuit board 3-170) may be disposed in the first portion 3-120A to protect such elements.

In some embodiments, the movable portion 3-M1 (the holder 3-130) may move relative to the fixed portion 3-F1 (e.g. the top plate 3-110 and the bottom 3-120). Therefore, the optical module 3-180 which is disposed on the holder 3-130 may move with the holder 3-130 to achieve auto focus (AF) or optical image stabilization (OIS). Moreover, as shown in FIG. 35B, the connecting element 3-150 includes a connecting portion 3-156, and at least a portion of the connecting portion 3-156 is exposed from the fixed portion 3-F1 when viewed along the main axis 3-O1.

In some embodiments, the first magnetic element 3-142 and the second magnetic element 3-144 may be called as a driving assembly 3-140 used for moving the movable portion 3-M1 (or the holder 3-130) relative to the fixed portion 3-F1. For example, the first magnetic element 3-142 and the second magnetic element 3-144 may include a combination of driving coils and driving magnets. For example, the first magnetic element 3-142 may be a driving magnet, and the second magnetic element 3-144 may be a driving coil. Alternatively, the first magnetic element 3-142 may be a coil, and the second magnetic element 3-144 may be a driving magnet, and is not limited. The first magnetic element 3-142 and the second magnetic element 3-144 may be respectively disposed on the fixed portion 3-F1 and the movable portion 3-M1 (or the holder 3-130), or their position may be interchanged. It should be noted that the interaction between the first magnetic element 3-142 and the second magnetic element 3-144 may generate a magnetic force to move the optical module 3-180 relative to the fixed portion 3-F1, so auto focus or optical image stabilization may be achieved. In some embodiments, the driving assembly 3-140 may include other driving elements, such as a piezoelectric element or a shape memory alloy element.

It should be noted that a pair of the contact element 3-162 and the contact element 3-164 may be respectively disposed on the bottom 3-120 and the holder 3-130. The contact elements 3-162 may be disposed at sides of the bottom 3-120, and the contact elements 3-164 may be disposed on the sides of the holder 3-130. In some embodiments, the bottom 3-120 and the contact element 3-162 may be formed as one piece or formed separately, and the holder 3-130 and the contact element 3-164 may be formed as one piece or formed separately as well.

Moreover, the circuit board 3-170 may be, for example, a flexible printed circuit (FPC), which may be bonded on the fixed portion 3-F1 by adhesion. In some embodiments, the circuit board 3-170 is electrically connected to other electronic elements in the optical element driving mechanism 3-100 or outside the optical element driving mechanism 3-100. For example, the circuit board 3-170 may be used for transferring electric signal to the driving assembly 3-140 to control the movement of the holder 3-130. In some embodiments, the circuit board 3-170 may be affixed on at least two adjacent sides of the fixed portion 3-F1 (e.g. the bottom 3-120), and may be arranged with the bottom 3-120 in the XY plane rather than in the Z direction to reduce the thickness of the optical element driving mechanism 3-100 in the Z direction. In some embodiments, additional reinforcement structure (e.g. a reinforce element 3-172) may be provided on the circuit board 3-170 to enhance the structure of the circuit board 3-170. The reinforce element 3-172 may be formed by material that is not magnetic-conductive. Furthermore, as shown in FIG. 36, the reinforce element 3-172 may have an opening, and additional magnetic-conductive element 3-174 may be disposed in the opening to increase the driving force of the optical element driving mechanism 3-100.

In some embodiments, the position sensor 3-146 may be disposed in the optical element driving mechanism 3-100 to detect the position of the movable portion 3-M1 relative to the fixed portion 3-F1. The position sensor may include a Hall sensor, a magnetoresistance effect sensor (MR sensor), a giant magnetoresistance effect sensor (GMR sensor), a tunneling magnetoresistance effect sensor (TMR sensor), or a fluxgate sensor. In some embodiments, if the second magnetic element 3-144 is a capsule-shaped coil, the position sensor 3-146 may be disposed in the second magnetic element 3-144 to protect the position sensor 3-146.

Figure 38:
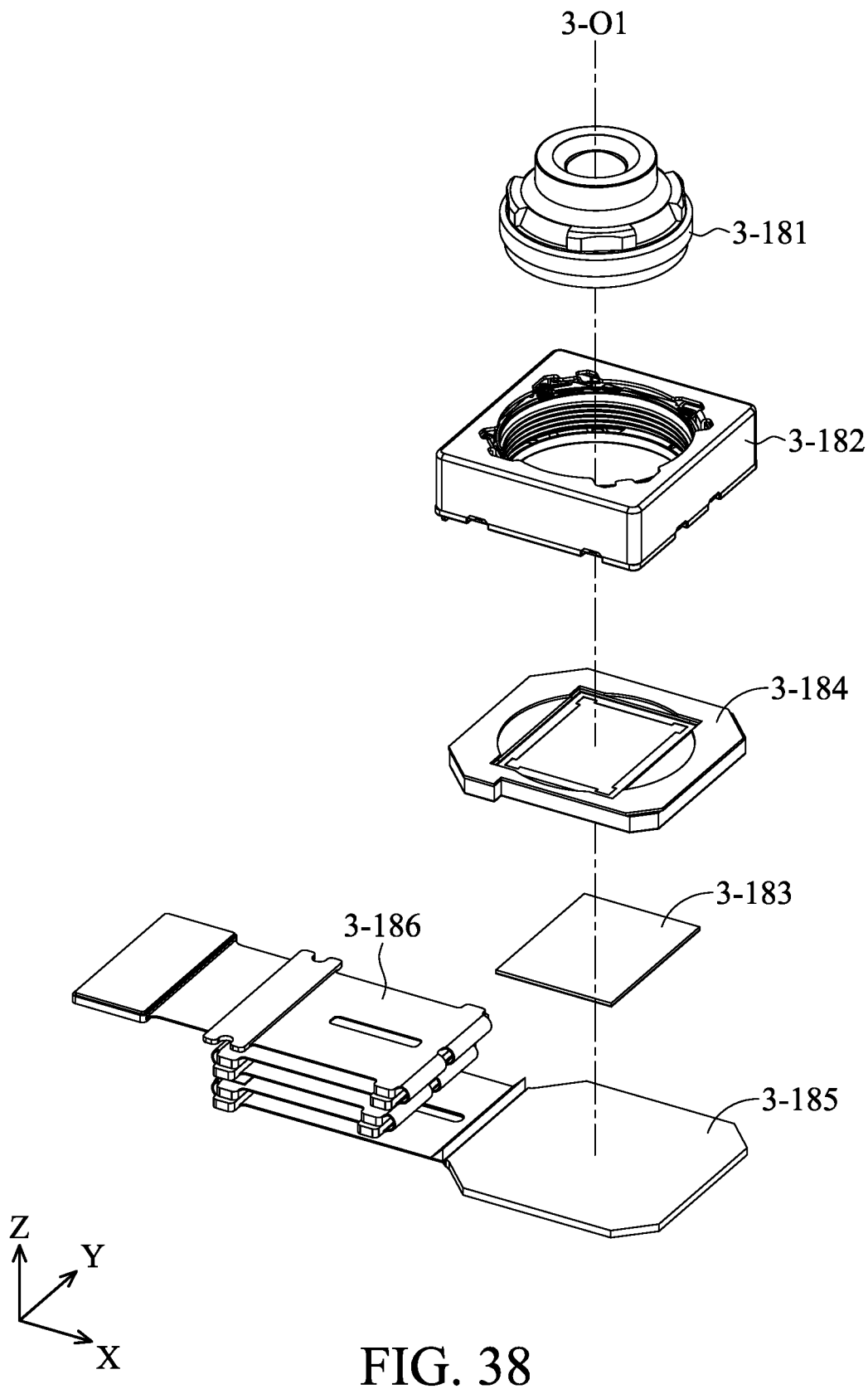
FIG. 38 is an exploded view of the optical module.

FIG. 38 is an exploded view of the optical module 3-180. The optical module 3-180 may be used for driving an optical element 3-181, and may include a driving assembly 3-182, an optical sensor 3-183, a holder 3-184, and a substrate 3-185 arranged in the main axis 3-O1 of the optical element 3-181.

The optical element 3-181 may be affixed on the driving assembly 3-182, such as by locking, adhesion, or snapping. Furthermore, the driving assembly 3-182 may be used for driving the optical element 3-181 to move in different direction than the holder 3-130 (or the movable portion 3-M1) to drive the optical element 3-181 in more directions. For example, the optical element 3-181 may be driven in X, Y, or Z directions.

The optical sensor 3-183 may detect the light passing through the optical element 3-181 and transfer the light to electric signal to other external element (e.g. a processor). The holder 3-184 may be disposed between the driving assembly 3-182 and the optical sensor 3-183 to connect the elements.

The substrate 3-185 may be a flexible printed circuit which may be affixed on the bottom 3-120 by adhesion. In this embodiment, the substrate 3-185 is electrically connected to electronic elements inside or outside the optical module 3-180. For example, electric signal may be transferred by the substrate 3-185 to the driving assembly 3-182 to control the movement of the optical element 3-181 in X, Y, or Z directions to achieve auto focus or optical image stabilization. A wiring 3-186 may be disposed on one side of the substrate 3-185, such as may be disposed in the second portion 3-120B of the bottom 3-120 to protect the wiring 3-186. The wiring 3-186 has a structure that is stacked in the Z direction as multiple layers to save the space and achieve miniaturization.

Moreover, as shown in FIG. 37, the circuit board 3-170 and the wiring 3-186 are extending beyond the bottom 3-120 in different directions to prevent interference between the circuit board 3-170 and the wiring 3-186. Furthermore, the circuit board 3-170 does not overlap the connecting element 3-150 in the direction that the main axis 3-O1 extends. Therefore, the thickness in the Z direction may be reduced to achieve miniaturization.

Figure 39:
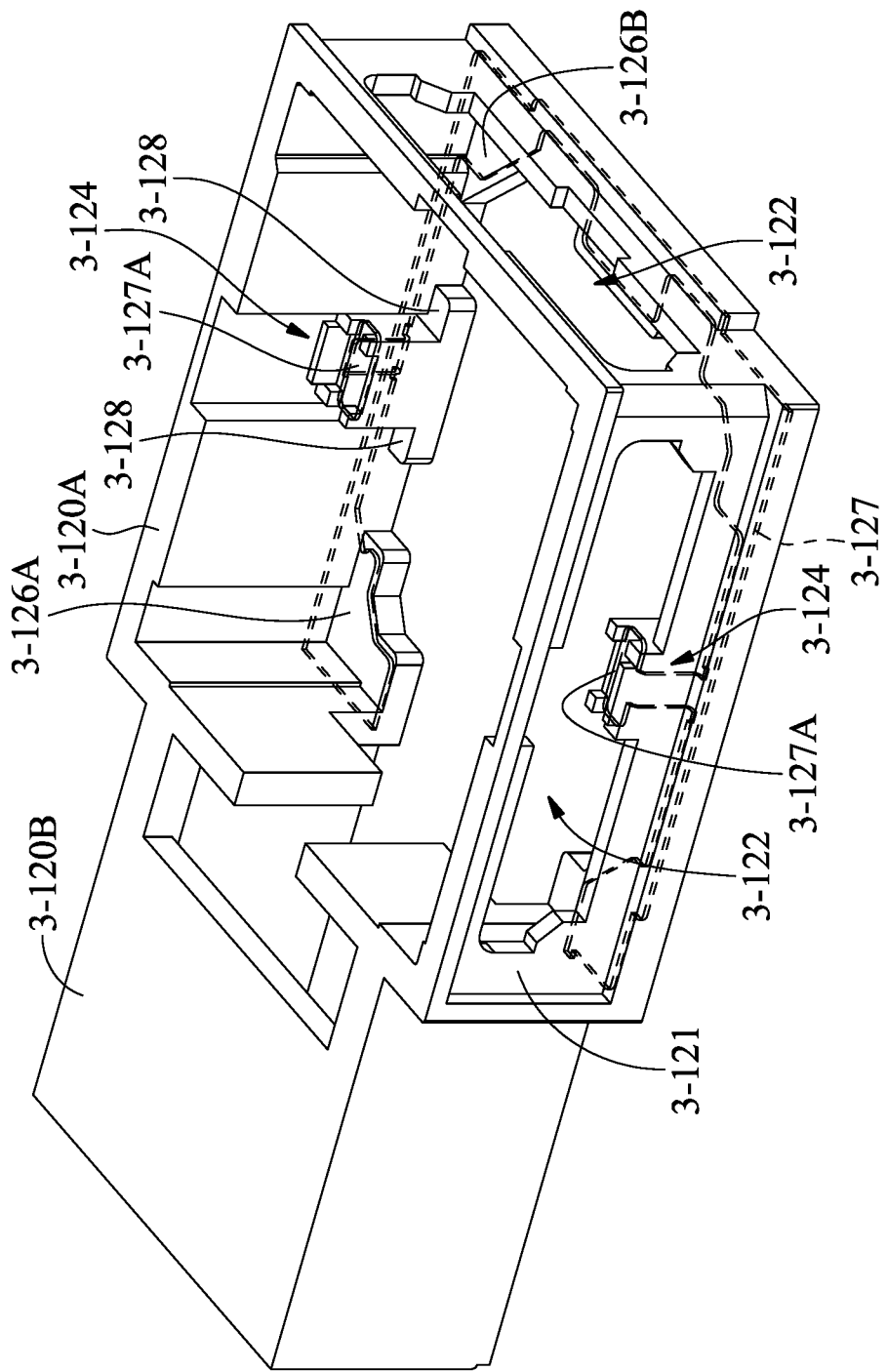
FIG. 39 is a schematic view of a bottom.

FIG. 39 is a schematic view of the bottom 3-120. The bottom 3-120 may has a recess 3-121 and a plurality of openings 3-122 at the first portion 3-120A used for accommodating the circuit board 3-170 and the second magnetic element 3-144, respectively. In some embodiments, the recess 3-121 and the openings 3-122 may be positioned at an identical side of the bottom 3-120 to reduce the distance between the second magnetic element 3-144 and the circuit board 170 to achieve miniaturization.

Moreover, in some embodiments, a pair of accommodating recesses 3-124 may be formed at the side of the bottom 3-120 for accommodating the contact element 3-162. In some embodiments, the contact element 3-162 may be formed as one piece with the bottom 3-120. In some embodiments, the contact elements 3-162 may be affixed in the accommodating recesses 3-124 of the bottom 3-120 by soldering, welding, resistance welding, or conductive glue.

In some embodiments, a metal element 3-127 may be embedded in the bottom 3-120 to enhance the strength of the bottom 3-127, as shown by the dashed line in FIG. 39. In some embodiments, a portion of the metal element 3-127 may be exploded by the bottom 3-120. For example, a surface 3-127A of the metal element 3-127 may be exposed from the accommodating recess 3-124. Moreover, in some embodiments, the metal element 3-127 may be exposed at other positions, and the metal element 3-127 may be connected to the top plate 3-100 by welding to increase the bonding strength between the elements.

Figure 40A:
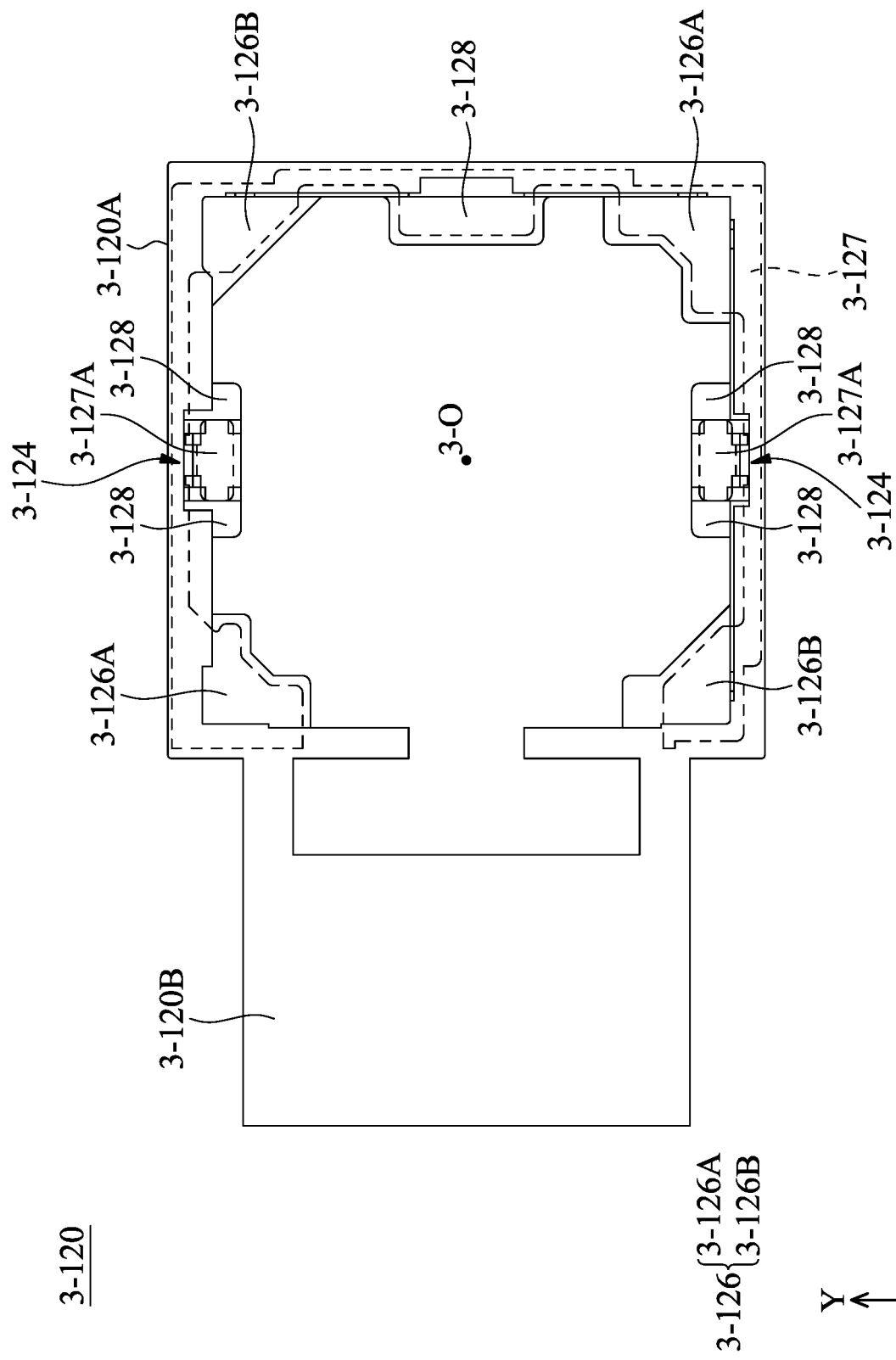
FIG. 40A is a top view of the bottom.

FIG. 40A is a top view of the bottom 3-120. The bottom 3-120 includes corner stopping portions 3-126 (includes a first corner stopping portion 3-126A and a second corner stopping portion 3-126B) and side stopping portions 3-128. The corner stopping portions 3-126 are positioned at the corners of the bottom 3-120, and the side stopping portions 3-128 are at the sides of the bottom 3-120. In some embodiments, the shape of the first corner stopping portion 3-126A and the second corner stopping portion 3-126B may have different shapes, or the distance between the first corner stopping portion 3-126A and the main axis 3-O1 is different than the distance between the second corner stopping portion 3-120B and the main axis 3-O1. As a result, the movable range of the movable portion 3-M1 relative to the bottom 3-120 in different directions may be controlled.

Figure 40B:
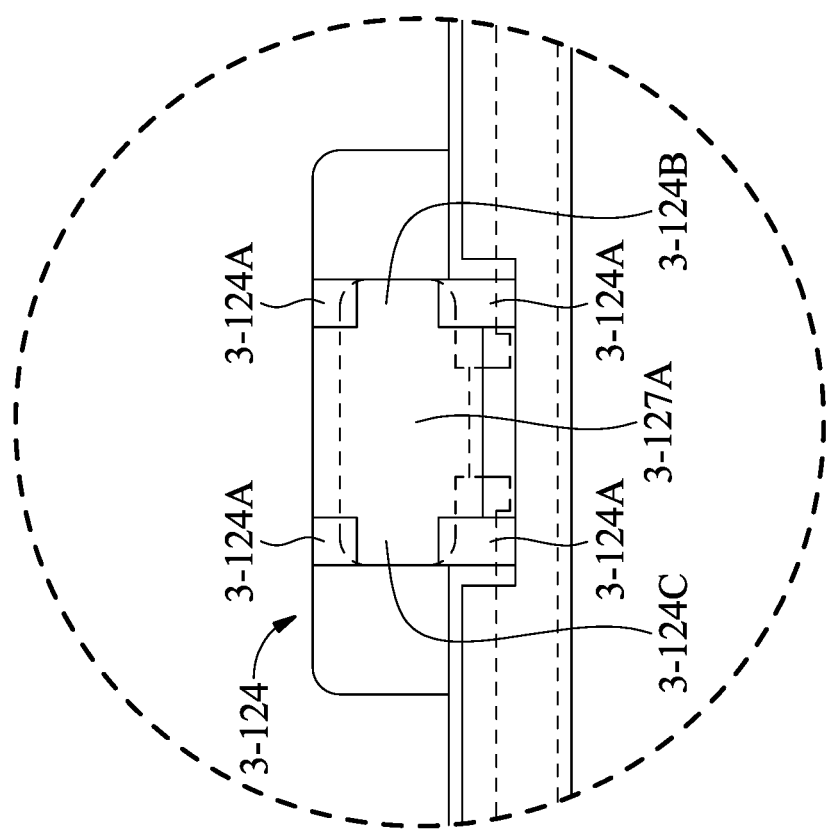
FIG. 40B is an enlarged view of FIG. 40A.
Figure 41A:
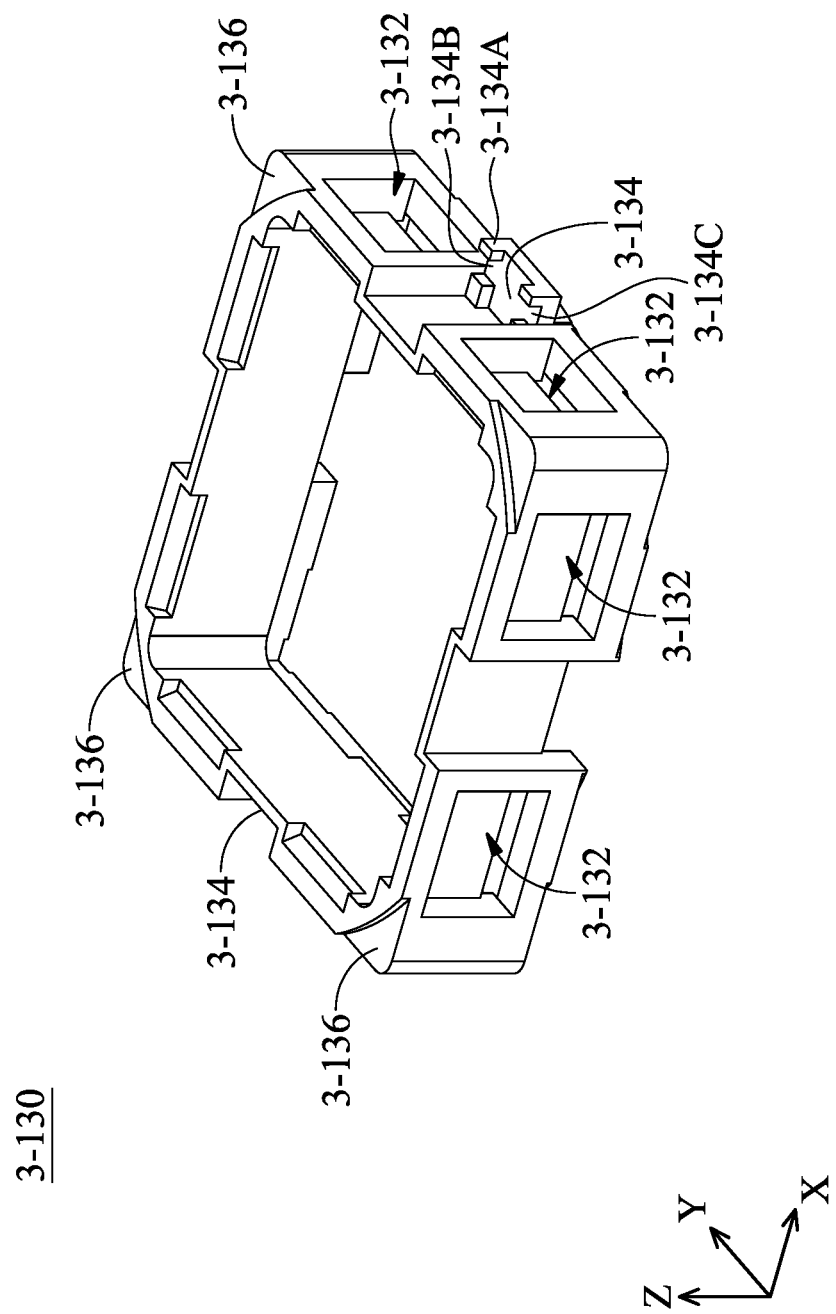
FIG. 41A and FIG. 41B are schematic views of the holder viewed in different directions.
Figure 41B:
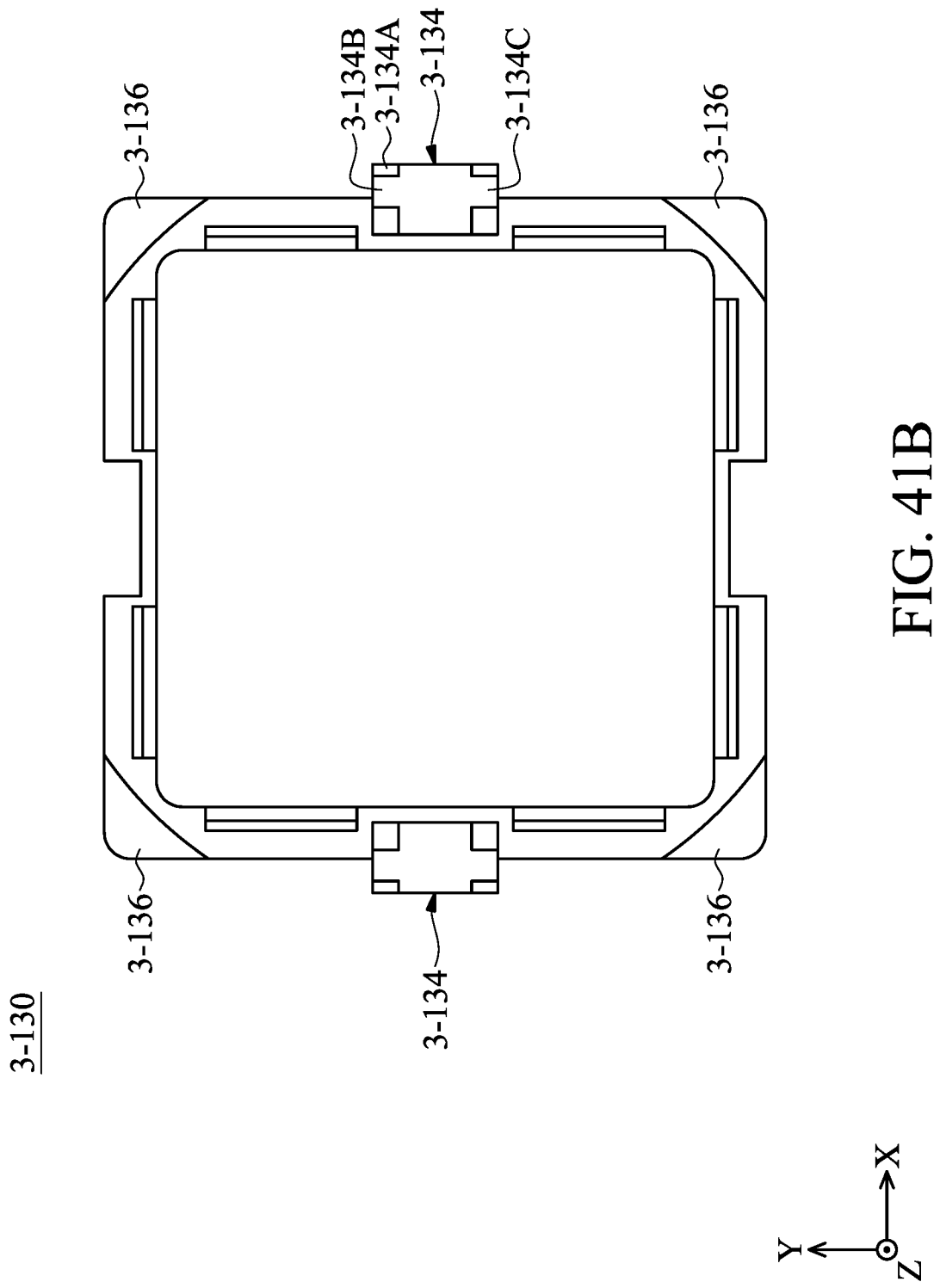

FIG. 40B is an enlarged view of the bottom 3-120. As shown in FIG. 40B, the accommodating recess 3-124 may have two sidewalls 3-124A and a first accommodating space 3-124B and a second accommodating space 3-124C between the two sidewalls 3-124A. The surface 3-127A of the metal element 3-127 may be exposed from the bottom 3-120 from the accommodating recess 3-124.

FIG. 41A, FIG. 41B, FIG. 42A, and FIG. 42B are schematic views of the holder 3-130 in different directions. The holder 3-130 may have multiple openings 3-132 at the sides. The openings 3-132 are used for accommodating the first magnetic elements 3-142. In some embodiments, the openings 3-132 may position at some sides of the holder 3-130, and other sides of the holder 3-130 may not have the opening. In other embodiments, the openings 3-132 may be formed at all sides of the holder 3-130 to provide the first magnetic elements 3-142 at four sides of the holder 3-130, depending on design requirement. The holder 3-130 may have a pair of accommodating recesses 3-134 at the sides. The accommodating recesses 3-134 are used for accommodating the contact element 3-164. In some embodiments, the contact element 3-164 may be formed as one piece with the holder 3-130. In some embodiments, the contact elements 3-164 may be affixed in the accommodating recesses 3-134 of the holder 3-130 by soldering, welding, resistance welding, or conductive glue. The accommodating recess 3-134 may have two sidewalls 3-134A and a first accommodating space 3-134B and a second accommodating space 3-134C between the two sidewalls 3-134A.

Furthermore, concave portions 3-136 may be formed at the corners of the holder 3-130. The concave portions 3-136 may act as a stopper for the holder 3-130 when the holder 3-130 is moving. In other words, the concave portions 3-136 may be in contact with the top plate 3-110 to limit the movable range of the holder 3-130.

Figure 42A:
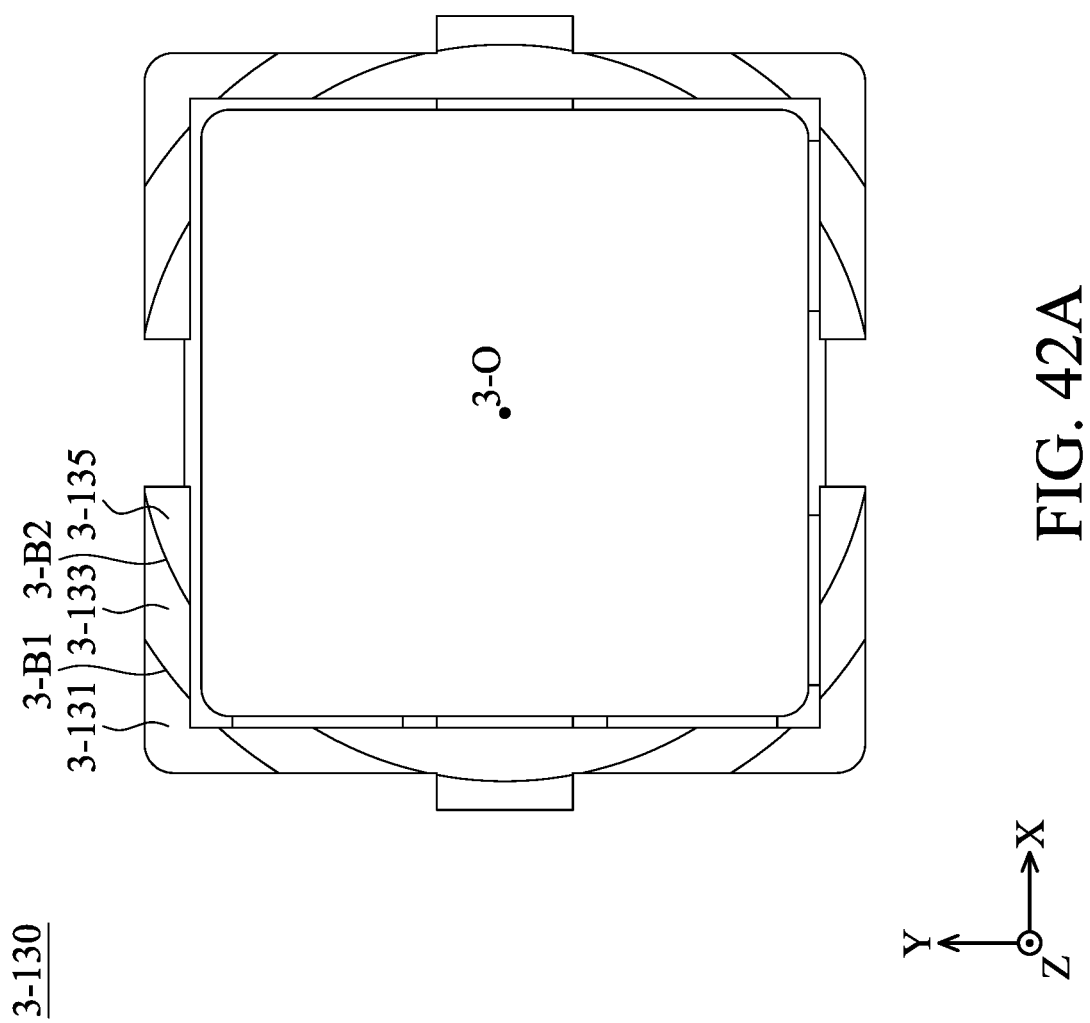
FIG. 42A and FIG. 42B are schematic views of the holder viewed in different directions.
Figure 42B:
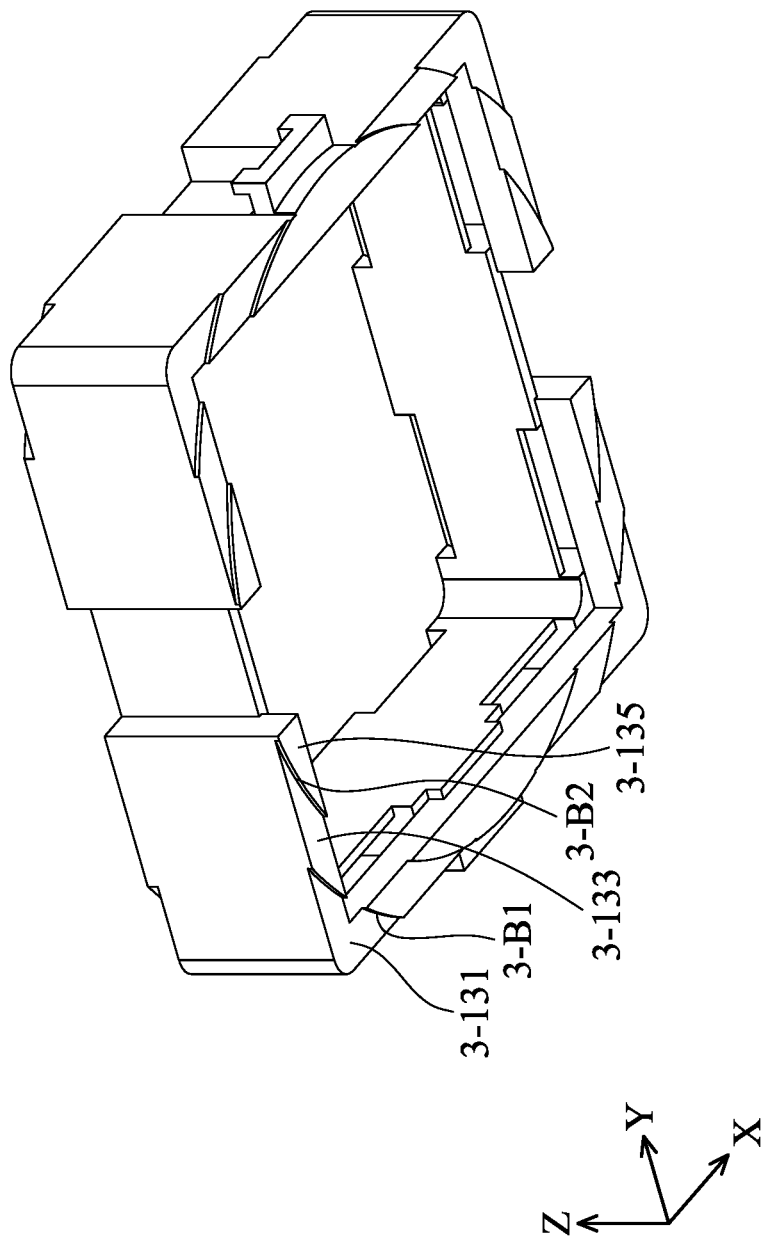

In FIG. 42A and FIG. 42B, the holder 3-130 has a first portion 3-131, a second portion 3-133, and a third portion 3-135 at the bottom of the holder 3-130, and the first portion 3-131, the second portion 3-133, and the third portion 3-135 are arranged from the corner to the center of the holder 3-130. The first portion 3-131, the second portion 3-133, and the third portion 3-135 have a first bottom surface 3-131A, a second bottom surface 3-133A, and a third bottom surface 3-135A. The first edge B1 between the first portion 3-131 and the second portion 3-133 and the second edge B2 between the second portion 3-133 and the third portion 3-135 may have substantially circular shapes to balance the movable range of the holder 3-130 in different directions. In some embodiments, the centers of circle of the first edge 3-B1 and the second edge 3-B2 are penetrated by the main axis 3-O1. In other words, the centers of circle of the first edge 3-B1 and the second edge 3-B2 overlaps each other.

Figure 43:
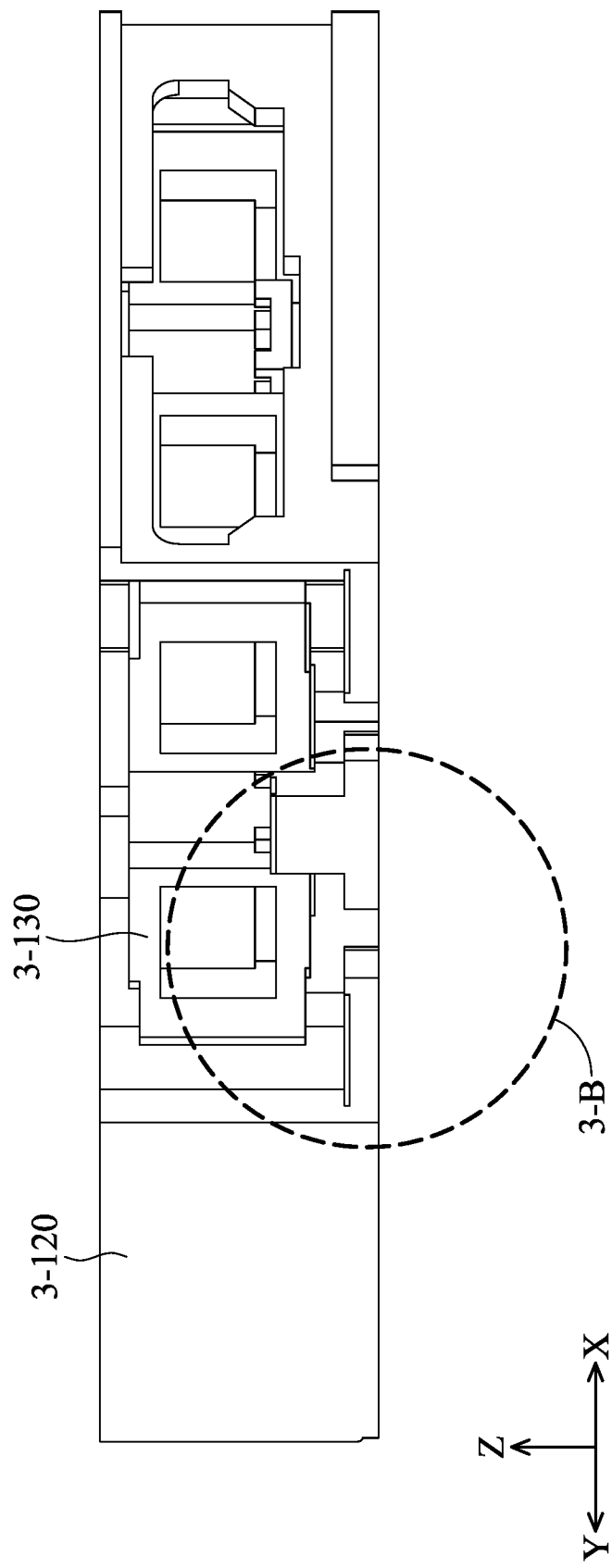
FIG. 43 is a cross-sectional view of some elements of the optical element driving mechanism.
Figure 44:
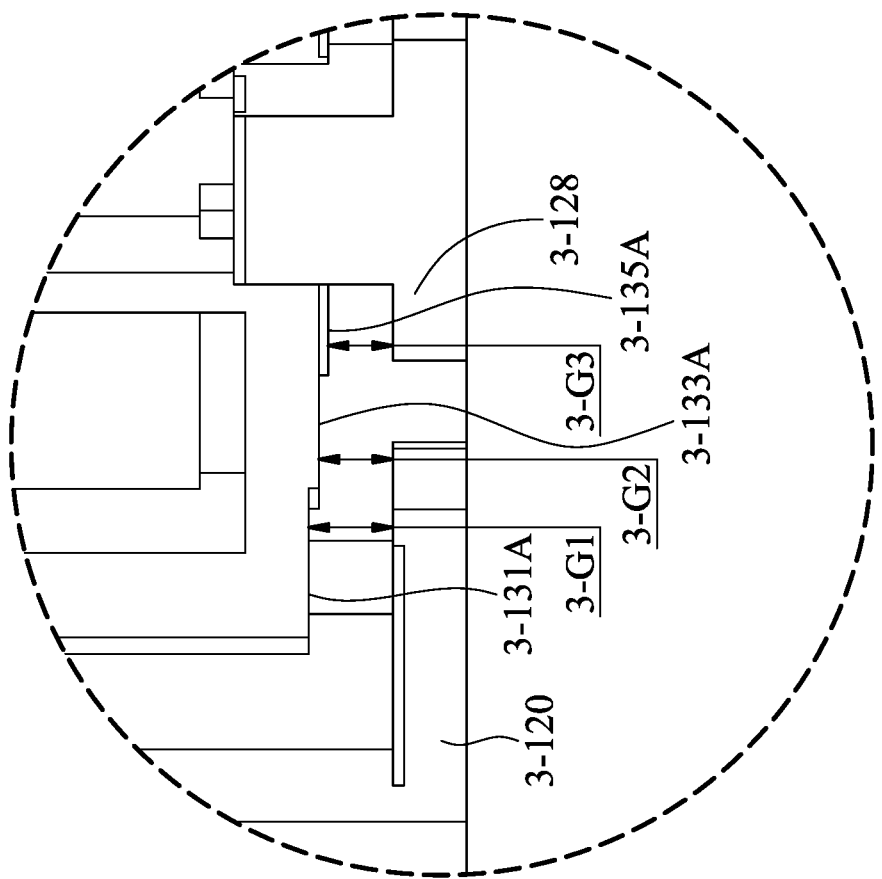
FIG. 44 is an enlarged view of the portion 3-B in FIG. 43.

FIG. 43 is a cross-sectional view of the bottom 3-120 and the holder 3-130 when viewed from the side, and FIG. 44 is an enlarged view of the portion 3-B in FIG. 43. As shown in FIG. 42 to FIG. 44, the holder 3-130 may have a stepped structure at its bottom surface (the surface facing the concave portion 3-136). The holder 3-130 may have multiple bottom surfaces, such as the first bottom surface 3-131A, the second bottom surface 3-133A, and the third bottom surface 3-135A that form the stepped structure. In other words, in the Z direction, the distances between the first bottom surface 3-131A, the second bottom surface 3-133A, and the third bottom surface 3-135A to the bottom 3-120 are different. In some embodiments, in the Z direction, the distance between the first bottom surface 3-131A and the corner stopping portion 3-126 is 3-G1, the distance between the second bottom surface 3-133A and the corner stopping portion 3-126 is 3-G2, the distance between the third bottom surface 3-135A and the corner stopping portion 3-126 is 3-G3, and 3-G1>3-G2>3-G3. In other words, in the direction of the main axis 3-O1, the distance between the top surface of the corner stopping portion 3-126 to the movable portion 3-M1 (e.g. the distance 3-G1 or 3-G2) is greater than the distance between the top surface of the side stopping portion 3-128 to the movable portion 3-M1 (e.g. the distance 3-G3). Therefore, when the holder 3-130 moves relative to the bottom 3-120 to tilt, multiple bottom surfaces of the holder 3-130 (the stepped first bottom surface 3-131A, the second bottom surface 3-133A, and the third bottom surface 3-135A) may in contact with the bottom 3-120, so the contact force may be separated to enhance the reliability of the optical element driving mechanism 3-100.

Figure 45:
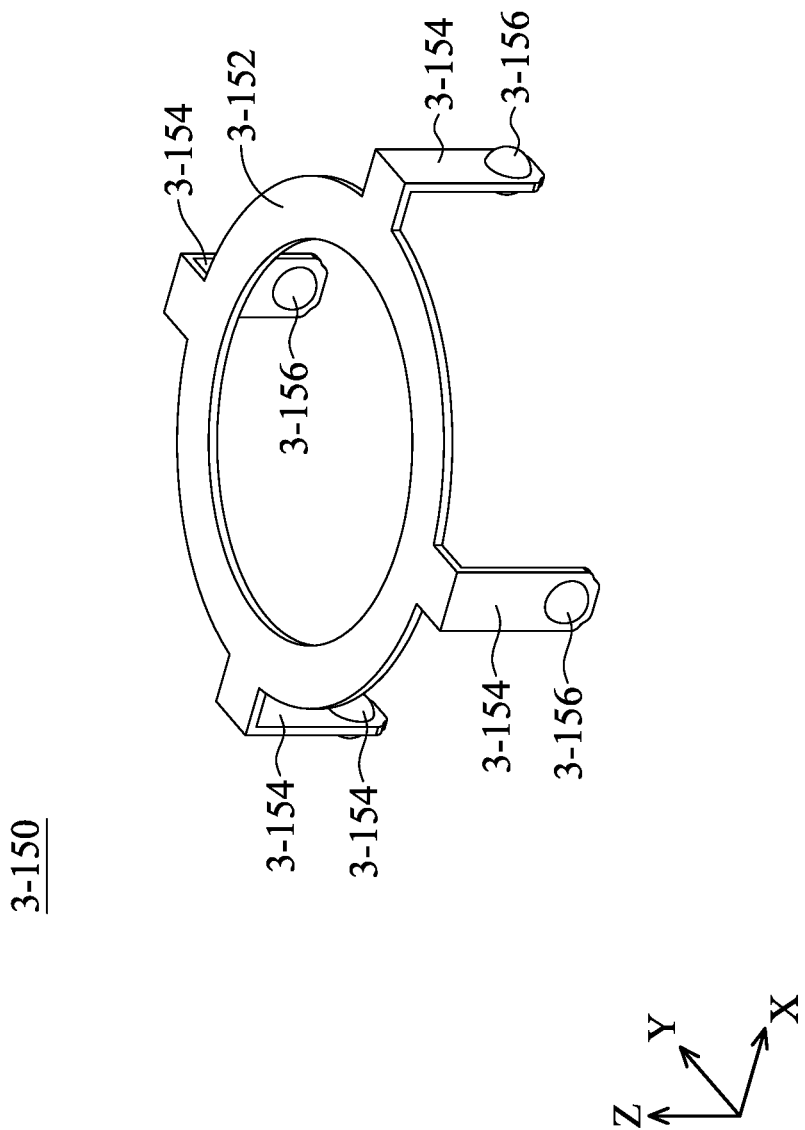
FIG. 45 is a schematic view of the connecting element.

FIG. 45 is a schematic view of the connecting element 3-150. The connecting element 3-150 includes a main body 3-152, an extending portion 3-154, and a connecting portion 3-156. In some embodiments, the main body 3-152 may have a circular shape. The extending portion 3-154 may extend from the main body 3-152 in the Z direction, and the connecting portion 3-156 is disposed on the extending portion 3-154 and may be spherical shaped. In some embodiments, the material of the connecting element 3-150 may be metal that is not magnetic-conductive to prevent magnetic interference between the connecting element 3-150 and other elements in the optical element driving mechanism 3-100 (e.g. the first magnetic element 3-142 or the second magnetic element 3-144). The optical module 3-180 may be affixed on the connecting element 3-150, such as affixed on the main body 3-152 and move with the connecting element 3-150. For example, the optical module 3-180 may move relative the holder 3-130. Therefore, the moving directions of the optical module 3-180 and the holder 3-130 relative to the fixed portion 3-F1 may be different. Alternatively, the optical module 3-180 may move together with the holder 3-130 and the connecting element 3-150 relative to the top plate 3-110 and the bottom 3-120, depending on design requirement.

Figure 46A:
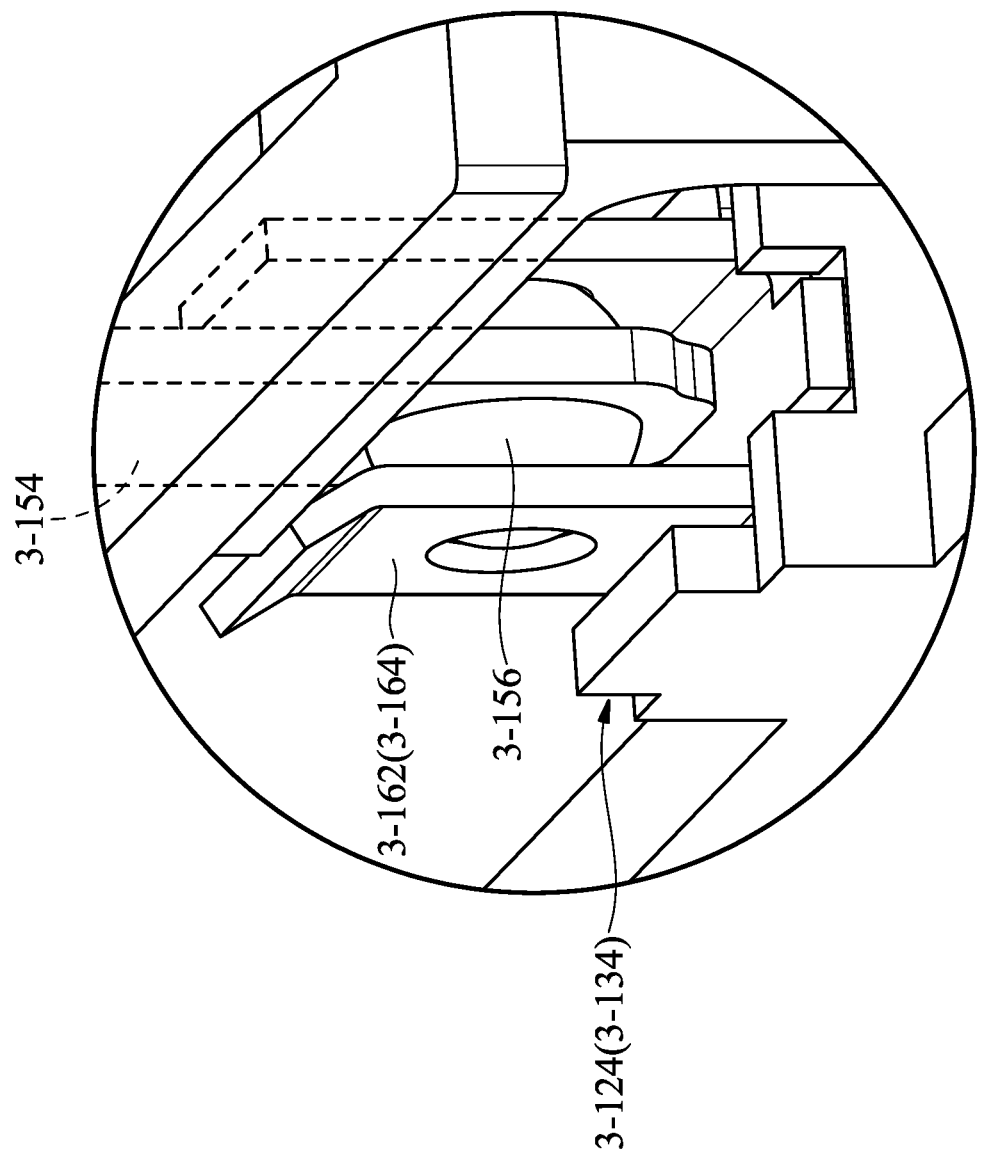
FIG. 46A is a schematic view of some elements of the optical element driving mechanism.
Figure 46C:
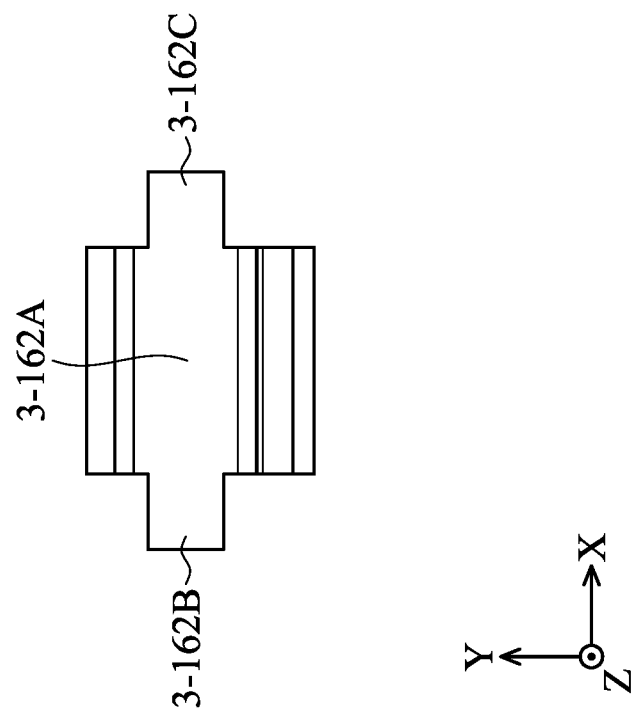
FIG. 46C is a schematic view of the contact element.
Figure 46B:
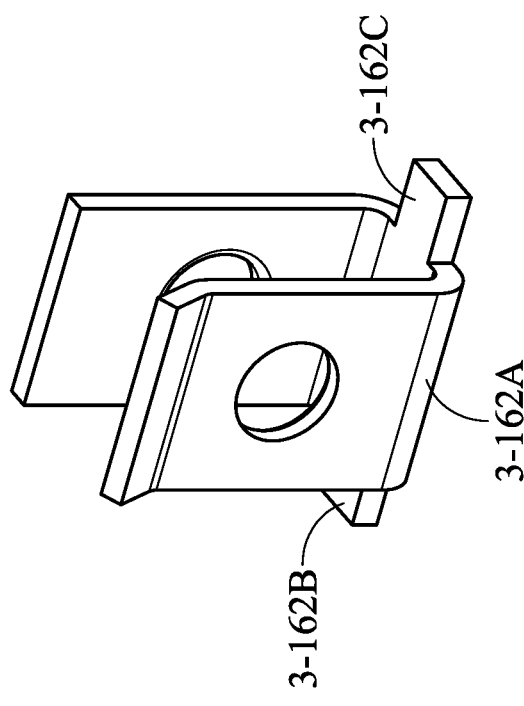
FIG. 46B is a schematic view of the contact element.
Figure 46D:
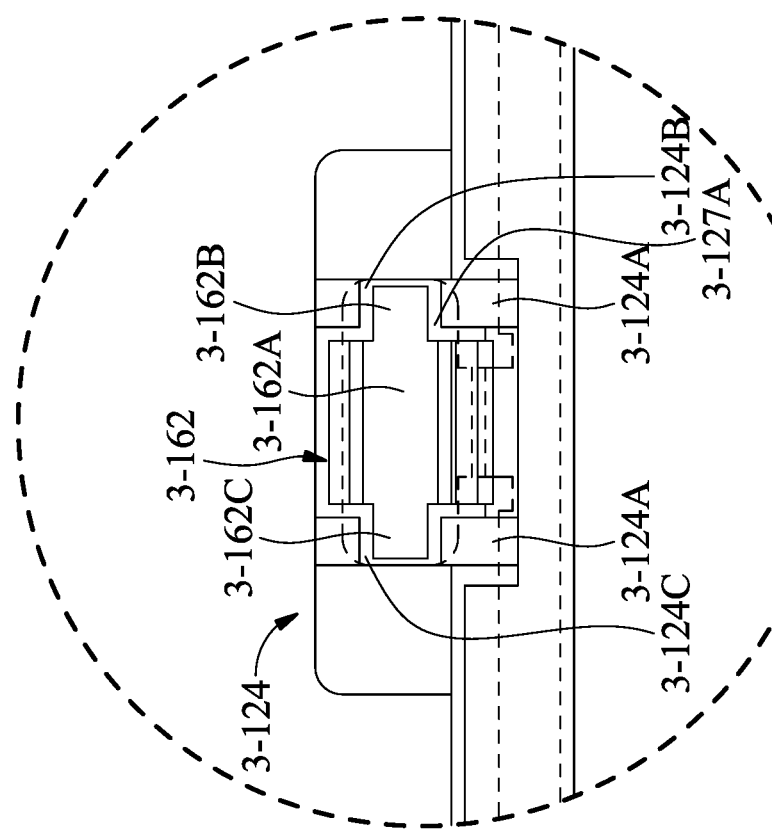
FIG. 46D is an enlarged view of some elements of the optical element driving mechanism.
Figure 47:
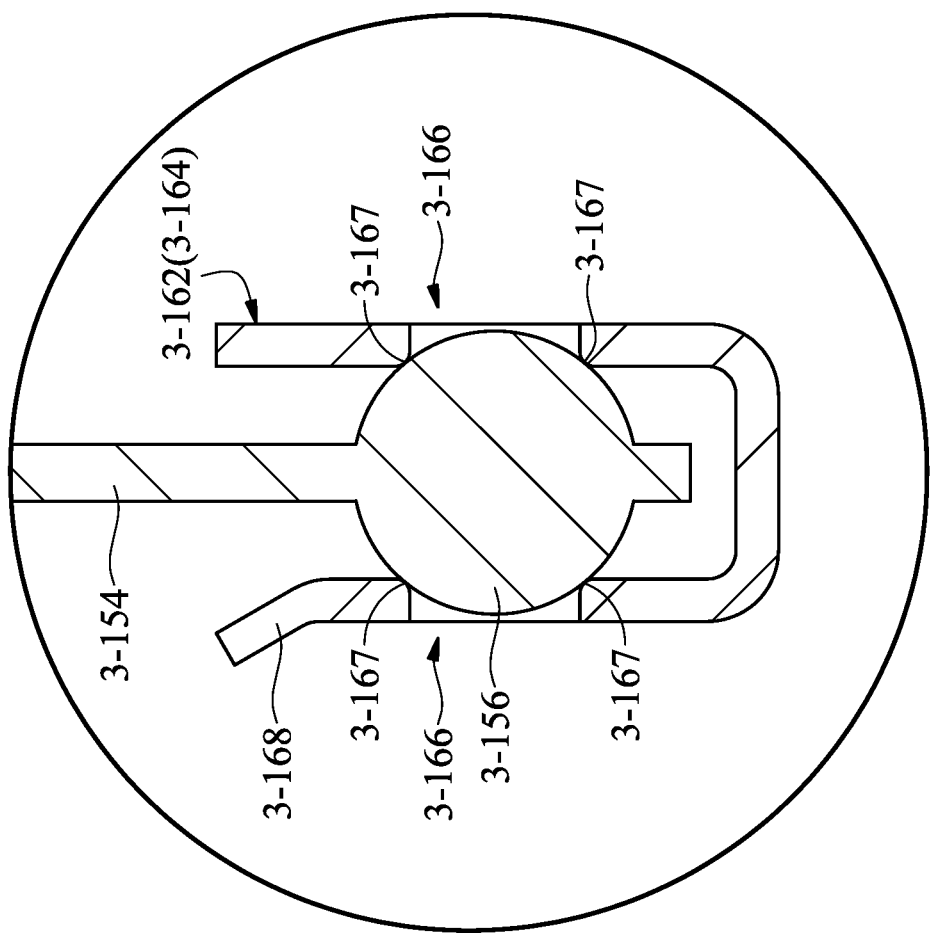
FIG. 47 is a cross-sectional view of some elements in the optical element driving mechanism.

FIG. 46A is a schematic view when the connecting element 3-150 connects to the contact element 3-162 or the contact element 3-164. FIG. 46B and FIG. 46B are schematic views of the contact element 3-162 viewed in different directions. FIG. 46D is an enlarged view of some elements of the optical element driving mechanism 3-100. FIG. 47 is a cross-sectional view when the connecting element 3-150 is connected to the contact element 3-162 or the contact element 3-164. A pair of the connecting portion 3-156 of the connecting element 3-150 is disposed in the contact element 3-162, and another pair of the connecting portions 3-156 are disposed in the contact element 3-164. In other words, the contact element 3-162 or the contact element 3-164 is in contact with one of the connecting portions 3-156.

The position relationship is illustrated by the contact element 3-162 and the accommodating recess 3-124. However, it should be noted that the contact element 3-164 and the accommodating recess 3-134 may have identical or similar relationship. The contact element 3-162 may have a main body 3-162A, a first extending portion 3-162B, and a third extending portion 3-162C. The first extending portion 3-162B and the second extending portion 3-162A extend in opposite directions on the main body 3-162A. As shown in FIG. 46D, the first extending portion 3-162B and the second extending portion 3-162C may be respectively in the first accommodating space 3-124B and the second accommodating space 3-124C.

Furthermore, the contact element 3-162 may be in direct contact with the surface 3-127A of the metal element 3-127. In some embodiments, the metal element 3-127 and the contact element 3-162 may be connected by welding. For example, the portion of the metal element 3-127 that is in contact with the contact element 3-162 may be melted by heating. In some embodiments, a side of the metal element 3-127 that faces away from the contact element 3-162 may be exposed from the bottom 3-120 (not shown), and the metal element 3-127 may be heated at the side that faces away from the contact element 3-162, such as by laser. Therefore, the metal element 3-127 may be melted to be bonded to the contact element 3-162.

The contact element 3-162 or the contact element 3-164 may have a pair of contact portions 3-165 extending to the Z direction. Each of the two contact portions 3-165 may have an assembling portion 3-166 (e.g. a circular opening). The connecting portion 3-156 may be clipped by the two contact portions 3-165 from the opposite sides of the connecting portion 3-156. In other words, the connecting portion 3-156 is disposed between two contact portions 3-165. Furthermore, a part of the spherical connecting portion 3-156 may be disposed in the assembling portion 3-166. In other words, when viewed along the main axis 3-O1, one of the connecting portion 3-156 overlaps on of the contact portions 3-165 to allow the connecting element 3-150 movably connects the bottom 3-120 (a portion of the fixed portion 3-F1) or the holder 3-130 (a portion of the movable portion 3-M1). In other words, a pair of the connecting portions 3-156 of the contact element 3-162 or the contact element 3-164 may directly and movably in contact with one of the movable portion 3-M1 or the fixed portion 3-F1, and another pair of the connecting portions 3-156 of the contact element 3-162 or the contact element 3-164 may directly and movably in contact with another one of the movable portion 3-M1 or the fixed portion 3-F1.

In some embodiments, a corner 3-167 of the assembling portion 3-166 which is in contact with the connecting portion 3-156 may not be a right angle (e.g. a rounded angle or a chamfer) to prevent the connecting portion 3-156 from in direct contact from right angle. In some embodiments, a bent portion 3-168 may be disposed on one of the contact portion 3-165 to allow the connecting portion 3-156 of the connecting element 3-150 be easily disposed in the contact element 3-162 or the contact element 3-164.

Figure 48A:
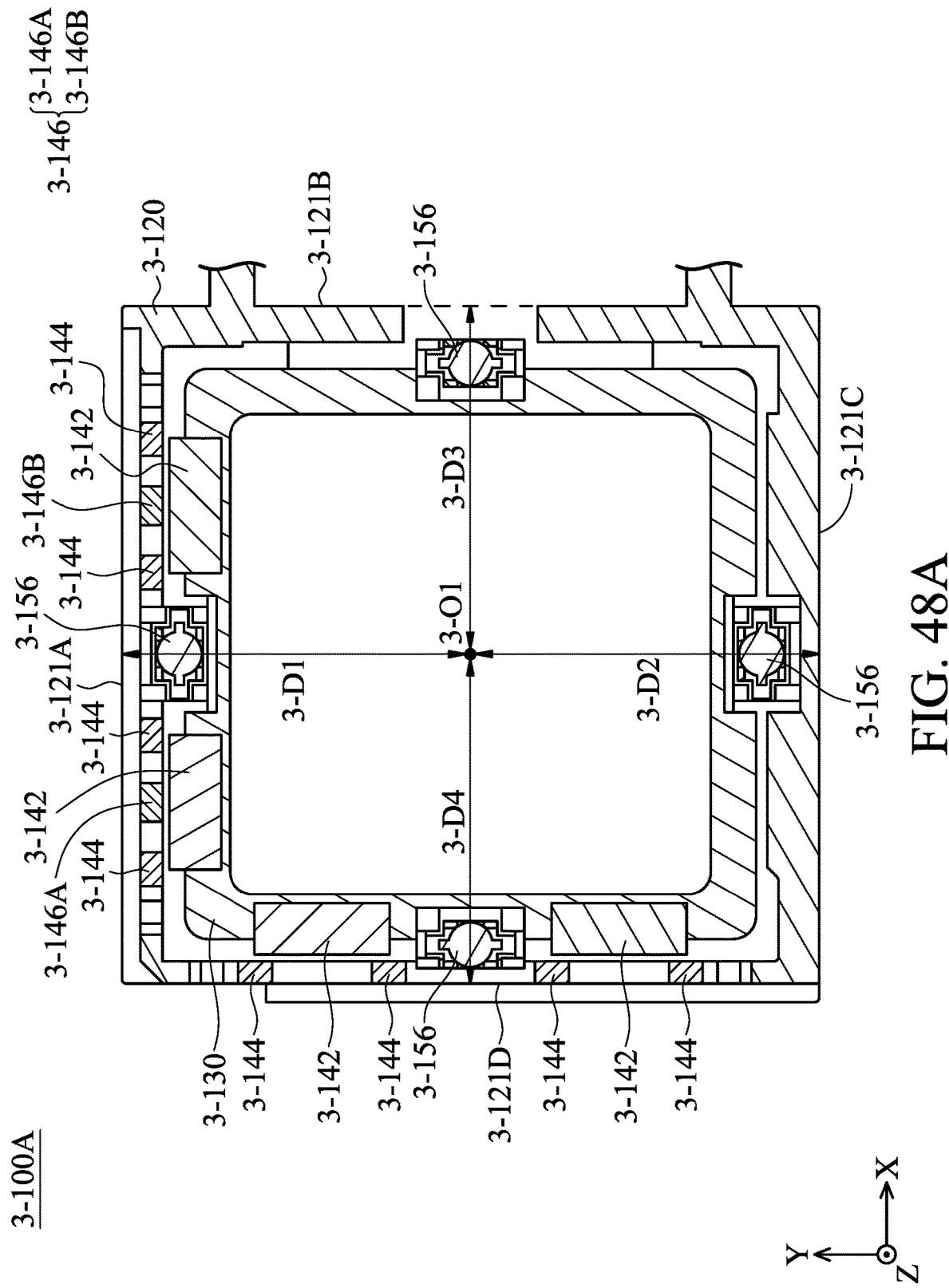
FIG. 48A is a cross-sectional view of some elements in the optical element driving mechanism in some embodiments.
Figure 48B:
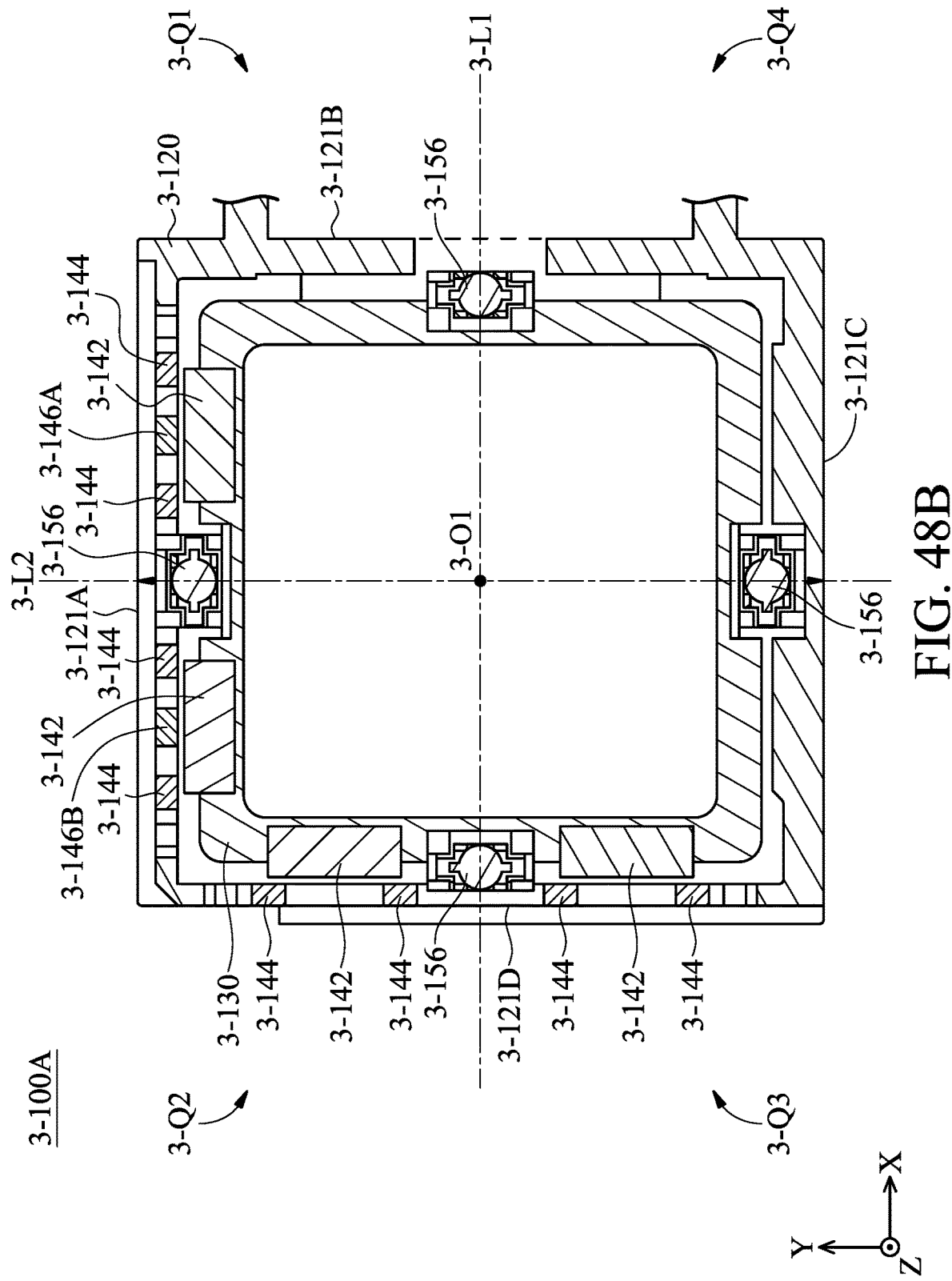
FIG. 48B is a cross-sectional view of some elements in the optical element driving mechanism in some embodiments.

FIG. 48A and FIG. 48B are cross-sectional views of the optical element driving mechanism 3-100A when viewed from top. The position sensor 3-146 may include a first position sensor 3-146A and a second position sensor 3-146B. The structure of the optical element driving mechanism 3-100A may be similar to the optical element driving mechanism 3-100. The first magnetic element 3-142 and the second magnetic element 3-144 may disposed opposite from each other, and may be disposed on some of the sides of the optical element driving mechanism 3-100A, such as disposed on two of the adjacent sides. Other sides may not have the first magnetic element 3-142 and the second magnetic element 3-144. In other words, the fixed portion 3-F1 has a rectangular shape, and the driving elements (the first magnetic element 3-142 and the second magnetic element 3-144) are disposed on adjacent sides of the fixed portion 3-F1. Therefore, magnetic interference in the optical element driving mechanism 3-100A may be reduced.

The first position sensor 3-146A and the second position sensor 3-146B may be disposed in the second magnetic element 3-144 at the first side 3-121A, and the second magnetic element 3-144 which is disposed at the second side 3-121D may not have any position sensor. Furthermore, as shown in FIG. 48A, the connecting portion 3-156 may substantially disposed at the centers of the sides of the bottom 3-120, such as the first side 3-121A, the second side 3-121B, the third side 3-121C, or the fourth side 3-121D. Therefore, the optical module 3-180 may rotate, and the rotational axis of the optical module 3-180 may be parallel to the X axis or the Y axis to easily control the optical element driving mechanism 3-100A. Moreover, the required space may be reduced to achieve miniaturization.

In some embodiments, the distance between the main axis 3-O1 (which passes through the center of the holder 3-130 or the optical module 3-180) and the sides of the bottom 3-120 may be different. For example, as shown in FIG. 48A, the distance between the main axis 3-O1 to the first side 3-121A, the second side 3-121B, the third side 3-121C, and the fourth side 3-121D may be distances 3-D1, 3-D2, 3-D3, and 3-D4, respectively. The distance 3-D1 may be not equal to the distance 3-D3, and the distance 3-D2 may be not equal to the distance 3-D4. In particular, the first side 3-121A is opposite from the second side 3-121B, the third side 3-121C is opposite from the fourth side 3-121D. The optical element 3-181 is circular, and the main axis 3-O1 passes through the center of circle of the optical element 3-181. In a first direction that is perpendicular to the main axis 3-O1 (e.g. the Y direction), the distance 3-D1 between the center of the optical element 3-181 to the first side 3-121A is different than the distance 3-D2 between the center of the optical element 3-181 to the second side 3-121B.

Moreover, in a second direction (e.g. the X direction) that is perpendicular to the main axis 3-O1 and the first direction (e.g. the Y direction), the distance 3-D3 between the center of the optical element 3-181 to the third side 3-121C is different than the distance 3-D4 between the center of the optical element 3-181 to the fourth side 3-121D. In other words, the main axis 3-O1 is not at the center of the bottom 3-120. Therefore, additional elements may be disposed at specific sides to utilize the space more efficiently, and miniaturization may be achieved. However, the present disclosure is not limited thereto. The main axis 3-O1 may pass the center of the bottom 3-120 to balance the weight of the optical element driving mechanism 3-100A.

In some embodiments, the holder 3-130 may be omitted, and the first magnetic element 3-142 may be directly disposed on the driving assembly 3-182 of the optical module 3-180 to achieve miniaturization.

In some embodiments, at least a portion of the driving assembly 3-140 overlaps the connecting element 3-150 in a direction that is perpendicular to the main axis 3-O1. For example, as shown in FIG. 48A, in the X direction or the Y direction, at least a portion of the connecting portion 3-156 of the connecting element 3-150 overlaps the driving assembly 3-140. Furthermore, in the X direction or the Y direction that is perpendicular to the main axis 3-O1, the two connection portions 3-156 of the connecting element 3-150 at least partially overlap each other. Therefore, the movable direction of the connecting element may be controlled. In some embodiments, the connecting element 3-150 does not overlap the driving assembly 3-140 when viewed along the main axis 3-O1.

In some embodiments, as shown in FIG. 48B, the optical element driving mechanism 3-100A has a first quadrant 3-Q1, a second quadrant 3-Q2, a third quadrant 3-Q3, and a fourth quadrant 3-Q4 arranged in a counterclockwise manner. The first position sensor 3-146A and the second position sensor 3-146B are in different quadrants. The first quadrant 1-Q1, the second quadrant 1-Q2, the third quadrant 1-Q3, and the fourth quadrant 3-Q4 are defined by the axis 3-L1 and the axis 3-L2 which pass through the main axis 3-O1. The axis 3-L1 is substantially parallel to the first side 3-121A, and the axis 3-L2 is perpendicular to the axis 3-L1. When the optical element driving mechanism 3-100A is operating, a first sensing signal 3-S1 is provided by the first position sensor 3-146A, a second sensing signal 3-S2 is provided by the second position sensor 3-146B, and the first sensing signal 3-S1 is different from the second sensing signal 3-S2.

For example, table 1 shows the values of the first sensing signal 3-S1 and the second sensing signal 3-S2 when the optical element driving mechanism 3-100A rotates relative to the axis 3-L1 and the axis 3-L2. It should be noted that the values are merely examples, and the values may be adjusted by a person with skill in the art depending on actual requirement.

TABLE 1

| Example | Rotational condition | 3-S1 (mV) | 3-S2 (mV) |
|---|---|---|---|
| 1 | Rotate relative to the axis 3-L1 | 50 | 50 |
| 2 | Rotate relative to the axis 3-L2 | 50 | −50 |
| 3 | Rotate in a specific direction | 40 | 20 |

Because in the optical element driving mechanism 3-100A, the first position sensor 3-146A and the second position sensor 3-146B are at an identical side of the axis 3-L1 and at opposite sides of the axis 3-L2. Therefore, when the optical element driving mechanism 3-100A rotates relative to the axis 3-L1, the first sensing signal 3-S1 and the second sensing signal have an identical sign (positive or negative sign), such as voltage. On the contrary, when the optical element driving mechanism 3-100A rotates relative to the axis 3-L2, the first sensing signal 3-S1 and the second sensing signal have opposite signs (one is positive, and another one is negative), such as voltage. Although the absolute values of the first sensing signal 3-S1 and the second sensing signal 3-S2 are identical in some examples, the absolute value is positive, and another one is negative), such as voltage. Although the absolute values of the first sensing signal 3-S1 and the second sensing signal 3-S2 may be adjusted based on requirement, and it is not limited.

Afterwards, the movement of the movable portion 3-M1 relative to the fixed portion 3-F1 may be calculated by a first algorithm 3-AL1 and a second algorithm 3-AL2. The inputs of the first algorithm 3-AL1 and the second algorithm 3-AL2 are the first sensing signal 3-S1 and the second sensing signal 3-S2, respectively. The first algorithm 3-AL1 is different from the second algorithm 3-AL2. For example, a result 1-R1 calculated by the first algorithm 3-AL1 and a result 1-R2 calculated by the second algorithm 3-AL2 may be:

$$3\text{-}R1 = (3\text{-}S1 + 3\text{-}S2)/2 \qquad (3\text{-AL1})$$

$$3\text{-}R2 = (3\text{-}S1 - 3\text{-}S2)/2 \qquad (3\text{-AL2})$$

In some embodiments, table 2 shows the results 3-R1 and 3-R2 when the first sensing 3-S1 and the second sensing signal 3-S2 in table 1 are calculated by the first algorithm 3-AL1 and the second algorithm 3-AL2.

TABLE 2

| Example | 3-R1 calculated by 3-AL1 | 3-R2 calculated by 3-AL2 |
|---|---|---|
| 1 | 50 | 0 |
| 2 | 0 | 50 |
| 3 | 30 | 10 |

Therefore, when the optical element driving mechanism 3-100A rotates in different directions, the result 3-R1 gained from the first algorithm 3-AL1 and the result 3-R2 gained from the second algorithm 3-AL2 may change accordingly. Therefore, the rotational direction of the optical element driving mechanism 3-100A may be determined from the results 3-R1 and 3-R2.

Figure 48C:
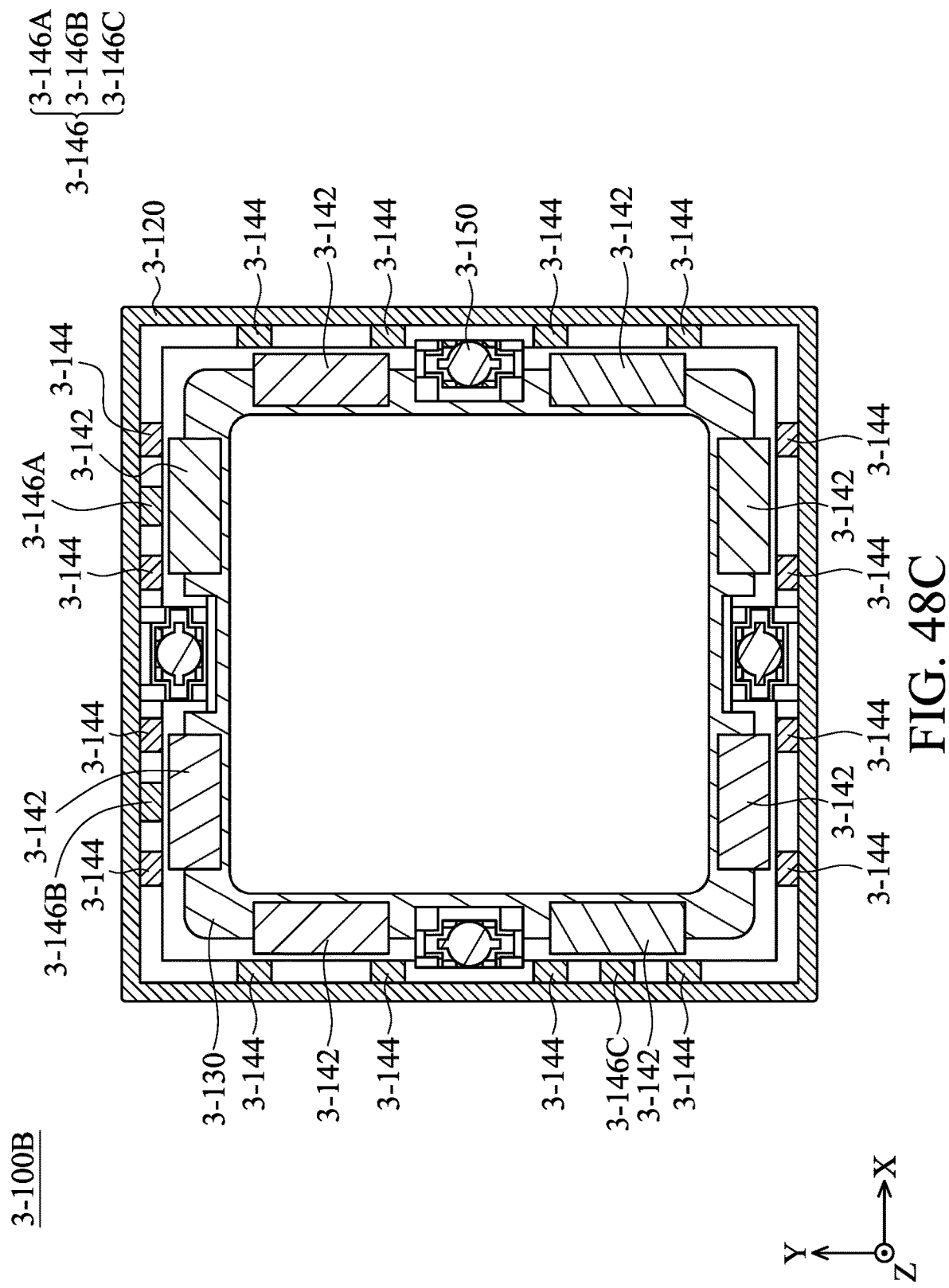
FIG. 48C is a cross-sectional view of some elements in the optical element driving mechanism in some embodiments.

In some embodiments, as shown in FIG. 48C, the first magnetic element 3-142 and the second magnetic element 3-144 may be disposed at all sides of the optical element driving mechanism 3-100B. In other words, the fixed portion 3-F1 has a rectangular shape, and the driving element (e.g. the first magnetic element 3-142 and the second magnetic element 3-144) may be disposed on at least two opposite sides of the fixed portion 3-F1, and may be disposed on four sides of the fixed portion 3-F1. In FIG. 48C, an additional third position sensor 3-146C may be disposed on the fixed portion 3-F1 or the movable portion 3-M1, and the direction of the magnetic field detected by the third position sensor 3-146C is different from the direction of the magnetic field detected by the first position sensor 3-146A or the direction of the magnetic field detected by the second position sensor 3-146B.

Figure 48D:
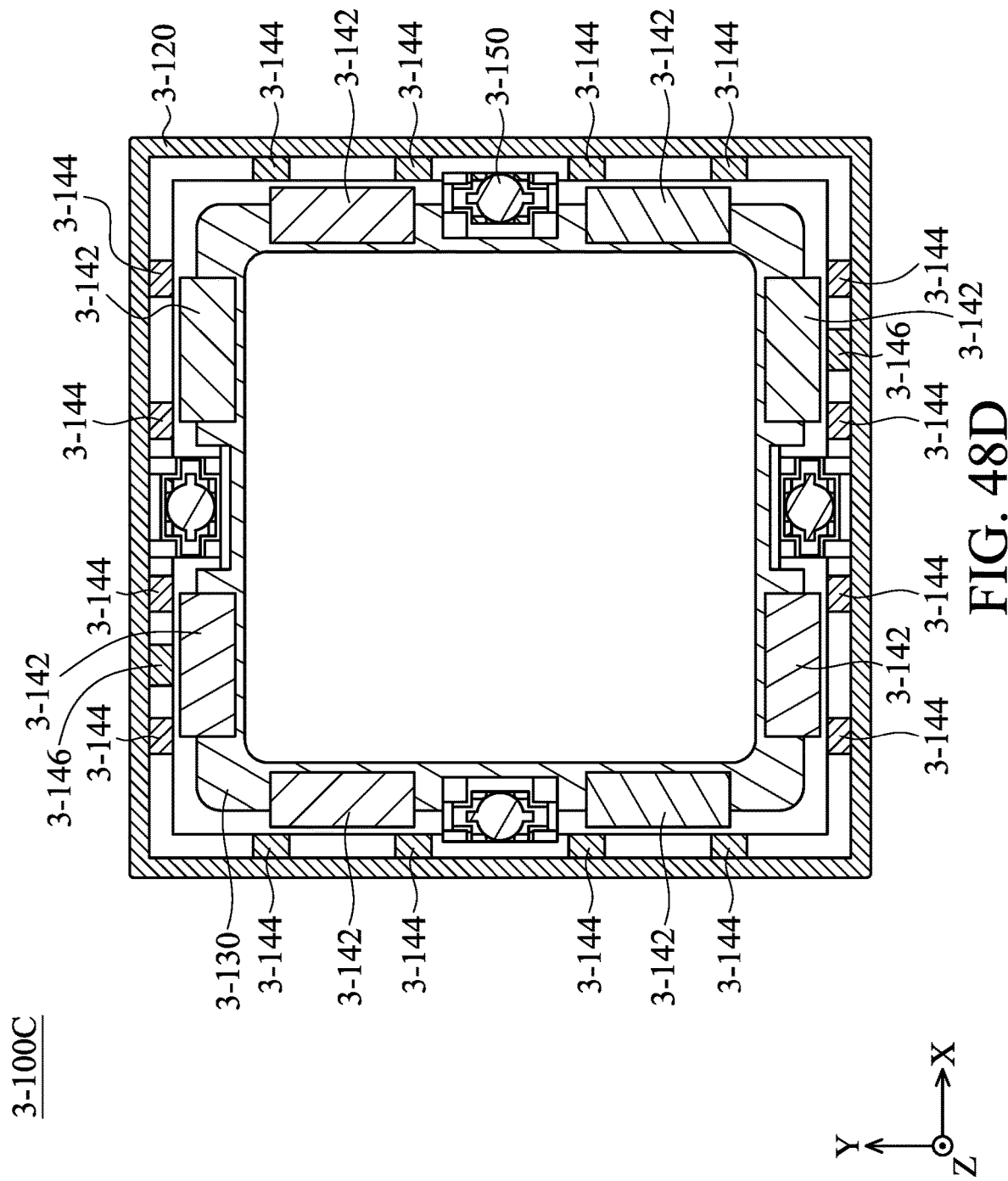
FIG. 48D is a cross-sectional view of some elements in the optical element driving mechanism in some embodiments.

In some embodiments, as shown in FIG. 48D, the first magnetic element 3-142 and the second magnetic element 3-144 may be disposed at all sides of the optical element driving mechanism 3-100C to further increase the driving force of the driving assembly 3-140. In FIG. 48C, two position sensors 3-146 may be used for detecting movement in different directions, and may be disposed at different quadrants, such as disposed at different sides (e.g. at opposite sides or adjacent sides).

Therefore, the connecting element 3-150 may be movably disposed in the optical element driving mechanism 3-100 to achieve rotation in one axis or multiple axes, rather than using a spring so suspend the optical module 3-180 in the optical element driving mechanism 3-100. Therefore, the optical element driving mechanism 3-100 may be operated if the friction between the connecting element 3-150, the contact element 3-162, and the contact element 3-162 is overcame, so required power may be reduced. Furthermore, this design allows the optical module 3-180 to be rotated by the optical element driving mechanism 3-100 with a higher angle (e.g. ±2 degrees or ±10 degrees). Moreover, the connecting element 3-150 has a higher mechanical strength, so the reliability of the optical element driving mechanism 3-100 may be increased, and the optical module 3-180 may be prevented from sinking because of its weight, but the present disclosure is not limited thereto.

Figure 49:
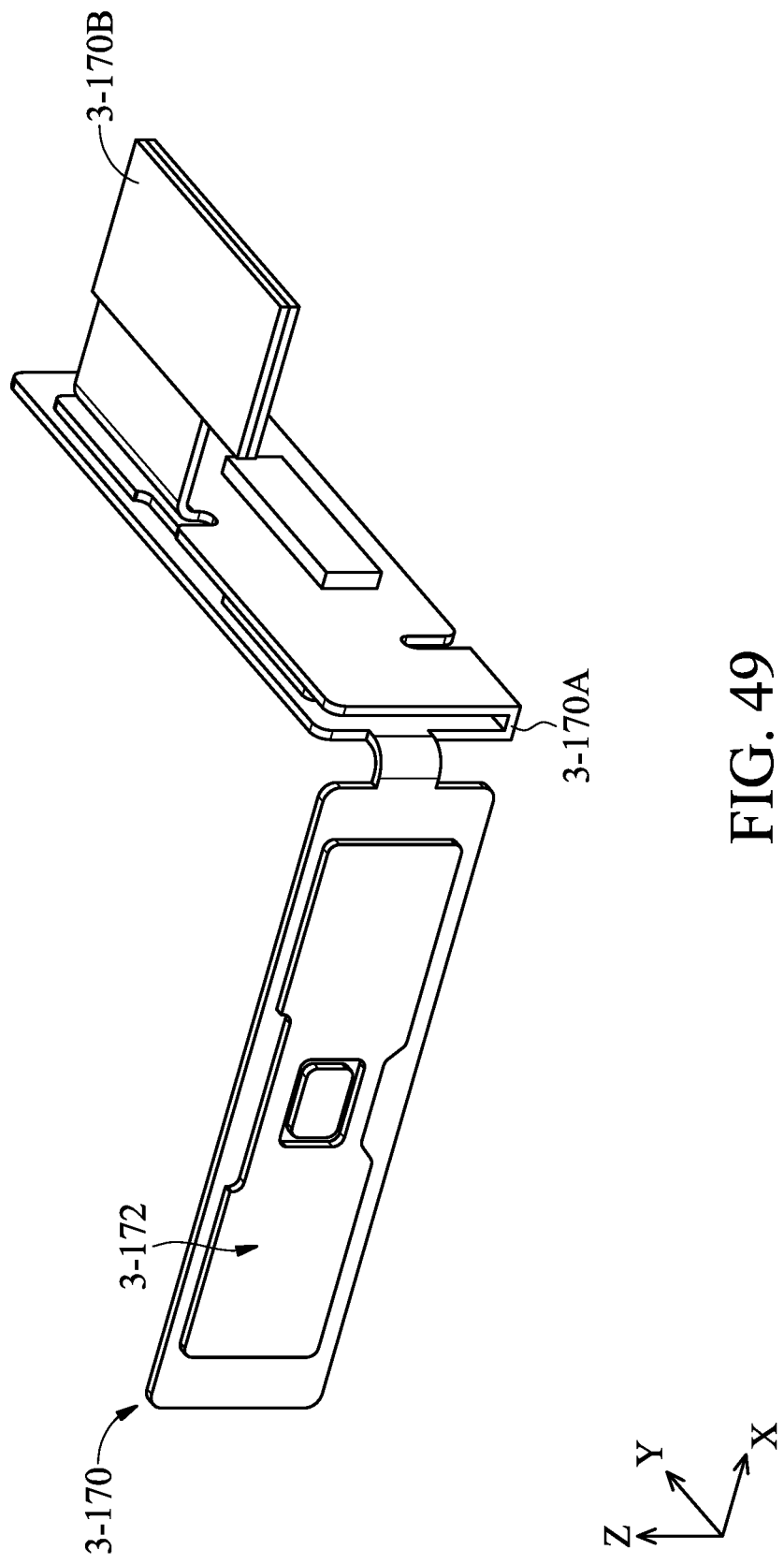
FIG. 49 is a schematic view of the circuit board.
Figure 50:
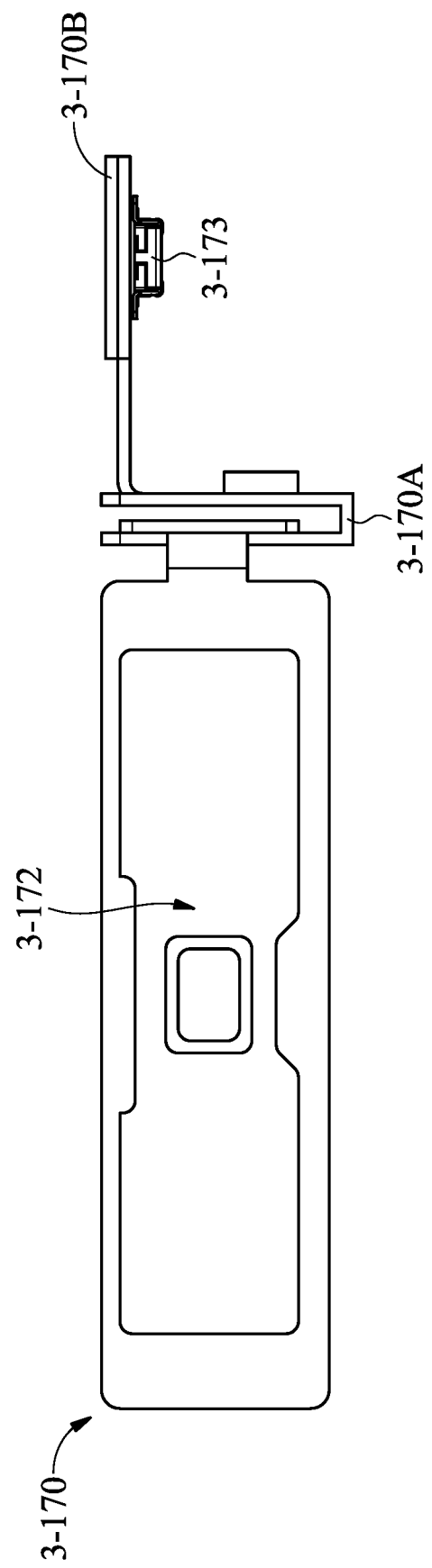
FIG. 50 is a side view of the circuit board

FIG. 49 and FIG. 50 are schematic views of the circuit board 3-170 viewed in different directions. The circuit board 3-170 may be affixed on the fixed portion 3-F1, and the circuit board 3-170 may have a bent portion 3-170A, an extending portion 3-170B, and an electronic element 3-173. The bent portion 3-170A overlaps the fixed portion 3-F1 in a first direction that is perpendicular to the main axis 3-O1 (e.g. the Y direction), and the electronic element 3-173 is disposed on the extending portion 3-170B. Therefore, the electronic element 3-173 may be prevented from damaged.

The electronic element 3-173 may be an integrated circuit used for controlling the operation of the optical element driving mechanism 3-100. Moreover, the bent portion 3-170A of the circuit board 3-170 may reduce the required space of the circuit board 3-170, and miniaturization may be achieved.

In some embodiments, recesses or openings may be provided on the circuit board 3-170 (not shown), and the second magnetic element 3-144 may be disposed in the opening or the recess to protect the second magnetic element 3-144 and achieve miniaturization.

Figure 51:
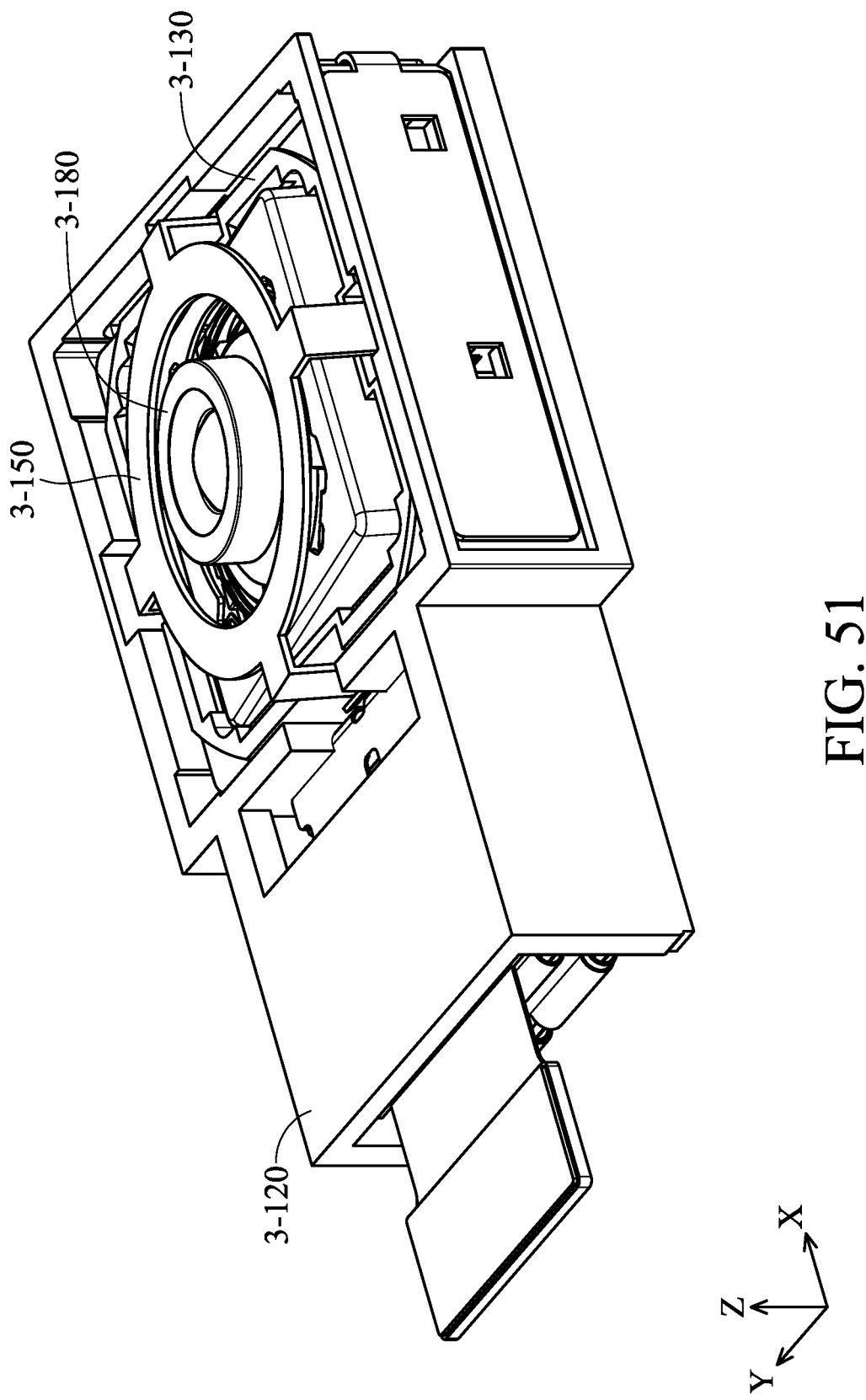
FIG. 51 is a schematic view when the optical element driving mechanism is operating.
Figure 52:
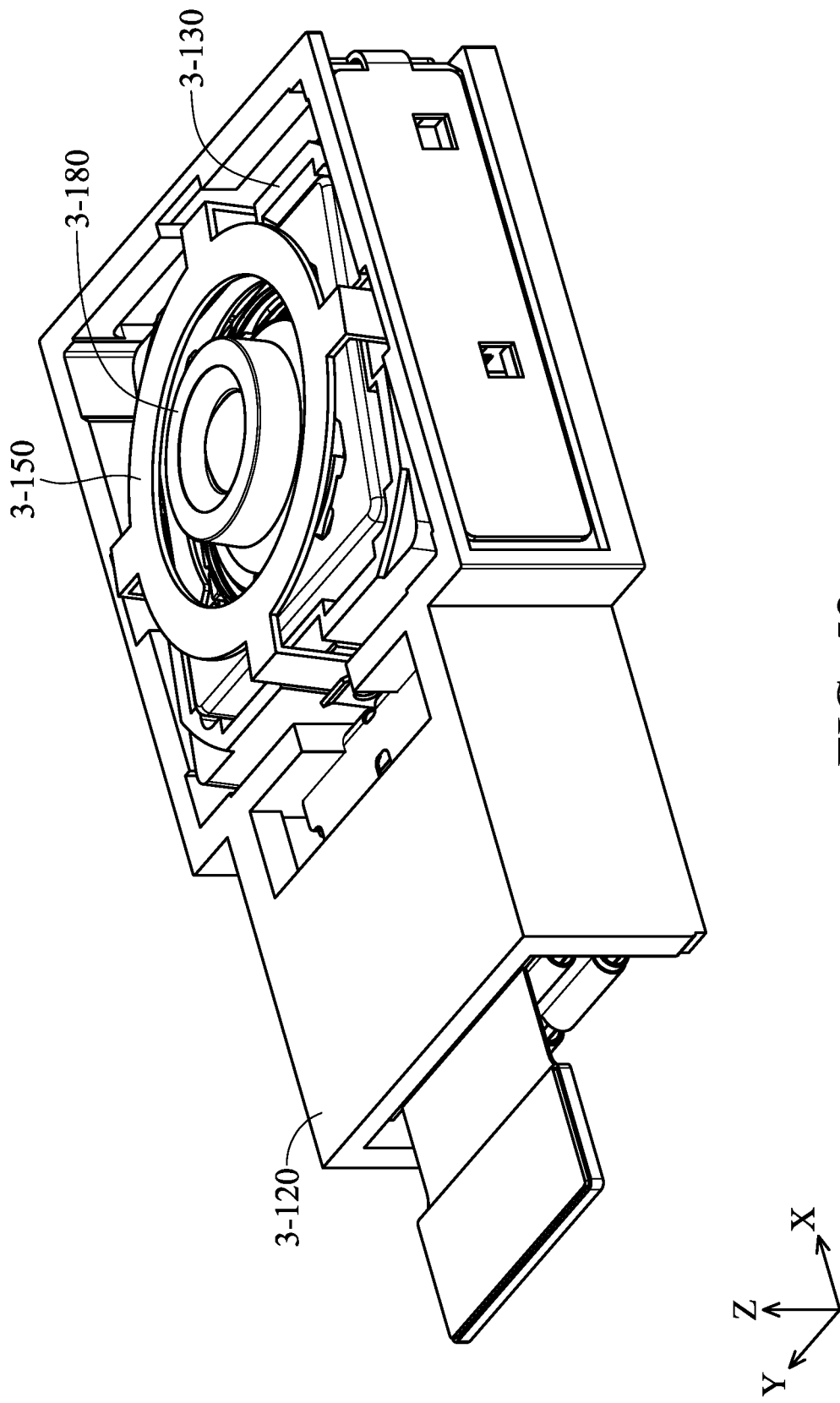
FIG. 52 is a schematic view when the optical element driving mechanism is operating.

FIG. 51 is a schematic view when the connecting element 3-150 and the optical module 3-180 in the optical element driving mechanism 3-100 rotates relative to the fixed portion 3-F1 in one direction, wherein the holder 3-130 does not move relative to the fixed portion 3-F1. FIG. 52 is a schematic view when the holder 3-130, the connecting element 3-150, and the optical module 3-180 disposed on the connecting element 3-150 rotate relative to the fixed portion 3-F1 in another direction. As shown in FIG. 51 and FIG. 52, the connecting element 3-150 and the optical module 3-180 disposed on the connecting element 3-150 may rotate in different direction by the driving force generated by the driving assembly 3-140. Although the optical module 3-180 only rotates in one direction in FIG. 51 and FIG. 52, it should be realized that the optical module 3-180 also may rotate in more than one axis (e.g. the X axis, the Y axis, or the Z axis) to achieve optical image stabilization.

Figure 53:
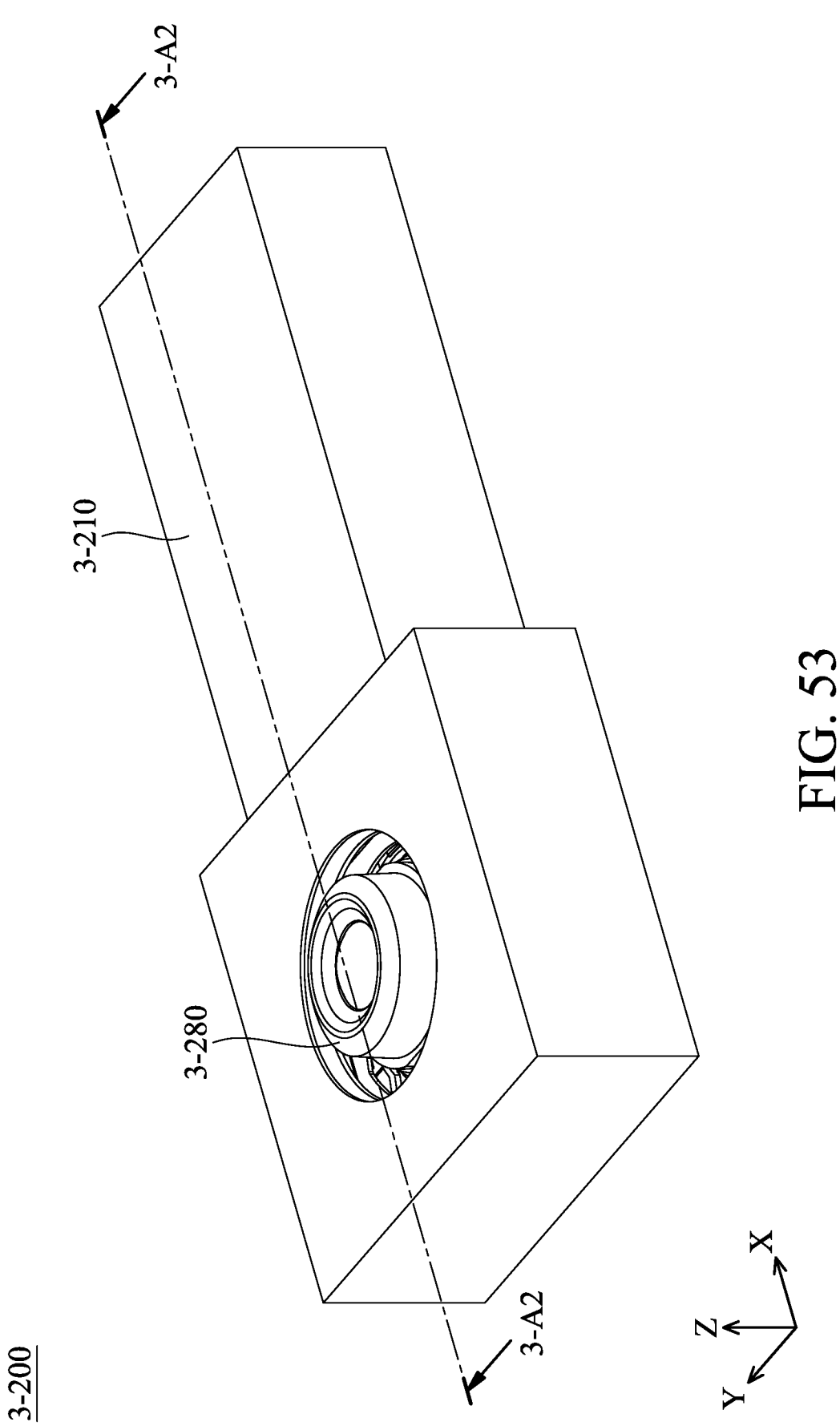
FIG. 53 is a perspective view of an optical element driving mechanism in some embodiments of the present disclosure.
Figure 54:
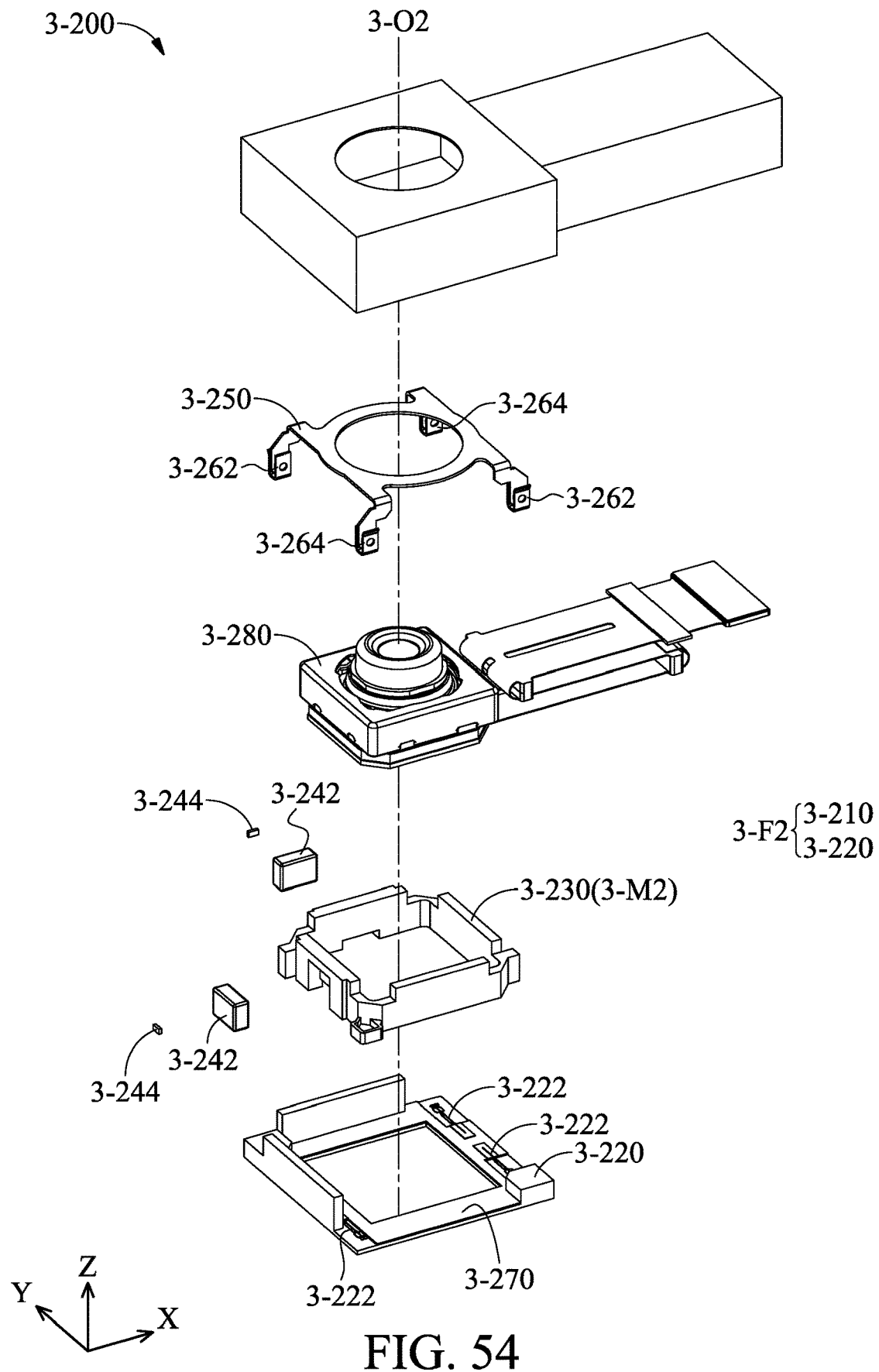
FIG. 54 is an exploded view of the optical element driving mechanism.
Figure 55:
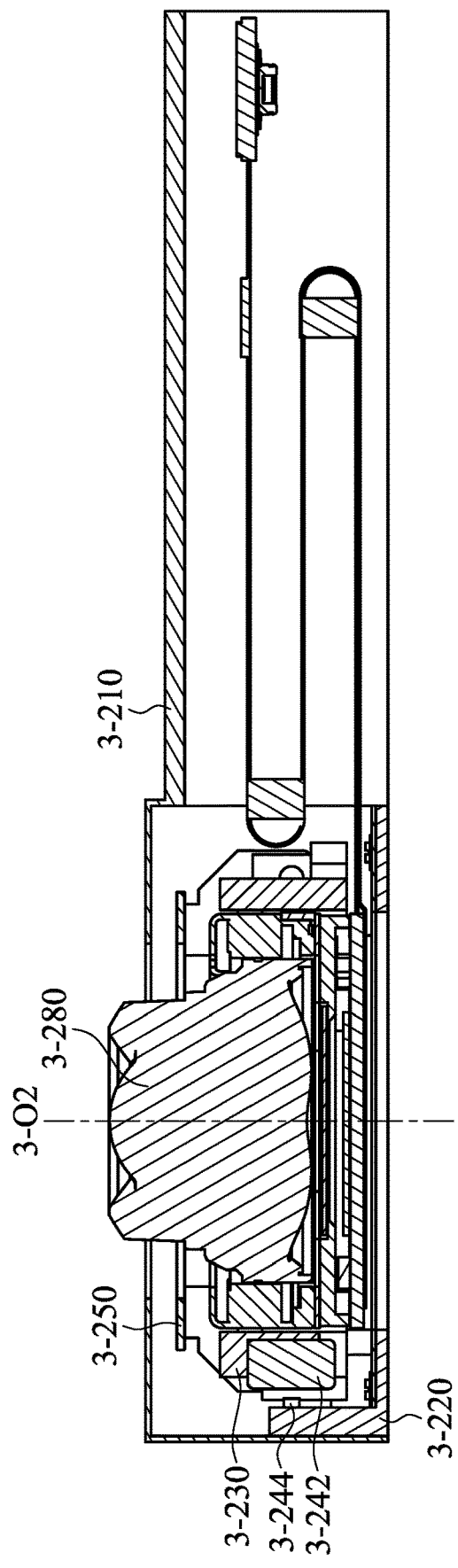
FIG. 55 is a cross-sectional view of the optical element driving mechanism.

FIG. 53 to FIG. 55 are a perspective view, an exploded view, and a cross-sectional view illustrated along the line 3-A3-3-A2 of FIG. 53 of an optical element driving mechanism 3-200 in some embodiments of the present disclosure. In FIG. 54, the optical element driving mechanism 3-200 mainly includes a top case 3-210, a bottom 3-220, a driving assembly 3-222, a holder 3-230 (or movable portion 3-M2), a magnetic element 3-242, a position sensor 3-244, a connecting element 3-250, a contact element 3-262, a contact element 3-264, and a circuit board 3-240. The optical element driving mechanism 3-200 is used for driving an optical module 3-280 to move, or may be used for driving other optical elements, such as a lens, a mirror, a prism, a beam splitter, or an aperture, but the present disclosure is not limited thereto.

In some embodiments, the top case 3-210 and the bottom 3-220 may be combined to form the case of the optical element driving mechanism 3-200. Moreover, the top case 3-210 and the bottom 3-220 may be called as the fixed portion 3-F2.

In some embodiments, the holder 3-230 (the movable portion 3-M2) may be relative to the fixed portion 3-F2 (e.g. the top case 3-210 and the bottom 3-220). Therefore, the optical module 3-280 which is disposed on the holder 3-230 may be moved by the holder 3-230 to achieve auto focus or optical image stabilization.

Figure 56:
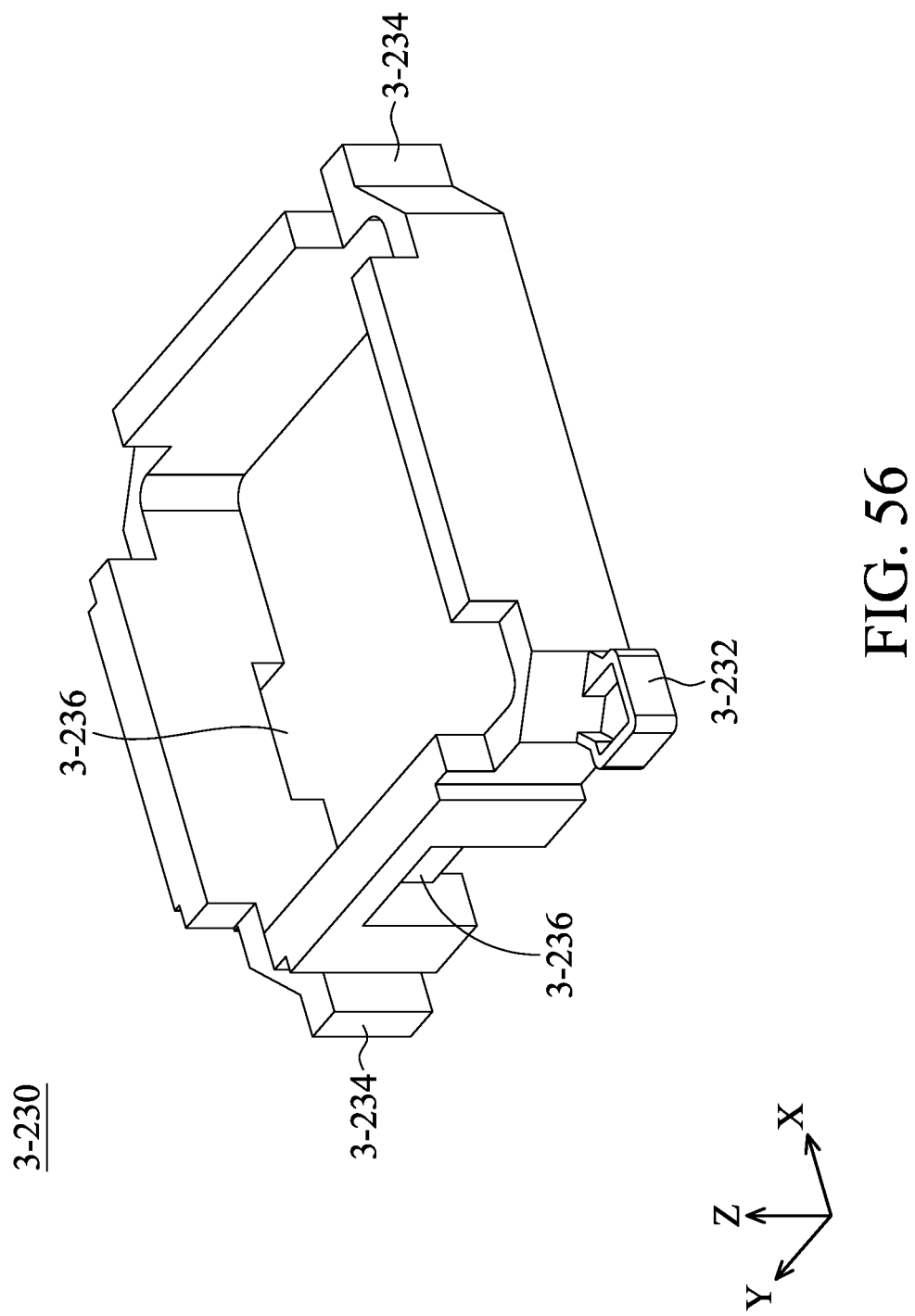
FIG. 56 is a schematic view of the holder.

FIG. 56 is a schematic view of the holder 3-230. The holder 3-230 may have a pair of first extending portions 3-232 and a pair of second extending portions 3-234 disposed on opposite corners of the holder 3-230. The shapes of the first extending portion 3-232 and the second extending portion 3-234 may be different. The contact element 3-264 may be disposed on the first extending portion 3-232.

In some embodiments, magnetic elements 3-242 (e.g. magnets) may be disposed on the holder 3-230, and position sensors 3-244 may be disposed on the fixed portion 3-F2 (e.g. the bottom 3-220) to allow the position sensor 3-244 detect the variation of the magnetic field generated by the magnetic element 3-242 when the holder 3-230 moves relative to the fixed portion 3-F2. For example, as shown in FIG. 56, the holder 3-230 may have a recess 3-236, and the magnetic element 3-242 may be disposed in the recess 3-236 to allow the magnetic element 3-242 to move relative to the holder 3-230.

The configuration of the connecting element 3-250, the contact element 3-262, and the contact element 3-264 of the optical element driving mechanism 3-200 are similar to the connecting element 3-150, the contact element 3-162, and the contact element 3-164 of the optical element driving mechanism 3-100, and is not repeated.

FIG. 57 is a top view of the driving assembly 3-222, and FIG. 58 is a side view of the driving assembly 3-222. As shown in FIG. 57 and FIG. 58, the driving assembly 3-222 may include a plurality of driving elements, such as a first driving element 3-224 and a second driving element 3-226. The first driving element 3-224 may be linear shaped, and the second driving element 3-226 may have a curved shape, such as may have a first portion 3-226A and a second portion 3-226B that bend to different directions.

The first driving element 3-224 may be formed by shape memory alloy (SMA), which is an alloy that can eliminate the deformation in lower temperature by heating. When the shape memory alloy performs plastic deformation under its phase transition temperature, it may return to its original shape by heating. Therefore, the temperature of the first driving element 3-224 may be changed by passing current to change the shape of the first driving element 3-224, and the second driving element 3-226 which is resilient may be moved accordingly. It should be noted that the fixed portion 3-F2 and the movable portion 3-M2 are affixed on the second driving element 3-226.

Figure 59:
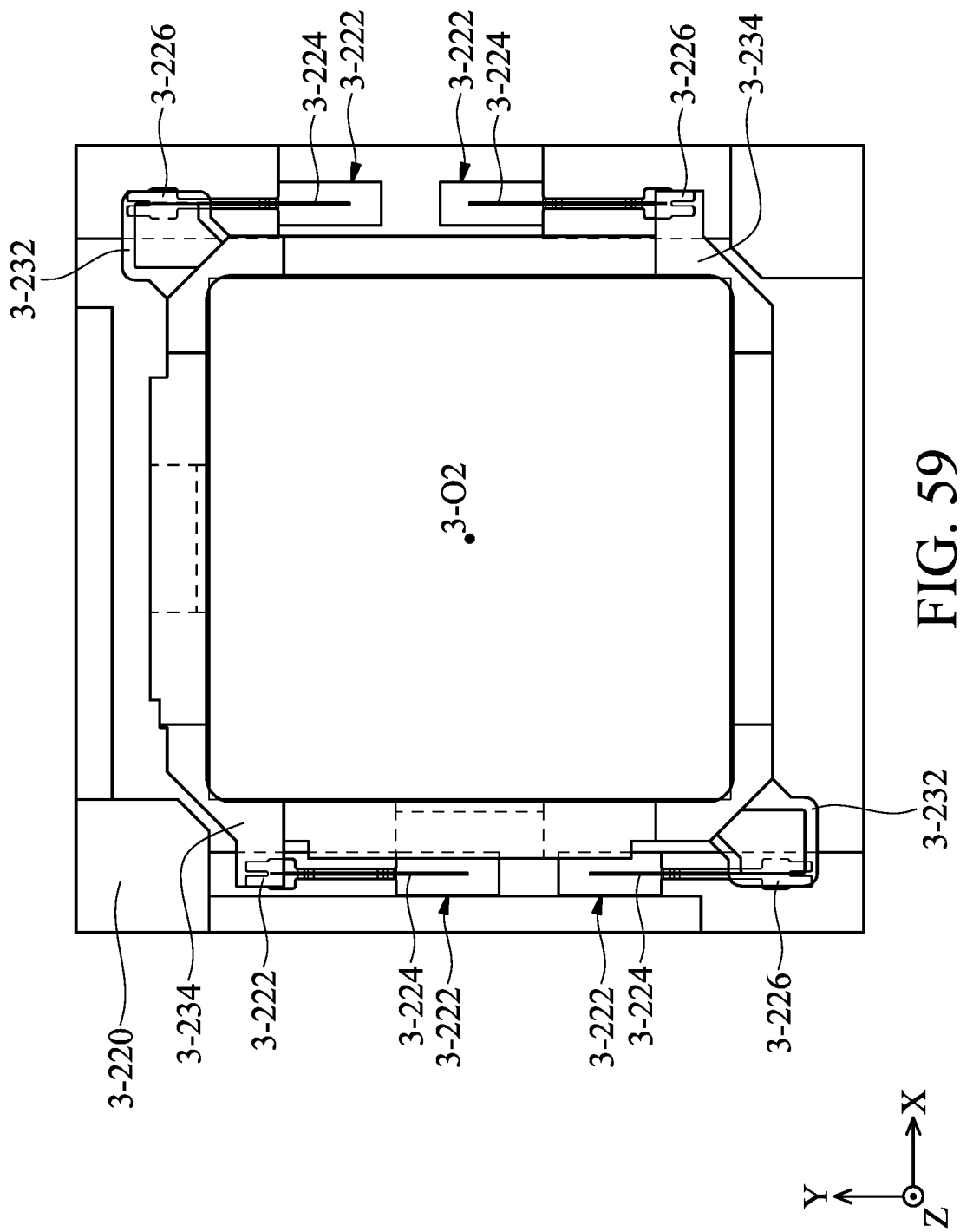
FIG. 59 is a top view of some elements of the optical element driving mechanism.

FIG. 59 is a top view of some elements of the optical element driving mechanism 3-200, wherein the first extending portion 3-232 and the second extending portion 3-234 of the holder 3-230 may be disposed (e.g. affixed) on the second portion 3-224B of the second driving element 3-226 (FIG. 58) to allow the holder 3-230 move with the deformation of the second driving element 3-226. Therefore, the holder 3-230 and the optical module 3-280 disposed on the holder 3-230 may move together relative to the fixed portion 3-F2, and the optical module 3-280 may move in additional directions (e.g. rotate relative to the X, Y, or Z axis) to improve the performance of the optical module, such as achieving optical image stabilization.

Figure 60:
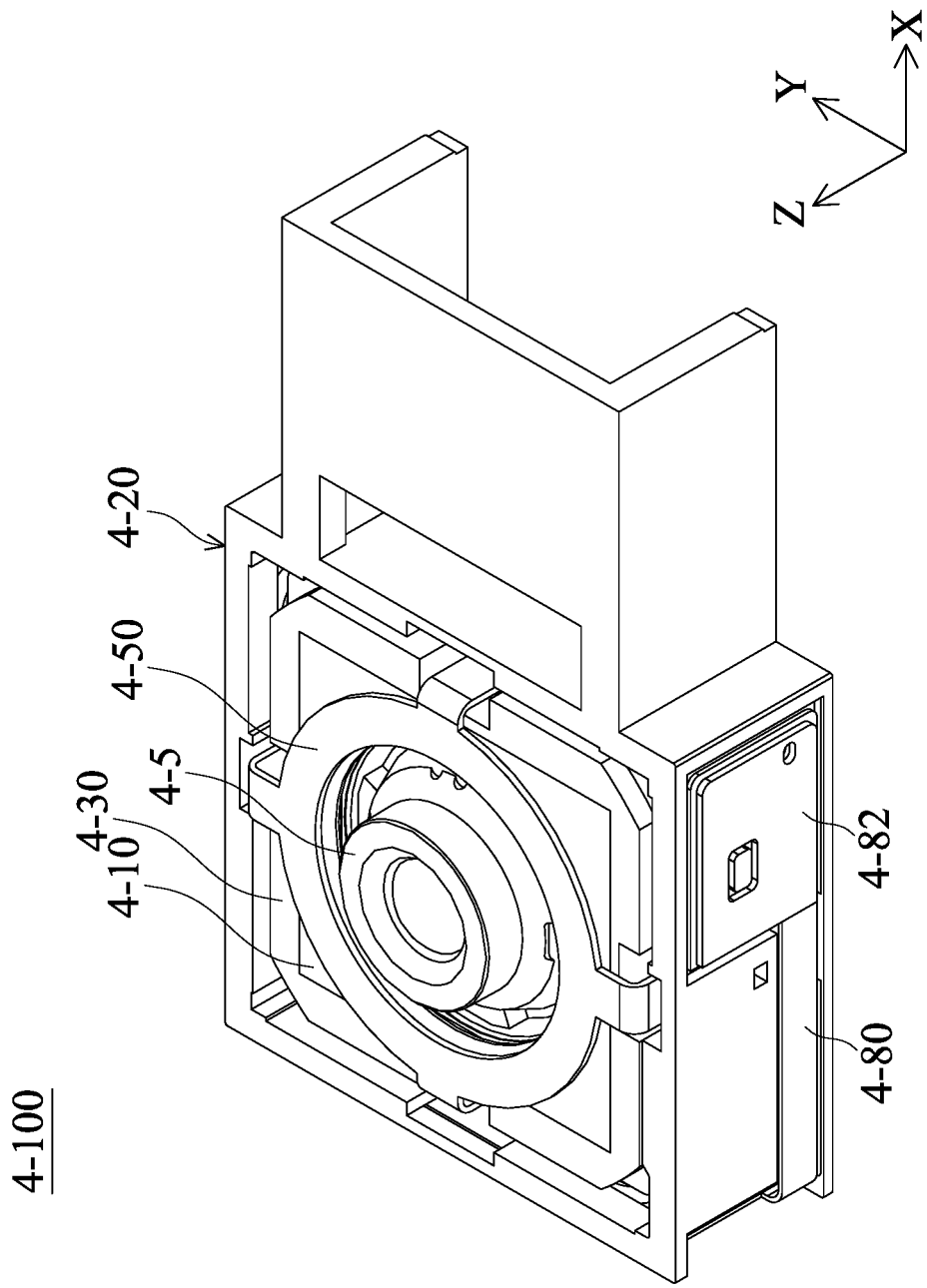
FIG. 60 is a schematic view of an optical system in some embodiments of the present disclosure.
Figure 61:
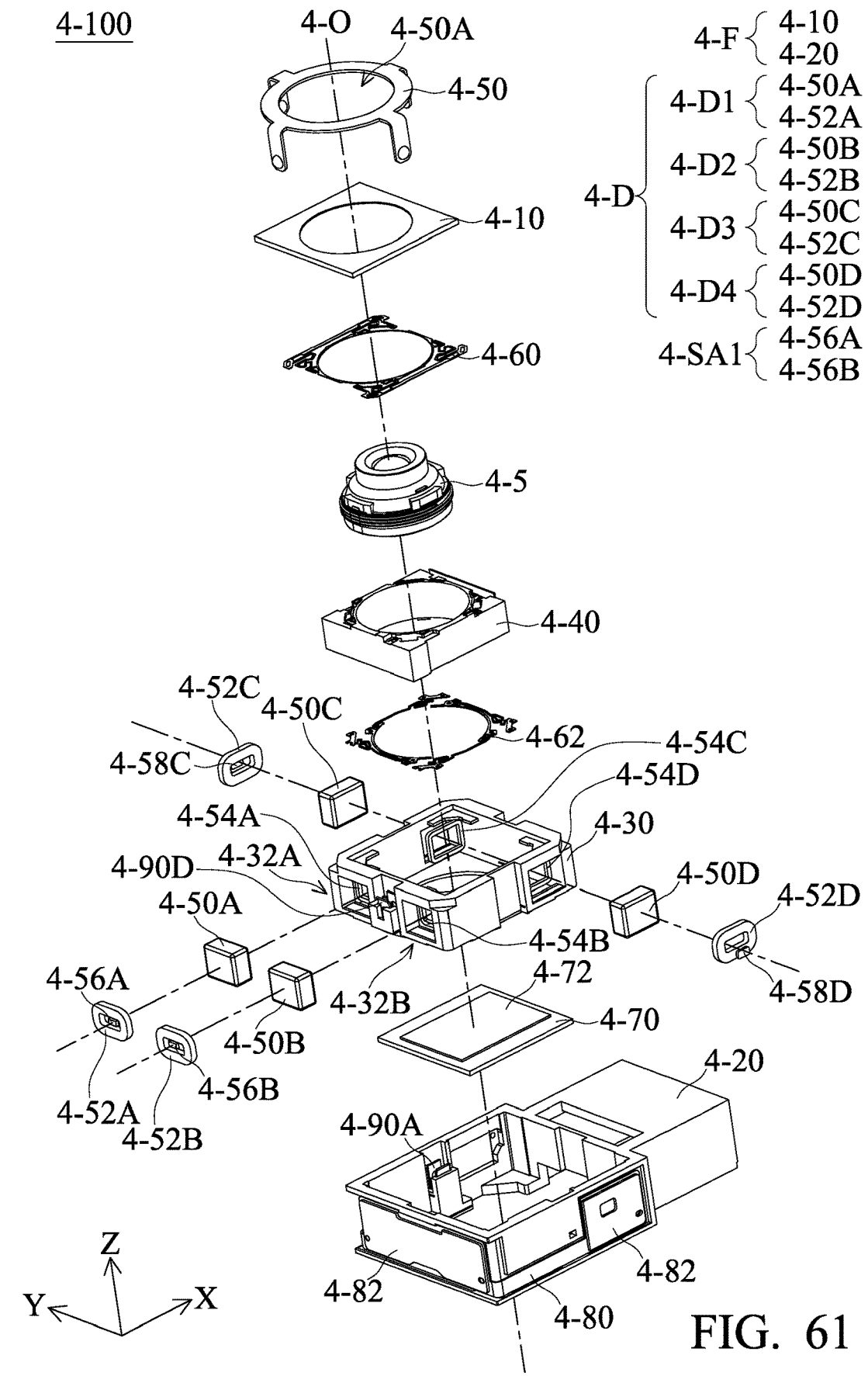
FIG. 61 is an exploded view of the optical system.
Figure 62:
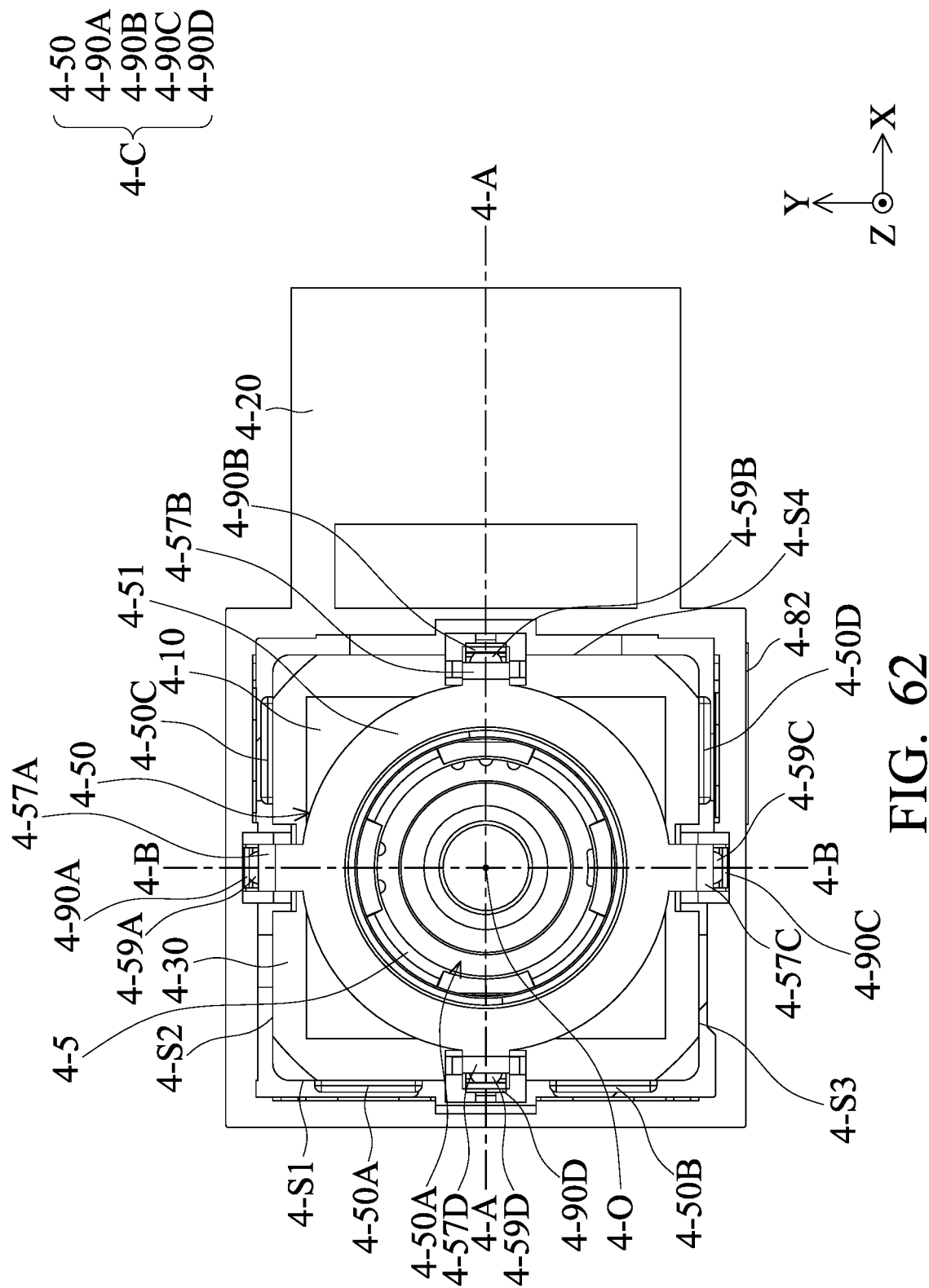
FIG. 62 is a top view of the optical system.
Figure 63A:
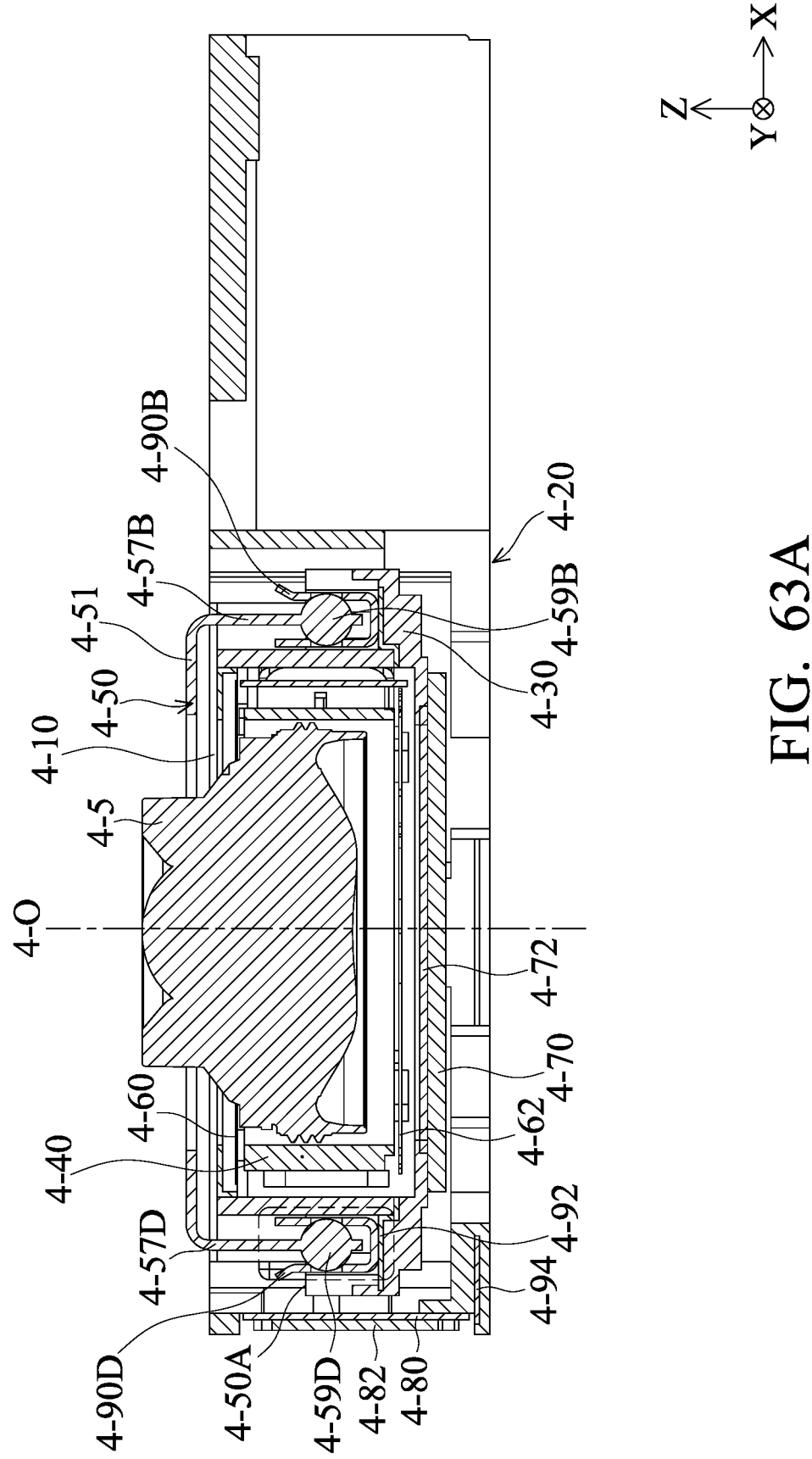
FIG. 63A is a cross-sectional view of the optical system illustrated along the line 4-A-4-A in FIG. 62.
Figure 63B:
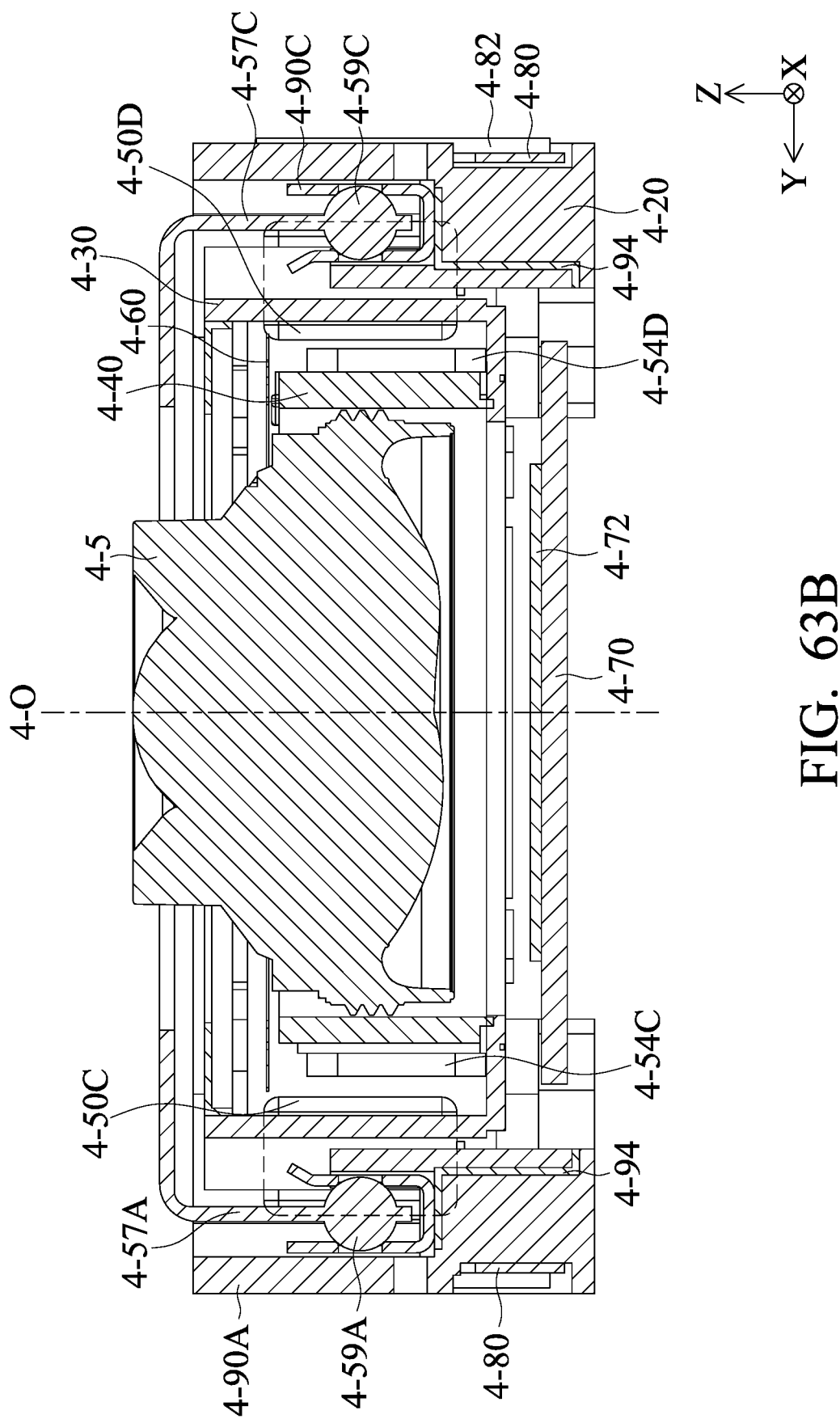
FIG. 63B is a cross-sectional view of the optical system illustrated along the line 4-B-4-B in FIG. 62.
Figure 64:
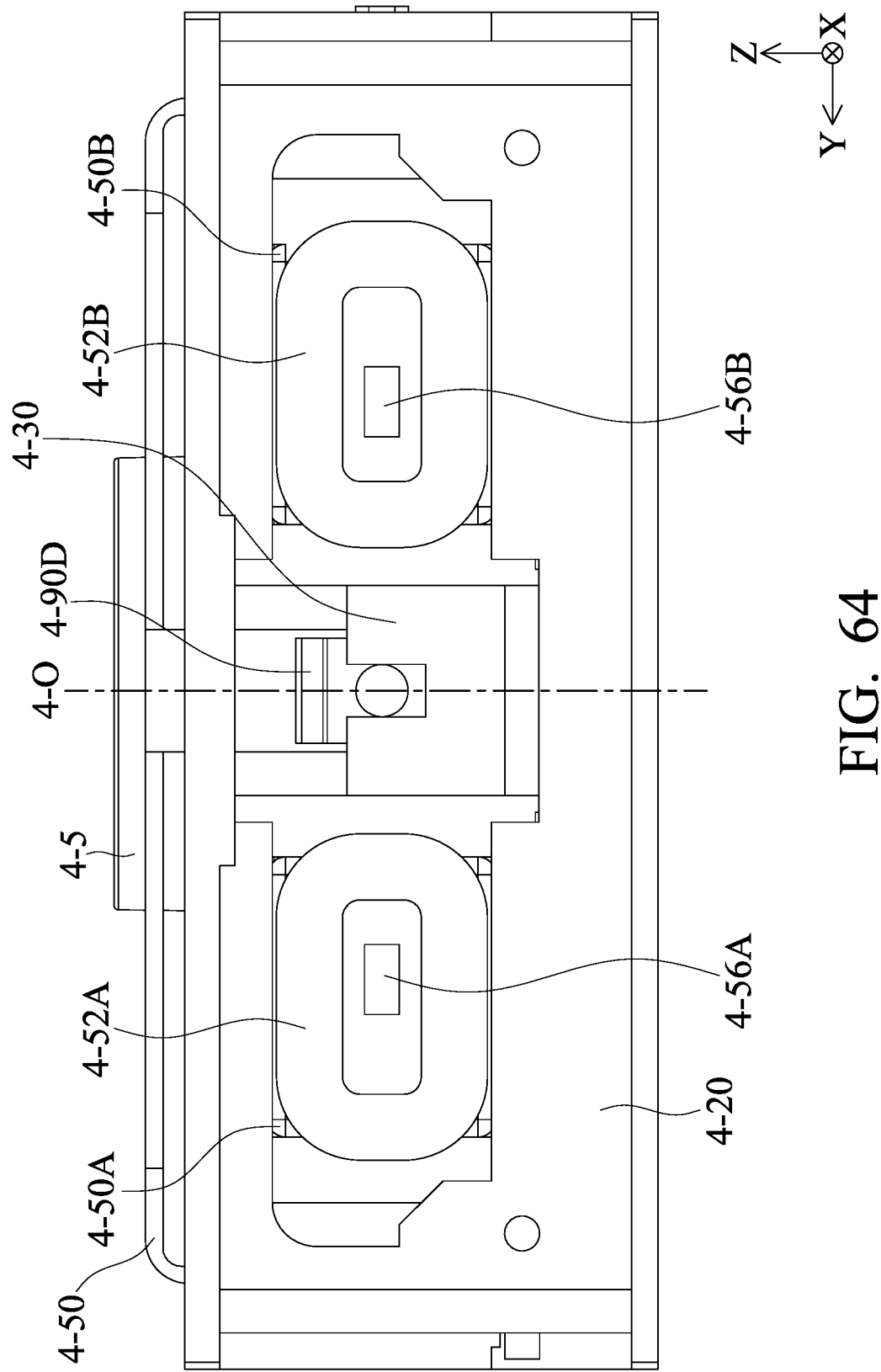
FIG. 64 is a side view of the optical system.

FIG. 60 is a schematic view of an optical system 4-100 in some embodiments of the present disclosure. FIG. 61 is an exploded view of the optical system 4-100. FIG. 62 is a top view of the optical system. FIG. 63A is a cross-sectional view of the optical system 4-100 illustrated along the line 4-A-4-A in FIG. 62. FIG. 63B is a cross-sectional view of the optical system 4-100 illustrated along the line 4-B-4-B in FIG. 62. FIG. 64 is a side view of the optical system 4-100. In FIG. 61, the optical system 4-100 mainly includes a case 4-10, a bottom 4-20, a first movable portion 4-30, a second movable portion 4-40, a frame 4-50, a first magnetic element 4-50A, a second magnetic element 4-50B, a third magnetic element 4-50C, a fourth magnetic element 4-50D, a first driving coil 4-52A, a second driving coil 4-52B, a third driving coil 4-52C, a fourth driving coil 4-52D, a fifth driving coil 4-54A, a sixth driving coil 4-54B, a seventh driving coil 4-54C, an eighth driving coil 4-54D, a first sensor 4-56A, a second sensor 4-56B, a first reinforcement element 4-58C, a second reinforcement element 4-58D, a first resilient element 4-60, a second resilient element 4-62, a bottom plate 4-70, an optical sensor 4-72, and a circuit assembly arranged along a main axis 4-O.

The optical system 4-100 may be used for driving an optical assembly 4-5, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

The optical system 4-100 may be disposed on an electronic device (not shown) and may be electrically connected to the electronic device. For example, the optical system 4-100 may be disposed on a cellphone, a tablet, a notebook, etc., and the present disclosure is not limited thereto.

In some embodiments, the case 4-10 and the bottom 4-20 may be combined to form an outer shell of the optical system 4-100. Furthermore, the case 4-10 and the bottom 4-20 may be called as a fixed portion 4-F. In some embodiments, the first movable portion 4-30 may move relative to the fixed portion 4-F, such as relative to the case 4-10 and the bottom 4-20, and the second movable portion 4-40 may move relative to the first movable portion 4-30 and the fixed portion 4-F. Therefore, the optical assembly 4-5 disposed on the second movable portion 4-40 may move with the second movable portion 4-40 to achieve optical image stabilization.

In some embodiments, the first magnetic element 4-50A and the first driving coil 4-52A may be called as a first driving assembly 4-D1, the second magnetic element 4-50B and the second driving coil 4-52B may be called as a second driving assembly 4-D2, the third magnetic element 4-50C and the third driving coil 4-52C may be called as a third driving assembly 4-D3, and the fourth magnetic element 4-50D and the fourth driving coil 4-52D may be called as a fourth driving assembly 4-D4. The first driving assembly 4-D1, the second driving assembly 4-D2, the third driving assembly 4-D3, and the fourth driving assembly 4-D4 may be called as a first movable portion driving assembly 4-D used for driving the first movable portion 4-30 to move relative to the fixed portion 4-F in different directions.

For example, the first magnetic element 4-50A and the first driving coil 4-52A may be disposed on the first movable portion 4-30 and the fixed portion 4-F, respectively. It should be noted that the interaction between the magnetic elements (e.g. magnets) and coils in the first movable portion driving assembly 4-D, a magnetic force may be generated to move the first movable portion 4-30 (and the optical assembly 4-5 disposed on the first movable portion 4-30) to move relative to the fixed portion 4-F to achieve auto focus or optical image stabilization. In some embodiments, the first movable portion driving assembly 4-D may include piezoelectric element or shape memory alloy as well.

Furthermore, the optical system 4-100 may further include a fifth driving coil 4-54A, a sixth driving coil 4-54B, a seventh driving coil 4-54C, and an eighth driving coil 4-54D, which are corresponding to the first magnetic element 4-50A, the second magnetic element 4-50B, the third magnetic element 4-50C, and the fourth magnetic element 4-50D, respectively. The fifth driving coil 4-54A, the sixth driving coil 4-54B, the seventh driving coil 4-54C, and the eighth driving coil 4-54D may be disposed on the second movable portion 4-40 to generate a driving force (e.g. magnetic force) to move the second movable portion 4-40 relative to the first movable portion 4-30. Therefore, the fifth driving coil 4-54A, the sixth driving coil 4-54B, the seventh driving coil 4-54C, and the eighth driving coil 4-54D may be called as a second movable portion driving assembly.

It should be noted that the first magnetic element 4-50A, the second magnetic element 4-50B, the third magnetic element 4-50C, and the fourth magnetic element 4-50D may be a portion of the first movable portion driving assembly 4-D and the second movable portion driving assembly at a same time. In other words, the first magnetic element 4-50A, the second magnetic element 4-50B, the third magnetic element 4-50C, and the fourth magnetic element 4-50D may generate a first driving force to drive the first movable portion 4-30 with the first driving coil 4-52A, the second driving coil 4-52B, the third driving coil 4-52C, and the eighth driving coil 4-54D, and may generate a second driving force to drive the second movable portion 4-40 with the 4-42A, the sixth driving coil 4-54B, the seventh driving coil 4-54C, and the eighth driving coil 4-54D. In other words, the fifth driving coil 4-54A may correspond to first driving assembly 4-D1, the sixth driving coil 4-54B may correspond to second driving assembly 4-D2, the seventh driving coil 4-54C may correspond to third driving assembly 4-D3, the eighth driving coil 4-54D may correspond to fourth driving assembly 4-D4. Therefore, the number of elements in the optical system 4-100 may be reduced to achieve miniaturization.

For example, the first driving assembly 4-D1 and the second driving assembly 4-D2 may drive the first movable portion 4-30 relative to the fixed portion 4-F in a first dimension, the third driving assembly 4-D3 and the fourth driving assembly 4-D4 may drive the first movable portion 4-30 relative to the fixed portion 4-F in a second dimension. The first dimension and the second dimension may be rotational movements relative to different rotational axes, but the present disclosure is not limited thereto. Furthermore, the second movable portion driving assembly may be used for driving the second movable portion 4-40 to move relative to the first movable portion 4-30 in a third dimension. The third dimension may be a translational movement along the X axis, the Y axis, or the Z axis. In other words, the first, second, and third dimensions may be different.

In some embodiments, a first sensor 4-56A and a second sensor 4-56B may be provided in the optical system 4-100 to detect the position of the first movable portion 4-30 relative to the fixed portion 4-F. For example, the first sensor 4-56A and the second sensor 4-56B may be disposed in the first driving coil 4-52A and the second driving coil 4-52B, respectively. Furthermore, additional sensors may be provided to detect the position of the second movable portion 4-40 relative to the first movable portion 4-30 or relative to the fixed portion 4-F.

The sensors (such as the first sensor 4-56A, the second sensor 4-56B) may include a Hall sensor, a magnetoresistance effect sensor (MR sensor), a giant magnetoresistance effect sensor (GMR sensor), a tunneling magnetoresistance effect sensor (TMR sensor), or a fluxgate sensor. In some embodiments, the first sensor 4-56A and the second sensor 4-56B may be called together as a first sensing assembly 4-SA1, which is used for detecting the position of the first movable portion 4-30 relative to the fixed portion 4-F.

In some embodiments, the optical assembly 4-5 may be disposed in the second movable portion 4-40, the bottom plate 4-70 may be disposed on the first movable portion 4-30, and the optical sensor 4-72 may be disposed on the bottom plate 4-70 and arranged with the optical assembly 4-5 along the main axis 4-O. The fifth driving coil 4-54A, the sixth driving coil 4-54B, the seventh driving coil 4-54C, and the eighth driving coil 4-54D disposed on the second movable portion 4-40 may be used for driving the optical assembly 4-5 and the second movable portion 4-40 to move relative to the first movable portion 4-30, such as move in the X, Y, or Z directions. Therefore, the optical assembly 4-5 may perform focus with the optical sensor 4-72 along the main axis 4-O (e.g. the Z direction), or may achieve optical image stabilization.

In this embodiment, the optical assembly 4-5 and the second movable portion 4-40 are movably disposed in the first movable portion 4-30. More specifically, the optical assembly 4-5 and the second movable portion 4-40 may be suspended in the first movable portion 4-30 by the first resilient element 4-60 and the second resilient element 4-62 which are metal (see FIG. 63A and FIG. 63B).

The optical assembly 4-5 may be connected to the circuit assembly 4-80. The circuit assembly 4-80 may be a flexible printed circuit, which may be adhered on the bottom 4-20. In this embodiment, the circuit assembly 4-80 is electrically connected to other electronic elements inside or outside the 4-5. For example, electrical signal may be provided to the second movable portion driving assembly through the circuit assembly 4-80 to control the movement of the first movable portion 4-30 and the second movable portion 4-40 in the X, Y or Z directions to achieve auto focus or optical image stabilization. Furthermore, addition enhancement element 4-82 may be disposed on the circuit assembly 4-80. The hardness of the enhancement element 4-82 may be higher than the hardness of the circuit assembly 4-80 to protect the circuit assembly 4-80. Furthermore, the enhancement element 4-82 may be magnetic conductive to increase the magnetic force generated by the magnetic elements.

In some embodiments, additional circuit may be provided on the bottom 4-20, such as embedded in the bottom 4-20. The circuit is electrically connected to other electronic elements inside or outside the first movable portion 4-30 or the second movable portion 4-40 to perform auto focus or optical image stabilization. The circuit on the bottom 4-20 may be used for transmitting electrical signal to the first driving coil 4-52A, the second driving coil 4-52B, the third driving coil 4-52C, the fourth driving coil 4-52D, the fifth driving coil 4-54A, the sixth driving coil 4-54B, the seventh driving coil 4-54C, or the eighth driving coil 4-54D to control the movement of the first movable portion 4-30 or the second movable portion 4-40 in different directions.

The second resilient element 4-62 may be combined with the circuit on the bottom 4-20 by soldering or laser welding to allow the first driving coil 4-52A, the second driving coil 4-52B, the third driving coil 4-52C, the fourth driving coil 4-52D, the fifth driving coil 4-54A, the sixth driving coil 4-54B, the seventh driving coil 4-54C, and the eighth driving coil 4-54D may be electrically connected to external circuit, such as connected to the aforementioned electronic device.

In some embodiments, a first clipping element 4-90A and a third clipping element 4-90C may be disposed on the bottom 4-20, and a second clipping element 4-90B and a fourth clipping element 4-90D may be disposed on the first movable portion 4-30. In some embodiments, the first clipping element 4-90A and the third clipping element 4-90C may be affixed on the bottom 4-20 (the fixed portion 4-F), and the second clipping element 4-90B and the fourth clipping element 4-90D may be affixed on the first movable portion 4-30.

In some embodiments, when viewed along the main axis 4-O, the bottom 4-20 and the first movable portion 4-30 may be polygonal (e.g. rectangular). The first clipping element 4-90A and the third clipping element 4-90C may be disposed at opposite sides of the bottom 4-20, and the second clipping element 4-90B and the fourth clipping element 4-90D may be disposed at opposite sides of the first movable portion 4-30. In some embodiments, a minimum distance between the first clipping element 4-90A and the third clipping element 4-90C may be different from a minimum distance between the second clipping element 4-90B and the fourth clipping element 4-90D.

The frame 4-50 may be connected to the bottom 4-20 and the first movable portion 4-30. For example, the frame 4-50 may mainly include a main body 4-51, a first intermediate element 4-57A, a second intermediate element 4-57B, a third intermediate element 4-57C, a fourth intermediate element 4-57D, a first contact element 4-59A, a second contact element 4-59B, a third contact element 4-59C, and a fourth contact element 4-59D. The first intermediate element 4-57A, the second intermediate element 4-57B, the third intermediate element 4-57C, and the fourth intermediate element 4-57D may be connected to the main body 4-51, and the first contact element 4-59A, the second contact element 4-59B, the third contact element 4-59C, and the fourth contact element 4-59D may be connected to the first intermediate element 4-57A, the second intermediate element 4-57B, the third intermediate element 4-57C, and the fourth intermediate element 4-57D, respectively.

As shown in FIG. 61 and FIG. 62, the main body 4-51 has a first opening 4-51A corresponding to the optical assembly 4-5, and the first opening 4-51A may be circular. The optical assembly 4-5 may be disposed in the first opening 4-51A. The main body 4-51 may be plate-shaped and may be perpendicular to the main axis 4-O. For example, a top surface 4-51B of the main body 5-51 may be perpendicular to the main axis 4-O.

In some embodiments, the first intermediate element 4-57A, the second intermediate element 4-57B, the third intermediate element 4-57C, and the fourth intermediate element 4-57D may be affixed on the main body 4-51, such as in direct contact with the main body 4-51. Furthermore, the first intermediate element 4-57A, the second intermediate element 4-57B, the third intermediate element 4-57C, and the fourth intermediate element 4-57D may be plate-shaped and parallel to the main body 4-51. In some embodiments, when viewed along the main axis 4-O, as shown in FIG. 64. The first intermediate element 4-57A and the third intermediate element 4-57C are disposed on opposite sides of the optical assembly 4-5, and the center of the first intermediate element 4-57A and the center of the third intermediate element 4-57C are arranged in a direction that is parallel to the second direction (e.g. the Y direction).

In some embodiments, the first contact element 4-59A is affixed on the first intermediate element 4-57A, the second contact element 4-59B is affixed on the second intermediate element 4-57B, the third contact element 4-59C is affixed on the third intermediate element 4-57C, the fourth contact element 4-59D is affixed on the fourth intermediate element 4-57D. Moreover, the first intermediate element 4-57A and the first contact element 4-59A may be formed as one piece, the second intermediate element 4-57B and the second contact element 4-59B may be formed as one piece, the third intermediate element 4-57C and the third contact element 4-59C may be formed as one piece, the fourth intermediate element 4-57D and the fourth contact element 4-59D may be formed as one piece. For example, these elements may be connected by welding (e.g. soldering or melting).

Furthermore, the main body 4-51, the first intermediate element 4-57A, the second intermediate element 4-57B, the third intermediate element 4-57C, the fourth intermediate element 4-57D, the first contact element 4-59A, the second contact element 4-59B, the third contact element 4-59C, the fourth contact element 4-59D may include metal. The material of the first intermediate element 4-57A and the first contact element 4-59A may be different. The material of the second intermediate element 4-57B and the second contact element 4-59B may be different. The material of the third intermediate element 4-57C and the third contact element 4-59C may be different. The material of the fourth intermediate element 4-57D and the fourth contact element 4-59D may be different.

The first contact element 4-59A, the second contact element 4-59B, the third contact element 4-59C, the fourth contact element 4-59D may be respectively disposed in the first clipping element 4-90A, the second clipping element 4-90B, the third clipping element 4-90C, the fourth clipping element 4-90D by means of friction contact to allow the frame 4-50 to move relative to the first movable portion 4-30 and the fixed portion 4-F. For example, the frame 4-50 may rotate by taking a connection of the first contact element 4-59A and the third contact element 4-59C as a rotational axis, and may rotate by taking a connection of the second contact element 4-59B and the fourth contact element 4-59D as a rotational axis as well.

In some embodiments, the frame 4-50, the first clipping element 4-90A, the second clipping element 4-90B, the third clipping element 4-90C, the fourth clipping element 4-90D may be called as an intermediate module 4-C, and the first movable portion 4-30 may move relative to the fixed portion 4-F through the intermediate module 4-C. The intermediate module 4-C may be in direct contact with the first movable portion 4-30 and the fixed portion 4-F.

Because the first contact element 4-59A and the third contact element 4-59C are respectively disposed on the first clipping element 4-90A and the third clipping element 4-90C, and the first clipping element 4-90A and the third clipping element 4-90C are affixed on the bottom 4-20, the first contact element 4-59A and the third contact element 4-59C may movably connected to the bottom 4-20 (the fixed portion 4-F) through the first clipping element 4-90A and the third clipping element 4-90C. Moreover, the second contact element 4-59B and the fourth contact element 4-59D are respectively disposed on the second clipping element 4-90B and the fourth clipping element 4-90D, and the second clipping element 4-90B and the fourth clipping element 4-90D are affixed on the first movable portion 4-30, the first movable portion 4-30 may connected to the frame 4-50 through the second clipping element 4-90B and the fourth clipping element 4-90D, and then connected to the first clipping element 4-90A and the third clipping element 4-90C through the frame 4-50. Therefore, the first movable portion 4-30 may be movably connected to the bottom 4-20 (the fixed portion 4-F).

In some embodiments, a first rotational axis may be defined by the connection 4-B-4-B between the first contact element 4-59A and the third contact element 4-59C, and a second rotational axis may be defined by the connection 4-A-4-A between the second contact element 4-59B and the fourth contact element 4-59D. The first movable portion 4-30 may take the connection 4-A-4-A (the second rotational axis) as a rotational axis to rotate relative to the frame 4-50, and the first movable portion 4-30 and the frame 4-50 may rotate together relative to the fixed portion 4-F by taking the connection 4-B-4-B as a rotational axis (the first rotational axis). In other words, the first movable portion 4-30 and the optical assembly 4-5 disposed on the first movable portion 4-30 may rotate in different directions to achieve optical image stabilization. In some embodiments, the connection 4-A-4-A and the connection 4-B-4-B may be perpendicular to the main axis 4-O, and the connection 4-A-4-A and the connection 4-B-4-B may extend in different directions.

As shown in FIG. 64, when viewed in the X direction, the first driving assembly 4-D1, the second driving assembly 4-D2, the third driving assembly 4-D3, and the fourth driving assembly 4-D4 at least partially exposed from the bottom 4-20. For example, the first magnetic element 4-50A, the second magnetic element 4-50B, the first driving coil 4-52A, or the second driving coil 4-52B at least partially exposed from the bottom 4-20. Moreover, the first driving coil 4-52A and the second driving coil 4-52B may be disposed in the opening of the bottom 4-20. The first sensing assembly 4-SA1 (which includes the first sensor 4-56A and the second sensor 4-56B) does not overlap the first driving coil 4-52A and the second driving coil 4-52B in the X direction to reduce the size of the optical system 4-100 in the X direction, and miniaturization may be achieved.

In some embodiments, in the X direction, at least a portion of the first magnetic element 4-50A overlaps the first driving coil 4-52A, and at least a portion of the second magnetic element 4-50B overlaps the second driving coil 4-52B. Moreover, in the Y direction, at least a portion of the third magnetic element 4-50C overlaps the third driving coil 4-52C, and at least a portion of the fourth magnetic element 4-50D overlaps the fourth driving coil 4-52D. Therefore, the driving force for driving the first movable portion 4-30 may be increased.

In some embodiments, the first movable portion 4-30 may include a first metal element 4-92 which is embedded in the first movable portion 4-30. As shown in FIG. 63A, in the Y direction, at least a portion of the first metal element 4-92 overlaps the first magnetic element 4-50A. The first metal element 4-92 may in direct contact with the intermediate module 4-C, such as in direct contact with the second clipping element 4-90B and the fourth clipping element 4-90D, and the elements may be connected by welding (e.g. soldering to melting). Therefore, the second clipping element 4-90B and the fourth clipping element 4-90D may be affixed on the first movable portion 4-30.

In some embodiments, the bottom 4-20 may include a second metal element 4-94 which is embedded in the bottom 4-20. As shown in FIG. 63B, in the X direction, at least a portion of the second metal element 4-94 overlaps the third magnetic element 4-50C. The second metal element 4-94 may in direct contact with the intermediate module 4-C, such as in direct contact with the first clipping element 4-90A and the third clipping element 4-90C, and the elements may be connected by welding (e.g. soldering to melting). Therefore, the first clipping element 4-90A and the third clipping element 4-90C may be affixed on the bottom 4-20.

Figure 65A:
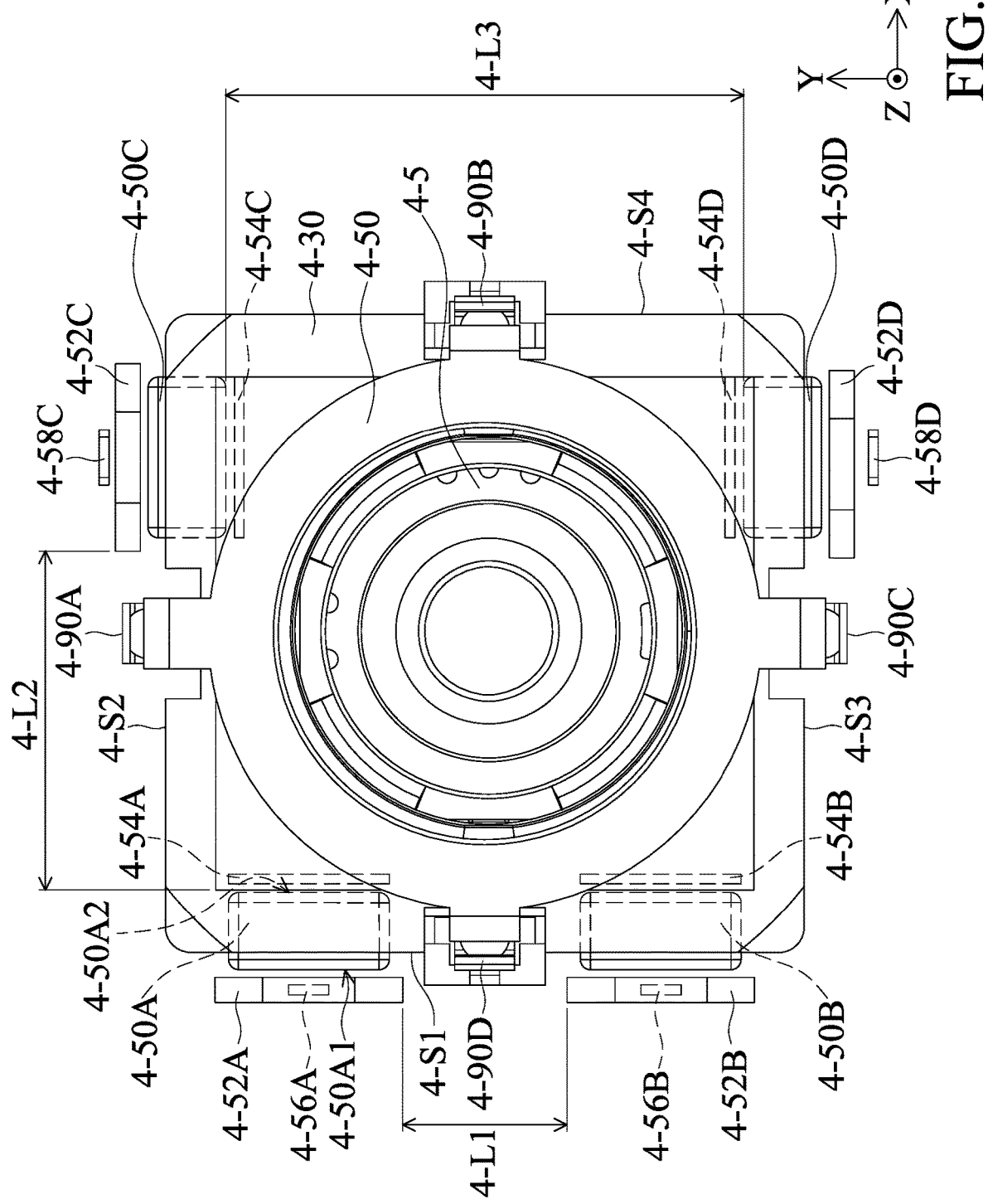
FIG. 65A is a schematic view of some elements of the optical system.
Figure 65B:
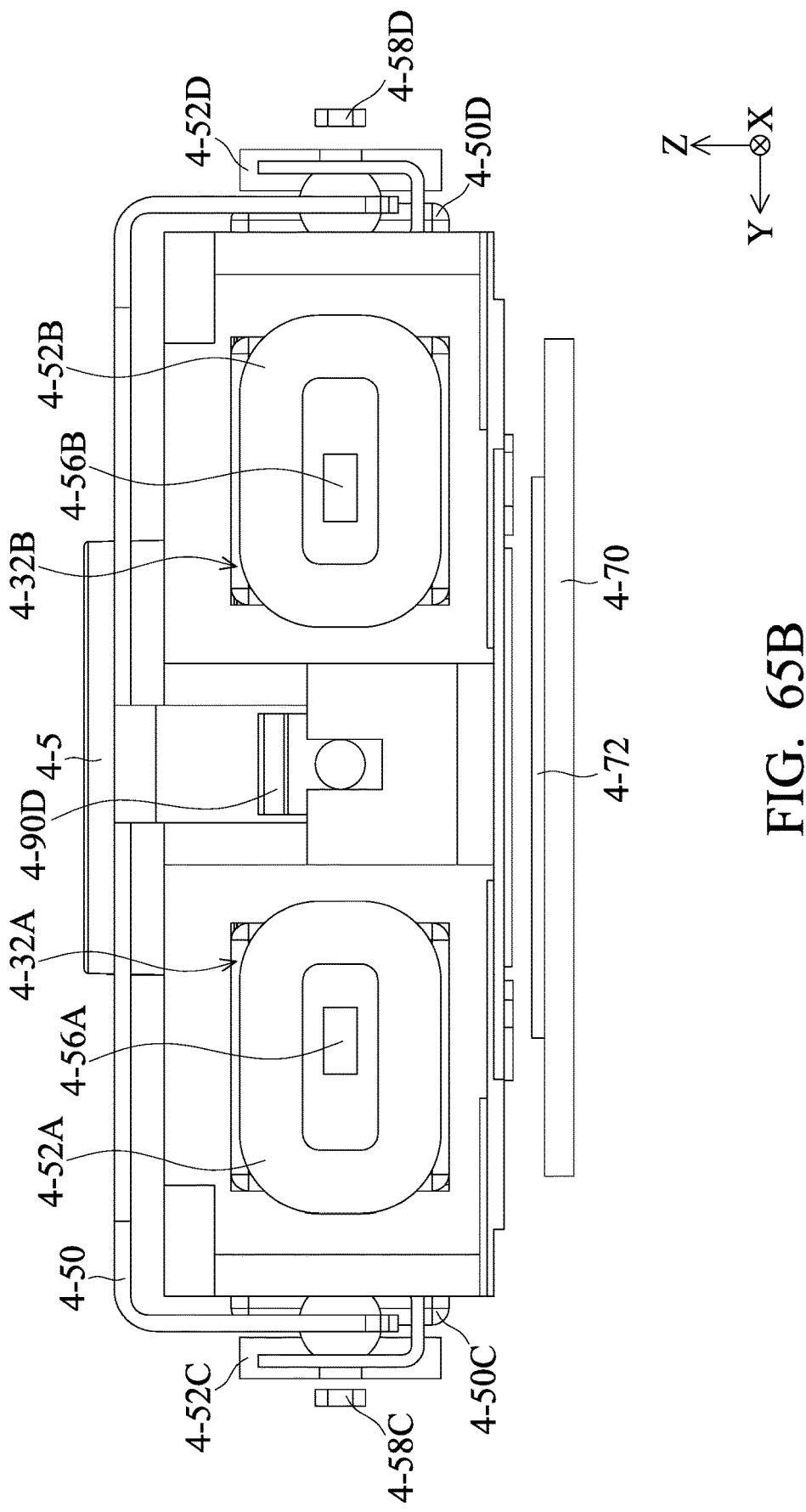
FIG. 65B is a schematic view of some elements of the optical system.
Figure 65C:
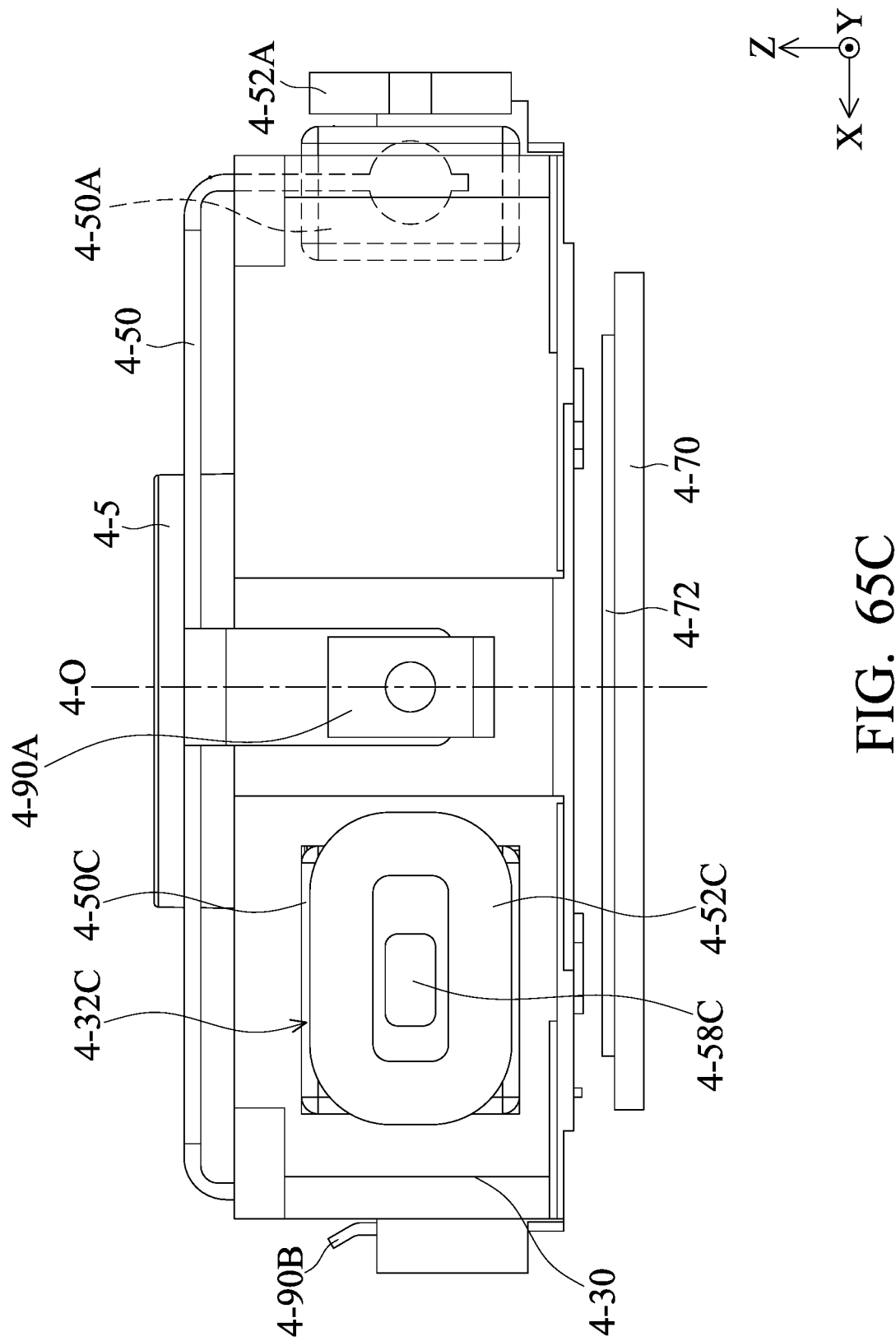
FIG. 65C is a schematic view of some elements of the optical system.
Figure 65D:
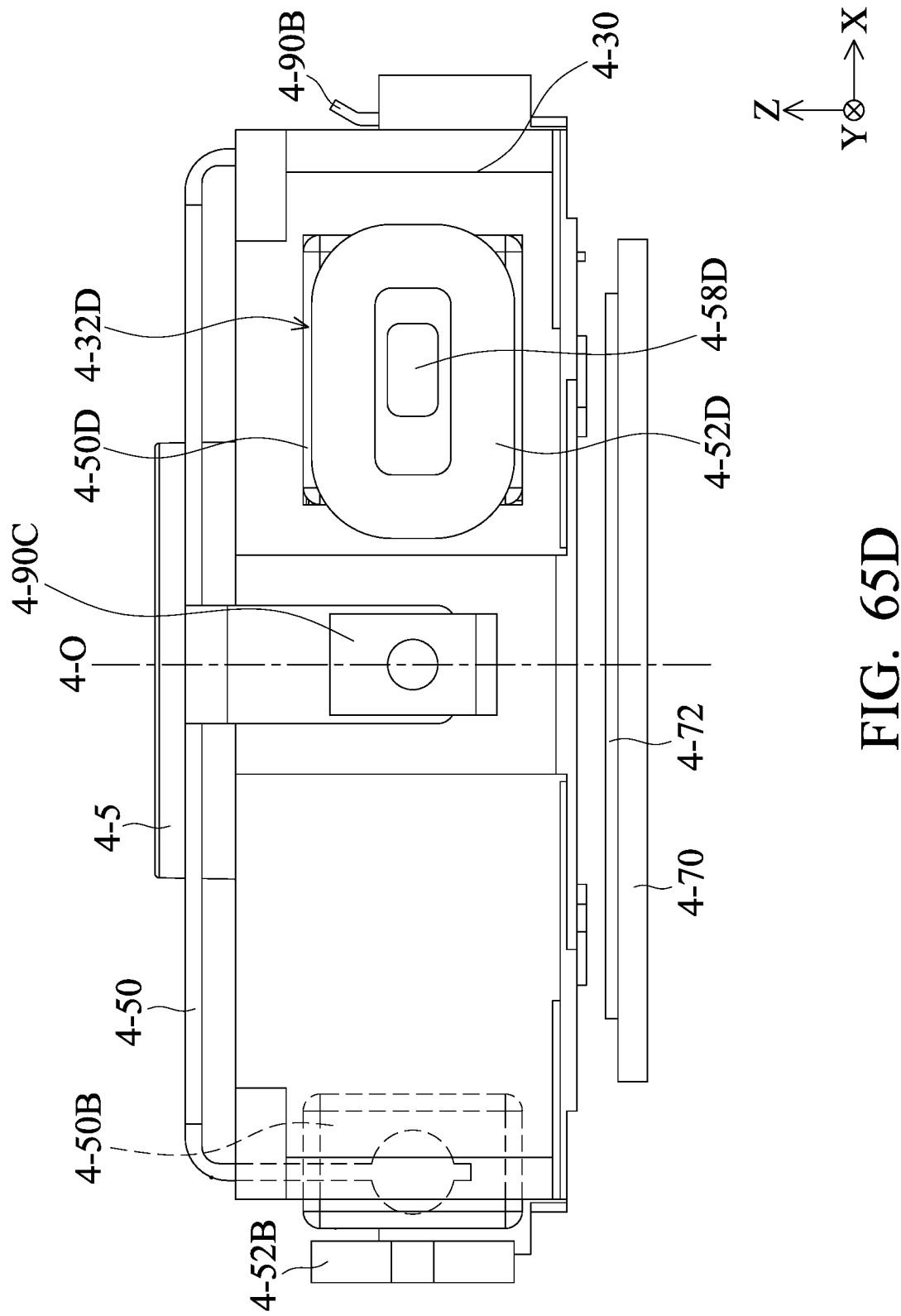
FIG. 65D is a schematic view of some elements of the optical system.

FIG. 65A is a schematic view of some elements of the optical system 4-100. FIG. 65B is a schematic view of some elements of the optical system 4-100. FIG. 65C is a schematic view of some elements of the optical system 4-100. FIG. 65D is a schematic view of some elements of the optical system 4-100. Some elements are omitted to show other elements more clearly. As shown in FIG. 65A, in a direction that the first driving assembly 4-D1 (which includes the first magnetic element 4-50A and the first driving coil 4-52A) and the second driving assembly 4-D2 (which includes the second magnetic element 4-50B and the second driving coil 4-52B) arranges (e.g. the Y direction), the first driving assembly 4-D1, the second driving assembly 4-D2, and the intermediate module 4-C at least partially overlaps each other. Therefore, the size of the optical system 4-100 in other directions (e.g. the Z direction) may be reduced to achieve miniaturization.

In some embodiments, the distance between the first driving assembly 4-D1 and the second driving assembly 4-D2 may be defined by the 4-L1 between the first driving coil 4-52A and the second driving coil 4-52B in the Y direction. The distance between the first driving assembly 4-D1 and the third driving assembly 4-D3 may be defined by the 4-L2 between the first magnetic element 4-50A and the third driving coil 4-52C in the X direction. The 4-L1 between the first driving assembly 4-D1 and the second driving assembly 4-D2 is different from the 4-L2 between the first driving assembly 4-D1 and the third driving assembly 4-D3. Moreover, the distance between the third driving assembly 4-D3 and the fourth driving assembly 4-D4 may be defined by the 4-L3 between the third magnetic element 4-50C and the fourth magnetic element 4-50D in the Y direction, and the 4-L1 may be different from the 4-L3.

In some embodiments, as shown in FIG. 65A, when viewed along the main axis 4-O, the first driving assembly 4-D1, the second driving assembly 4-D2, the third driving assembly 4-D3, and the fourth driving assembly 4-D4 do not overlap the intermediate module 4-C to reduce the height of the optical system 4-100 to achieve miniaturization.

In some embodiments, when viewed along the main axis 4-O, the first movable portion 4-30 is polygonal (e.g. rectangular, octagonal, etc.). The first movable portion 4-30 may have a first side 4-S1, a second side 4-S2, a third side 4-S3, and a fourth side 4-S4. The first side 4-S1 and the fourth side 4-S4 may at opposite sides of the first movable portion 4-30, and the second side 4-S2 and the third side 4-S3 may at opposite sides of the first movable portion 4-30.

In some embodiments, the first driving assembly 4-D1 and the second driving assembly 4-D2 may arranged along the first side 4-S1 of the first movable portion 4-30, the third driving assembly 4-D3 is disposed on the second side 4-S2 of the first movable portion 4-30, the fourth driving assembly 4-D4 is disposed on the third side 4-S3 of the first movable portion 4-30. The second side 4-S2 and the third side 4-S3 are parallel, and the first side 4-S1 and the second side 4-S2 are not parallel. Moreover, as shown in FIG. 60 to FIG. 63B, at least a portion of the circuit assembly 4-80 is at the first side 4-S1, the second side 4-S2, and the third side 4-S3.

In some embodiments, a first through hole 4-32A may be formed on the first movable portion 4-30, and at least a portion of the first magnetic element 4-50A is disposed in the first through hole 4-32A, and exposed from the first movable portion 4-30. A second through hole 4-32B may be formed on the first movable portion 4-30, and at least a portion of the second magnetic element 4-50B is disposed in the second through hole 4-32B, and exposed from the first movable portion 4-30. A third through hole 4-32C may be formed on the first movable portion 4-30, and at least a portion of the third magnetic element 4-50C is disposed in the third through hole 4-32C, and exposed from the first movable portion 4-30. A fourth through hole 4-32D may be formed on the first movable portion 4-30, and at least a portion of the fourth magnetic element 4-50D is disposed in the fourth through hole 4-32D, and exposed from the first movable portion 4-30.

Therefore, the first magnetic element 4-50A, the second magnetic element 4-50B, the third magnetic element 4-50C, and the fourth magnetic element 4-50D may face the first driving coil 4-52A, the second driving coil 4-52B, the third driving coil 4-52C, the fourth driving coil 4-52D, the fifth driving coil 4-54A, the sixth driving coil 4-54B, the seventh driving coil 4-54C, and the eighth driving coil 4-54D at a same time to increase the magnetic force generated between the magnetic elements and the driving coils.

In some embodiments, the first reinforcement element 4-58C may correspond to the third magnetic element 4-50C. For example, in a direction that is parallel to the main axis 4-O (e.g. the Z direction) or parallel to the second side 4-S2 (e.g. the X direction), the first reinforcement element 4-58C does not overlap the third magnetic element 4-50C. In a direction that is parallel to the first side 4-S1 (e.g. the X direction), at least a portion of the first reinforcement element 4-58C overlaps the third magnetic element 4-50C.

In some embodiments, the second reinforcement element 4-58D may correspond to the fourth magnetic element 4-50D. For example, in a direction that is parallel to the main axis 4-O (e.g. the Z direction) or parallel to the second side 4-S2 (e.g. the X direction), the second reinforcement element 4-58D does not overlap the fourth magnetic element 4-50D. In a direction that is parallel to the first side 4-S1 (e.g. the X direction), at least a portion of the second reinforcement element 4-58D overlaps the fourth magnetic element 4-50D.

The first reinforcement element 4-58C and the second reinforcement element 4-58D may be magnetic conductive and may be used for concentrating the magnetic field generated by the third driving coil 4-52C and the fourth driving coil 4-52D to increase the electromagnetic driving force generated by the third driving assembly 4-D3 and the fourth driving assembly 4-D4.

As shown in FIG. 65A, in a direction that is parallel to the second side 4-S2, at least a portion of the fifth driving coil 4-54A overlaps the first magnetic element 4-50A. For example, the first magnetic element 4-50A may include a first magnetic element 4-50A1 and a first magnetic element 4-50A2, the first magnetic element 4-50A1 faces the first driving coil 4-52A, the first magnetic element 4-50A2 faces the fifth driving coil 4-54A, and no other element is between the first magnetic element 4-50A1 and the first driving coil 4-52A or between the first magnetic element 4-50A2 and the fifth driving coil 4-54A. Therefore, the first magnetic element 4-50A may interact with two different driving coils (the first driving coil 4-52A and the fifth driving coil 4-54A) to generate electromagnetic driving forces, and a force for moving the first movable portion 4-30 relative to the fixed portion 4-F and another force for moving the second movable portion 4-40 relative to the first movable portion 4-30 may be generated by an identical first magnetic element 4-50A.

Similarly, in a direction that is parallel to the second side 4-S2 (the X direction), at least a portion of the sixth driving coil 4-54B may overlap the second magnetic element 4-50B. In a direction that is parallel to the first side 4-S1 (the Y direction), at least a portion of the seventh driving coil 4-54C may overlap the third magnetic element 4-50C, and at least a portion of the eighth driving coil 4-54D may overlap the fourth magnetic element 4-50D. Therefore, required number of magnetic elements may be reduced to achieve miniaturization.

It should be noted that in a direction that is parallel to the first side 4-S1 (the Y direction), the third driving coil 4-52C, the third magnetic element 4-50C, the seventh driving coil 4-54C, the eighth driving coil 4-54D, the fourth magnetic element 4-50D, and the fourth driving coil 4-52D are arranged in sequence. Moreover, in a direction that is parallel to the second side 4-S2 (the X direction), the first driving coil 4-52A, the first magnetic element 4-50A, the fifth driving coil 4-54A, and the seventh driving coil 4-54C are arranged in sequence. In a direction that is parallel to the main axis 4-O (the Z direction), the fifth driving coil 4-54A, the sixth driving coil 4-54B, the seventh driving coil 4-54C, and the eighth driving coil 4-54D at least partially overlap the intermediate module 4-C (e.g. the frame 4-50). Therefore, the size of the optical system 4-100 in other directions may be reduced to achieve miniaturization.

Figure 66:
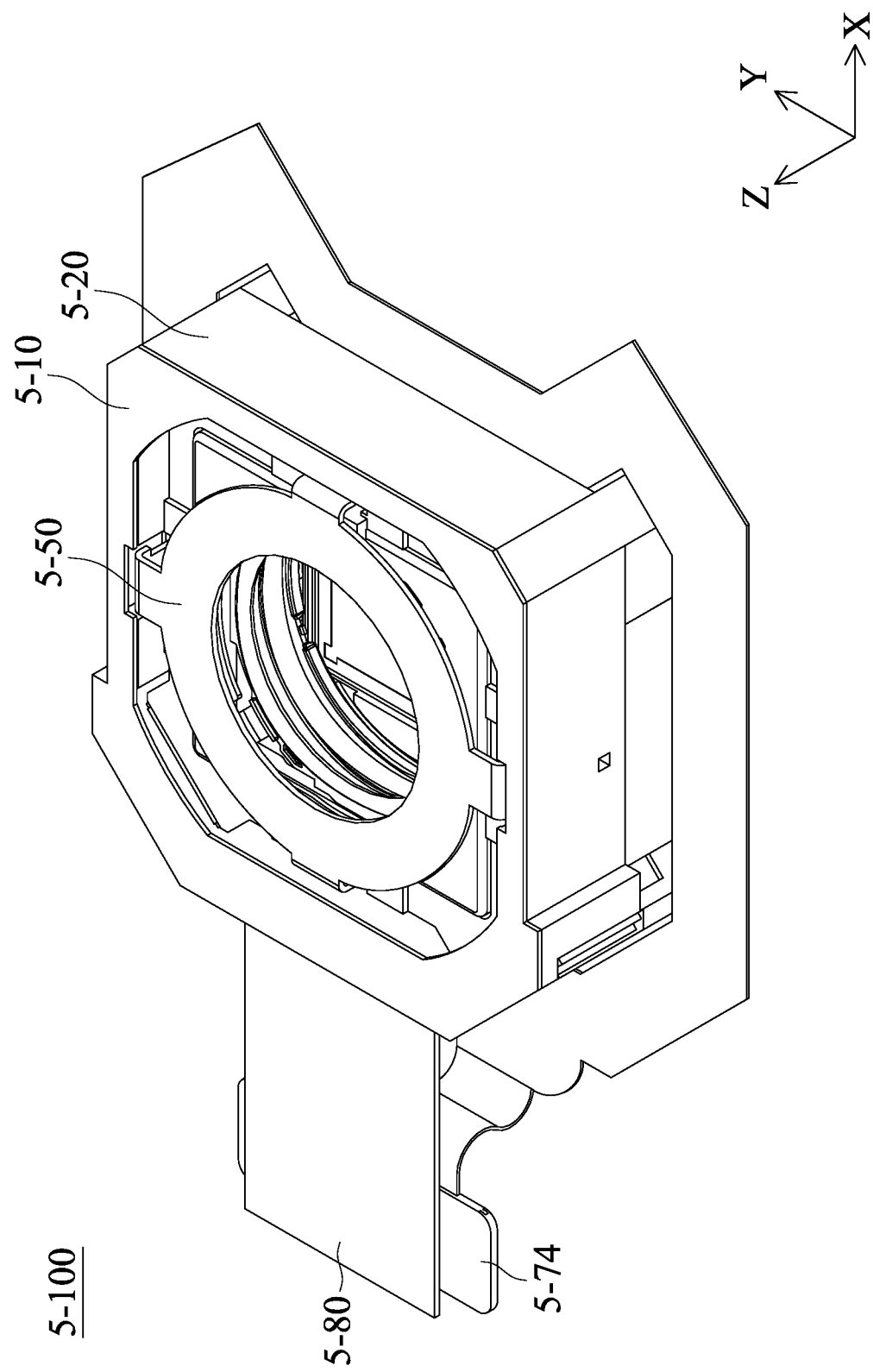
FIG. 66 is a perspective view of an optical system in some embodiments of the present disclosure.
Figure 67:
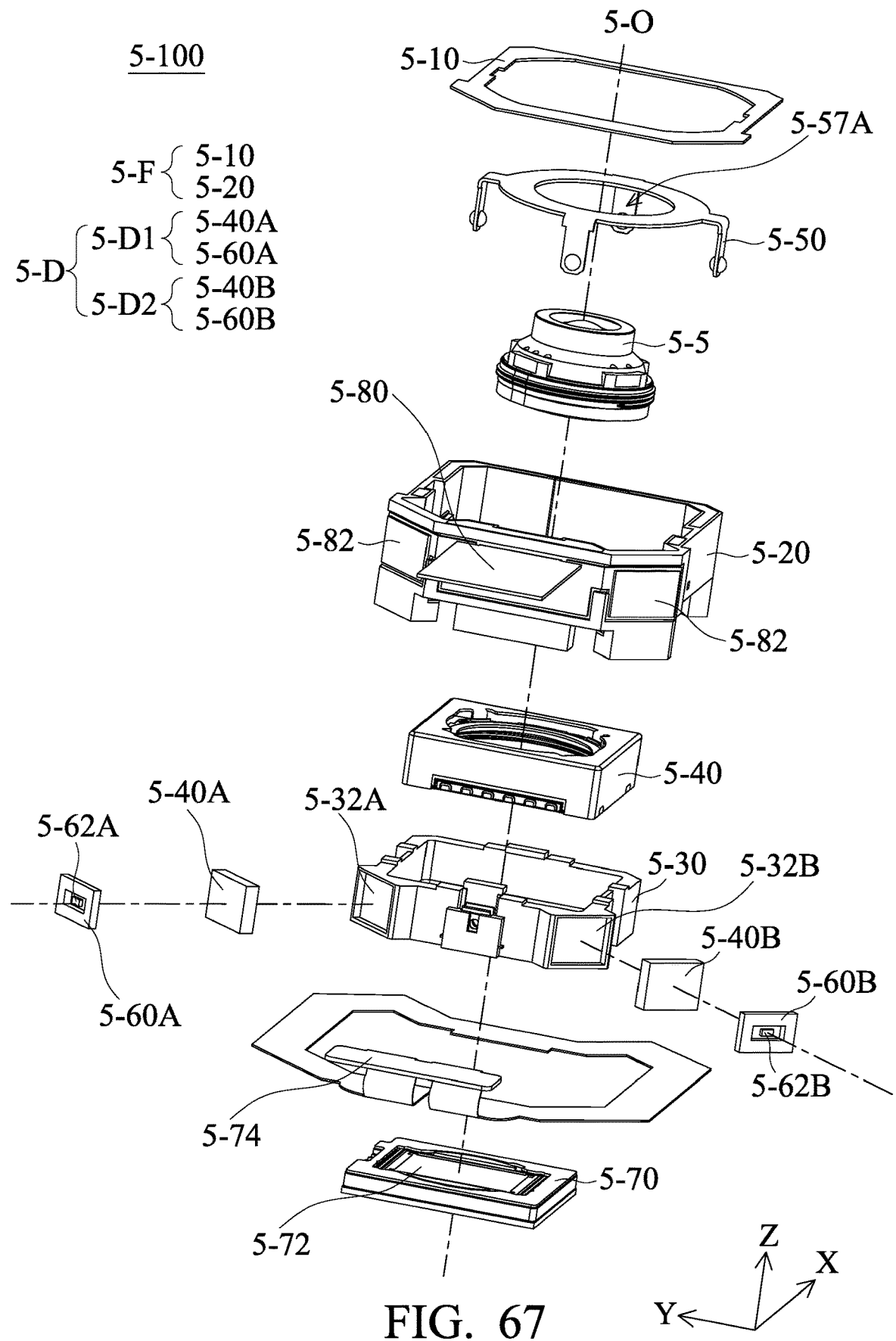
FIG. 67 is an exploded view of the optical system.
Figure 68:
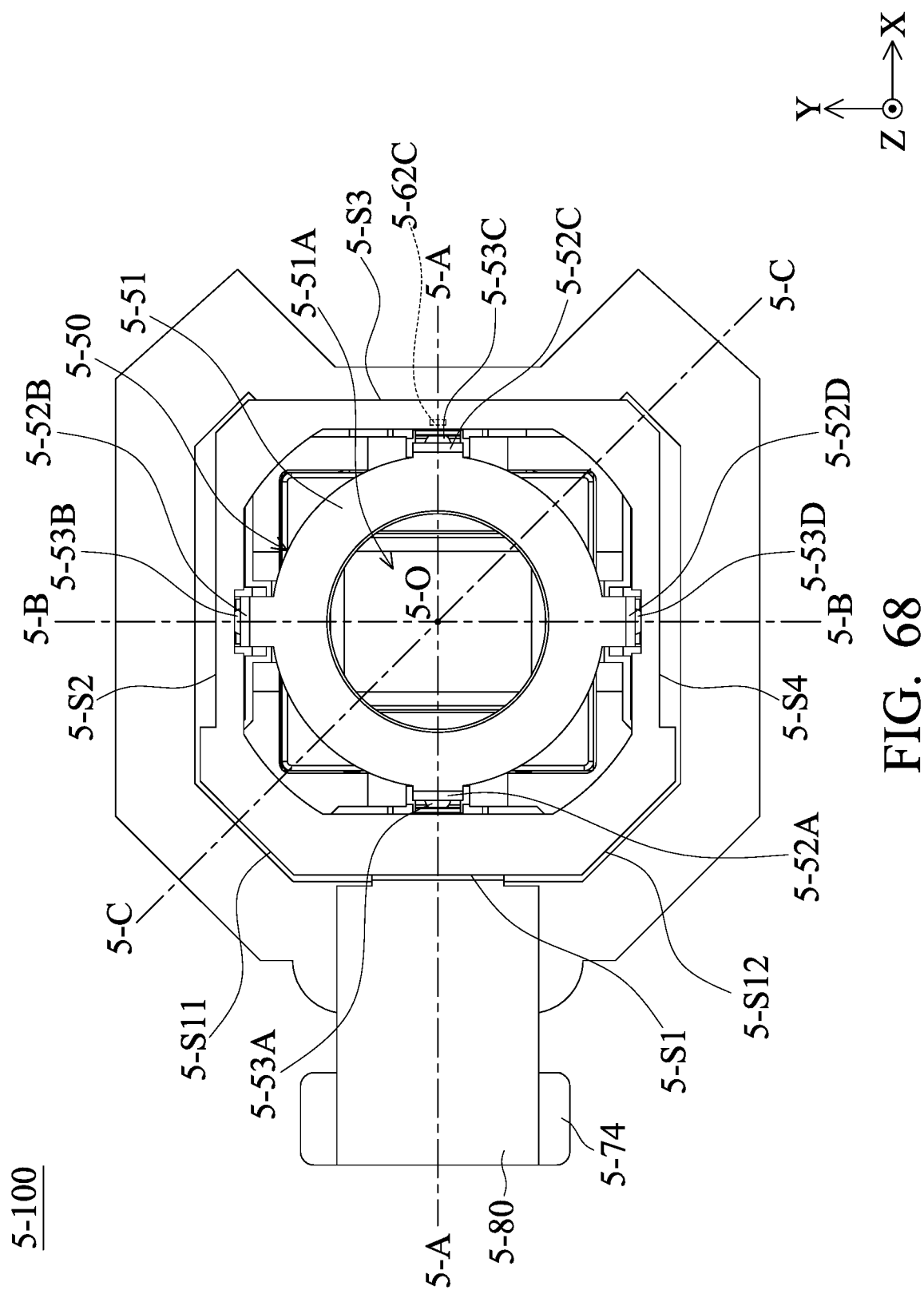
FIG. 68 is a top view of the optical system.
Figure 69:
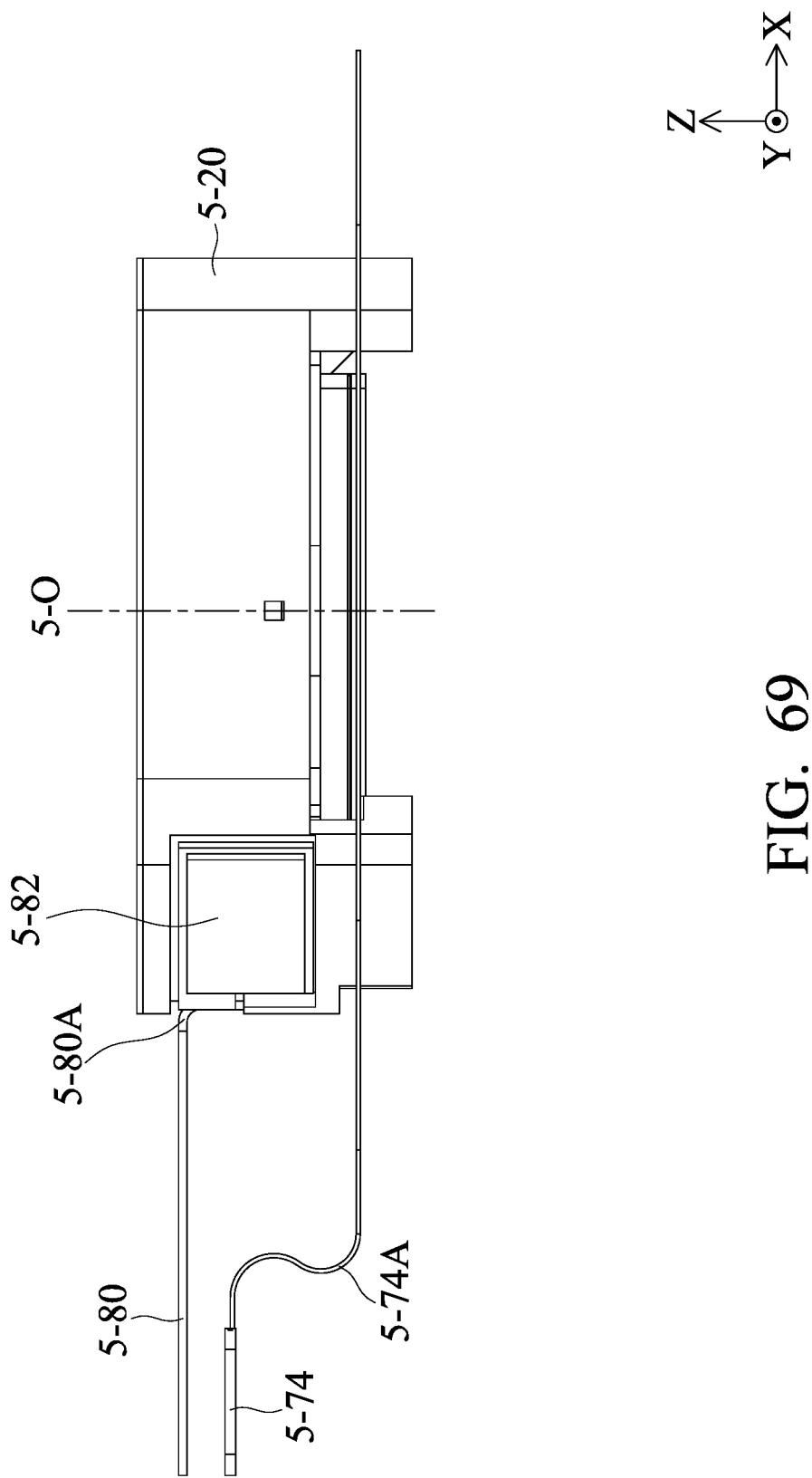
FIG. 69 is a side view of the optical system.
Figure 70:
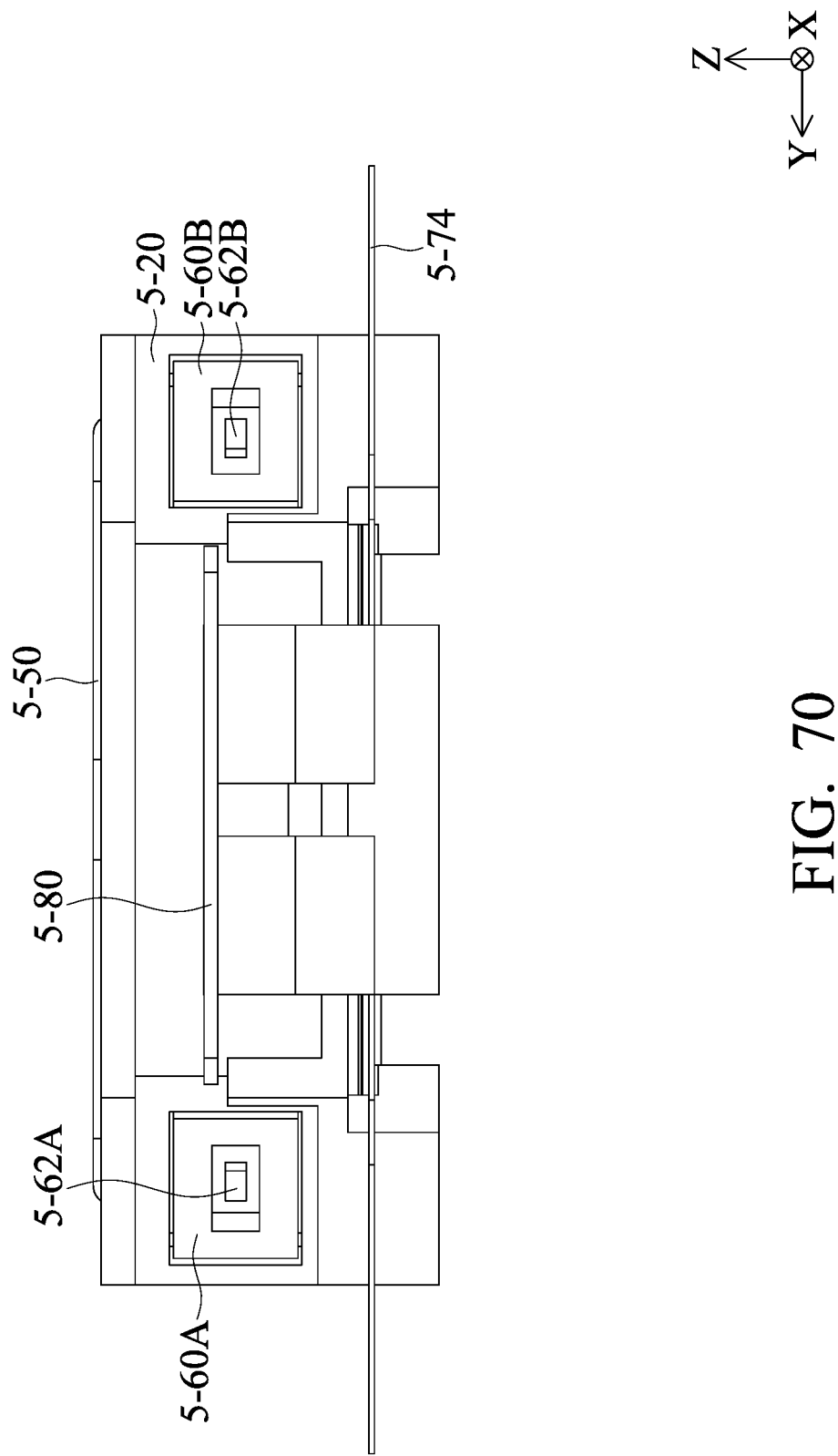
FIG. 70 is a side view of some elements of the optical system.
Figure 71A:
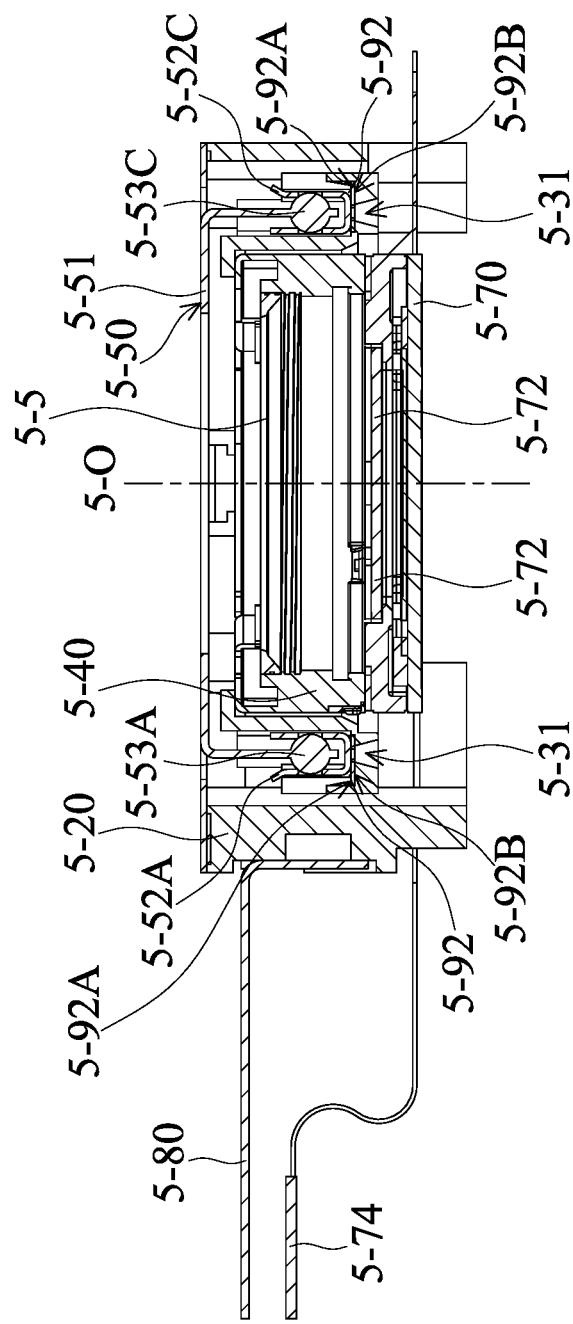
FIG. 71A is a cross-sectional view illustrated along a line 5-A-5-A in FIG. 68.
Figure 71B:
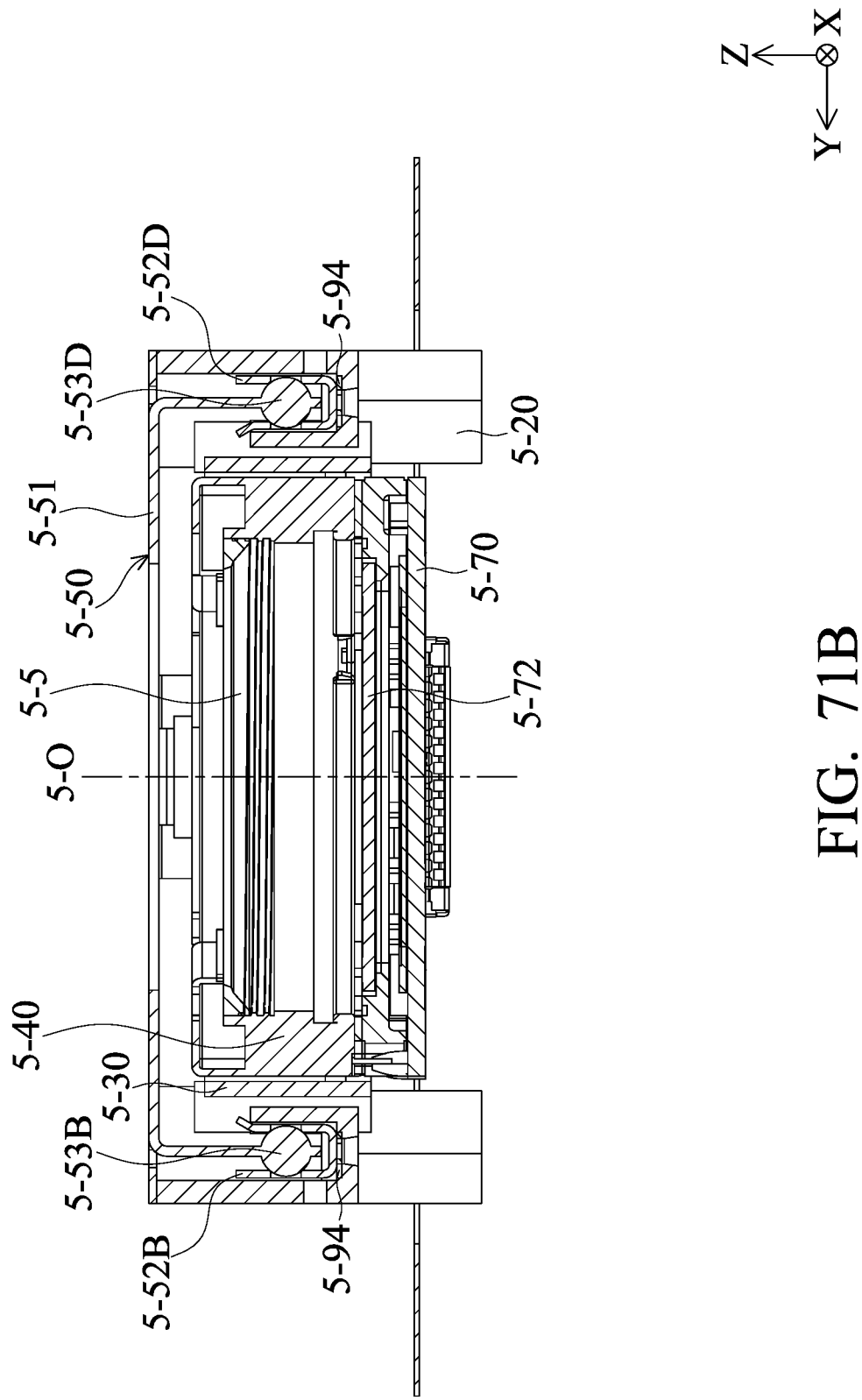
FIG. 71B is a cross-sectional view illustrated along a line 5-B-5-B in FIG. 68.
Figure 71C:
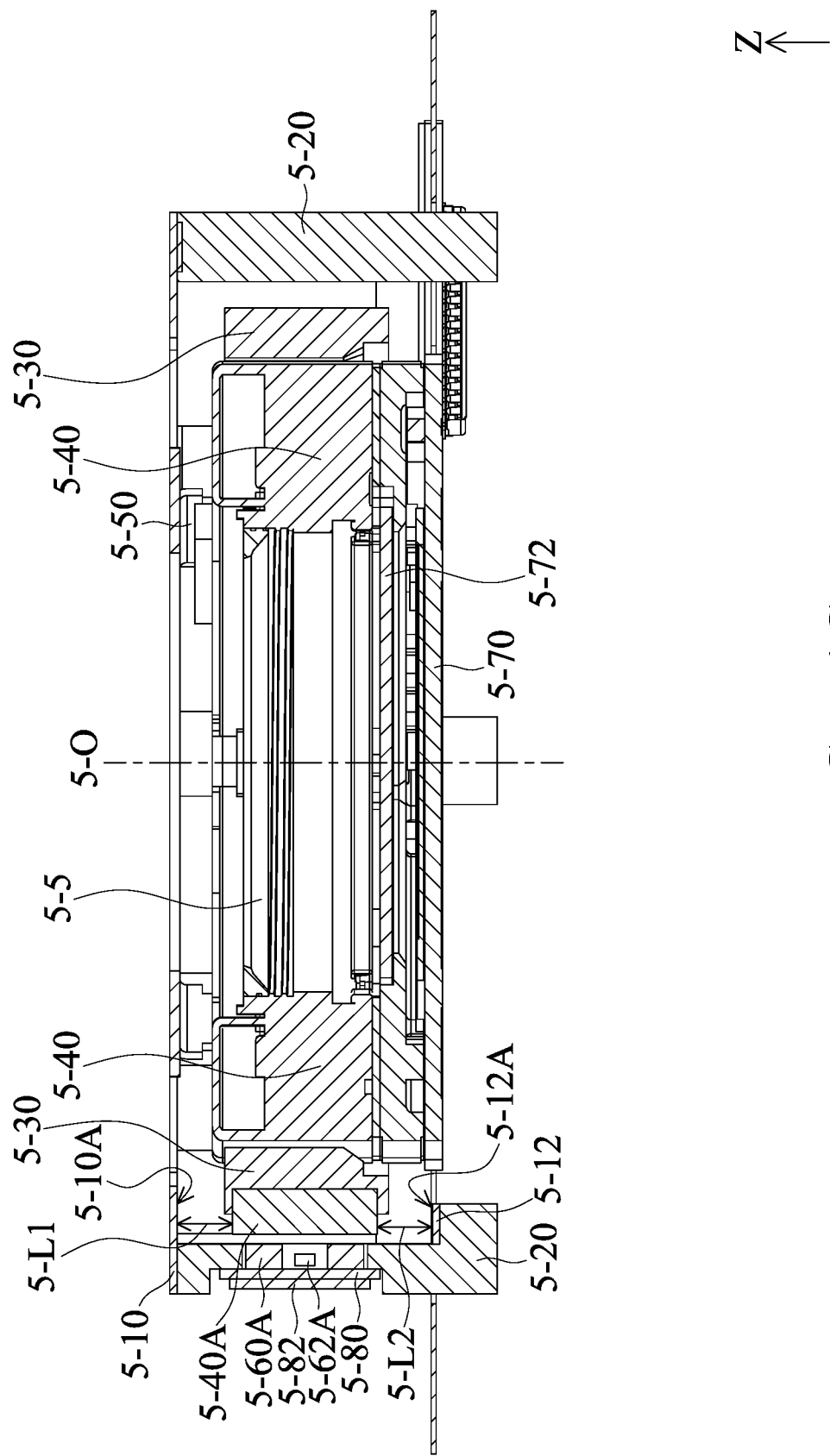
FIG. 71C is a cross-sectional view illustrated along a line 5-C-5-C in FIG. 68.

FIG. 66 is a perspective view of an optical system 5-100 in some embodiments of the present disclosure. FIG. 67 is an exploded view of the optical system 5-100. FIG. 68 is a top view of the optical system. FIG. 69 is a side view of the optical system 5-100. FIG. 70 is a side view of some elements of the optical system 5-100. FIG. 71A is a cross-sectional view illustrated along a line 5-A-5-A in FIG. 68. FIG. 71B is a cross-sectional view illustrated along a line 5-B-5-B in FIG. 68. FIG. 71C is a cross-sectional view illustrated along a line 5-C-5-C in FIG. 68.

In FIG. 67, the optical system 5-100 mainly includes a case 5-10, a bottom 5-20, a movable portion 5-30, a shell 5-40, a frame 5-50, a first magnetic element 5-40A, a second magnetic element 5-40B, a first driving coil 5-60A, a second driving coil 5-60B, a first sensor 5-62A, a second sensor 5-62B, a bottom plate 5-70, a optical sensing element 5-72, a first circuit assembly 5-74, and a second circuit assembly 5-80 arranged along a main axis 5-O.

The optical system 5-100 may be used for driving an optical assembly optical element 5-5, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

The optical system 5-100 may be disposed on an electronic device (not shown) and may be electrically connected to the electronic device. For example, the optical system 5-100 may be disposed on a cellphone, a tablet, a notebook, etc., and the present disclosure is not limited thereto.

In some embodiments, the case 5-10 and the bottom 5-20 may be combined to form an outer shell of the optical system 5-100. Furthermore, the case 5-10 and the bottom 5-20 may be called as a fixed portion 5-F. In some embodiments, the movable portion 5-30 may move relative to the fixed portion 5-F, such as relative to the case 5-10 and the bottom 5-20, and the shell 5-40 may move relative to the movable portion 5-30 and the fixed portion 5-F. Therefore, the optical element 5-5 disposed on the shell 5-40 may move with the shell 5-40 to achieve optical image stabilization.

In some embodiments, the first magnetic element 5-40A and the first driving coil 5-60A may be called as a first driving assembly 5-D1, the second magnetic element 5-40B and the second driving coil 5-60B may be called as a second driving assembly 5-D2, and the first driving assembly 5-D1 and the second driving assembly 5-D2 may be called as movable portion driving assembly 5-D used for driving the movable portion 5-30 to move relative to the fixed portion 5-F in different directions, so optical image stabilization may be achieved.

For example, the first magnetic element 5-40A and the first driving coil 5-60A may be disposed on the movable portion 5-30 and the fixed portion 5-F, respectively. It should be noted that the interaction between the magnetic elements (e.g. magnets) and coils in the movable portion driving assembly 5-D, a magnetic force may be generated to move the movable portion 5-30 (and the optical element 5-5 disposed on the movable portion 5-30) to move relative to the fixed portion 5-F to achieve auto focus or optical image stabilization. In some embodiments, the movable portion driving assembly 5-D may include piezoelectric element or shape memory alloy as well.

For example, the first driving assembly 5-D1 may drive the movable portion 5-30 relative to the fixed portion 5-F in a first dimension, the second driving assembly 5-D2 may drive the movable portion 5-30 relative to the fixed portion 5-F in a second dimension. The first dimension and the second dimension may be rotational movements relative to different rotational axes (e.g. the line 5-A-5-A and the line 5-B-5-B), but the present disclosure is not limited thereto. In other words, the first dimension and the second dimension may be different. Therefore, the movable portion 5-30 may rotate in different directions to achieve optical image stabilization.

In some embodiments, a first sensor 5-62A and a second sensor 5-62B may be provided in the optical system 5-100 to detect the position of the movable portion 5-30 relative to the fixed portion 5-F. For example, the first sensor 5-62A and the second sensor 5-62B may be disposed in the first driving coil 5-60A and the second driving coil 5-60B to protect the first sensor 5-62A and the second sensor 5-62B, respectively. Furthermore, an additional third sensor 5-62C may be provided, such as disposed on the fixed portion 5-F, to detect the position of the optical element 5-5 relative to the movable portion 5-30 or relative to the fixed portion 5-F.

The sensors (such as the first sensor 5-62A, the second sensor 5-62B, the third sensor 5-62C) may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the optical element 5-5 may be disposed in the shell 5-40, the bottom plate 5-70 may be disposed on the movable portion 5-30, and the optical sensing element 5-72 may be disposed on the bottom plate 5-70 and arranged with the optical element 5-5 along the main axis 5-O. In this embodiment, the optical element 5-5 and the shell 5-40 are affixed in the movable portion 5-30, but the present disclosure is not limited thereto. A third driving assembly (not shown) may be disposed in the shell 5-40 to drive the optical element 5-5 and the shell 5-40 to move relative to the movable portion 5-30 and the fixed portion 5-F, such may move in X, Y, or Z directions.

In some embodiments, the third driving assembly may include a combination of magnets and coils, or may include piezoelectric element or shape memory alloy as well. The third driving assembly may be electrically connected to the first circuit assembly 5-74 to provide external signal to the third driving assembly. Therefore, the optical element 5-5 may perform focus with the optical sensing element 5-72 along the main axis 5-O (e.g. the Z direction), or may achieve optical image stabilization. Moreover, the optical element 5-5 in the shell 5-40, the third driving assembly (not shown), and the optical sensing element 5-72 may be electrically to external by the first circuit assembly 5-74, such as electrically to the aforementioned electronic device.

The movable portion driving assembly 5-D may be electrically connected to the second circuit assembly 5-80 to electrically connect to external devices (e.g. the aforementioned electronic device) through the second circuit assembly 5-80. The second circuit assembly 5-80 may be a flexible printed circuit, which may be adhered on the bottom 5-20 to control the movement of the movable portion 5-30 in the X, Y or Z directions to achieve auto focus or optical image stabilization. Furthermore, an additional reinforcement element 5-82 may be disposed on the second circuit assembly 5-80. The hardness of the reinforcement element 5-82 may be higher than the hardness of the second circuit assembly 5-80 to protect the second circuit assembly 5-80.

In some embodiments, as shown in FIG. 68, when viewed along the main axis 5-O (the Z direction), at least a portion of the first circuit assembly 5-74 overlaps the second circuit assembly 5-80. Moreover, as shown in FIG. 69, the first circuit assembly 5-74 and the second circuit assembly 5-80 are separated from each other in a direction that the main axis 5-O extends (e.g. the Z direction). Moreover, in the direction that the main axis 5-O extends, a first bent portion 5-74A of the first circuit assembly 5-74 does not overlap a second bent portion 5-80A of the second circuit assembly 5-80 to prevent short circuit between the circuits, and may achieve miniaturization.

As shown in FIG. 71, the case 5-10 of the optical system 5-100 may be magnetic conductive, so the case 5-10 may be called as first driving force enhancing element 5-10. Moreover, a second driving force enhancing element 5-12 may be included in the optical system 5-100. The second driving force enhancing element 5-12 is disposed on the bottom 5-20, and the second driving force enhancing element 5-12 may be magnetic conductive. In the Z direction, the first driving force enhancing element 5-10 (the case 5-10) and the second driving force enhancing element 5-12 may be disposed on opposite sides of the first magnetic element 5-40A. The interaction between the first driving force enhancing element 5-10, the second driving force enhancing element 5-12 to the shell 5-40 may increase the driving force of the first magnetic element 5-40A to the movable portion 5-30.

The first driving force enhancing element 5-10 may have a first driving force enhancing element surface 5-10A, the second driving force enhancing element 5-12 may have a second driving force enhancing element surface 5-12A. The first driving force enhancing element surface 5-10A and the second driving force enhancing element surface 5-12A face the first magnetic element 5-40A, and the first driving force enhancing element surface 5-10A and the second driving force enhancing element surface 5-12A face opposite directions and have different surface areas.

Moreover, a minimum distance between the first driving force enhancing element surface 5-10A and the first magnetic element 5-40A is a distance 5-L1, a minimum distance between the second driving force enhancing element surface 5-12A and the first magnetic element 5-40A is a distance 5-L2, and the distance 5-L1 may be different from the distance 5-L2. For example, the distance 5-L1 may be greater than the distance 5-L2 to adjust the driving forces in different directions, but the present disclosure is not limited thereto.

It should be noted that the movable portion 5-30 may move relative to the fixed portion 5-F (e.g. the bottom 5-20) in a first maximum movable range, such as the rotation taking the line 5-A-5-A and the line 5-B-5-B as rotational axes. When the movable portion 5-30 moves in the first maximum movable range, the first driving assembly 5-D1 does not in direct contact with the case 5-10 or the second driving force enhancing element 5-12. Alternatively, the first driving assembly 5-D1 may in contact with other stopping structures (e.g. the first stopping structure 5-32 described later) to protect the case 5-10 and the second driving force enhancing element 5-12.

Furthermore, the reinforcement element 5-82 of the optical system 5-100 may correspond to the movable portion driving assembly 5-D. In specific, in some embodiments, in the direction that the main axis 5-O extends (e.g. the Z direction), the reinforcement element 5-82 does not overlap the first driving assembly 5-D1 to reduce the height of the optical system 5-100 in the Z direction, and miniaturization may be achieved. Moreover, the reinforcement element 5-82, the first driving coil 5-60A, and the first magnetic element 5-40A may arranged along a straight line, such as along the line 5-C-5-C to protect the movable portion driving assembly 5-D. It should be noted that the magnetic conductivity of the reinforcement element 5-82 is less than that of the case 5-10 or the second driving force enhancing element 5-12 to prevent magnetic interference.

Figure 72A:
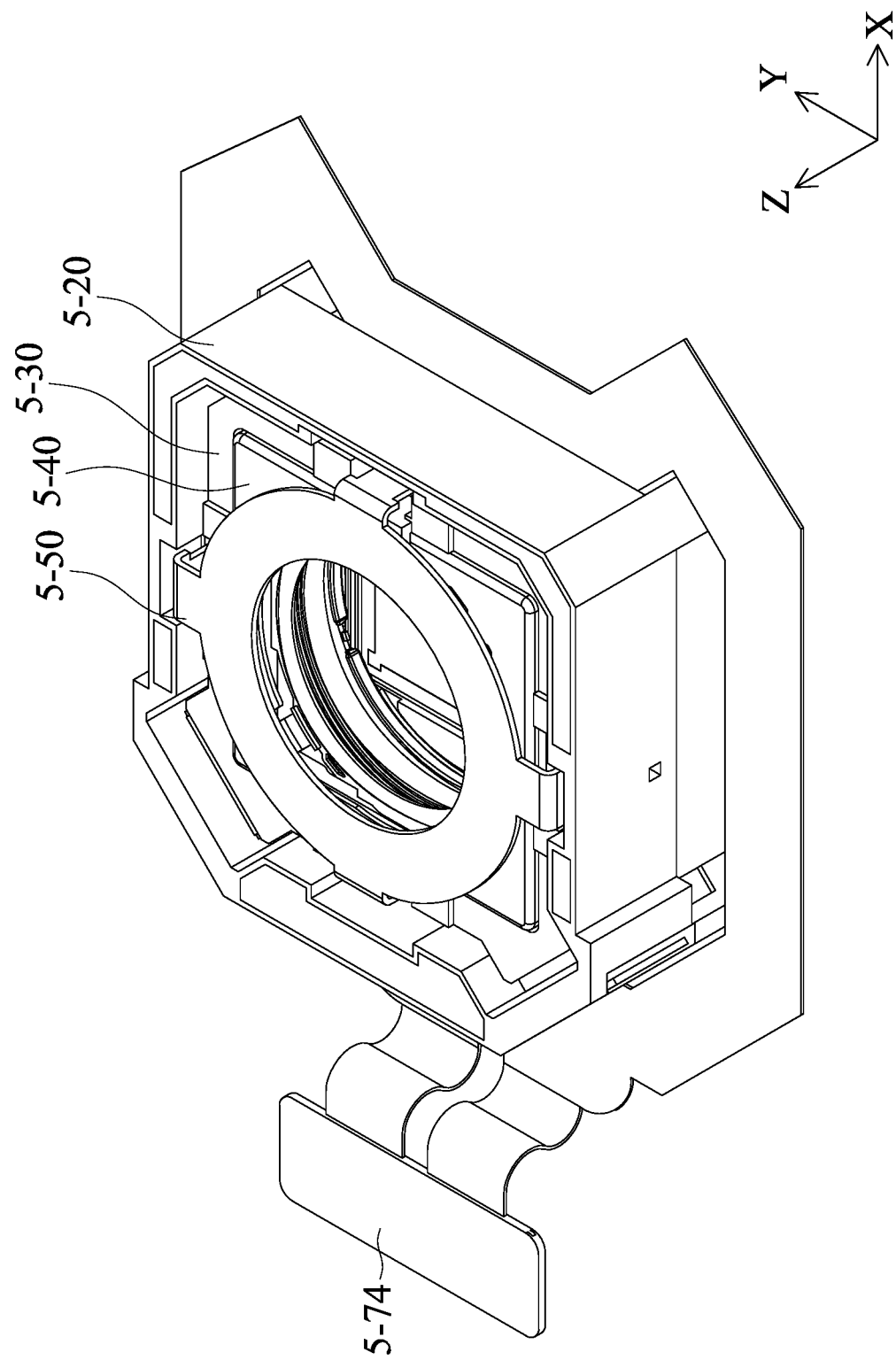
FIG. 72A is a schematic view of some elements in the optical system.
Figure 72B:
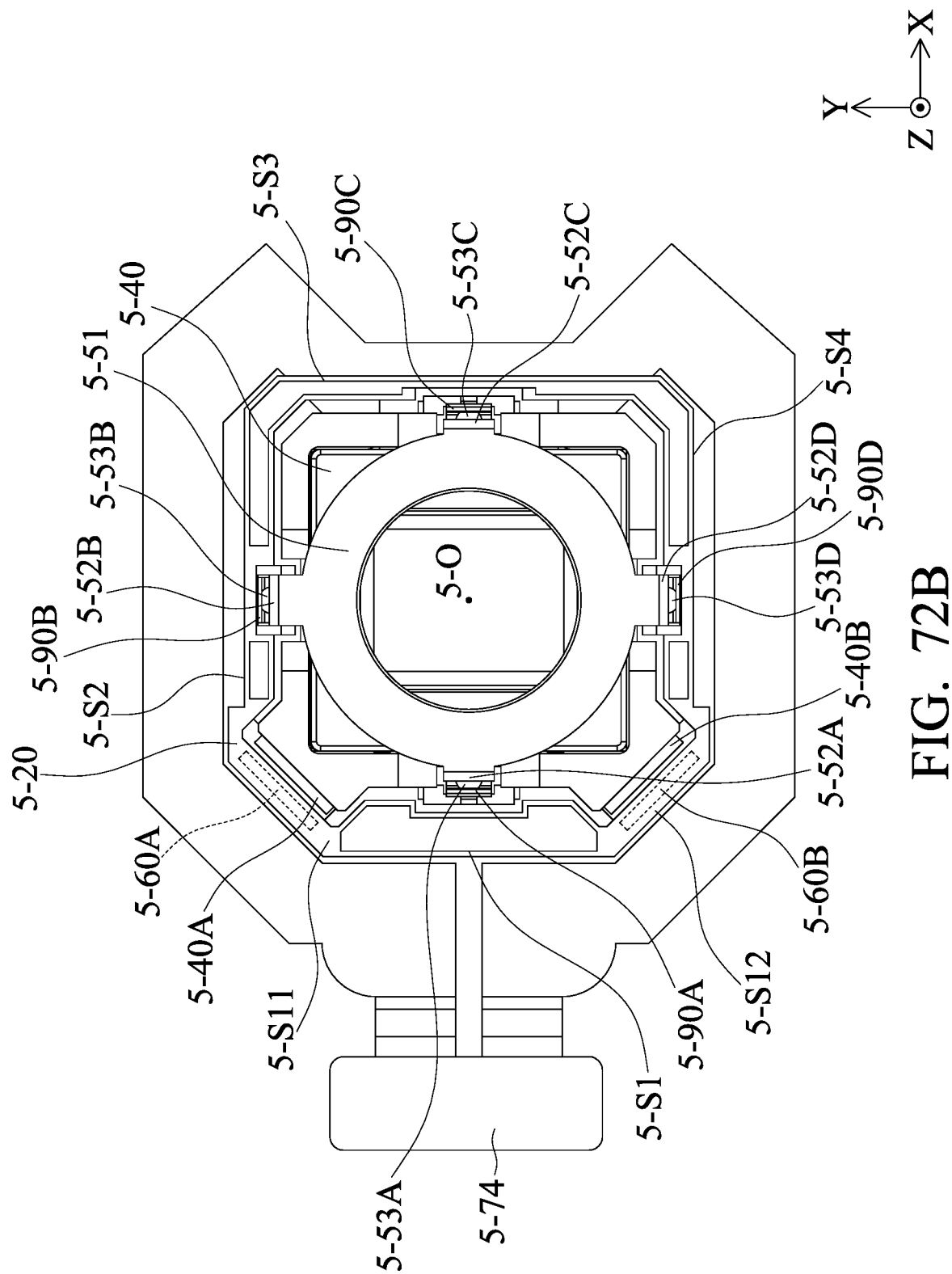
FIG. 72B is a top view of the elements in FIG. 72A.
Figure 73A:
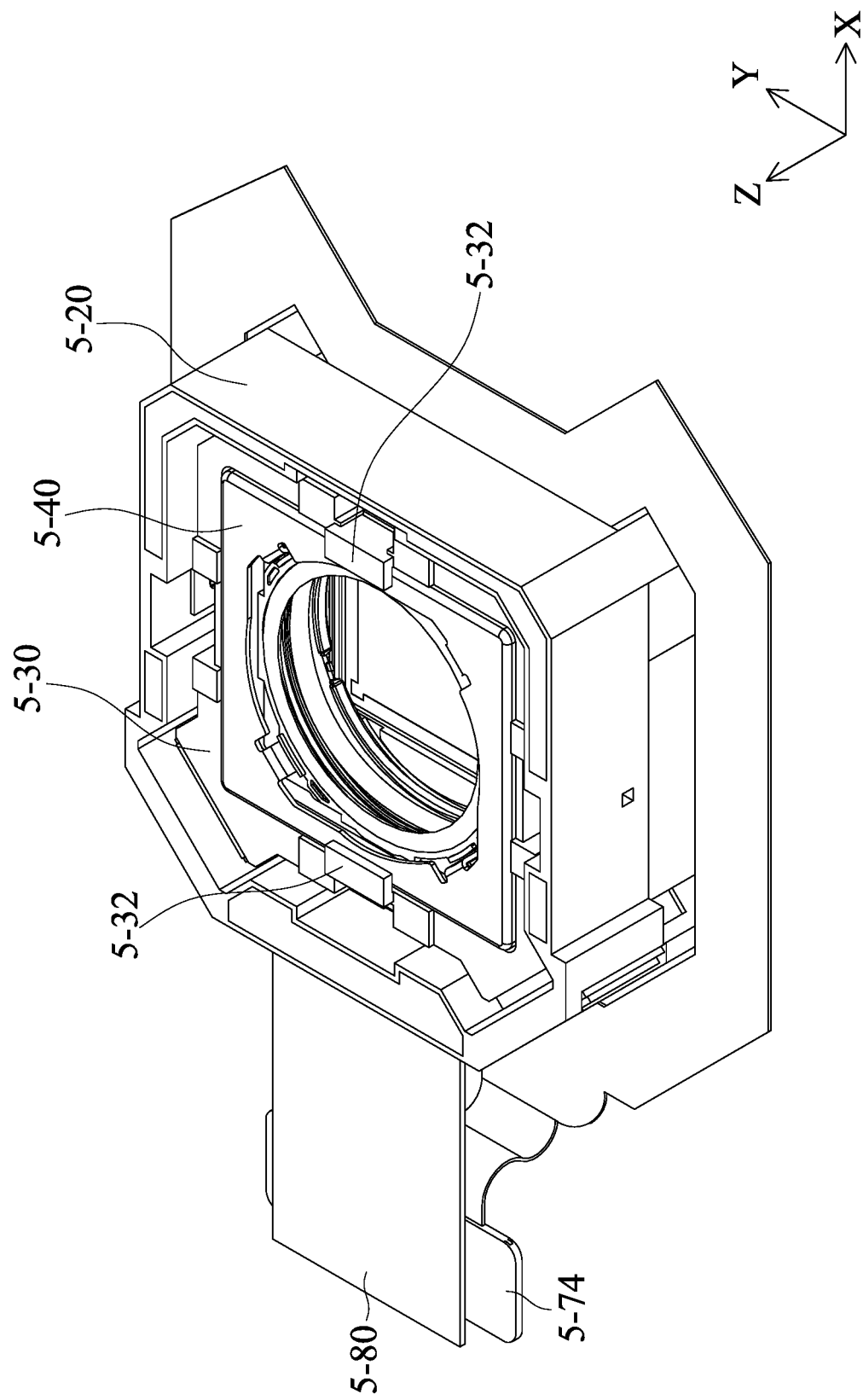
FIG. 73A is a schematic view of some elements in the optical system.
Figure 73B:
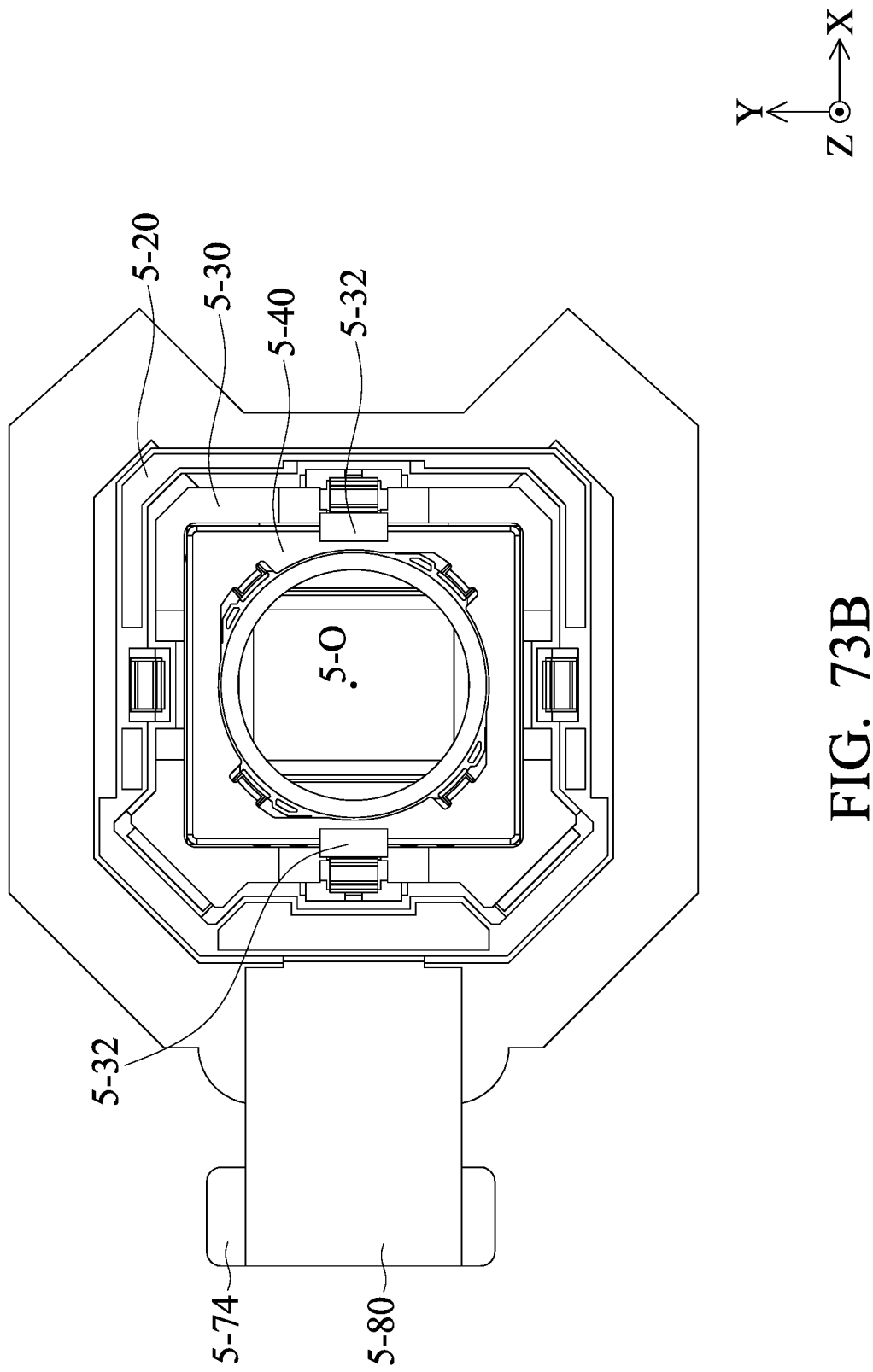
FIG. 73B is a top view of the elements in FIG. 73A.

FIG. 72A is a schematic view of some elements in the optical system 5-100. FIG. 72B is a top view of the elements in FIG. 72A. FIG. 73A is a schematic view of some elements in the optical system 5-100. FIG. 73B is a top view of the elements in FIG. 73A. Some elements are omitted to show the inner structure of the optical system 5-100 more clearly.

In some embodiments, a first clipping element 5-52A and a third clipping element 5-52C may be disposed on the bottom 5-20, and a second clipping element 5-52B and a fourth clipping element 5-52D may be disposed on the movable portion 5-30. In some embodiments, the first clipping element 5-52A and the third clipping element 5-52C may be affixed on the movable portion 5-30, and the second clipping element 5-52B and the fourth clipping element 5-52D may be affixed on the bottom 5-20 (the fixed portion 5-F).

Moreover, a third sensor 5-62C may be provided in the optical system 5-100 used for detecting the movement of the optical element 5-5 in the shell 5-40 relative to the movable portion 5-30. When viewed along the main axis 5-O, the third sensor 5-62C may be disposed at a third side 5-S3, such as may under the bottom 5-20, but it is not limited thereto. In some embodiments, the line 5-A-5-A does not pass through the third sensor 5-62C to enhance the performance of the third sensor 5-62C (such may detect the rotational movement taking the line 5-A-5-A as rotational axis).

In some embodiments, when viewed along the main axis 5-O, the bottom 5-20 and the movable portion 5-30 may be polygonal (e.g. rectangular). The first clipping element 5-52A and the third clipping element 5-52C may be disposed at opposite sides of the movable portion 5-30, and the second clipping element 5-52B and the fourth clipping element 5-52D may be disposed at opposite sides of the bottom 5-20. In some embodiments, a minimum distance between the first clipping element 5-52A and the third clipping element 5-52C may be different from a minimum distance between the second clipping element 5-52B and the fourth clipping element 5-52D. In a direction that the second clipping element 5-52B and the fourth clipping element 5-52D arrange with each other, at least a portion of the first driving assembly 5-D1 overlaps the first clipping element 5-52A, and the first driving assembly 5-D1 does not overlap the second clipping element 5-52B.

The frame 5-50 may be connected to the bottom 5-20 and the movable portion 5-30. For example, the frame 5-50 may mainly include a main body 5-51, a first intermediate element 5-57A, a second intermediate element 5-57B, a third intermediate element 5-57C, a fourth intermediate element 5-57D, a first contact element 5-53A, a second contact element 5-53B, a third contact element 5-53C, and a fourth contact element 5-53D. The first intermediate element 5-57A, the second intermediate element 5-57B, the third intermediate element 5-57C, and the fourth intermediate element 5-57D may be connected to the main body 5-51, and the first contact element 5-53A, the second contact element 5-53B, the third contact element 5-53C, and the fourth contact element 5-53D may be connected to the first intermediate element 5-57A, the second intermediate element 5-57B, the third intermediate element 5-57C, and the fourth intermediate element 5-57D, respectively.

As shown in FIG. 67 and FIG. 68, the main body 5-51 has a first opening 5-51A corresponding to the optical element 5-5, and the first opening 5-51A may be circular. The optical element 5-5 may be disposed in the first opening 5-51A. The main body 5-51 may be plate-shaped and may be perpendicular to the main axis 5-O. For example, a main body 5-51B of the main body 5-51 may be perpendicular to the main axis 5-O.

In some embodiments, the first intermediate element 5-57A, the second intermediate element 5-57B, the third intermediate element 5-57C, and the fourth intermediate element 5-57D may be affixed on the main body 5-51, such as in direct contact with the main body 5-51. Furthermore, the first intermediate element 5-57A, the second intermediate element 5-57B, the third intermediate element 5-57C, and the fourth intermediate element 5-57D may be plate-shaped and parallel to the main body 5-51. In some embodiments, when viewed along the main axis 5-O, as shown in FIG. 70. The first intermediate element 5-57A and the third intermediate element 5-57C are disposed on opposite sides of the optical element 5-5, and the center of the first intermediate element 5-57A and the center of the third intermediate element 5-57C are arranged in a direction that is parallel to the first direction (e.g. the X direction).

In some embodiments, the first contact element 5-53A is affixed on the first intermediate element 5-57A, the second contact element 5-53B is affixed on the second intermediate element 5-57B, the third contact element 5-53C is affixed on the third intermediate element 5-57C, the fourth contact element 5-53D is affixed on the fourth intermediate element 5-57D. Moreover, the first intermediate element 5-57A and the first contact element 5-53A may be formed as one piece, the second intermediate element 5-57B and the second contact element 5-53B may be formed as one piece, the third intermediate element 5-57C and the third contact element 5-53C may be formed as one piece, the fourth intermediate element 5-57D and the fourth contact element 5-53D may be formed as one piece. For example, these elements may be connected by welding (e.g. soldering or melting).

Furthermore, the main body 5-51, the first intermediate element 5-57A, the second intermediate element 5-57B, the third intermediate element 5-57C, the fourth intermediate element 5-57D, the first contact element 5-53A, the second contact element 5-53B, the third contact element 5-53C, the fourth contact element 5-53D may include metal. The material of the first intermediate element 5-57A and the first contact element 5-53A may be different. The material of the second intermediate element 5-57B and the second contact element 5-53B may be different. The material of the third intermediate element 5-57C and the third contact element 5-53C may be different. The material of the fourth intermediate element 5-57D and the fourth contact element 5-53D may be different.

The first contact element 5-53A, the second contact element 5-53B, the third contact element 5-53C, the fourth contact element 5-53D may be respectively disposed in the first clipping element 5-52A, the second clipping element 5-52B, the third clipping element 5-52C, the fourth clipping element 5-52D by means of friction contact to allow the frame 5-50 to move relative to the movable portion 5-30 and the fixed portion 5-F. For example, the frame 5-50 may rotate by taking a connection of the first contact element 5-53A and the third contact element 5-53C as a rotational axis, and may rotate by taking a connection of the second contact element 5-53B and the fourth contact element 5-53D as a rotational axis as well.

In some embodiments, the frame 5-50, the first clipping element 5-52A, the second clipping element 5-52B, the third clipping element 5-52C, the fourth clipping element 5-52D may be called as a intermediate module 5-C, and the movable portion 5-30 may move relative to the fixed portion 5-F through the intermediate module 5-C. The intermediate module 5-C may be in direct contact with the movable portion 5-30 and the fixed portion 5-F.

Because the first contact element 5-53A and the third contact element 5-53C are respectively disposed on the first clipping element 5-52A and the third clipping element 5-52C, and the first clipping element 5-52A and the third clipping element 5-52C are affixed on the movable portion 5-30, the first contact element 5-53A and the third contact element 5-53C may be movably connected to the movable portion 5-30 through the first clipping element 5-52A and the third clipping element 5-52C. Moreover, the second contact element 5-53B and the fourth contact element 5-53D are respectively disposed on the second clipping element 5-52B and the fourth clipping element 5-52D, and the second clipping element 5-52B and the fourth clipping element 5-52D are affixed on the bottom 5-20 (the fixed portion 5-F), so the bottom 5-20 (the fixed portion 5-F) may be connected to the frame 5-50 through the second clipping element 5-52B and the fourth clipping element 5-52D. Therefore, the bottom 5-20 may be movably connected to the movable portion 5-30.

In some embodiments, a first rotational axis may be defined by the line 5-A-5-A between the first contact element 5-53A and the third contact element 5-53C, and a second rotational axis may be defined by the line 5-B-5-B between the second contact element 5-53B and the fourth contact element 5-53D. The movable portion 5-30 may take the line 5-A-5-A (the first rotational axis) as a rotational axis to rotate relative to the frame 5-50, and the movable portion 5-30 and the frame 5-50 may rotate together relative to the fixed portion 5-F by taking the line 5-B-5-B as a rotational axis (the second rotational axis). In other words, the movable portion 5-30 and the optical element 5-5 disposed on the movable portion 5-30 may rotate in different directions to achieve optical image stabilization. In some embodiments, the line 5-A-5-A and the line 5-B-5-B may be perpendicular to the main axis 5-O, and the line 5-A-5-A and the line 5-B-5-B may extend in different directions.

As shown in FIG. 70, when viewed in the X direction, the first driving assembly 5-D1 and the second driving assembly 5-D2 at least partially exposed from the bottom 5-20. For example, the first driving coil 5-60A or the second driving coil 5-60B at least partially exposed from the bottom 5-20. Moreover, the first driving coil 5-60A or the second driving coil 5-60B may be disposed in the opening of the bottom 5-20. The first sensor 5-62A and the second sensor 5-62B do not overlap the first driving coil 5-60A and the second driving coil 5-60B in the X direction to reduce the size of the optical system 5-100 in the X direction, and miniaturization may be achieved.

In some embodiments, the movable portion 5-30 may include a first metal element 5-92 which is embedded in the movable portion 5-30. As shown in FIG. 71A, the first metal element 5-92 may in direct contact with the intermediate module 5-C, such as in direct contact with the first clipping element 5-52A and the third clipping element 5-52C, and the elements may be connected by welding (e.g. soldering to melting). Therefore, the first clipping element 5-52A and the third clipping element 5-52C may be affixed on the movable portion 5-30. In other words, at least a portion of the first metal element 5-92 overlaps the intermediate module 5-C in a direction that the main axis 5-O extends.

In some embodiments, the bottom 5-20 may include a second metal element 5-94 which is embedded in the bottom 5-20. As shown in FIG. 71B, the second metal element 5-94 may in direct contact with the intermediate module 5-C, such as in direct contact with the second clipping element 5-52B and the fourth clipping element 5-52D, and the elements may be connected by welding (e.g. soldering to melting). Therefore, the second clipping element 5-52B and the fourth clipping element 5-52D may be affixed on the bottom 5-20. In other words, at least a portion of the second metal element 5-94 overlaps the intermediate module 5-C in a direction that the main axis 5-O extends.

It should be noted that the first metal element 5-92 has a first surface 5-92A and a second surface 5-92B that are opposite. The first surface 5-92A may face the intermediate module 5-C (such as faces the first clipping element 5-52A and the third clipping element 5-52C), and the second surface 5-92B may face the movable portion 5-30. Moreover, the movable portion 5-30 has an opening 5-31, and at least a portion of the first metal element 5-92B is exposed from the opening 5-31. Therefore, the first metal element 5-92 may be heated through the opening 5-31 (e.g. by laser) to allow the first metal element 5-92 being connected to the first clipping element 5-52A and the third clipping element 5-52C. The second metal element 5-94 and the bottom 5-20 may have similar structure, and is not repeated.

In some embodiments, when viewed along the main axis 5-O, the movable portion 5-30 is polygonal (e.g. rectangular, octagonal, etc.). The movable portion 5-30 may have a first side 5-S1, a second side 5-S2, a third side 5-S3, and a fourth side 5-S4. The first side 5-S1 and the fourth side 5-S4 may at opposite sides of the movable portion 5-30, and the second side 5-S2 and the third side 5-S3 may at opposite sides of the movable portion 5-30.

In some embodiments, the first driving assembly 5-D1 and the second driving assembly 5-D2 may arrange through the first side 5-S1 of the bottom 5-20 (the fixed portion 5-F), such as may position at a first end 5-S11 and second end 5-S12 of the first side 5-S1, respectively. The first end 5-S11 and the second end 5-512 may at corners of the bottom 5-20. The second side 5-S2 and the third side 5-S3 are parallel, and the first side 5-S1 and the second side 5-S2 are not parallel. Furthermore, as shown in FIG. 66 to FIG. 69, at least a portion of the second circuit assembly 5-80 is at the first side 5-S1, the second side 5-S2, and the third side 5-S3. Moreover, when viewed along the main axis 5-O (e.g. viewed from the Z direction), the first clipping element 5-52A may at the first side 5-S1, the second clipping element 5-52B may at the second side 5-S2, the third clipping element 5-52C may at the third side 5-S3, the fourth clipping element 5-52D may at the fourth side 5-S4. The first side 5-S1 may be opposite from the third side 5-S3, and the second side 5-S2 may be opposite from the fourth side 5-S4.

In some embodiments, the first side 5-S1 may be adjacent to the second side 5-S2 and the fourth side 5-S4, and the third side 5-S3 may be adjacent to the second side 5-S2 and the fourth side 5-S4. The first side 5-S1 and the second side 5-S2 may extend in different directions, and the third side 5-S3 and the fourth side 5-S4 may extend in different directions. However, the present disclosure is not limited thereto. For example, additional sides may be provided between the first side 5-S1, the second side 5-S2, the third side 5-S3, and the fourth side 5-S4 to allow the fixed portion 5-F has a polygonal shape (e.g. octahedral).

In some embodiments, as shown in FIG. 73A and FIG. 73B, the movable portion 5-30 may include first stopping structure 5-32 to limit the movable range of the movable portion 5-30 relative to the fixed portion 5-F. When viewed along the main axis 5-O, the first stopping structure 5-32 does not overlap the movable portion driving assembly 5-D. Therefore, the size of the optical system 5-100 in the Z direction may be reduced to achieve miniaturization.

In some embodiments, as shown in FIG. 67, FIG. 71C, and FIG. 72B, the first magnetic element 5-40A and the second magnetic element 5-40B may be partially disposed in the movable portion 5-30, such as may be disposed in the recess 5-32A and the recess 5-32B, and may be partially exposed from the movable portion 5-30. Therefore, the first magnetic element 5-40A and the second magnetic element 5-40B may be protected, and the position of the first magnetic element 5-40A and the second magnetic element 5-40B may be affixed.

Figure 74:
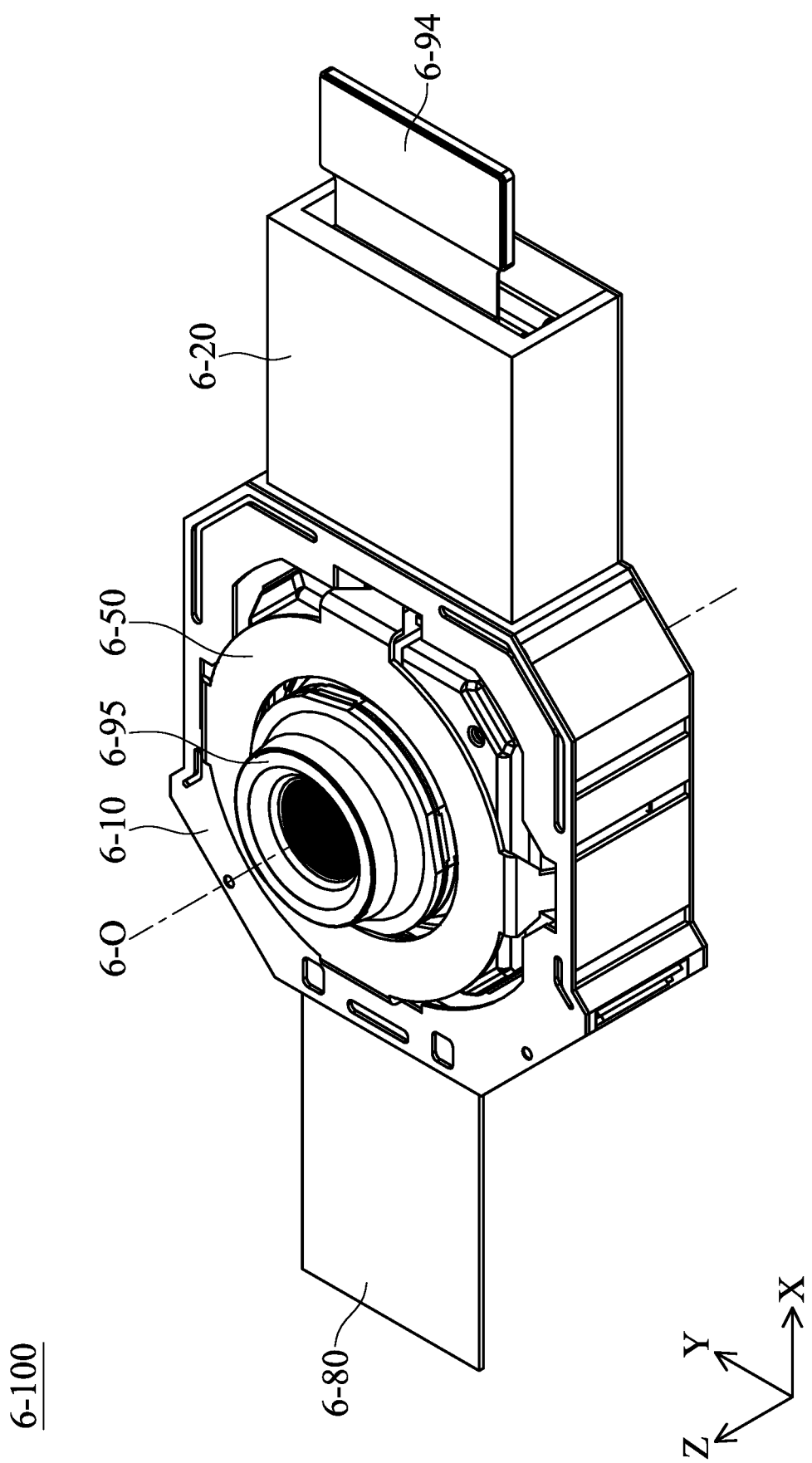
FIG. 74 is a perspective view of an optical system in some embodiments of the present disclosure.
Figure 75:
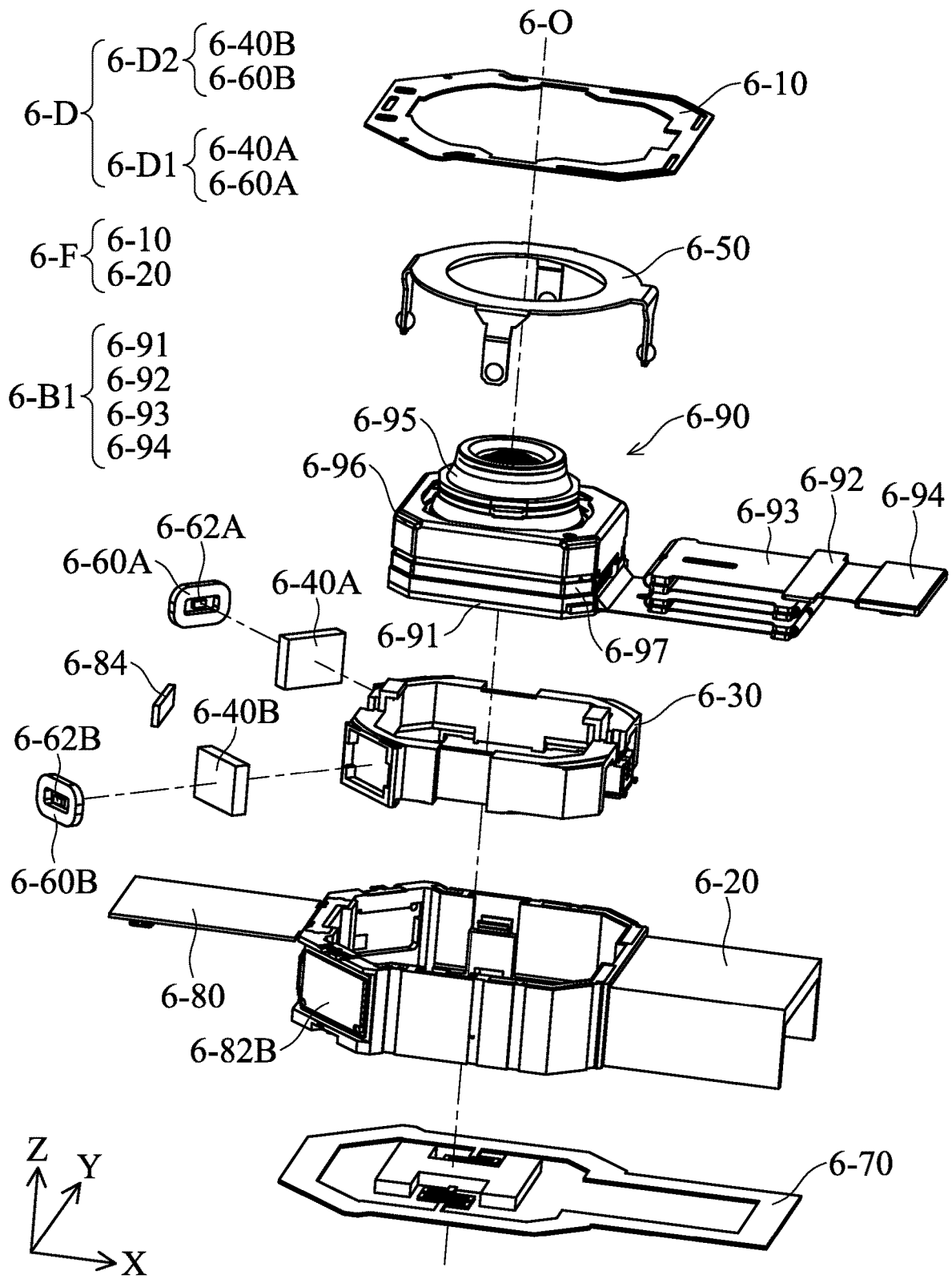
FIG. 75 is an exploded view of the optical system.
Figure 76A:
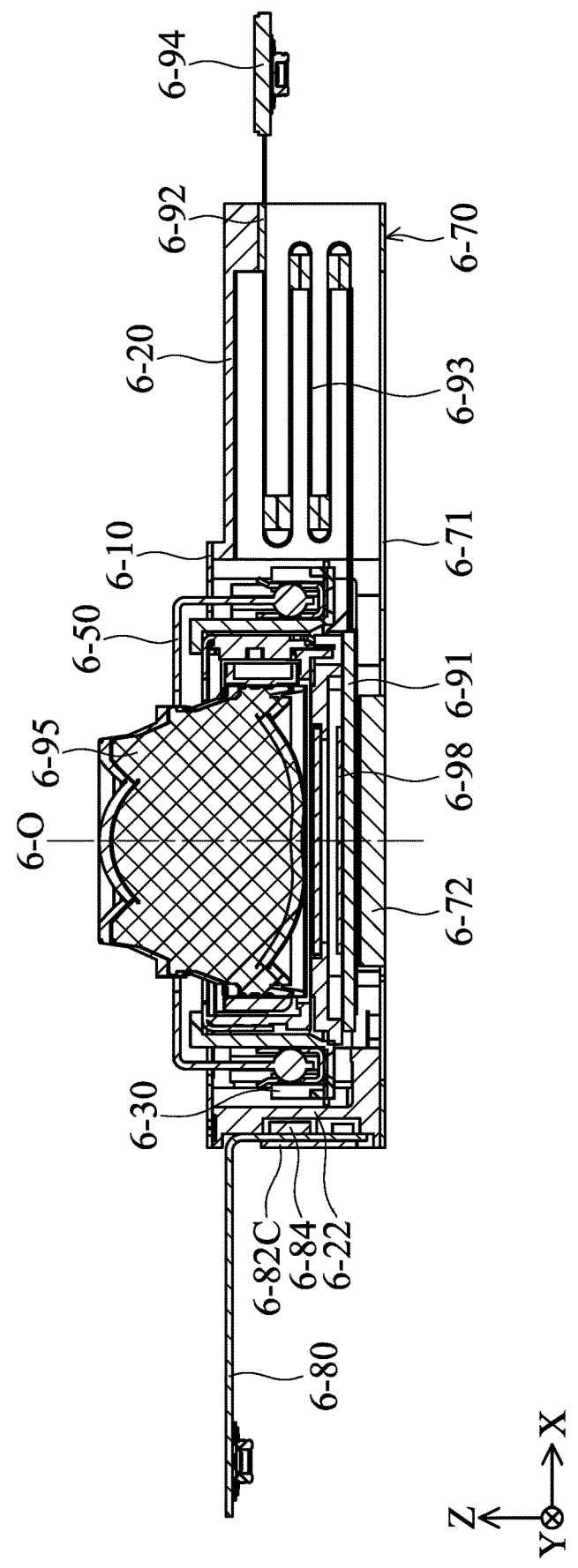
FIG. 76A is a cross-sectional view of the optical system.
Figure 76B:
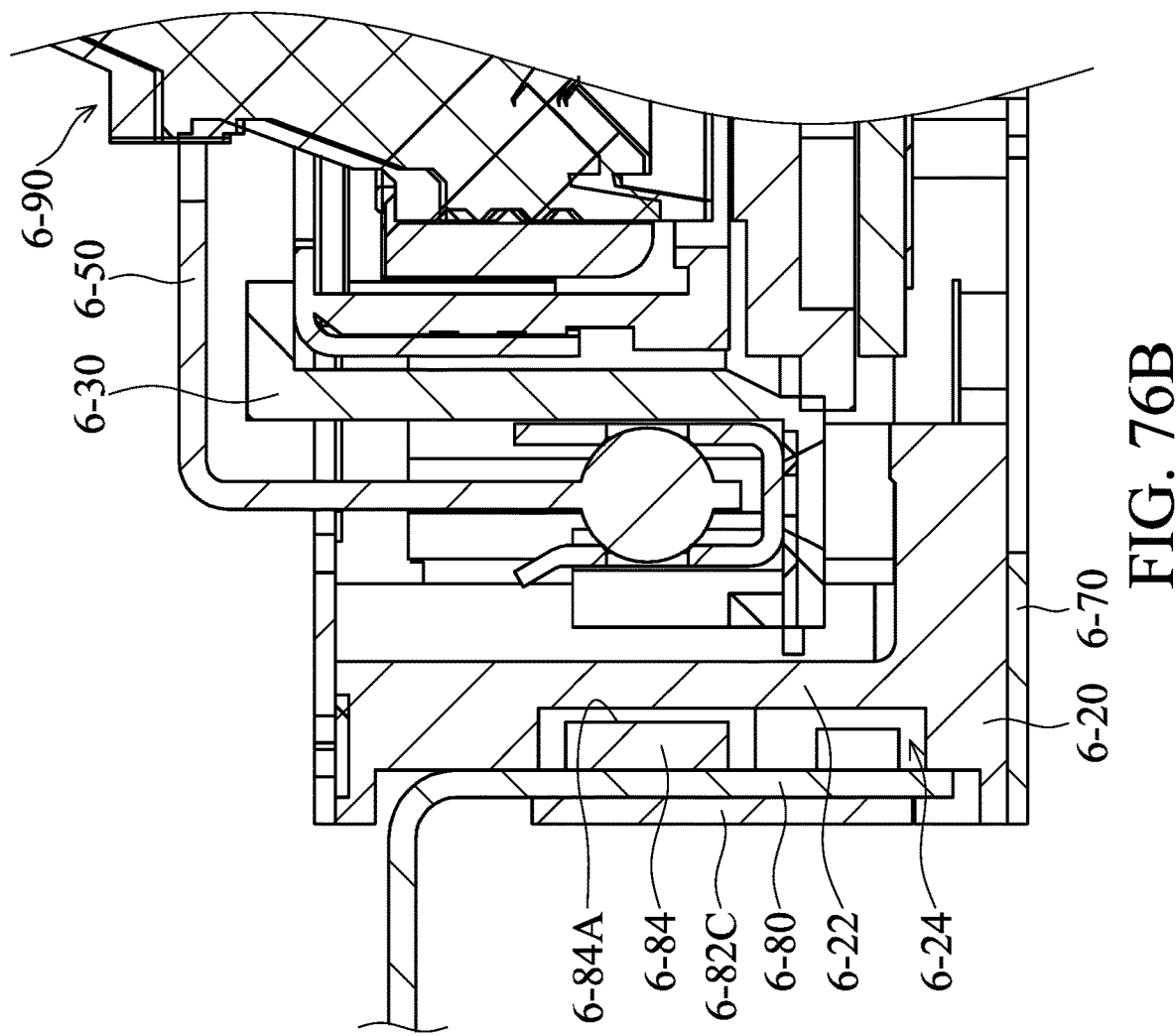
FIG. 76B is an enlarged view of FIG. 76A.

FIG. 74 is a perspective view of an optical system 6-100 in some embodiments of the present disclosure. FIG. 75 is an exploded view of the optical system 6-100. FIG. 76A is a cross-sectional view of the optical system 6-100. FIG. 76B is an enlarged view of FIG. 76A. In FIG. 75, the optical system 6-100 mainly includes a case 6-10, a bottom 6-20, a movable portion 6-30, a first magnetic element 6-40A, a second magnetic element 6-40B, a frame 6-50, a first coil 6-60A, a second coil 6-60B, a first position sensor 6-62A, a second position sensor 6-62B, a connecting module 6-70, and a circuit element 6-80 arranged along a main axis 6-O. The optical system 6-100 may be used for driving an optical assembly 6-90, or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the case 6-10 and the bottom 6-20 may be combined to form an outer shell of the optical system 6-100. Furthermore, the case 6-10 and the bottom 6-20 may be called as a fixed portion 6-F. In some embodiments, the movable portion 6-30 may move relative to the fixed portion 6-F, such as relative to the case 6-10 and the bottom 6-20. Therefore, the optical assembly 6-90 disposed on the movable portion 6-30 may move with the movable portion 6-30 to achieve optical image stabilization.

In some embodiments, the first magnetic element 6-40A and the first coil 6-60A may be called as a first driving assembly 6-D1, the second magnetic element 6-40B and the second coil 6-60B may be called as a second driving assembly 6-D2, and the first driving assembly 6-D1 and the second driving assembly 6-D2 may be called as driving assembly 6-D used for driving the movable portion 6-30 to move relative to the fixed portion 6-F in different directions. For example, the first magnetic element 6-40A and the first coil 6-60A may be respectively disposed on the movable portion 6-30 and the fixed portion 6-F, or their position may be interchanged. It should be noted that the interaction between the first magnetic element 6-40A and the first coil 6-60A and the interaction between the second magnetic element 6-40B and the second coil 6-60B may generate magnetic forces to move the optical assembly 6-90 disposed on the movable portion 6-30 relative to the fixed portion 6-F, so auto focus or optical image stabilization may be achieved.

In some embodiments, the driving assembly 6-D may include piezoelectric element or shape memory alloy as well.

For example, the first driving assembly 6-D1 may drive the movable portion 6-30 relative to the fixed portion 6-F in a first dimension, the second driving assembly 6-D2 may drive the movable portion 6-30 relative to the fixed portion 6-F in a second dimension. The first dimension and the second dimension may be rotational movements relative to different rotational axes, but the present disclosure is not limited thereto.

In some embodiments, a first position sensor 6-62A and a second position sensor 6-62B may be provided in the optical system 6-100 to detect the position of the movable portion 6-30 relative to the fixed portion 6-F. For example, the first position sensor 6-62A and the second position sensor 6-62B may be disposed in the first coil 6-60A and the second coil 6-60B, respectively. The first position sensor 6-62A and the second position sensor 6-62B may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The optical assembly 6-90 may include a case 6-96, a bottom 6-97, and a optical element 6-95 disposed between the case 6-96 and the bottom 6-97. It should be noted that a case opening and a bottom opening are formed on the case 6-96 and the bottom 6-97, respectively. The center of the case opening corresponds to the main axis 6-O of the optical element 6-95, the bottom opening corresponds to an optical sensing element 6-98, and the optical sensing element 6-98 may be disposed on the first circuit assembly 6-B1, which will be described later. As a result, the optical element 6-95 disposed in the optical assembly 6-90 can perform image focusing with the optical sensing element 6-98 along the main axis 6-O (i.e. the Z direction).

Furthermore, an additional movable assembly (not shown) may be provided in the optical assembly 6-90. The movable assembly may move relative to the case 6-96 and the bottom 6-97 of the optical assembly 6-90, and the optical element 6-95 may be affixed on the movable assembly, such as being fixed by means of locking, bonding, or snapping. Furthermore, additional driving components (not shown) may be provided in the optical assembly 6-90, such as a combination of magnets and coils. Therefore, the optical element 6-95 and the movable assembly may be moved in a direction that is different from the moving direction of the movable portion 6-30, and the optical element 6-95 may be driven in more directions For example, the optical element 6-95 may be driven in the X, Y, or Z directions.

The optical assembly 6-90 may be electrically connected to the first circuit assembly 6-B1. The first circuit assembly 6-B1 may be a flexible printed circuit, which may be adhered on the bottom of the optical assembly 6-90. In this embodiment, the first circuit assembly 6-B1 is electrically connected to the electronic elements inside or outside the optical assembly 6-90. For example, electric signal may be provided to the driving component through the first circuit assembly 6-B1 to control the movement of the movable assembly in the X, Y, or Z directions, so auto focus or optical image stabilization may be achieved.

FIG. 77 is a bottom view of the optical system 6-100. A connecting module 6-70 may be provided on the bottom of the optical system 6-100, and the movable portion 6-30 may be movably connected to the fixed portion 6-F through the connecting module 6-70. For example, a first movable portion connecting portion 6-71 of the connecting module 6-70 may be affixed on the optical assembly 6-90, which is affixed on the movable portion 6-30. A first fixed portion connecting portion 6-72 may be affixed on the bottom 6-20 of the fixed portion 6-F. Moreover, the first movable portion connecting portion 6-71 may be movably connected to the first fixed portion connecting portion 6-72 through a first resilient portion 6-73 (which includes a first resilient unit 6-73A and a second resilient unit 6-73B).

It should be noted that the first resilient unit 6-73A and the second resilient unit 6-73B are disposed on opposite sides of the first movable portion connecting portion 6-71 in the Y direction, and no resilient unit is provided on the sides of the first movable portion connecting portion 6-71 in the X direction. Therefore, the elastic modulus of the first movable portion connecting portion 6-71 relative to the first fixed portion connecting portion 6-72 in a first direction (e.g. the X direction) is different from the elastic modulus of the first movable portion connecting portion 6-71 relative to the first fixed portion connecting portion 6-72 in a second direction (e.g. the Y direction). For example, the elastic modulus of the first movable portion connecting portion 6-71 relative to the first fixed portion connecting portion 6-72 in the first direction may be less than the elastic modulus of the first movable portion connecting portion 6-71 relative to the first fixed portion connecting portion 6-72 in the second direction. In other words, a higher force should be provided to move the first movable portion connecting portion 6-71 relative to the first fixed portion connecting portion 6-72 in the first direction than in the second direction.

Moreover, the elastic modulus of the first movable portion connecting portion 6-71 relative to the first fixed portion connecting portion 6-72 when rotating relative to a rotational axis extending in the first direction is different from the elastic modulus of the first movable portion connecting portion 6-71 relative to the first fixed portion connecting portion 6-72 when rotating relative to a rotational axis extending in the second direction. For example, the elastic modulus of the first movable portion connecting portion 6-71 relative to the first fixed portion connecting portion 6-72 when rotating relative to a rotational axis extending in the first direction may be higher than the elastic modulus of the first movable portion connecting portion 6-71 relative to the first fixed portion connecting portion 6-72 when rotating relative to a rotational axis extending in the second direction. In other words, a higher force should be provided to rotate the first movable portion connecting portion 6-71 relative to the first fixed portion connecting portion 6-72 when rotating relative to a rotational axis extending in the first direction than rotating relative to a rotational axis extending in the second direction. In some embodiments, the first direction may be not parallel to the second direction (e.g. may be perpendicular). Moreover, the first direction (e.g. the X direction) and the second direction (e.g. the Y direction) may be not parallel to the direction that the main axis 6-O extends (e.g. the Z direction), such as may be perpendicular to the main axis 6-O.

The first movable portion connecting portion 6-71 may be in direct contact with the optical assembly 6-90. For example, FIG. 77B is a schematic view of the connecting module 6-70, and FIG. 77C is a side view of the connecting module 6-70. As shown in FIG. 77, the first movable portion connecting portion 6-71 may have a first thickness 6-T1, the first fixed portion connecting portion 6-72 may have a second thickness 6-T2, and the first thickness 6-T1 may be higher than the second thickness 6-T2. Therefore, the thicker first movable portion connecting portion 6-71 may be in direct contact with the optical assembly 6-90. In some embodiments, the material of the connecting module 6-70 may include metal, so the connecting module 6-70 may be a heat spreader to dissipate the heat generated from the optical assembly 6-90. In some embodiments, the first movable portion connecting portion 6-71 may be a heat sink (not shown) to further dissipate the heat.

However, the shape of the connecting module is not limited to the connecting module 6-70. For example, FIG. 77D is a bottom view of an optical system 6-102 in other embodiments of the present disclosure. The optical system 6-102 is substantially similar to the optical system 6-100, and the difference is that the connecting module 6-70 is replaced by a connecting module 6-74.

Figure 77A:
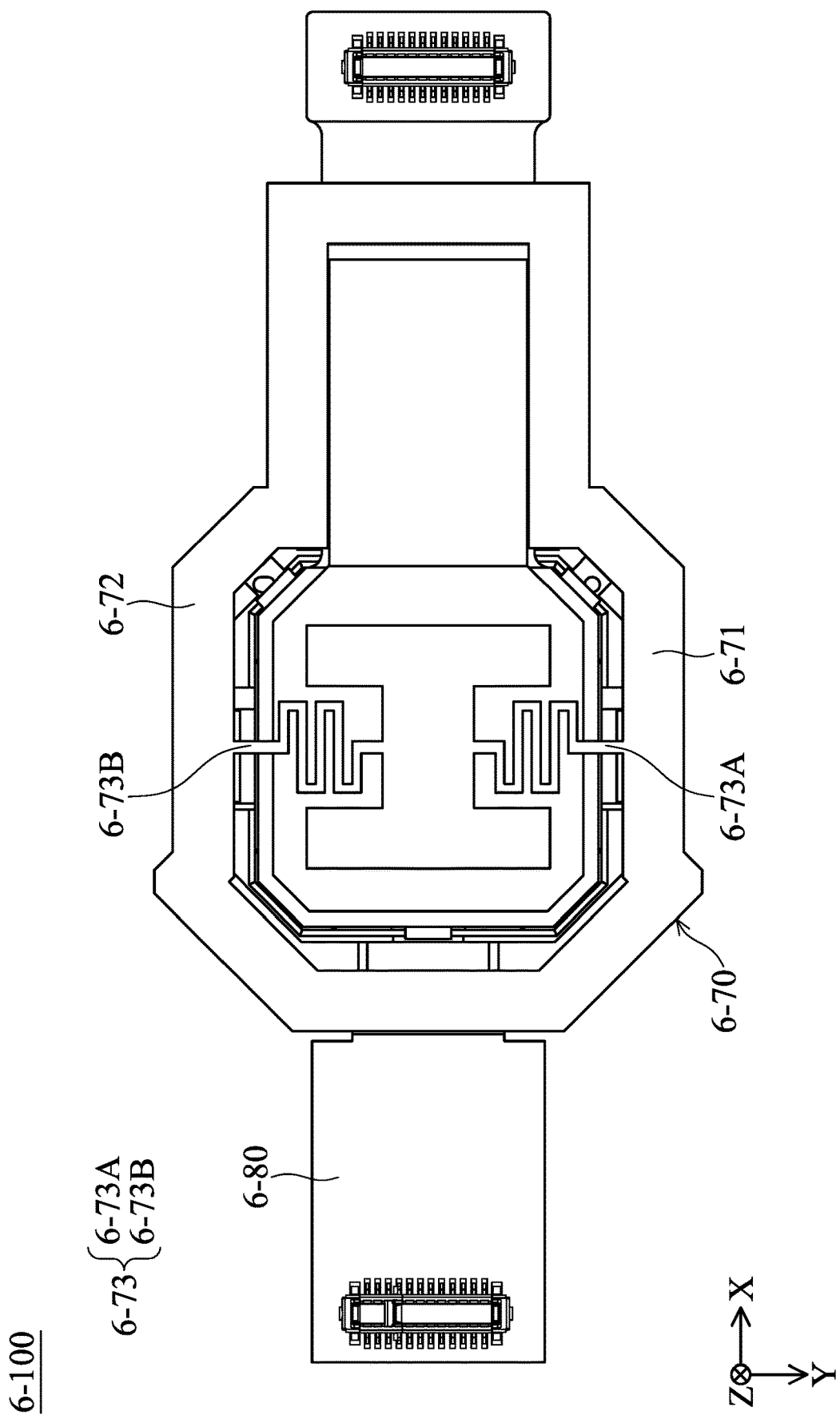
FIG. 77A is a top view of the optical system.
Figure 77B:
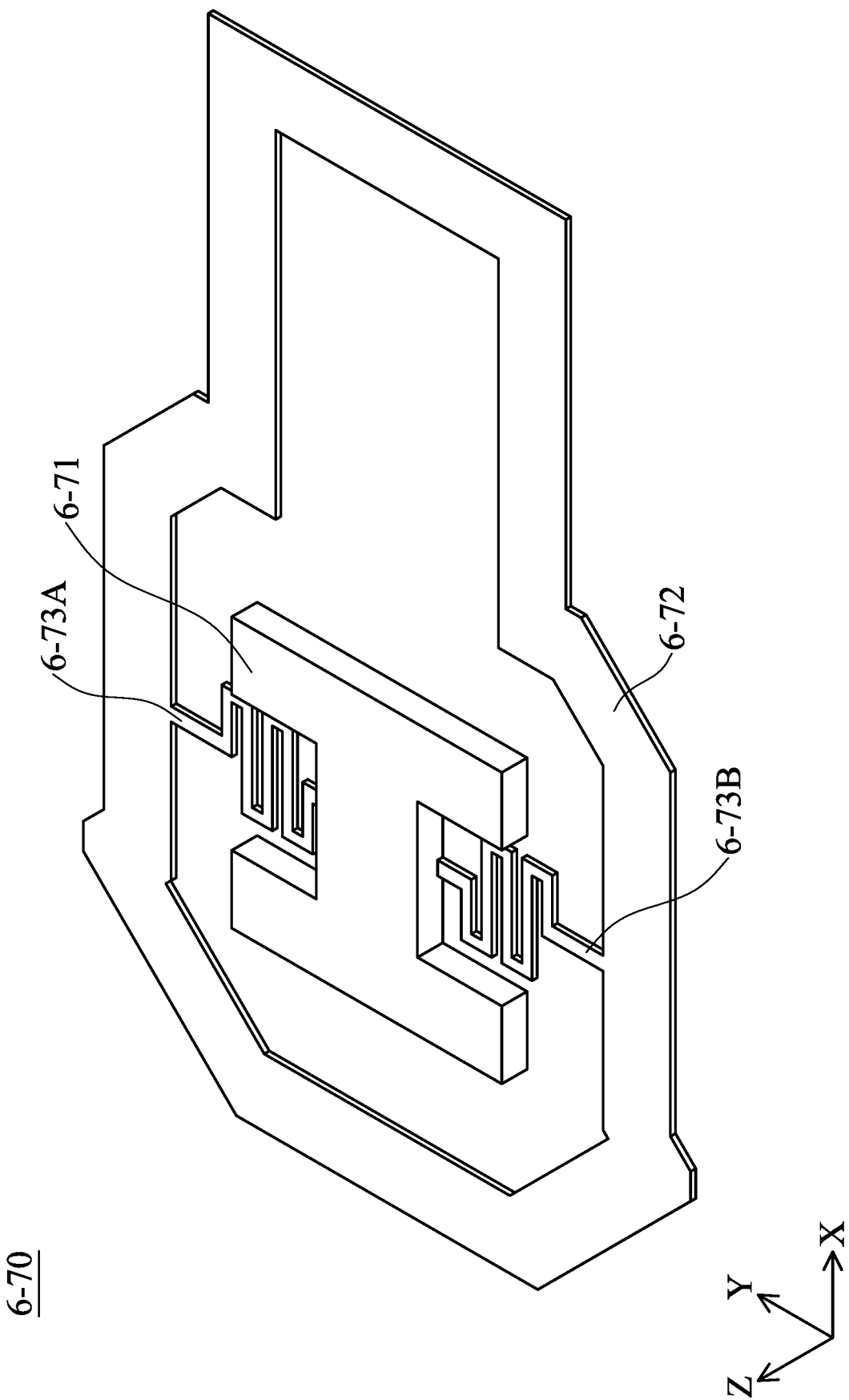
FIG. 77B is a schematic view of a connecting module.
Figure 77C:
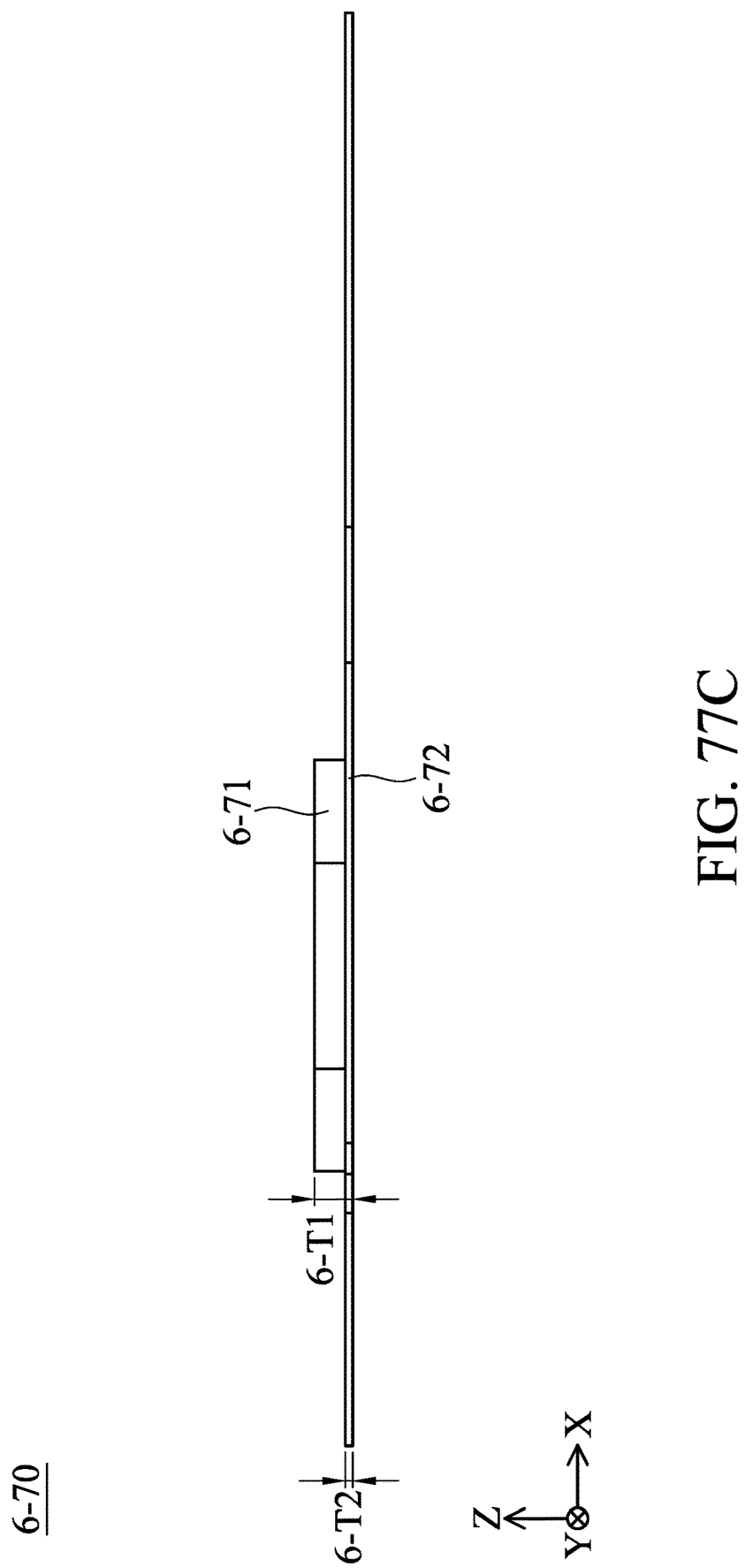
FIG. 77C is a side vie of the connecting module.
Figure 77D:
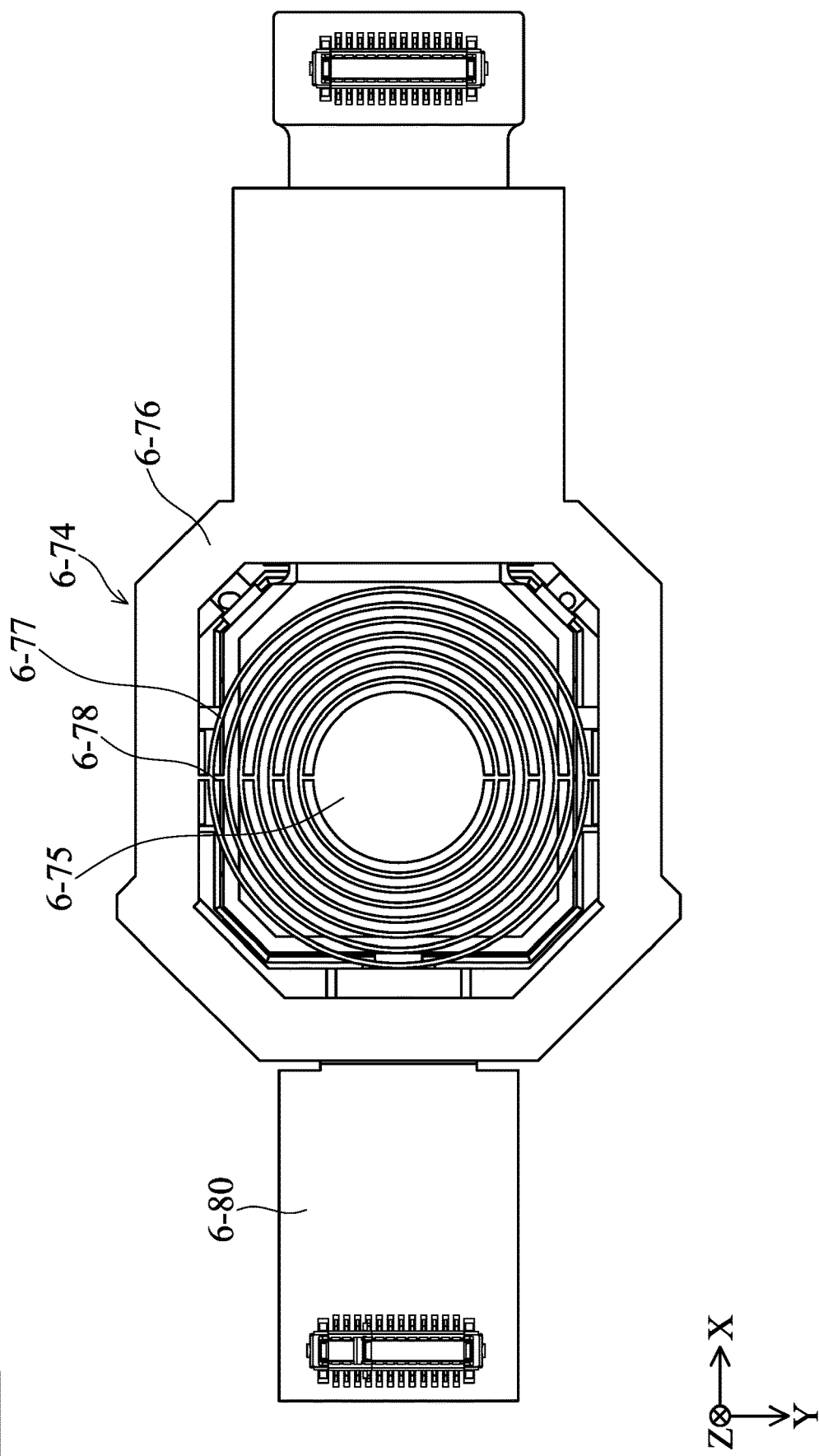
FIG. 77D is a bottom view of another optical system in other embodiments of the present disclosure.
Figure 77E:
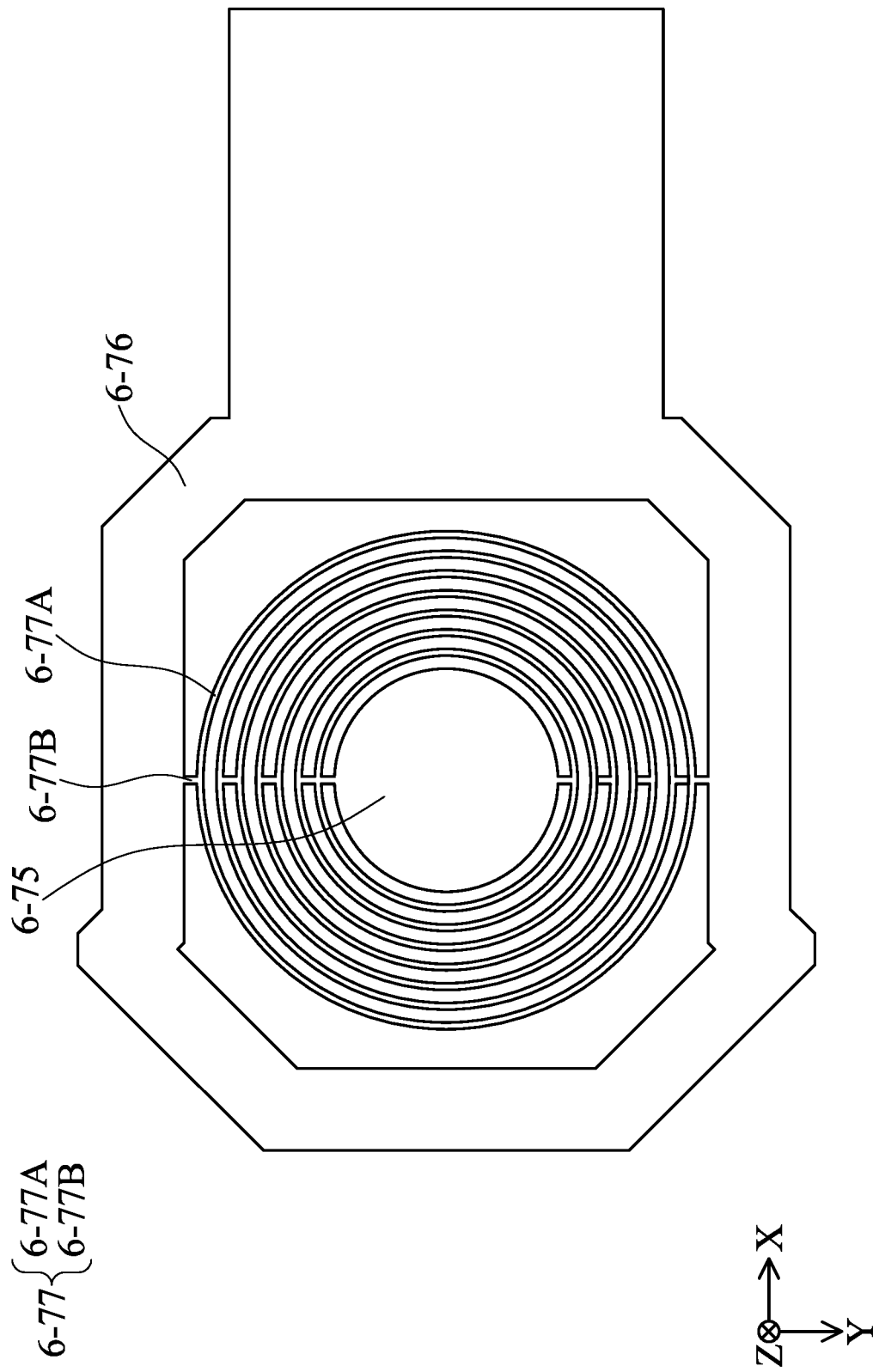
FIG. 77E is a schematic view of the connecting module.

FIG. 77E is a schematic view of the connecting module 6-74. For example, a first movable portion connecting portion 6-75 of the connecting module 6-74 may be affixed on the optical assembly 6-90, which is affixed on the movable portion 6-30. A first fixed portion connecting portion 6-76 may be affixed on the bottom 6-20 of the fixed portion 6-F. Moreover, the first movable portion connecting portion 6-75 may be movably connected to the first fixed portion connecting portion 6-76 through a first resilient portion 6-77 (which includes first resilient unit 6-77A and second resilient unit 6-77B).

The first resilient unit 6-77A may be concentric circles, and the first resilient unit 6-77A may be connected by the second resilient unit 6-77B. For example, the second resilient unit 6-77B may extend in the radical direction of the first resilient unit 6-77A. Moreover, the second resilient unit 6-77B may connect two or more than two (e.g. three) first resilient unit 6-77A. The first resilient portion 6-77 may be resilient, so the first movable portion connecting portion 6-75 may move relative to the first fixed portion connecting portion 6-76. The first movable portion connecting portion 6-75 is affixed on the optical assembly 6-90 of the movable portion 6-30, so the heat generated by the optical assembly 6-90 may be dissipated by the first movable portion connecting portion 6-75. For example, the material of the first resilient portion 6-77 may include metal.

As shown in FIG. 75 and FIG. 76A, the first circuit assembly 6-B1 may include a second movable portion connecting portion 6-91, a second fixed portion connecting portion 6-92, a second resilient portion 6-93, and a exposing portion 6-94. The second movable portion connecting portion 6-91 may be affixed on the optical assembly 6-90, and the second fixed portion connecting portion 6-92 may be affixed on the fixed portion 6-F (directly or indirectly). The second resilient portion 6-93 may be disposed between the second movable portion connecting portion 6-91 and the second fixed portion connecting portion 6-92 and may be bent, and the second movable portion connecting portion 6-91 may movably connected to the second fixed portion connecting portion 6-92 through the second resilient portion 6-93.

In some embodiments, the elastic modulus of the second movable portion connecting portion 6-91 relative to the second fixed portion connecting portion 6-92 in the first direction (e.g. the X direction) is different from the elastic modulus of the second movable portion connecting portion 6-91 relative to the second fixed portion connecting portion 6-92 in the second direction (e.g. the Y direction). For example, the elastic modulus of the second movable portion connecting portion 6-91 relative to the second fixed portion connecting portion 6-92 in the first direction may be less than the elastic modulus of the second movable portion connecting portion 6-91 relative to the second fixed portion connecting portion 6-92 in the second direction. In other words, a smaller force should be provided to move the second movable portion connecting portion 6-91 relative to the second fixed portion connecting portion 6-92 in the first direction than in the second direction.

Moreover, the elastic modulus of the second movable portion connecting portion 6-91 relative to the second fixed portion connecting portion 6-92 when rotating relative to a rotational axis extending in the first direction is different from the elastic modulus of the second movable portion connecting portion 6-91 relative to the second fixed portion connecting portion 6-92 when rotating relative to a rotational axis extending in the second direction. For example, the elastic modulus of the second movable portion connecting portion 6-91 relative to the second fixed portion connecting portion 6-92 when rotating relative to a rotational axis extending in the first direction may be less than the elastic modulus of the second movable portion connecting portion 6-91 relative to the second fixed portion connecting portion 6-92 when rotating relative to a rotational axis extending in the second direction. In other words, a smaller force should be provided to rotate the second movable portion connecting portion 6-91 relative to the second fixed portion connecting portion 6-92 when rotating relative to a rotational axis extending in the first direction than rotating relative to a rotational axis extending in the second direction.

In other words, the first circuit assembly 6-B1 and the connecting module 6-70 may be used for limiting the movable range of the movable portion 6-30 relative to the fixed portion 6-F in the first direction and the second direction, respectively. Therefore, the force received by the movable portion 6-30 in different directions may be balanced to simplify the design.

Figure 78:
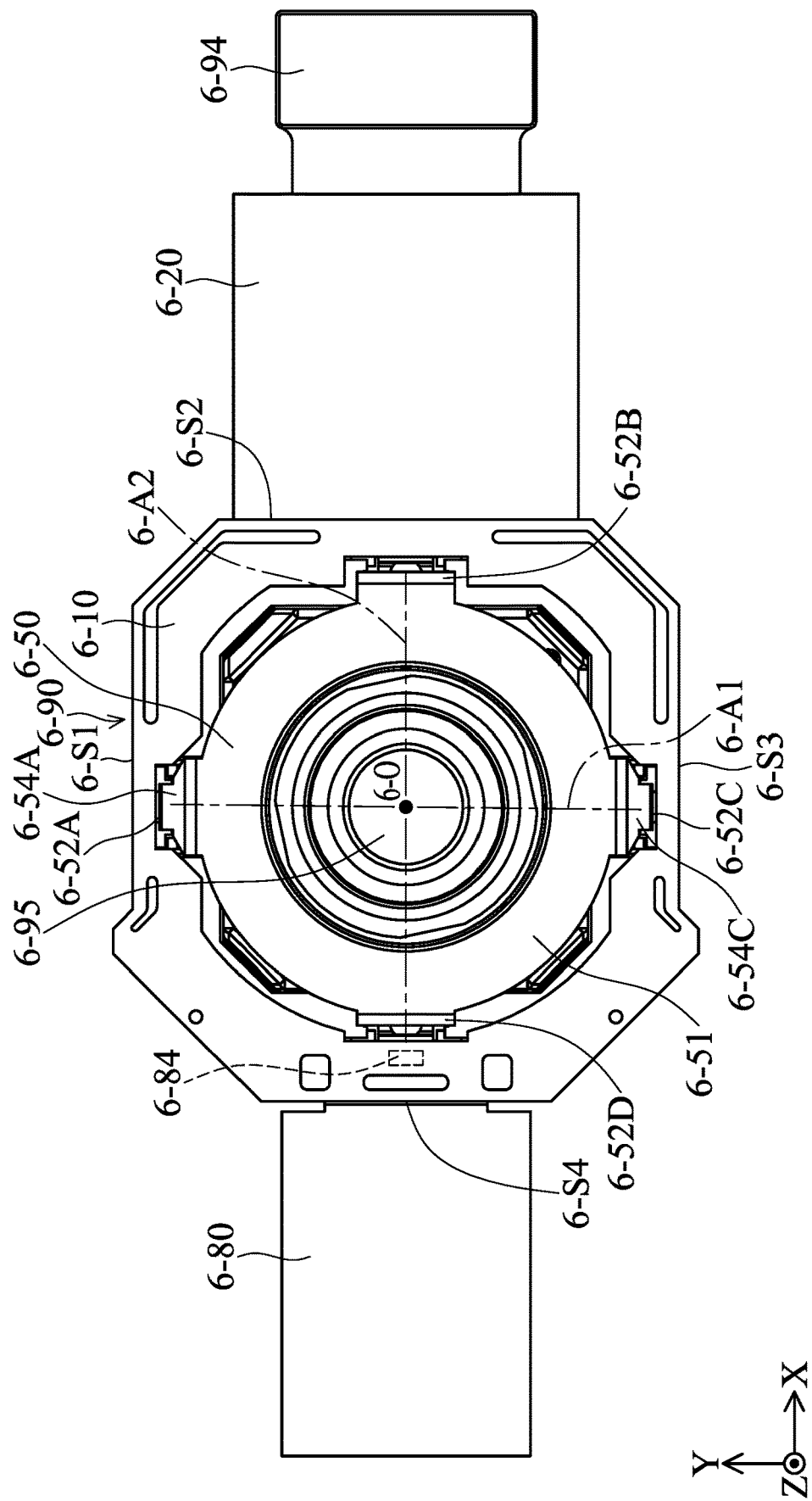
FIG. 78 is a top view of the optical system.

FIG. 78 is a top view of the optical system 6-100. When viewed along the main axis 6-O, the fixed portion 6-F (e.g. the case 6-10) may be polygonal, and may include a first side 6-S1, a second side 6-S2, and a third side 6-S3. The first side 6-S1 may extend in the first direction (e.g. the X direction), the second side 6-S2 may extend in the second direction (e.g. the Y direction), and the third side 6-S3 may extend in a third direction (e.g. the X direction). The first direction may be parallel to the third direction.

Referring to FIG. 76A, FIG. 77A, and FIG. 78, the first resilient unit 6-73A and the second resilient unit 6-73B of the first resilient portion 6-73 are not at the second side 6-S2, but at the first side 6-S1 and the third side 6-S3. The second resilient portion 6-93 may be disposed at the second side 6-S2. Therefore, the first resilient portion 6-73 and the second resilient portion 6-93 may be separated to prevent interference.

Figure 79A:
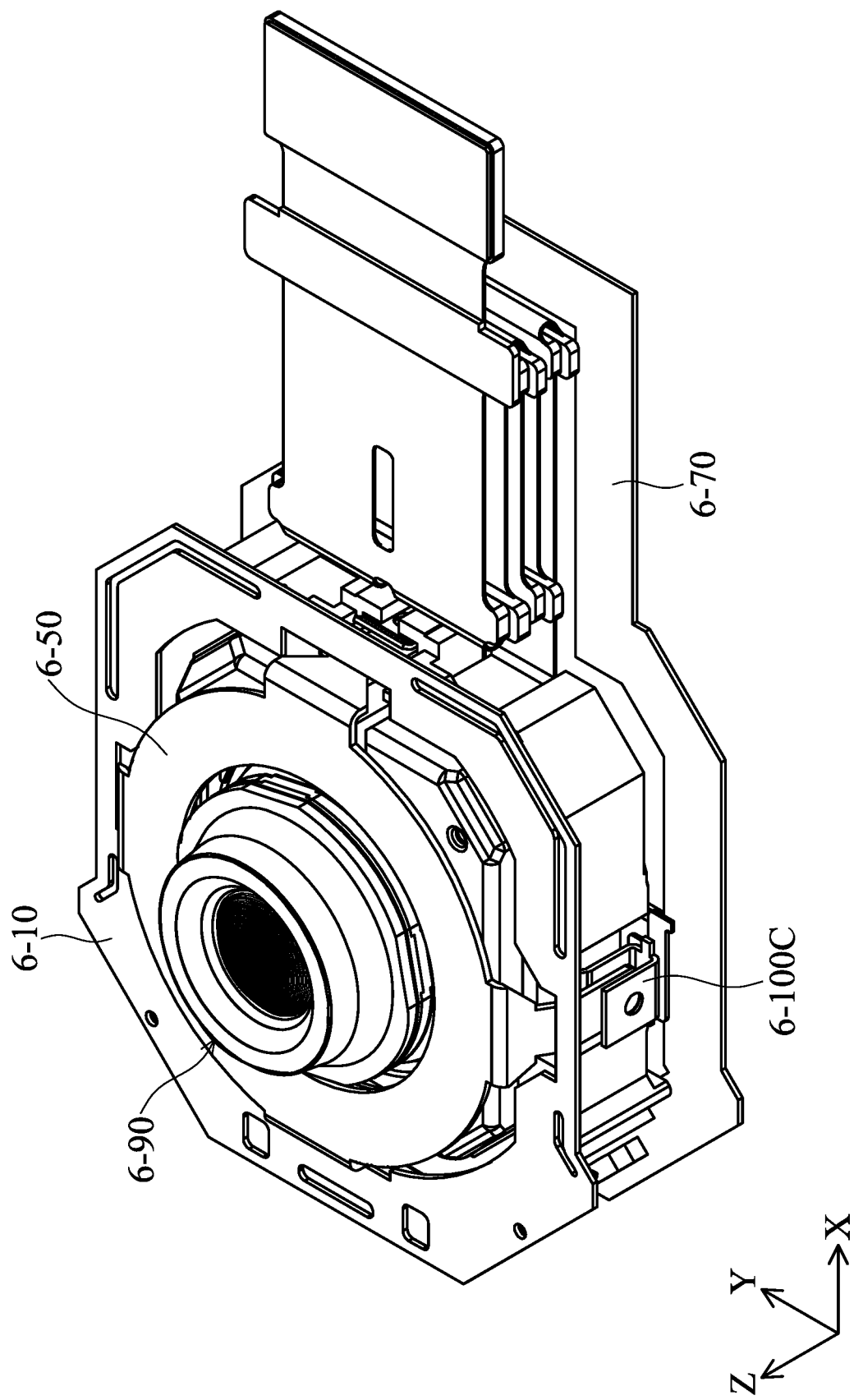
FIG. 79A, FIG. 79B, and FIG. 79C are schematic views of some elements of the optical system viewed in different directions.
Figure 79B:
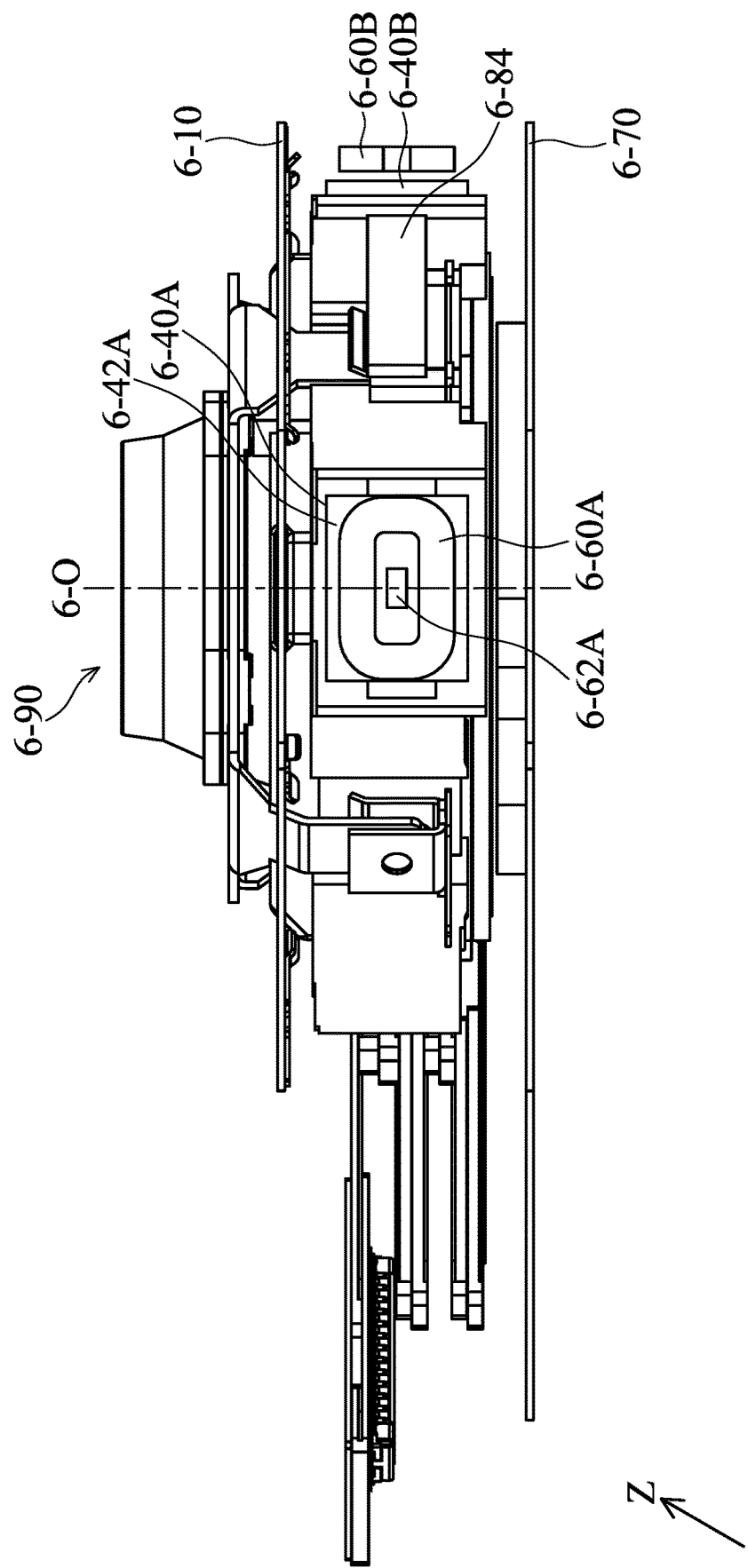
Figure 79C:
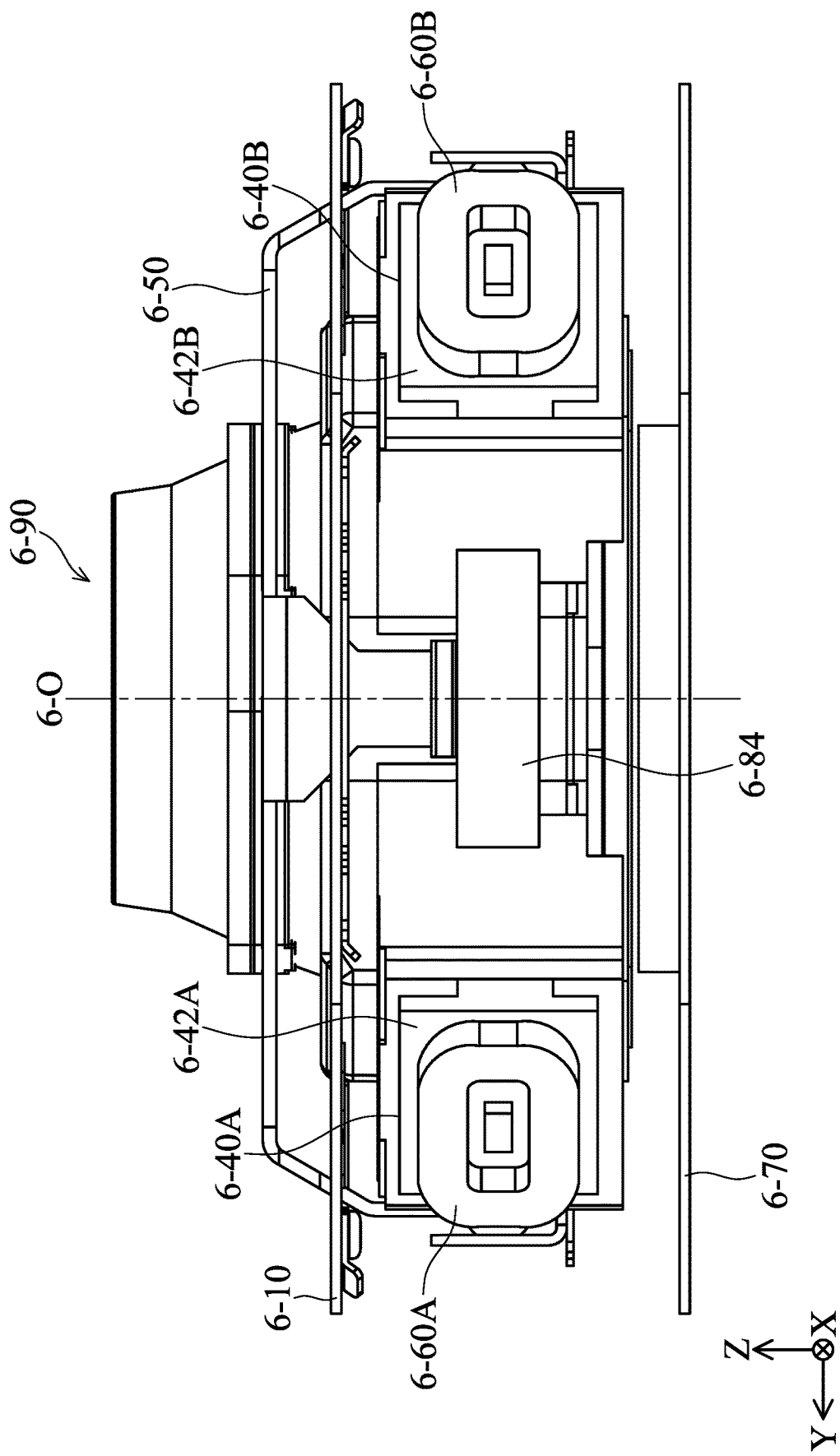
Figure 79D:
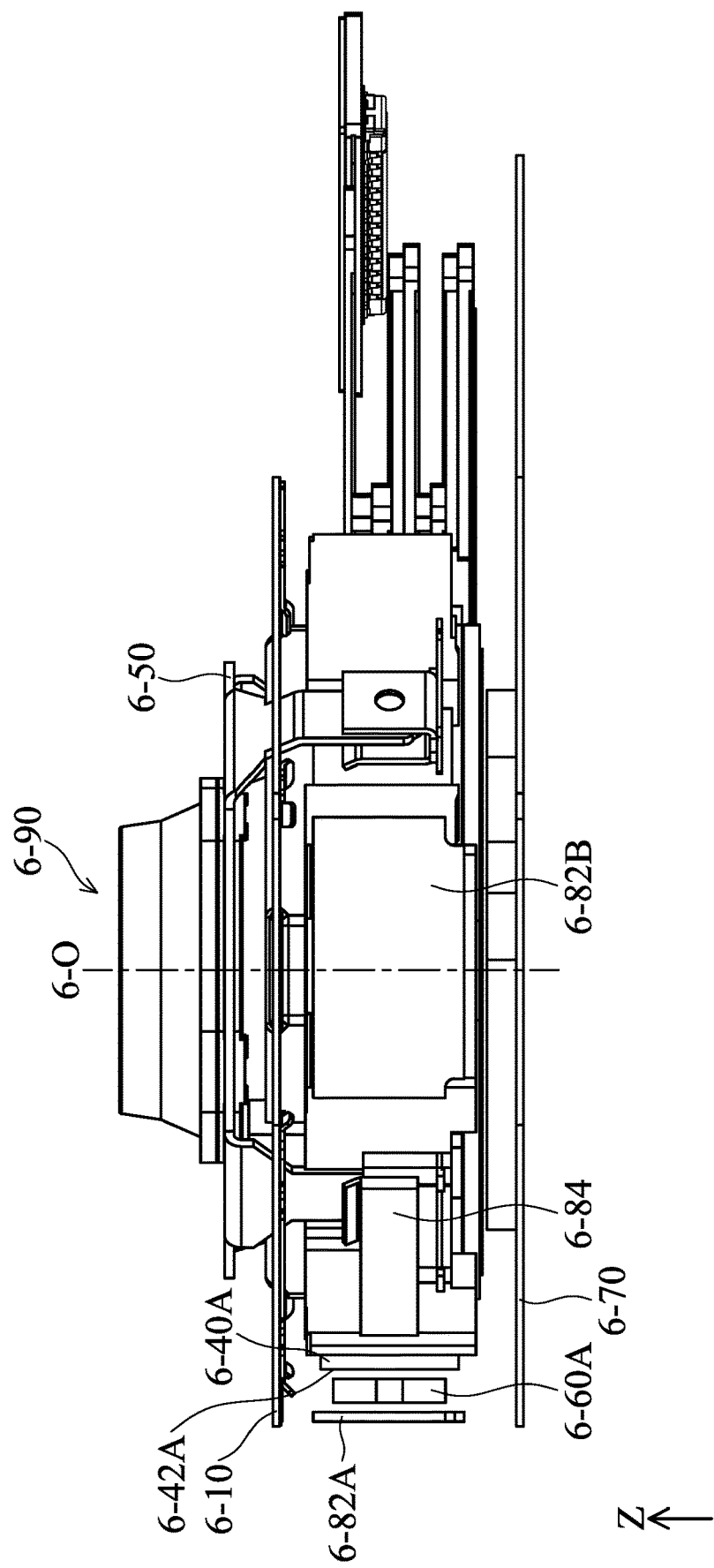
FIG. 79D, FIG. 79E, FIG. 79F, FIG. 79G, and FIG. 79H are schematic views of some elements of the optical system viewed in different directions.
Figure 79E:
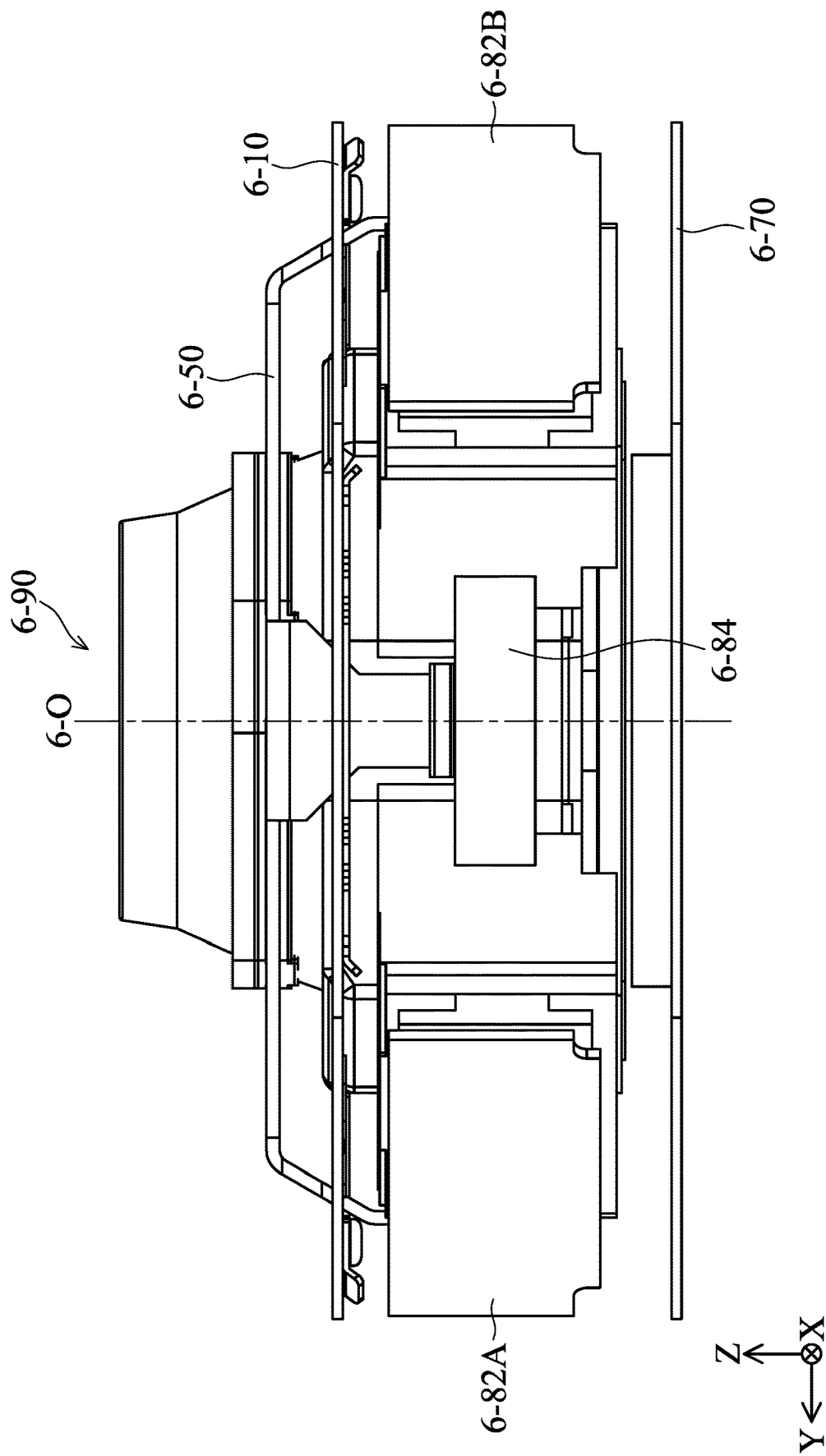

FIG. 79A, FIG. 79B, and FIG. 79C are schematic views of some elements the optical system 6-100 viewed in different directions, wherein the driving assembly 6-D behind the circuit element 6-80 is shown. FIG. 79D, FIG. 79E, FIG. 79F, FIG. 79G, and FIG. 79H are schematic views of some elements of the optical system 6-100 viewed in different directions, wherein a third magnetic conductive element 6-82A and a third magnetic conductive element 6-82B are shown. As shown in FIG. 79A to FIG. 79G, the first magnetic element 6-40A has a first magnetic element surface 6-42A facing the first coil 6-60A. The first magnetic element surface 6-42A is not perpendicular nor parallel to the second direction (the Y direction) and the third direction (the X direction).

Figure 79F:
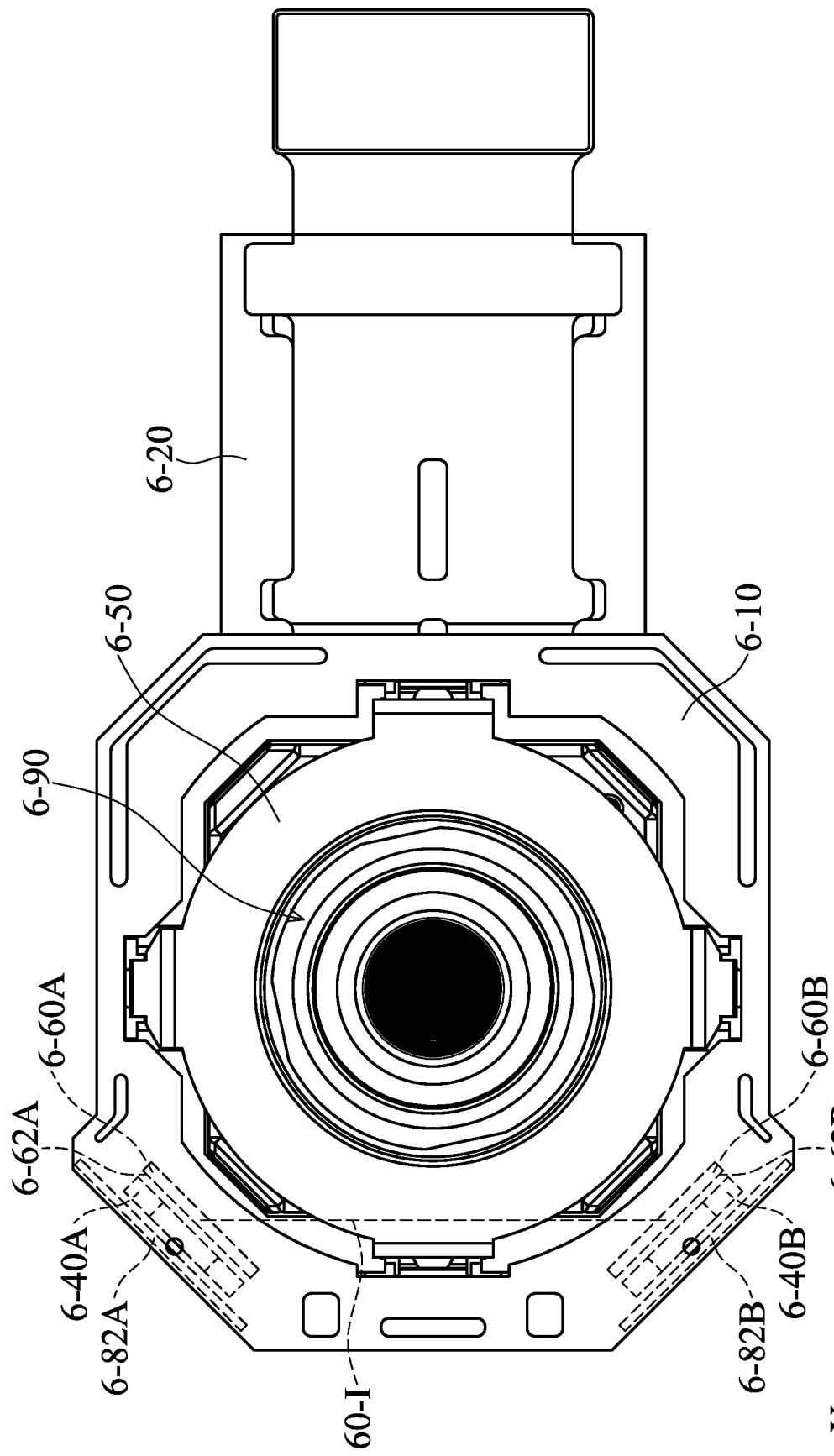

Moreover, the material of the case 6-10 may be magnetic conductive (e.g. metal), and the case 6-10 may be called as first magnetic conductive element 6-10. The first magnetic conductive element 6-10 (the case 6-10) may correspond to the first magnetic element 6-40A to generate a first driving force to the movable portion 6-30. In other words, the first magnetic element 6-40A may move relative to the first magnetic conductive element 6-10. As shown in FIG. 79B, when viewed in a direction that is perpendicular to the first magnetic element surface 6-42A, the first magnetic conductive element 6-10 does not overlap the first magnetic element 6-40A. Moreover, in some embodiments, as shown in FIG. 79F, when viewed in a direction that is parallel to the first magnetic element surface 6-42A (e.g. the Z direction), at least a portion of the first magnetic conductive element 6-10 overlaps the first magnetic element 6-40A or the first coil 6-60A. Therefore, the height of the optical system 6-100 in the Z direction may be reduced to achieve miniaturization. When viewed along the main axis 6-O, as shown in FIG. 79F, a connection 6-I between centers of the first magnetic element 6-40A and the second magnetic element 6-40B is parallel to the second direction (the Y direction) and does not penetrate the center of the optical assembly 6-90.

Figure 79G:
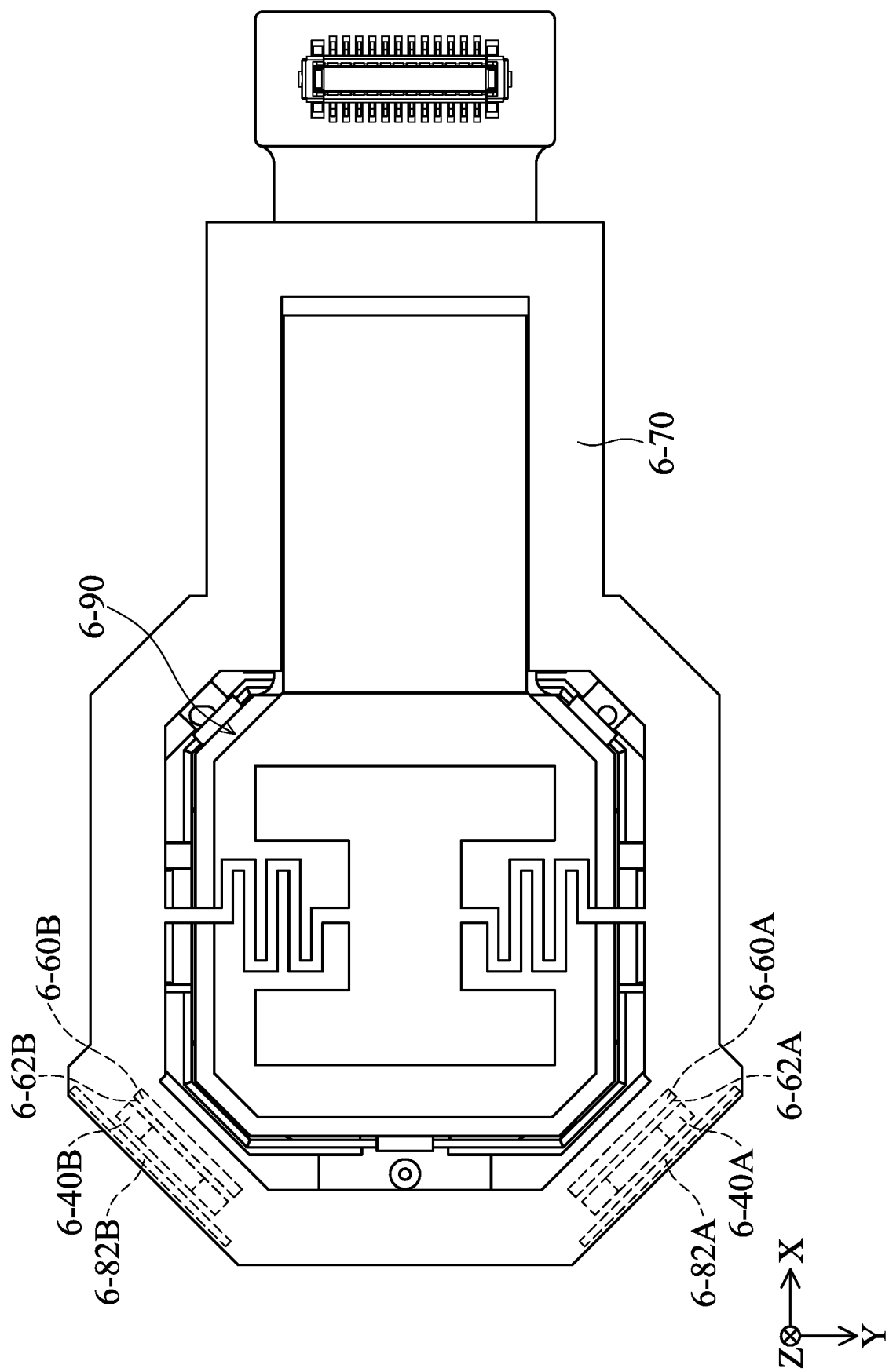
Figure 79H:
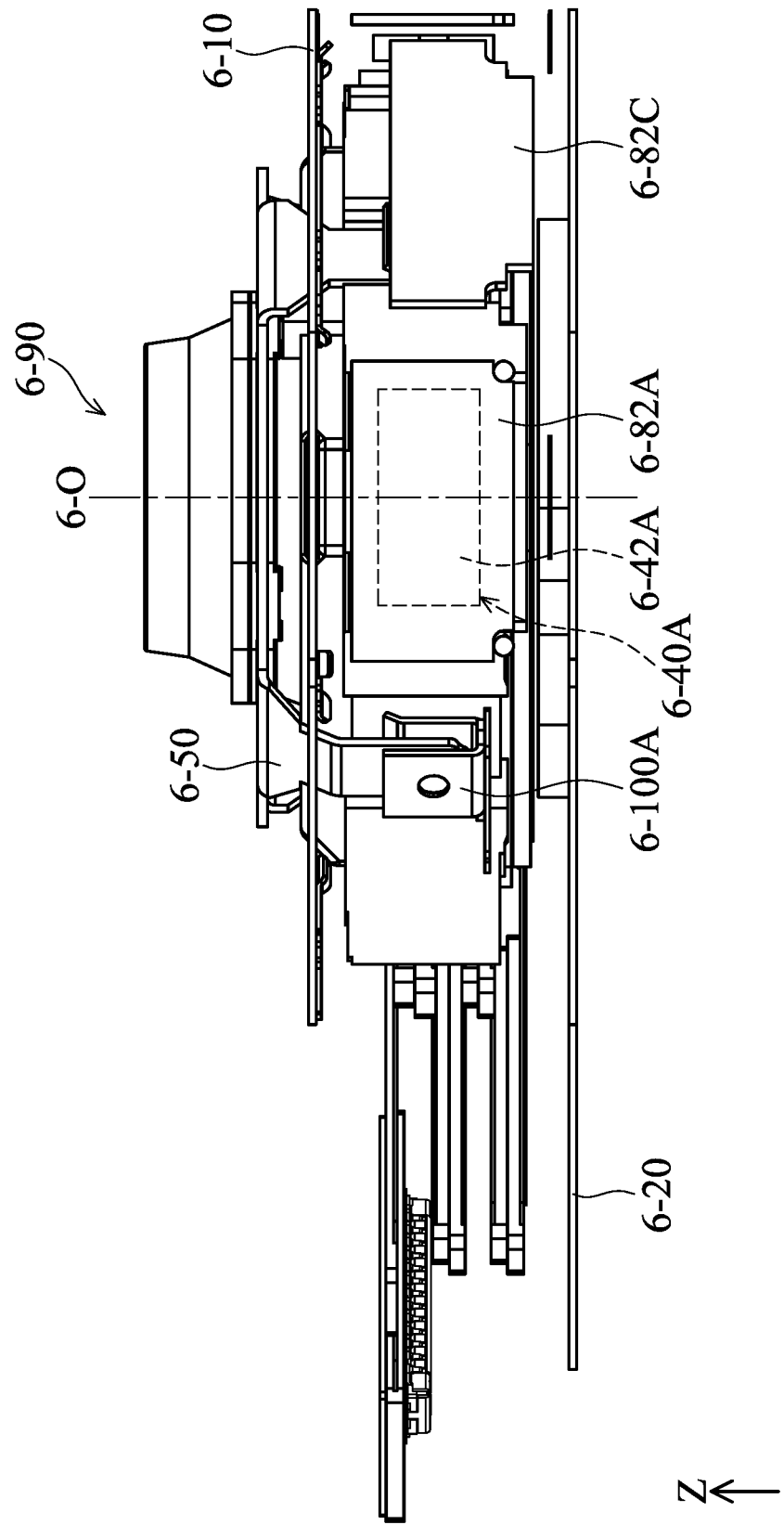

The connecting module 6-70 may be formed by magnetic conductive material (e.g. metal), and may be called as a first movable portion connecting portion 6-71. The first movable portion connecting portion 6-71 (the connecting module 6-70) may correspond to the first magnetic element 6-40A to generate a second driving force to the movable portion 6-30. In other words, the first magnetic element 6-40A may move relative to the connecting module 6-70. As shown in FIG. 79B, when viewed in a direction that is perpendicular to the first magnetic element surface 6-42A, the first movable portion connecting portion 6-71 does not overlap the first magnetic element 6-40A. Moreover, as shown in FIG. 79G, when viewed in a direction that is parallel to the first magnetic element surface 6-42A (e.g. the Z direction), at least a portion of the first movable portion connecting portion 6-71 overlaps the first magnetic element 6-40A and the first coil 6-60A. Therefore, the height of the optical system 6-100 in the Z direction may be reduced to achieve miniaturization.

It should be noted that the first magnetic conductive element 6-10 and the first movable portion connecting portion 6-71 may arrange in a direction that is parallel to the first magnetic element surface 6-42A (e.g. the Z direction). The direction of the first driving force generated between the first magnetic conductive element 6-10 and the first magnetic element 6-40A may be toward the +Z direction, and the direction of the second driving force generated between the first movable portion connecting portion 6-71 and the first magnetic element 6-40A may be toward the −Z direction. Therefore, the directions of the first driving force and the second driving force may be different (e.g. may be not parallel). Therefore, the driving forces provided by the first magnetic conductive element 6-10 and the first movable portion connecting portion 6-71 to the first magnetic element 6-40A may be balanced in the Z direction.

In some embodiments, as shown in FIG. 79D to FIG. 79G, the material of the third magnetic conductive element 6-82A may be magnetic conductive (e.g. metal), and the third magnetic conductive element 6-82A may correspond to the first magnetic element 6-40A to generate a third driving force to the movable portion 6-30, such as at least a portion of the third magnetic conductive element 6-82 overlap the first magnetic element 6-40A in a direction that is perpendicular to the first magnetic element surface 6-42A. It should be noted that the direction of the first driving force generated between the first magnetic conductive element 6-10 and the first magnetic element 6-40A may be different than the direction of the third driving force generated between the third magnetic conductive element 6-82A and the first magnetic element 6-40A.

It should be noted that as shown in FIG. 79, when viewed in a direction that is parallel to the first magnetic element surface 6-42A, the first coil 6-60A is between the first magnetic element 6-40A and the third magnetic conductive element 6-82A, and at least a portion of the first magnetic conductive element 6-10 overlaps the third magnetic conductive element 6-82A. Moreover, as shown in FIG. 79H, when viewed in a direction that is perpendicular to the first magnetic element surface 6-42A, at least a portion of the third magnetic conductive element 6-82A overlaps the first magnetic element 6-40A, and the first magnetic conductive element 6-10 does not overlap the third magnetic conductive element 6-82A. Therefore, the height of the optical system 6-100 in the Z direction may be reduced to achieve miniaturization.

In some embodiments, the circuit element 6-80 may be a circuit board that is plate-shaped, and circuit may be provided in the circuit element 6-80. The circuit element 6-80 may be electrically connected to the driving assembly 6-D. The electronic assembly 6-84 may be electrically connected to the circuit element 6-80. The electronic assembly 6-84 may include various suitable electronic elements. For example, the electronic assembly 6-84 may be a control unit used for controlling the driving assembly 6-D. Alternatively, the electronic assembly 6-84 may be a position sensor used for detecting the movement of the movable portion 6-30 relative to the fixed portion 6-F. As shown in FIG. 6B, the electronic assembly 6-84 may include an electronic assembly 6-84 facing the movable portion 6-30 and facing away from the third magnetic conductive element 6-82A. When viewed in a direction that is parallel to the electronic assembly 6-84 (e.g. viewed in the Y direction), the wall 6-22 of the bottom 6-20 of the fixed portion 6-F is between the electronic assembly 6-84 and the movable portion 6-30. In other words, at least a portion of the wall 6-22 overlaps the electronic assembly 6-84 in a direction that is perpendicular to the electronic assembly 6-84 (e.g. the X direction). The wall 6-22 may be used to separate the electronic assembly 6-84 and the movable portion 6-30 to prevent the movable portion 6-30 collide the electronic assembly 6-84 when the movable portion 6-30 is moving. In some embodiments, the circuit element 6-80 and the electronic assembly 6-84 may be called as a second circuit assembly 6-B2 which is electrically connected to the driving assembly 6-D.

Furthermore, the bottom 6-20 may include an accommodating space 6-24 corresponding to the electronic assembly 6-84. The electronic assembly 6-84 may be disposed in the accommodating space 6-24, and the electronic assembly 6-84 is between the circuit element 6-80 and the wall 6-22 when viewed in a direction that is parallel to the electronic assembly 6-84 to protect the electronic assembly 6-84. In FIG. 78, when viewed along the main axis 6-O (e.g. the Z direction), the electronic assembly 6-84 is at the fourth side 6-S4 of the fixed portion 6-F, and the second side 6-S2 and the fourth side 6-S4 are parallel.

Figure 80:
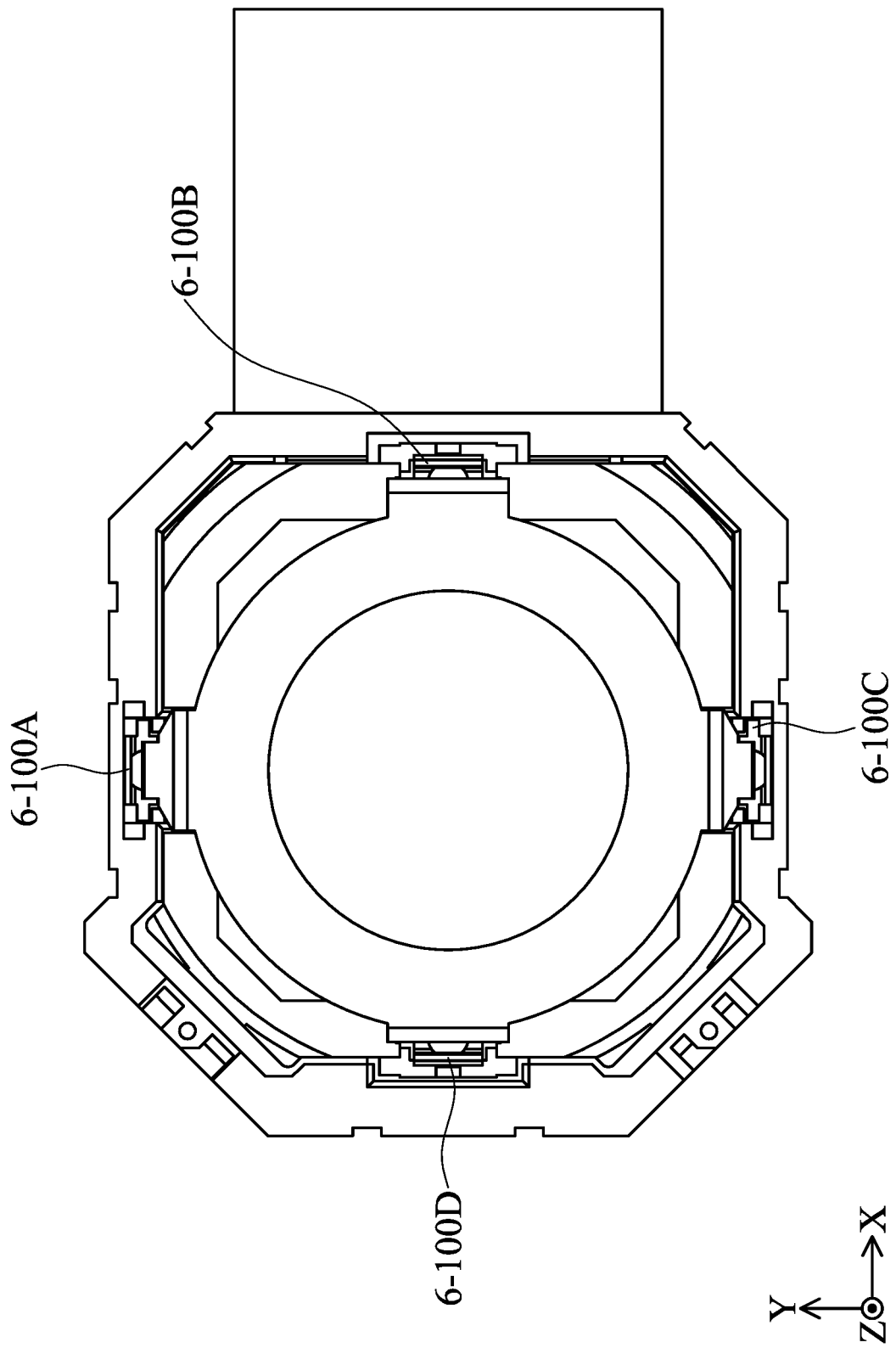
FIG. 80 is a top view of some elements of the optical system.

FIG. 80 is a top view of some elements of the optical system 6-100, wherein the case 6-10, the circuit element 6-80, and the optical assembly 6-90 are omitted in FIG. 80 for simplicity. In some embodiments, a first clipping element 6-100A and a third clipping element 6-100C may be disposed on the bottom 6-20, and a second clipping element 6-100B and a fourth clipping element 6-100D may be disposed on the movable portion 6-30. In some embodiments, the first clipping element 6-100A and the third clipping element 6-100C may be affixed on the bottom 6-20 (the fixed portion 6-F), and the second clipping element 6-100B and the fourth clipping element 6-100D may be affixed on the movable portion 6-30.

In some embodiments, when viewed along the main axis 6-O, the bottom 6-20 and the movable portion 6-30 may be polygonal (e.g. rectangular). The first clipping element 6-100A and the third clipping element 6-100C may be disposed on opposite sides of the bottom 6-20, and the second clipping element 6-100B and the fourth clipping element 6-100D may be disposed on the opposite sides of the movable portion 6-30. In some embodiments, a minimum distance between the first clipping element 6-100A and the third clipping element 6-100C may be different from a minimum distance between the second clipping element 6-100B and the fourth clipping element 6-100D.

Figure 81A:
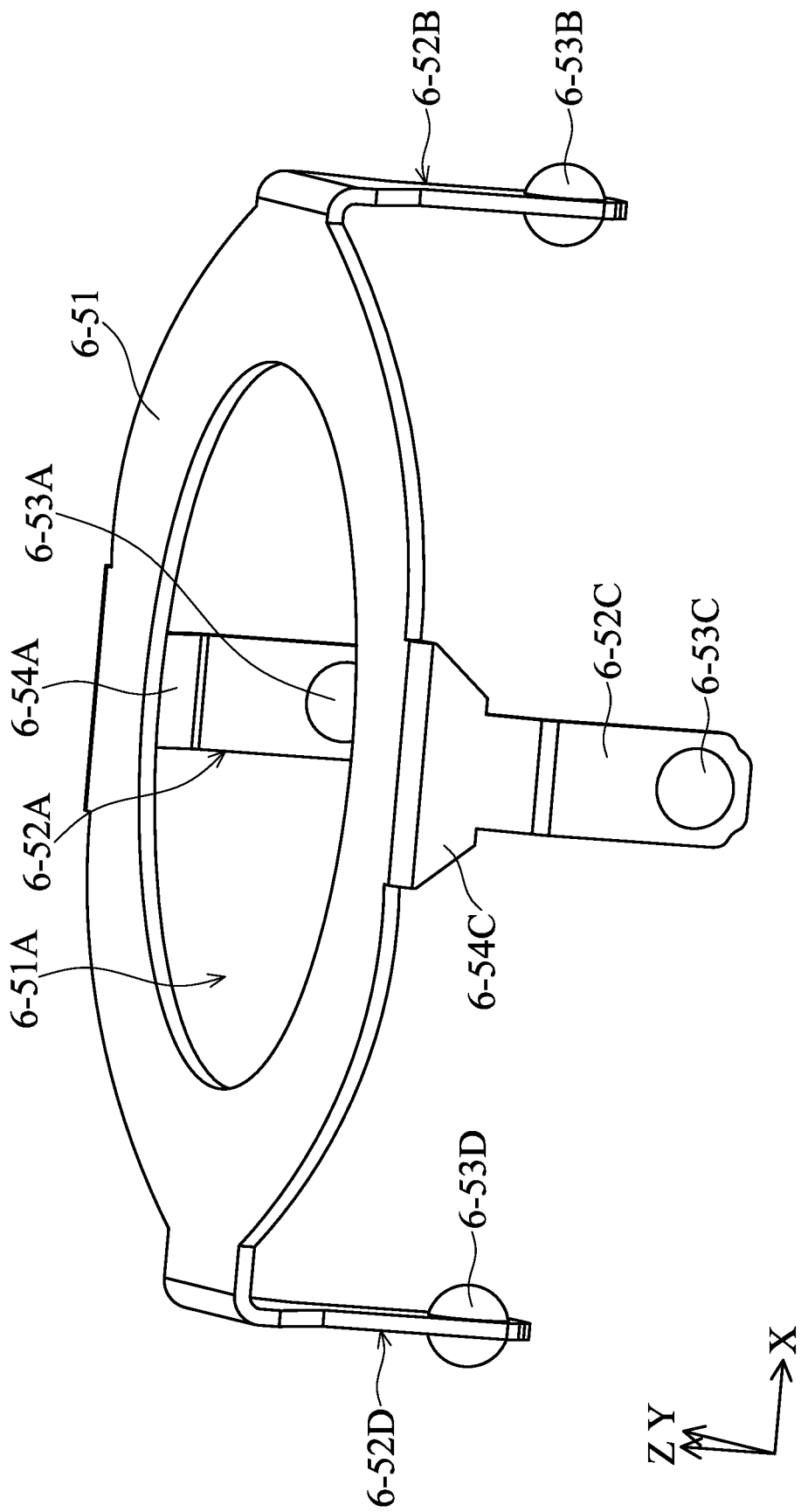
FIG. 81A is a perspective view of a frame.
Figure 81B:
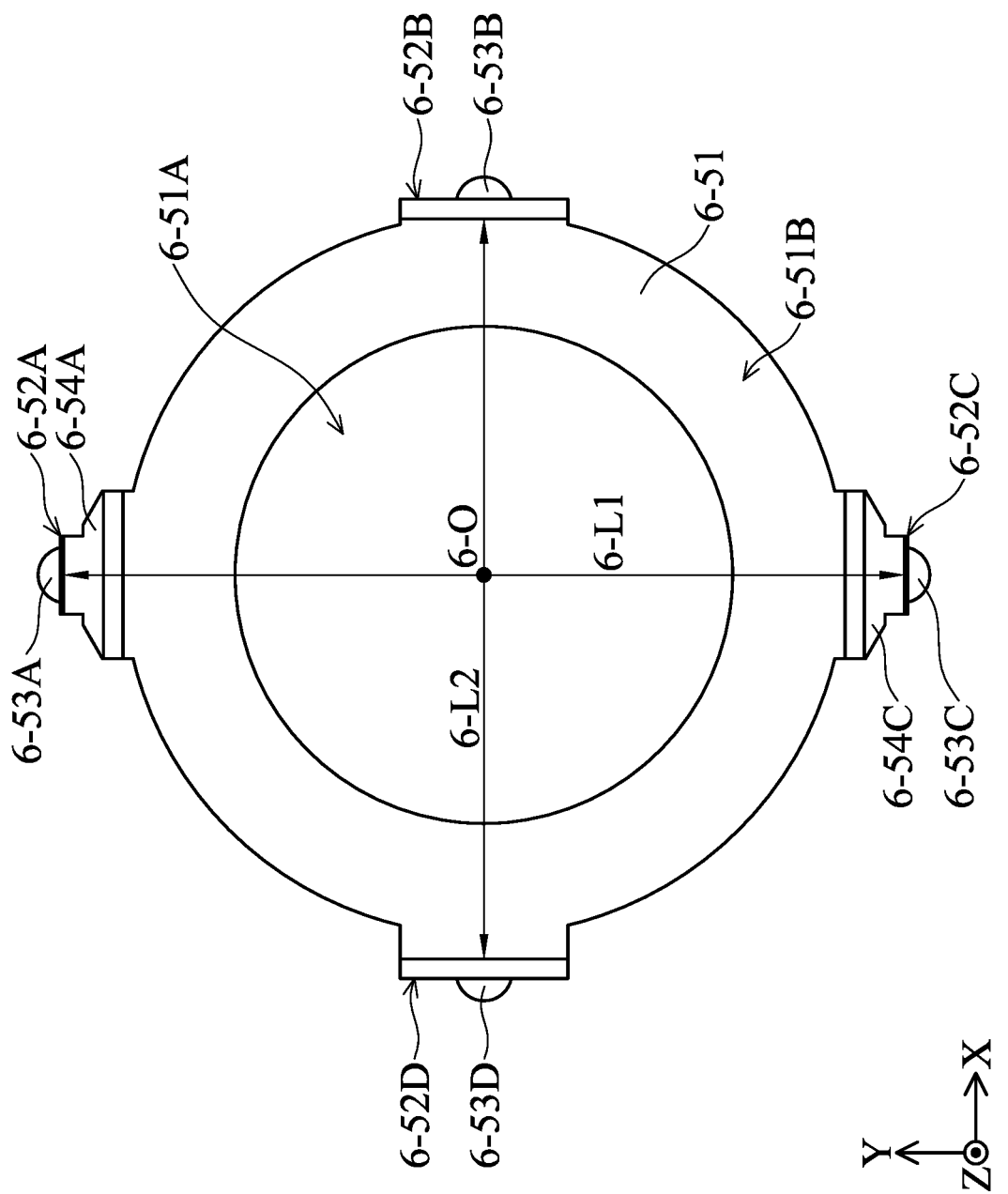
FIG. 81B is a top view of the frame.
Figure 81C:
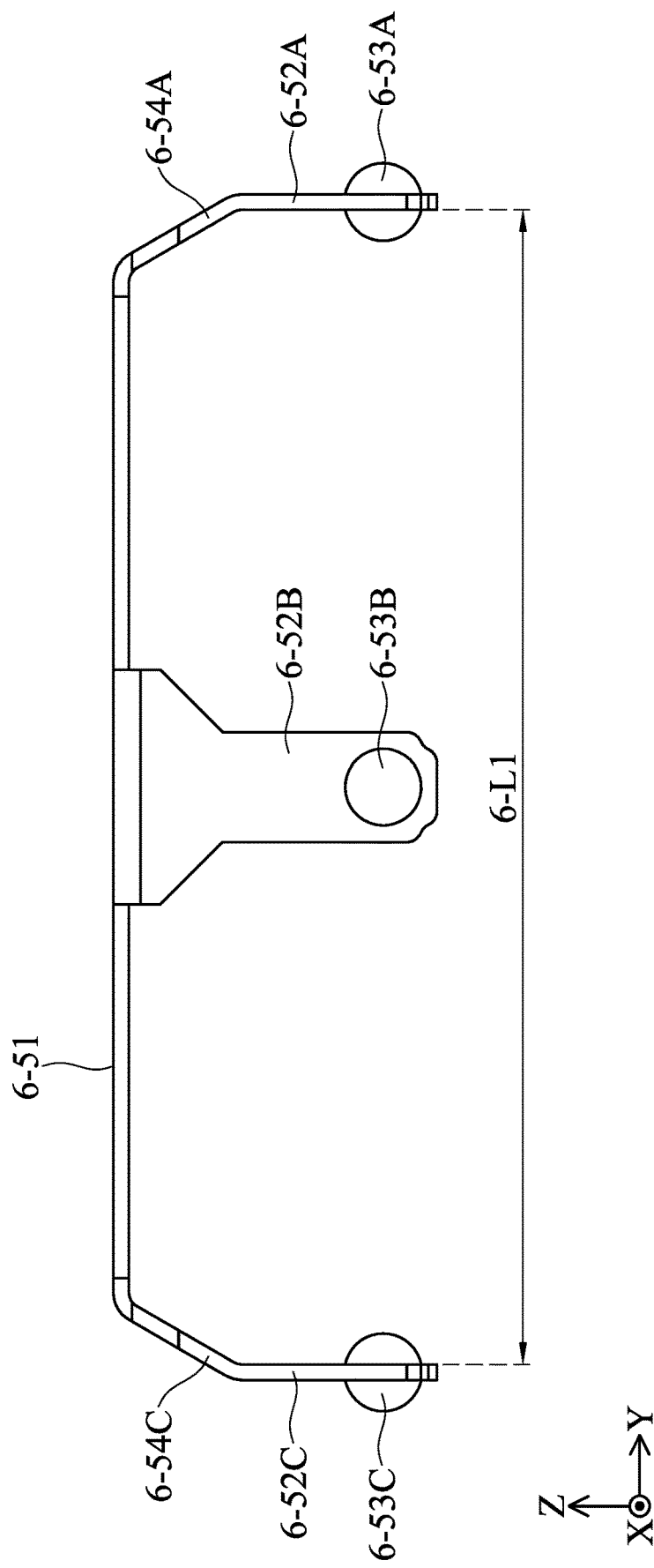
FIG. 81C and FIG. 81D are side views of the frame viewed in different directions.
Figure 81D:
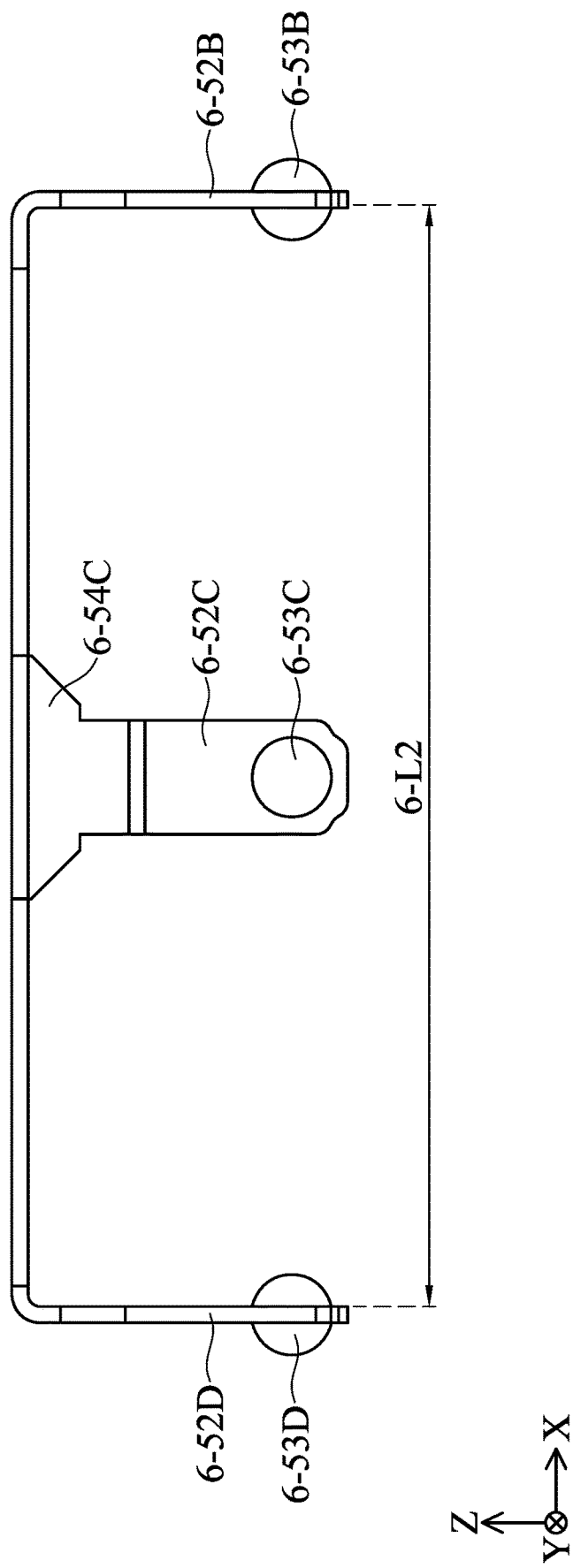

FIG. 81A is a perspective view of a frame 6-50. FIG. 81B is a top view of the frame 6-50. FIG. 81C and FIG. 81D are side views of the frame 6-50 viewed in different directions. The frame 6-50 mainly includes a main body 6-51, a first intermediate element 6-52A, a second intermediate element 6-52B, a third intermediate element 6-52C, a fourth intermediate element 6-52D, a first contact element 6-53A, a second contact element 6-53B, a third contact element 6-53C, and a fourth contact element 6-53D. Moreover, the first intermediate element 6-52A and the third intermediate element 6-52C may be connected to the main body 6-51 through a first connecting element 6-54A and a second connecting element 6-54C, respectively.

As shown in FIG. 81A and FIG. 84B, the main body 6-51 has a first opening 6-51A corresponding to the optical assembly 6-90, and the first opening 6-51A may be circular. The optical assembly 6-90 may be disposed in the main body 6-51. The main body 6-51 may be plate-shaped and may be perpendicular to the main axis 6-O, such as a top surface 6-51B of the main body 6-51 may be perpendicular to the main axis 6-O.

In some embodiments, the first intermediate element 6-52A, the second intermediate element 6-52B, the third intermediate element 6-52C, and the fourth intermediate element 6-52D may be affixed on the main body 6-51, such as may be formed as one piece with the main body 6-51 or connected to the main body 6-51 through the first connecting element 6-54A and the second connecting element 6-54C. Moreover, the first intermediate element 6-52A, the second intermediate element 6-52B, the third intermediate element 6-52C, and the fourth intermediate element 6-52D may be plate-shaped and does not parallel to the main body 6-51. In some embodiments, when viewed along the main axis 6-O, as shown in FIG. 78, the first intermediate element 6-52A and the third intermediate element 6-52C are disposed on opposite sides of the optical assembly 6-90, and the centers of the first intermediate element 6-52A and the third intermediate element 6-52C are arranged in a direction that is parallel to the second direction (the Y direction).

In some embodiments, as shown in FIG. 81B to FIG. 81D, a minimum distance 6-L1 is between the first intermediate element 6-52A and the third intermediate element 6-52C, a minimum distance 6-L2 is between the second intermediate element 6-52B and the fourth intermediate element 6-52D. In some embodiments, the first intermediate element 6-52A and the third intermediate element 6-52C are respectively connected to the main body 6-51 through the first connecting element 6-54A and the second connecting element 6-54C which extend in different directions than the first intermediate element 6-52A and the third intermediate element 6-52C, and the second intermediate element 6-52B and the fourth intermediate element 6-52D are in direct contact with the main body 6-51, so the minimum distance 6-L1 is different from the minimum distance 6-L2. For example, the minimum distance 6-L1 may be greater than the minimum distance 6-L2.

In some embodiments, the first contact element 6-53A is affixed on the first intermediate element 6-52A, the second contact element 6-53B is affixed on the second intermediate element 6-52B, the third contact element 6-53C is affixed on the third intermediate element 6-52C, the fourth contact element 6-53D is affixed on the fourth intermediate element 6-52D. Moreover, the first contact element 6-53A and the first intermediate element 6-52A may be formed as one piece, the second contact element 6-53B and the second intermediate element 6-52B may be formed as one piece, the third contact element 6-53C and the third intermediate element 6-52C may be formed as one piece, the fourth contact element 6-53D and the fourth intermediate element 6-52D may be formed as one piece. For example, the elements may be connected by welding (e.g. soldering or melting).

The material of the main body 6-51, the first intermediate element 6-52A, the second intermediate element 6-52B, the third intermediate element 6-52C, the fourth intermediate element 6-52D, the first contact element 6-53A, the second contact element 6-53B, the third contact element 6-53C, and the fourth contact element 6-53D may include metal. The materials of the first intermediate element 6-52A and the first contact element 6-53A may be different. The materials of the second intermediate element 6-52B and the second contact element 6-53B may be different. The materials of the third intermediate element 6-52C and the third contact element 6-53C may be different. The materials of the fourth intermediate element 6-52D and the fourth contact element 6-53D may be different.

The first contact element 6-53A, the second contact element 6-53B, the third contact element 6-53C, and the fourth contact element 6-53D may be disposed in the first clipping element 6-100A, the second clipping element 6-100B, the third clipping element 6-100C, and the fourth clipping element 6-100D by means of friction contact to allow the frame 6-50 to move relative to the movable portion 6-30 and the fixed portion 6-F. For example, the frame 6-50 may rotate by taking a connection between the first contact element 6-53A and the third contact element 6-53C as a rotational axis, and may rotate by taking a connection between the second contact element 6-53B and the fourth contact element 6-53D as another rotational axis.

In some embodiments, the frame 6-50, the first clipping element 6-100A, the second clipping element 6-100B, the third clipping element 6-100C, and the fourth clipping element 6-100D may be called as an intermediate module 6-C, and the movable portion 6-30 may move relative to the fixed portion 6-F through the intermediate module 6-C. The intermediate module 6-C may be in direct contact with the movable portion 6-30 and the fixed portion 6-F.

Because the first contact element 6-53A and the third contact element 6-53C are respectively disposed on the first clipping element 6-100A and the third clipping element 6-100C, and the first clipping element 6-100A and the third clipping element 6-100C are affixed on the bottom 6-20, the first contact element 6-53A and the third contact element 6-53C may be movably connected to the bottom 6-20 (the fixed portion 6-F) through the first clipping element 6-100A and the third clipping element 6-100C. Moreover, the second contact element 6-53B and the fourth contact element 6-53D are respectively disposed on the second clipping element 6-100B and the fourth clipping element 6-100D, and the first clipping element 6-100A and the third clipping element 6-100C are affixed on the bottom 6-20, so the second clipping element 6-100B and the second clipping element 6-100B may be connected to the bottom 6-20 (the fixed portion 6-F) through the first clipping element 6-100A, the third clipping element 6-100C, and the frame 6-50.

In some embodiments, the connection between the first contact element 6-53A and the third contact element 6-53C may be defined as a first rotational axis 6-A1, and the connection between the second contact element 6-53B and the fourth contact element 6-53D may be defined as a second rotational axis 6-A2. The movable portion 6-30 may rotate by taking the second rotational axis 6-A2 as its rotational axis relative to the frame 6-50, and the movable portion 6-30 and the frame 6-50 may rotate by taking the first rotational axis 6-A1 as their rotational axis relative to the fixed portion 6-F. In other words, the movable portion 6-30 and the optical assembly 6-90 disposed on the movable portion 6-30 may rotate in multiple directions to achieve optical image stabilization. In some embodiments, the first rotational axis 6-A1 and the second rotational axis 6-A2 may be perpendicular to the main axis 6-O, and the first rotational axis 6-A1, the second rotational axis 6-A2, the main axis 6-O may extend in different directions.

In summary, an optical system is provided. The optical system includes a movable portion, a fixed portion, a driving assembly, and an intermediate module. The movable portion is used for connecting to an optical assembly. The movable portion is movable relative to the fixed portion. The driving assembly is used for driving the movable portion to move relative to the fixed portion. The movable portion is movable relative to the fixed portion through the intermediate module. The intermediate module is in direct contact with the movable portion and the fixed portion. The design of present disclosure may allow the optical element to move in different directions to enhance the performance of the optical module, and may achieve miniaturization.

The relative positions and size relationship of the elements in the present disclosure may allow the optical system achieving miniaturization in specific directions or for the entire mechanism. Moreover, different optical modules may be combined with the optical system to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system, comprising:
a movable portion used for connecting to an optical assembly;
a fixed portion, comprising a case and a bottom arranged along a main axis, wherein the movable portion is movable relative to the fixed portion; and
a driving assembly used for driving the movable portion to move relative to the fixed portion;
an intermediate module, wherein the movable portion is movable relative to the fixed portion through the intermediate module, and the intermediate module is in direct contact with the fixed portion and the movable portion; and
a connecting module, wherein the movable portion is movably connected to the fixed portion through the connecting module, and the connecting module comprises:
  a first movable portion connecting portion affixed on the movable portion;
  a first fixed portion connecting portion affixed on the fixed portion; and
  a first resilient portion, wherein the first movable portion connecting portion is movably connected to the first fixed portion connecting portion through the first resilient portion;
wherein an elastic modulus of the first movable portion connecting portion relative to the first fixed portion connecting portion in a first direction is different from an elastic modulus of the first movable portion connecting portion relative to the first fixed portion connecting portion in a second direction;
the first direction, the second direction, and the main axis are not parallel.

2. The optical system as claimed in claim 1, wherein:
an elastic modulus of the first movable portion connecting portion relative to the first fixed portion connecting portion when rotating relative to a rotational axis extending in the first direction is different from an elastic modulus of the first movable portion connecting portion relative to the first fixed portion connecting portion when rotating relative to a rotational axis extending in the second direction;
the first movable portion connection portion comprises a heat spreader.

3. The optical system as claimed in claim 2, wherein:
the elastic modulus of the first movable portion connecting portion relative to the first fixed portion connecting portion in the first direction is less than the elastic modulus of the first movable portion connecting portion relative to the first fixed portion connecting portion in the second direction;
the first direction and the second direction are perpendicular;
the elastic modulus of the first movable portion connecting portion relative to the first fixed portion connecting portion when rotating relative to the rotational axis extending in the first direction is higher than the elastic modulus of the first movable portion connecting portion relative to the first fixed portion connecting portion when rotating relative to the rotational axis extending in the second direction;
the heat spreader comprises a heat sink.

4. The optical system as claimed in claim 3, further comprising a first circuit assembly electrically connected to the optical assembly, wherein the first circuit assembly comprises:
a second movable portion connecting portion affixed on the optical assembly;
a second fixed portion connecting portion directly or indirectly connected to the fixed portion; and
a second resilient portion, wherein the second movable portion connecting portion is movably connected to the second fixed portion connecting portion through the second resilient portion.

5. The optical system as claimed in claim 4, wherein:
an elastic modulus of the second movable portion connecting portion relative to the second fixed portion connecting portion in the first direction is different from an elastic modulus of the second movable portion connecting portion relative to the second fixed portion connecting portion in the second direction;
an elastic modulus of the second movable portion connecting portion relative to the second fixed portion connecting portion when rotating relative to the rotational axis extending in the first direction is different from an elastic modulus of the second movable portion connecting portion relative to the second fixed portion connecting portion when rotating relative to the rotational axis extending in the second direction.

6. The optical system as claimed in claim 5, wherein:
the elastic modulus of the second movable portion connecting portion relative to the second fixed portion connecting portion in the first direction is higher than the elastic modulus of the second movable portion connecting portion relative to the second fixed portion connecting portion in the second direction;
the elastic modulus of the second movable portion connecting portion relative to the second fixed portion connecting portion when rotating relative to the rotational axis extending in the first direction is less than the elastic modulus of the second movable portion connecting portion relative to the second fixed portion connecting portion when rotating relative to the rotational axis extending in the second direction.

7. The optical system as claimed in claim 6, wherein:
the first direction and the second direction are perpendicular to the main axis;
when viewed along the main axis, the fixed portion is polygonal;
when viewed along the main axis, the fixed portion comprises a first side extending in the first direction and a second side extending in the second direction;
when viewed along the main axis, the second resilient portion is disposed at the second side;
when viewed along the main axis, the first resilient portion is not disposed at the second side;
when viewed along the main axis, the first resilient portion comprises a first resilient unit, wherein the first resilient unit is disposed at the second side;
when viewed along the main axis, the first resilient portion further comprises a second resilient unit, the fixed portion further comprises a third side, wherein the second resilient unit is disposed at the third side;
when viewed along the main axis, the first side and the third side extend in parallel directions.

8. The optical system as claimed in claim 7, wherein the driving assembly comprises:

a first driving assembly used for driving the movable portion to move relative to the fixed portion in a first dimension, wherein the first driving assembly comprises:
a first coil; and
a first magnetic element comprising a first magnetic element surface facing the first coil.

9. The optical system as claimed in claim 8, wherein:
the first magnetic element surface is not parallel to the first direction;
the first magnetic element surface is not perpendicular to the first direction;
the first magnetic element surface is not parallel to the second direction;
the first magnetic element surface is not perpendicular to the second direction;
the optical system further comprises:
a first magnetic conductive element corresponding to the first magnetic element to generate a first driving force to the movable portion;
a second magnetic conductive element corresponding to the first magnetic element to generate a second driving force to the movable portion;
a third magnetic conductive element corresponding to the first magnetic element to generate a third driving force to the movable portion;
the first magnetic element is movable relative to the first magnetic conductive element.

10. The optical system as claimed in claim 9, wherein:
when viewed in a direction that is perpendicular to the first magnetic element surface, the first magnetic conductive element does not overlap the first magnetic element;
when viewed in a direction that is parallel to the first magnetic element surface, at least a portion of the first magnetic conductive element overlaps the first magnetic element;
directions of the first driving force and the second driving force are different;
the first magnetic element is movable relative to the second magnetic conductive element;
when viewed in a direction that is parallel to the first magnetic element surface, at least a portion of the second magnetic conductive element overlaps the first coil;
the first magnetic conductive element and the second magnetic conductive element are arranged in a direction that is parallel to the first magnetic element surface;
the direction of the first driving force is different from a direction of the third driving force;
when viewed in a direction that is parallel to the first magnetic element surface, the first coil is between the first magnetic element and the third magnetic conductive element;
when viewed in a direction that is perpendicular to the first magnetic element surface, at least a portion of the third magnetic conductive element overlaps the first magnetic element;
when viewed in a direction that is perpendicular to the first magnetic element surface, the first magnetic conductive element does not overlap the third magnetic conductive element;
when viewed in a direction that is parallel to the first magnetic element surface, at least a portion of the first magnetic conductive element overlaps the third magnetic conductive element.

11. The optical system as claimed in claim 10, further comprising a second driving assembly used for driving the movable portion to move relative to the fixed portion in a second dimension, wherein the second driving assembly comprises:
a second coil; and
a second magnetic element corresponding to the second coil.

12. The optical system as claimed in claim 11, wherein:
when viewed along the main axis, a connection between centers of the first magnetic element and the second magnetic element is parallel to the second direction;
when viewed along the main axis, the connection between the centers of the first magnetic element and the second magnetic element does not penetrate a center of the optical assembly.

13. The optical system as claimed in claim 12, further comprising a second circuit assembly electrically connected to the driving assembly, wherein the second circuit assembly comprises:
a circuit element comprising a circuit, wherein the circuit element is electrically connected to the driving assembly; and
an electronic element electrically connected to the circuit element.

14. The optical system as claimed in claim 13, wherein:
the circuit element is plate-shaped;
the electronic element comprises a control unit for controlling the driving assembly or comprises a position sensor used for detecting the movement of the movable portion relative to the fixed portion;
the electronic element comprises an electronic element surface facing the movable portion.

15. The optical system as claimed in claim 14, wherein:
when viewed in a direction that is parallel to the electronic element surface, the fixed portion comprises a wall, and the wall is disposed between the electronic element and the movable portion;
when viewed in a direction that is perpendicular to the electronic element surface, at least a portion of the wall overlaps the electronic element;
the fixed portion comprises an accommodating space corresponding to the electronic element;
when viewed along the main axis, the electronic element is disposed at a fourth side of the fixed portion;
the fourth side is parallel to the second side.

16. The optical system as claimed in claim 15, wherein the intermediate module comprises:
a main body;
a first intermediate element affixed on the main body;
a second intermediate element affixed on the main body;
a third intermediate element affixed on the main body;
a fourth intermediate element affixed on the main body;
a first connecting element connected to the main body and the first intermediate element; and
a second connecting element connected to the main body and the second intermediate element.

17. The optical system as claimed in claim 16, wherein
the main body comprises a first opening corresponding to the optical element;
the first opening is circular;
the main body is movably connected to the fixed portion through the first intermediate element;
the main body is movably connected to the movable portion through the second intermediate element;
the main body is movably connected to the fixed portion through the third intermediate element;

the main body is movably connected to the movable portion through the fourth intermediate element;

a minimum distance between the first intermediate element and the third intermediate element is different from a minimum distance between the second intermediate element and the fourth intermediate element.

18. The optical system as claimed in claim 17, wherein:

the minimum distance between the first intermediate element and the third intermediate element is greater than the minimum distance between the second intermediate element and the fourth intermediate element;

the main body is plate-shaped;

the first intermediate element is plate-shaped;

the first intermediate element is not parallel to the main body;

the first intermediate element is parallel to the main axis;

the first connecting element is plate-shaped;

the first connecting element is not parallel to the main axis;

the second intermediate element is plate-shaped;

the second intermediate element is parallel to the main axis;

the first connecting element and the second intermediate element are not parallel.

19. The optical system as claimed in claim 18, wherein:

when viewed along the main axis, the first intermediate element and the third intermediate element are disposed on opposite sides of the optical assembly;

when viewed along the main axis, a center of the first intermediate element and a center of the third intermediate element are arranged in a direction that is parallel to the second direction.

\* \* \* \* \*